(12) United States Patent
Ito et al.

(10) Patent No.: US 12,174,355 B2
(45) Date of Patent: Dec. 24, 2024

(54) ZOOM OPTICAL SYSTEM, IMAGING DEVICE AND METHOD FOR MANUFACTURING THE ZOOM OPTICAL SYSTEM

(71) Applicant: Nikon Corporation, Tokyo (JP)

(72) Inventors: Tomoki Ito, Kawasaki (JP); Hiroshi Yamamoto, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 17/879,741

(22) Filed: Aug. 2, 2022

(65) Prior Publication Data

US 2022/0373774 A1 Nov. 24, 2022

Related U.S. Application Data

(60) Division of application No. 16/599,107, filed on Oct. 10, 2019, now Pat. No. 11,428,911, which is a
(Continued)

(30) Foreign Application Priority Data

Mar. 27, 2014 (JP) ................................ 2014-067072
Mar. 27, 2014 (JP) ................................ 2014-067073
(Continued)

(51) Int. Cl.
  *G02B 15/14* (2006.01)
  *G02B 5/00* (2006.01)
  (Continued)

(52) U.S. Cl.
  CPC ...... *G02B 15/144113* (2019.08); *G02B 5/005* (2013.01); *G02B 15/143105* (2019.08); *G02B 27/0025* (2013.01); *G02B 27/646* (2013.01)

(58) Field of Classification Search
  CPC ................ G02B 15/143105; G02B 15/144113
  (Continued)

(56) References Cited

U.S. PATENT DOCUMENTS 4,636,040 A * 1/1987 Tokumaru ...... G02B 15/143507
  359/689
4,639,095 A 1/1987 Kato
(Continued)

FOREIGN PATENT DOCUMENTS

CN 101315458 A 12/2008
CN 102087403 A 6/2011
(Continued)

OTHER PUBLICATIONS

International Preliminary Report on Patentability from International Patent Application No. PCT/JP2015/001718, Sep. 27, 2016.
(Continued)

*Primary Examiner* — Zachary W Wilkes
(74) *Attorney, Agent, or Firm* — Potomac Law Group, PLLC

(57) ABSTRACT

A zoom optical system includes, in order from an object, a first lens group, a second lens group, and a third lens group having positive, negative, and positive refractive powers, respectively. The first lens group moves toward the object and air distances between the first to third lens groups vary upon zooming from a wide-angle end state to a tele-photo end state. The first lens group comprises a cemented lens consisting of a negative lens and a positive lens in order from the object. The following conditional expressions are satisfied:

$4.40 < f1/(-f2) < 8.00$ $0.60 < f3/fw < 3.50$ $0.60 < (-f2)/f3 < 1.05$ $30.00° < \omega w < 80.000$ (Continued)

f1, f2, and f3 denoting focal lengths of the first to third lens groups, respectively, and fw and ow denoting a focal length of the zoom optical system and a half angle of view in the wide-angle end state, respectively.

5 Claims, 78 Drawing Sheets

Related U.S. Application Data division of application No. 15/256,738, filed on Sep. 6, 2016, now Pat. No. 10,466,454, which is a continuation of application No. PCT/JP2015/001718, filed on Mar. 26, 2015.

(30) Foreign Application Priority Data

| Mar. 27, 2014 | (JP) | ................................ | 2014-067074 |
|---|---|---|---|
| Mar. 27, 2014 | (JP) | ................................ | 2014-067076 |
| Mar. 27, 2014 | (JP) | ................................ | 2014-067079 |
| Mar. 27, 2014 | (JP) | ................................ | 2014-067080 |

(51) Int. Cl.
  G02B 27/00 (2006.01)
  G02B 27/64 (2006.01)

(58) Field of Classification Search
  USPC .................................................. 359/690, 687
  See application file for complete search history.

(56) References Cited

U.S. PATENT DOCUMENTS

| 4,650,291 | A | | 3/1987 | Kato | |
|---|---|---|---|---|---|
| 4,749,265 | A | * | 6/1988 | Hattori | G02B 15/1451 |
| | | | | | 359/683 |
| 4,865,434 | A | * | 9/1989 | Matsushita | G02B 15/143105 |
| | | | | | 359/705 |
| 4,925,280 | A | | 5/1990 | Hashimoto | |
| 4,963,006 | A | | 10/1990 | Inadome | |
| 5,103,343 | A | | 4/1992 | Sekita | |
| 5,105,311 | A | * | 4/1992 | Tokumaru | G02B 15/144105 |
| | | | | | 359/686 |
| 5,185,678 | A | | 2/1993 | Arimoto | |
| 5,257,135 | A | | 10/1993 | Kohno et al. | |
| 5,543,969 | A | | 8/1996 | Ito | |
| 5,543,970 | A | | 8/1996 | Hata et al. | |
| 5,583,701 | A | * | 12/1996 | Yamanashi | G02B 15/145129 |
| | | | | | 359/683 |
| 5,600,490 | A | | 2/1997 | Sugawara et al. | |
| 5,610,766 | A | * | 3/1997 | Aoki | G02B 15/145129 |
| | | | | | 359/683 |
| 5,654,826 | A | | 8/1997 | Suzuki | |
| 5,828,499 | A | | 10/1998 | Ohtake | |
| 5,973,854 | A | * | 10/1999 | Shimo | G02B 15/145129 |
| | | | | | 359/683 |
| 6,010,537 | A | | 1/2000 | Konno et al. | |
| 6,081,385 | A | * | 6/2000 | Konno | G02B 27/0025 |
| | | | | | 359/557 |
| 6,307,685 | B1 | | 10/2001 | Mori et al. | |
| 6,333,823 | B1 | | 12/2001 | Ozaki et al. | |
| 6,362,925 | B1 | | 3/2002 | Nakamura et al. | |
| 6,462,885 | B2 | * | 10/2002 | Nishio | G02B 15/144113 |
| | | | | | 359/557 |
| 6,498,687 | B1 | | 12/2002 | Sekita et al. | |
| 6,545,819 | B1 | | 4/2003 | Nanba et al. | |
| 6,867,925 | B1 | | 3/2005 | Sato | |
| 7,177,092 | B2 | * | 2/2007 | Satori | G02B 15/145121 |
| | | | | | 359/683 |
| 10,466,454 | B2 | | 11/2019 | Ito et al. | |
| 2001/0022696 | A1 | * | 9/2001 | Nishio | G02B 15/144113 |
| | | | | | 359/686 |
| 2002/0097503 | A1 | | 7/2002 | Kohno et al. | |
| 2003/0133201 | A1 | | 7/2003 | Nanba et al. | |
| 2003/0197951 | A1 | | 10/2003 | Nanba et al. | |
| 2005/0024749 | A1 | | 2/2005 | Nanba et al. | |
| 2005/0030642 | A1 | | 2/2005 | Nanba et al. | |
| 2005/0041303 | A1 | | 2/2005 | Nanba et al. | |
| 2005/0068637 | A1 | | 3/2005 | Suzuki | |
| 2006/0056057 | A1 | * | 3/2006 | Nishio | G02B 15/143105 |
| | | | | | 359/690 |
| 2006/0072212 | A1 | | 4/2006 | Nanba et al. | |
| 2006/0238889 | A1 | | 10/2006 | Nanba et al. | |
| 2006/0238890 | A1 | | 10/2006 | Nanba et al. | |
| 2007/0024987 | A1 | | 2/2007 | Ori | |
| 2007/0070524 | A1 | | 3/2007 | Sato | |
| 2007/0183042 | A1 | | 8/2007 | Mizuguchi | |
| 2008/0100924 | A1 | | 5/2008 | Sato | |
| 2008/0112064 | A1 | | 5/2008 | Ishii et al. | |
| 2009/0040622 | A1 | * | 2/2009 | Iwama | G02B 15/144113 |
| | | | | | 359/687 |
| 2009/0147376 | A1 | | 6/2009 | Take | |
| 2009/0231726 | A1 | * | 9/2009 | Nanba | G02B 15/144113 |
| | | | | | 359/687 |
| 2010/0214658 | A1 | | 8/2010 | Ito | |
| 2011/0069396 | A1 | | 3/2011 | Ishii et al. | |
| 2011/0116173 | A1 | | 5/2011 | Itoh | |
| 2011/0122508 | A1 | | 5/2011 | Miwa et al. | |
| 2011/0149412 | A1 | | 6/2011 | Sato | |
| 2011/0261469 | A1 | | 10/2011 | Arai | |
| 2011/0273780 | A1 | * | 11/2011 | Hosoi | G02B 13/06 |
| | | | | | 359/683 |
| 2012/0038816 | A1 | | 2/2012 | Yamano | |
| 2012/0105976 | A1 | | 5/2012 | Kim | |
| 2012/0300313 | A1 | | 11/2012 | Wada | |
| 2013/0003191 | A1 | | 1/2013 | Kanai | |
| 2013/0050843 | A1 | | 2/2013 | Nakamura | |
| 2013/0201370 | A1 | | 8/2013 | Hatada | |
| 2014/0368913 | A1 | | 12/2014 | Kawamura | |
| 2014/0368925 | A1 | | 12/2014 | Kawamura | |
| 2015/0043086 | A1 | | 2/2015 | Yamashita | |
| 2017/0068076 | A1 | | 3/2017 | Ito et al. | |
| 2017/0176726 | A1 | | 6/2017 | Yamashita | |

FOREIGN PATENT DOCUMENTS

| CN | 104238097 | A | | 12/2014 | |
|---|---|---|---|---|---|
| CN | 104238098 | A | | 12/2014 | |
| JP | 58-199313 | A | | 11/1983 | |
| JP | 59-030515 | A | | 2/1984 | |
| JP | 63-298210 | A | | 12/1988 | |
| JP | 01-201614 | A | | 8/1989 | |
| JP | 04-083214 | A | | 3/1992 | |
| JP | 04-106512 | A | | 4/1992 | |
| JP | 04-149402 | A | | 5/1992 | |
| JP | 04-317020 | A | | 11/1992 | |
| JP | 06-138390 | A | | 5/1994 | |
| JP | 08-271788 | A | | 10/1996 | |
| JP | 08-278445 | A | | 10/1996 | |
| JP | H09101459 | A | * | 4/1997 | ..... G02B 15/144113 |
| JP | 2000-187160 | A | | 7/2000 | |
| JP | 2000-275526 | A | | 10/2000 | |
| JP | 2000-347102 | A | | 12/2000 | |
| JP | 2001-141996 | A | | 5/2001 | |
| JP | 2001-281545 | A | | 10/2001 | |
| JP | 2004-258239 | A | | 9/2004 | |
| JP | 2005-106925 | A | | 4/2005 | |
| JP | 2005-148437 | A | | 6/2005 | |
| JP | 2005-275435 | A | | 10/2005 | |
| JP | 2006-154481 | A | | 6/2006 | |
| JP | 2006-163075 | A | | 6/2006 | |
| JP | 2007-034064 | A | | 2/2007 | |
| JP | 2007-122019 | A | | 5/2007 | |
| JP | 2007-206542 | A | | 8/2007 | |
| JP | 2007-316146 | A | | 12/2007 | |
| JP | 2007-334215 | A | | 12/2007 | |
| JP | 2008-122676 | A | | 5/2008 | |
| JP | 2008-181147 | A | | 8/2008 | |
| JP | 2009-133941 | A | | 6/2009 | |
| JP | 2009-210691 | A | | 9/2009 | |

(56) References Cited

FOREIGN PATENT DOCUMENTS

| | | |
|---|---|---|
| JP | 2009-223008 A | 10/2009 |
| JP | 2010-044190 A | 2/2010 |
| JP | 2011-107311 A | 6/2011 |
| JP | 2011-232503 A | 11/2011 |
| JP | 2012-42557 A | 3/2012 |
| JP | 2013-008007 A | 1/2013 |
| JP | 2013-011641 A | 1/2013 |
| JP | 2013-044815 A | 3/2013 |
| JP | 2013-145286 A | 7/2013 |
| JP | 2013-182017 A | 9/2013 |
| JP | 2013-210475 A | 10/2013 |
| JP | 2013-210571 A | 10/2013 |
| JP | 2013-254160 A | 12/2013 |
| JP | 2013-257508 A | 12/2013 |
| JP | 2014-044243 A | 3/2014 |
| JP | 2014-044319 A | 3/2014 |
| JP | 2014-066946 A | 4/2014 |
| JP | 2014-157225 A | 8/2014 |
| JP | 2015-001538 A | 1/2015 |
| JP | 2015-001539 A | 1/2015 |
| JP | 2015-191060 A | 11/2015 |
| JP | 2015-191064 A | 11/2015 |

OTHER PUBLICATIONS

International Search Report from International Patent Application No. PCT/JP2015/001718, Jun. 23, 2015.
Extended European Search Report issued Aug. 31, 2017, in European Patent Application No. 15770184.8.
Office Action and Written Notice of Same Day Filing of Application by Same Applicant issued Nov. 28, 2017, in Japanese Patent Application No. 2014-067076.
Office Action and Written Notice of Same Day Filing of Application by Same Applicant issued Nov. 28, 2017, in Japanese Patent Application No. 2014-067080.
Office Action issued Dec. 12, 2017, in Japanese Patent Application No. 2014-067072.
Office Action issued Dec. 12, 2017, in Japanese Patent Application No. 2014-067073.
Office Action issued Dec. 12, 2017, in Japanese Patent Application No. 2014-067074.
Office Action issued Nov. 7, 2017, in Japanese Patent Application No. 2014-067079.
Office Action issued Jul. 5, 2018, in European Patent Application No. 15770184.8.
Office Action issued Aug. 7, 2018, in Japanese Patent Application No. 2014-067079.
Office Action issued Sep. 18, 2018, in Japanese Patent Application No. 2014-067072.
Decision of Refusal issued Sep. 18, 2018, in Japanese Patent Application No. 2014-067073.
Decision of Refusal issued Sep. 18, 2018, in Japanese Patent Application No. 2014-067074.
First Examination Report issued Dec. 28, 2018, in Indian Patent Application No. 201617036762.
Office Action issued Nov. 14, 2018, in Chinese Patent Application No. 201580016772.7.
Office Action issued Mar. 14, 2018, in Chinese Patent Application No. 201580016772.7.
Office Action issued Apr. 6, 2021, in Chinese Patent Application No. 201910777692.3.
Office Action issued Sep. 15, 2021, in Chinese Patent Application No. 201910777692.3.
Office Action issued Mar. 25, 2022, in Chinese Patent Application No. 201910777692.3.

* cited by examiner

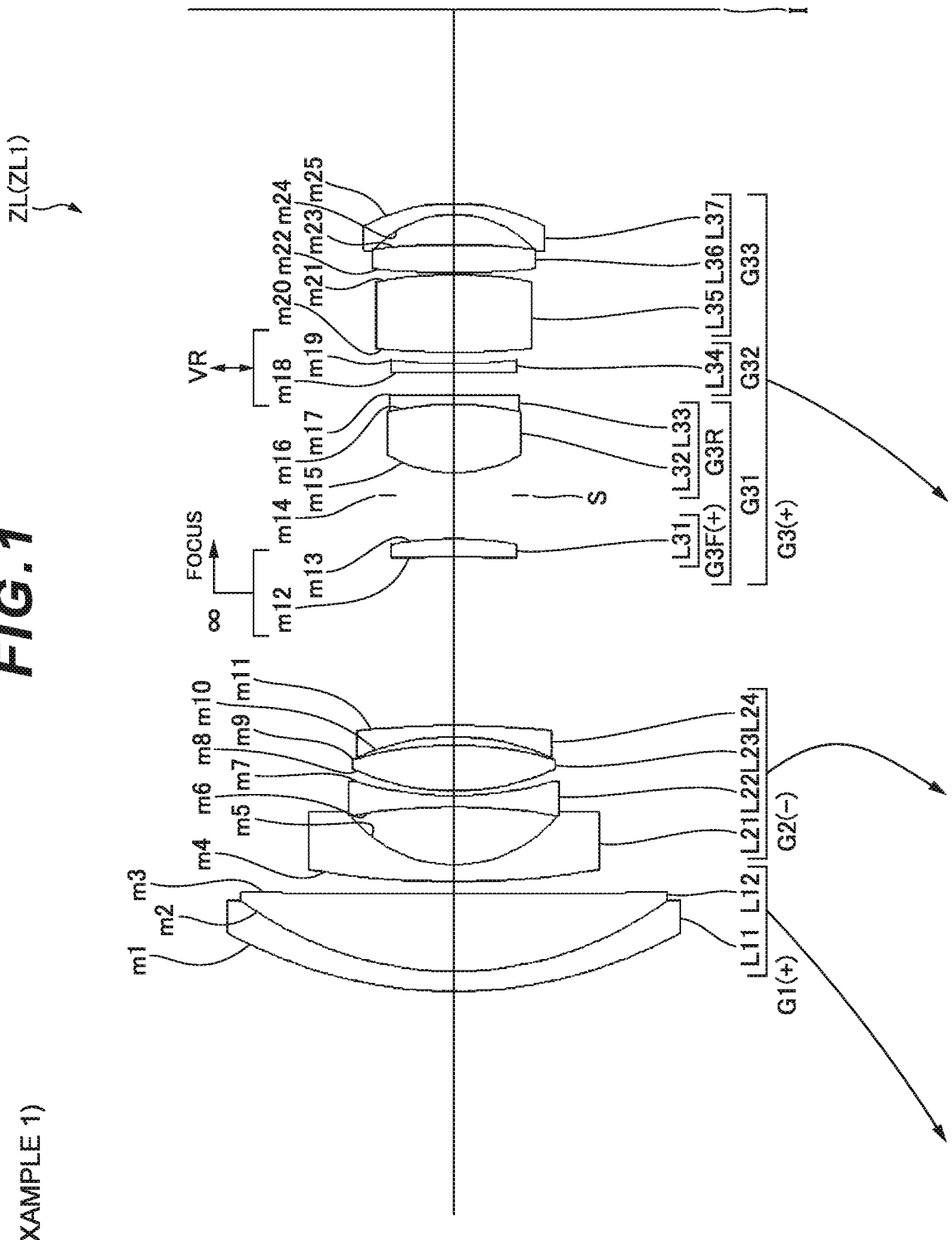

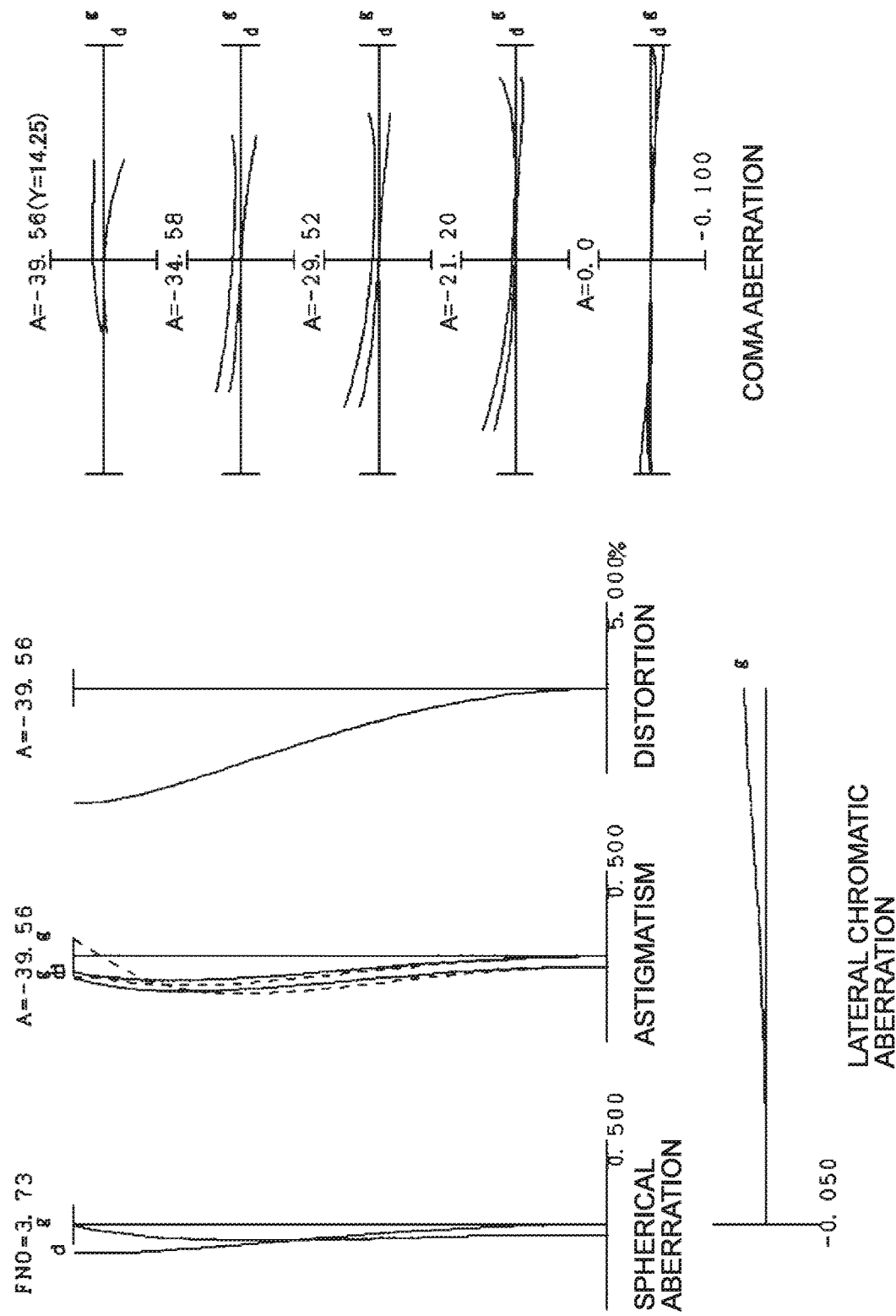

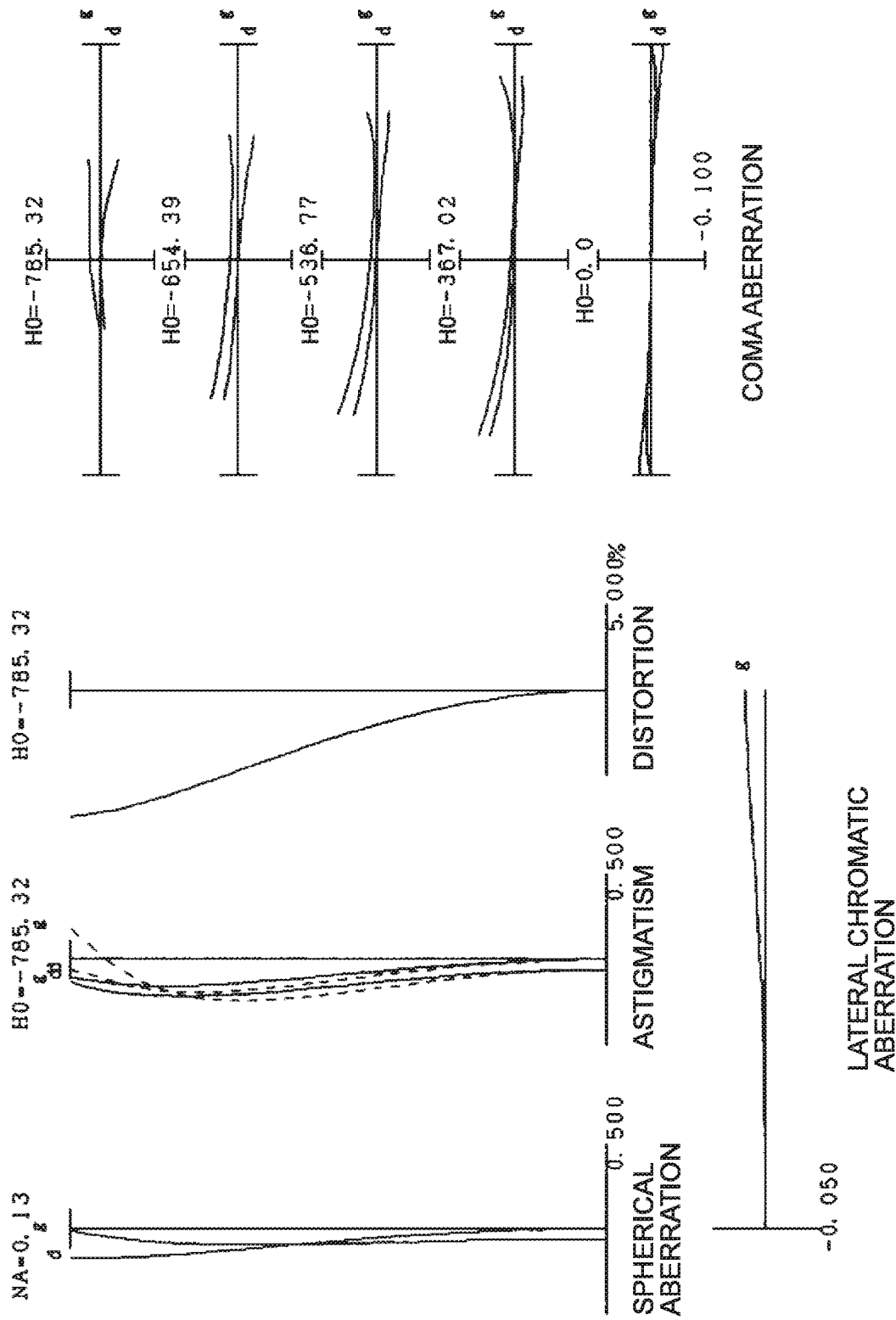

COMA ABERRATION

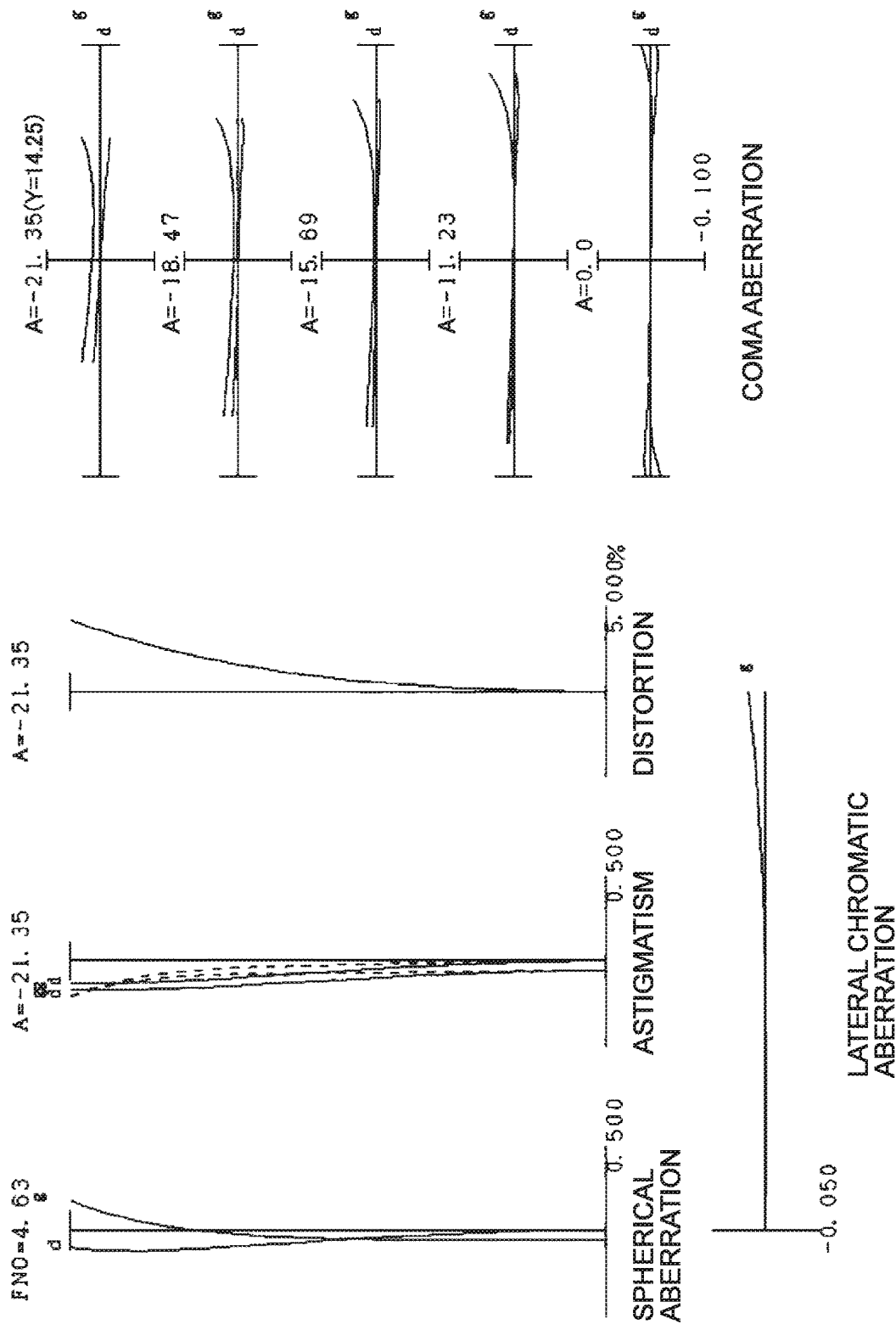

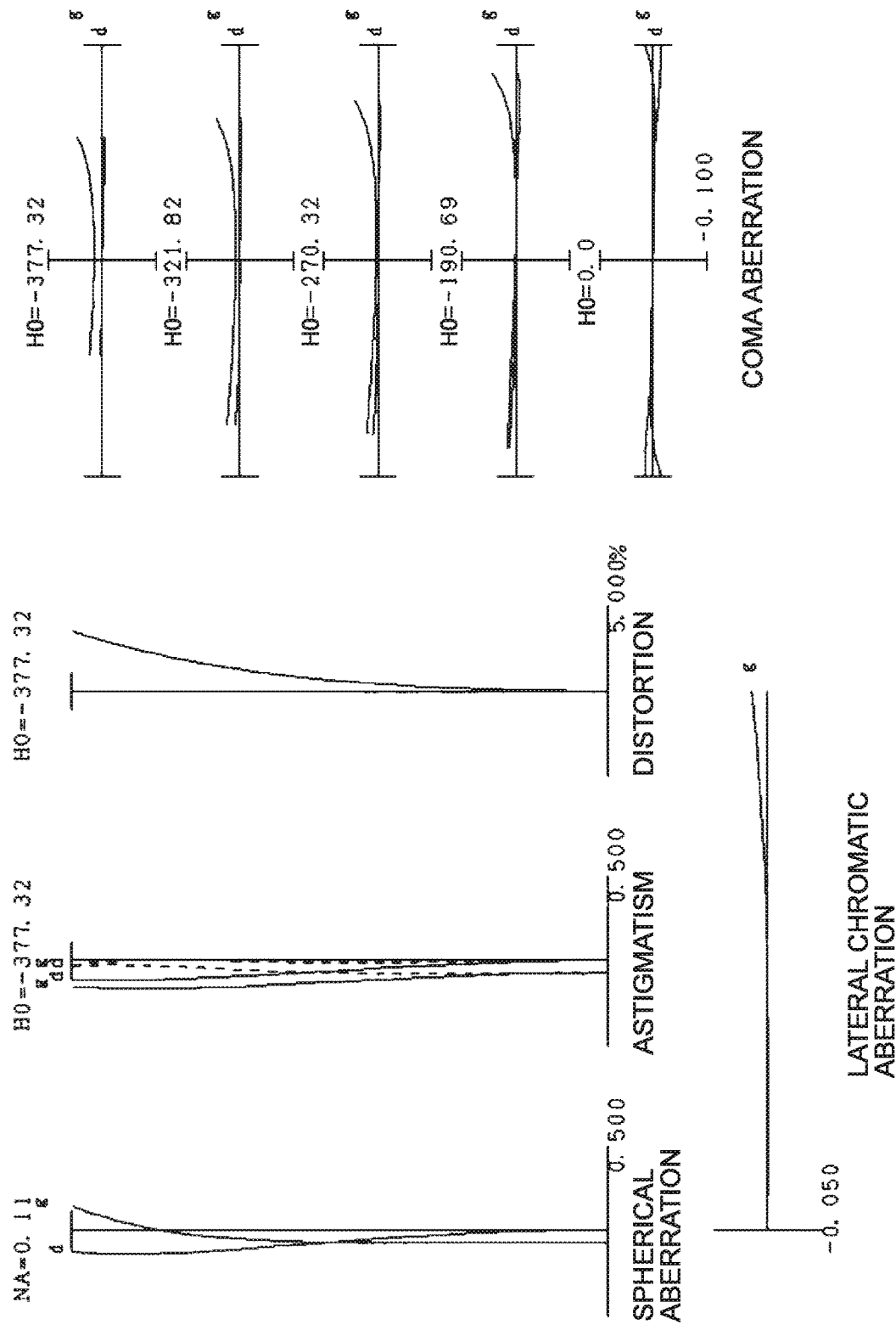

COMA ABERRATION

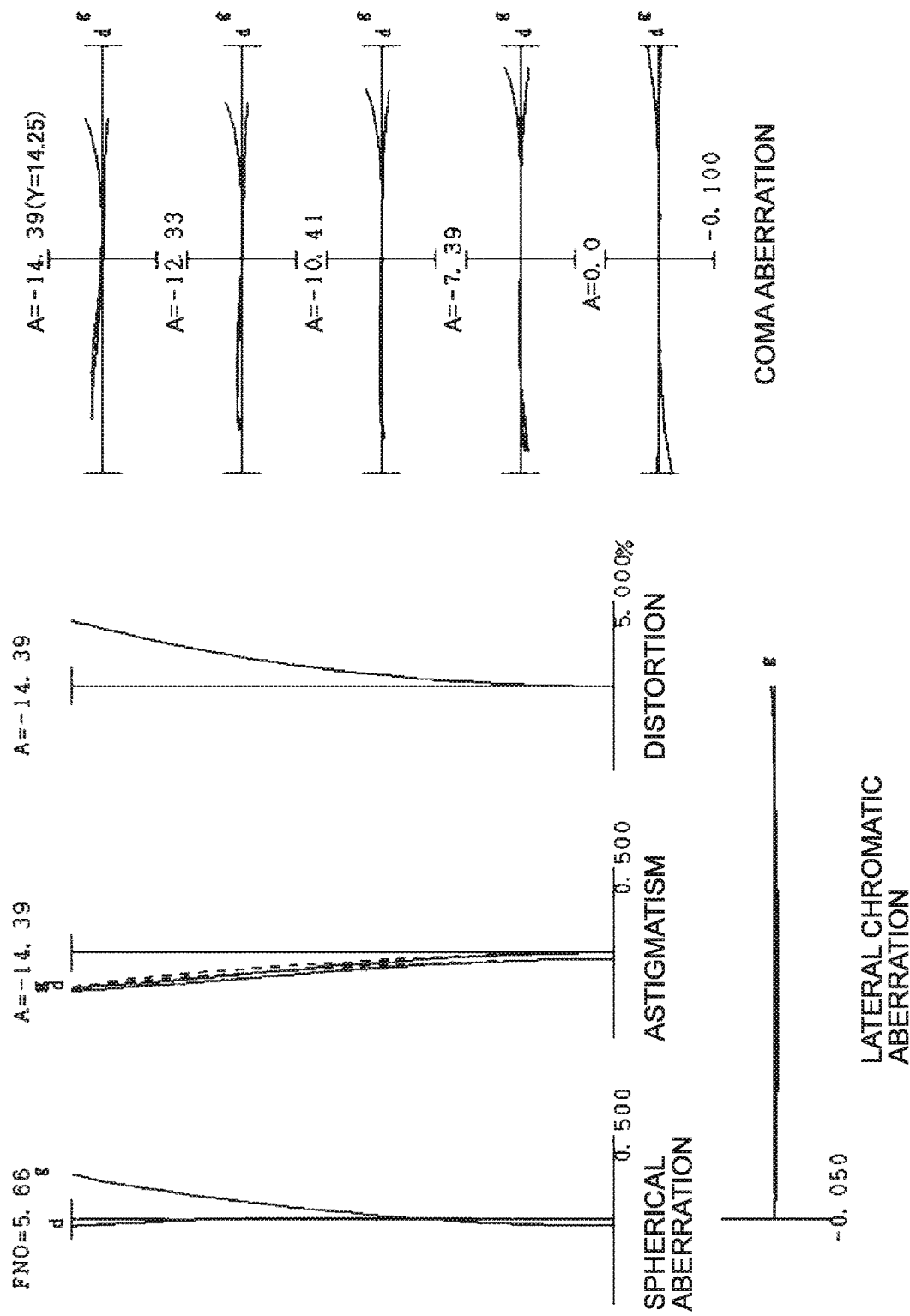

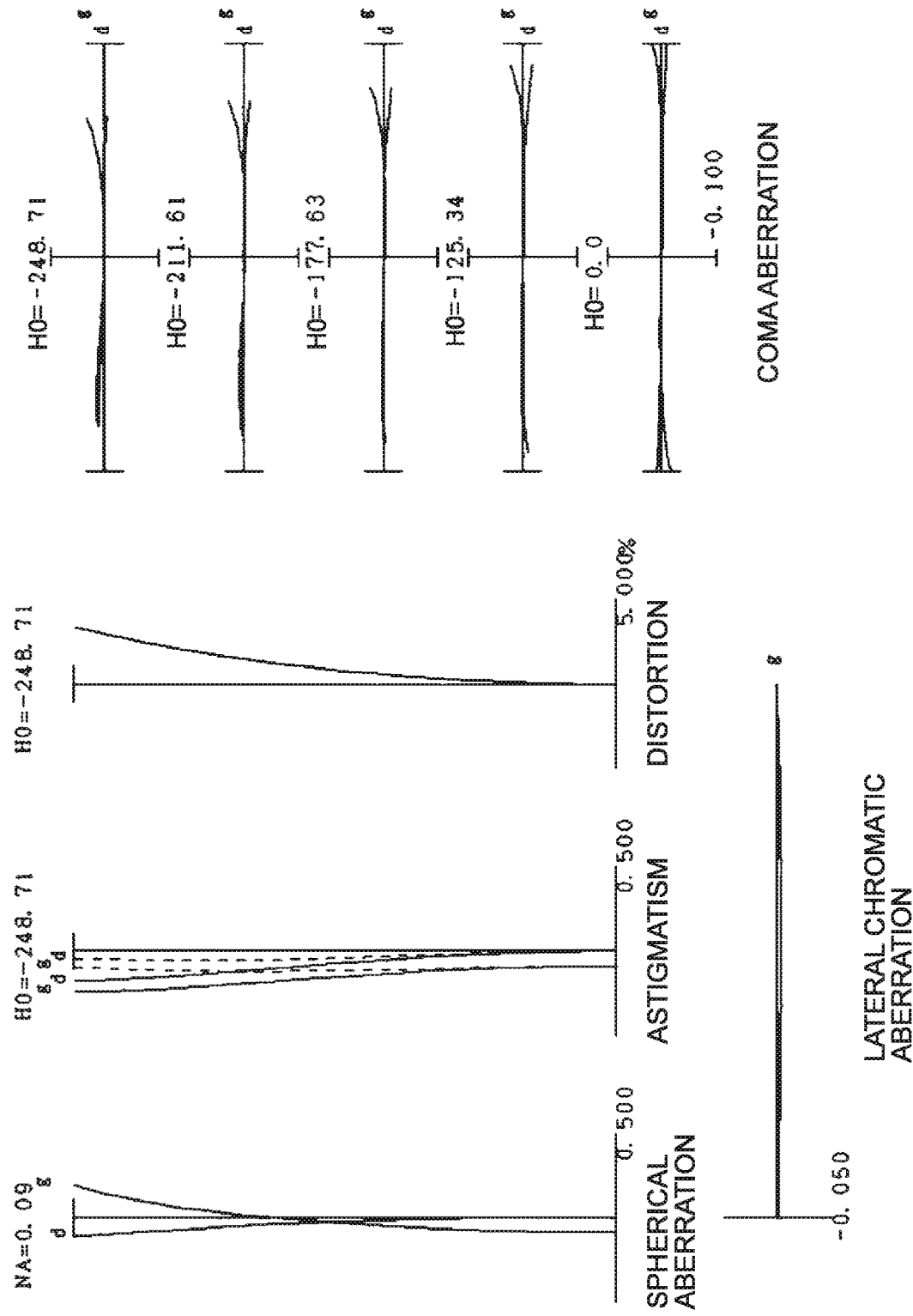

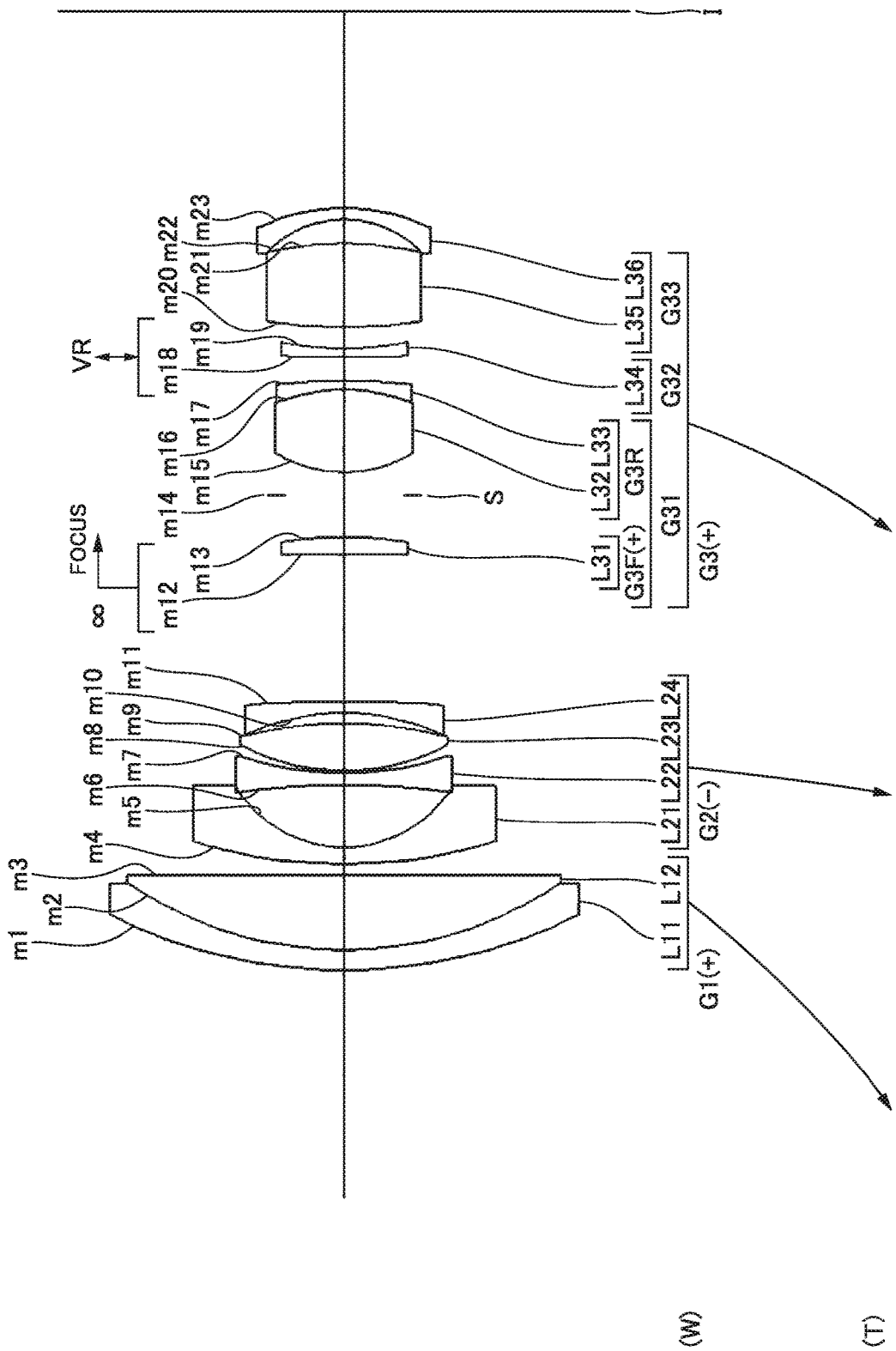

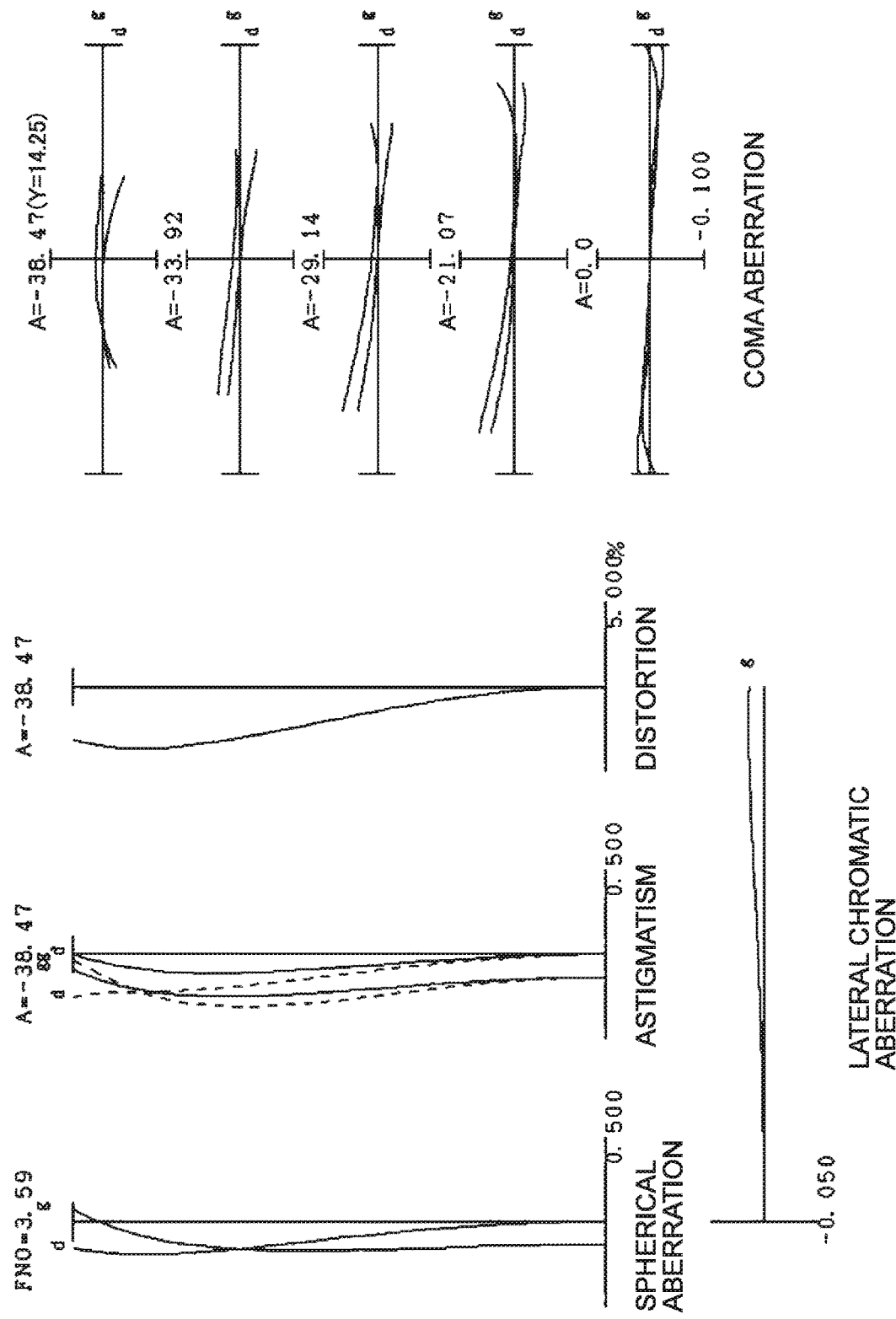

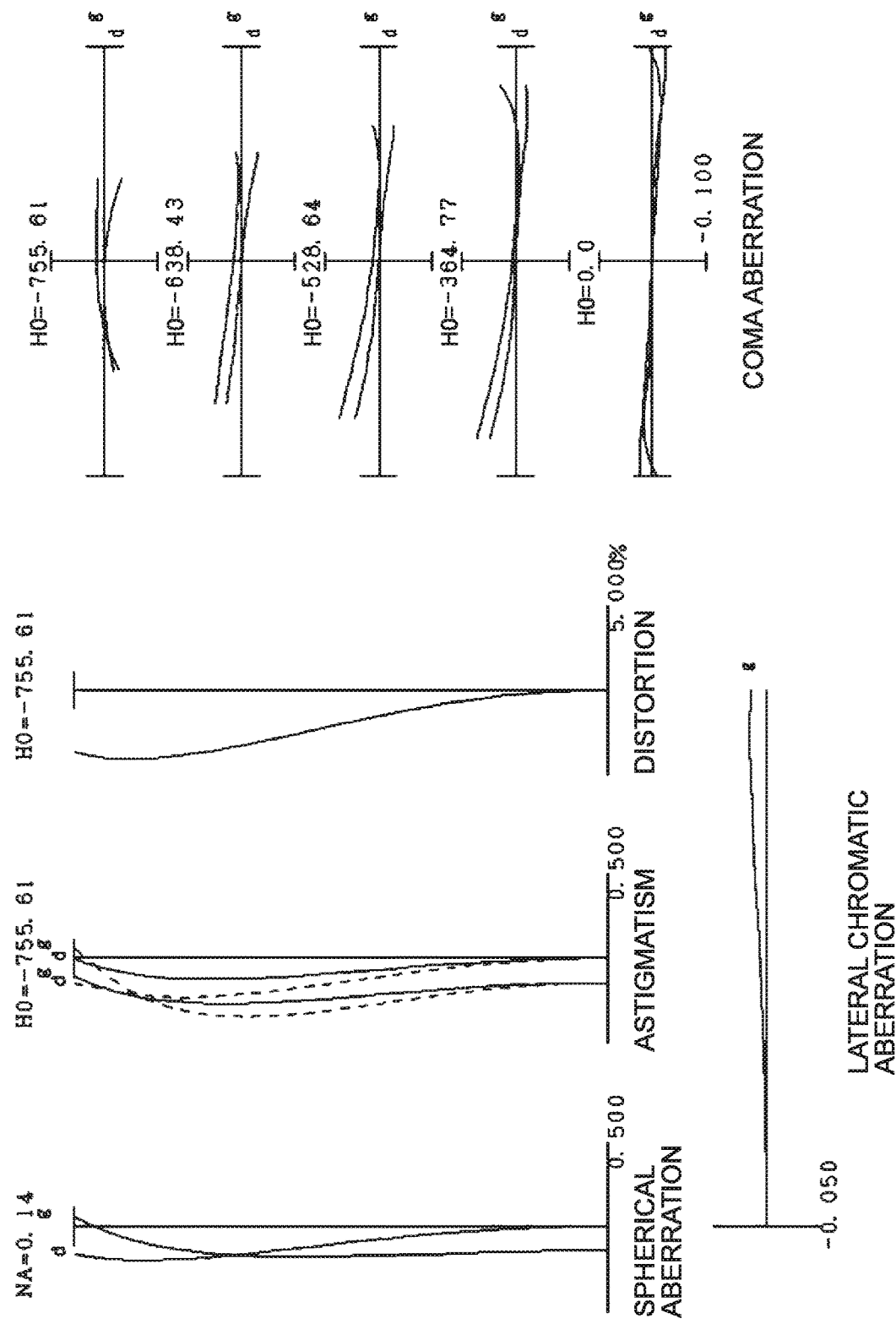

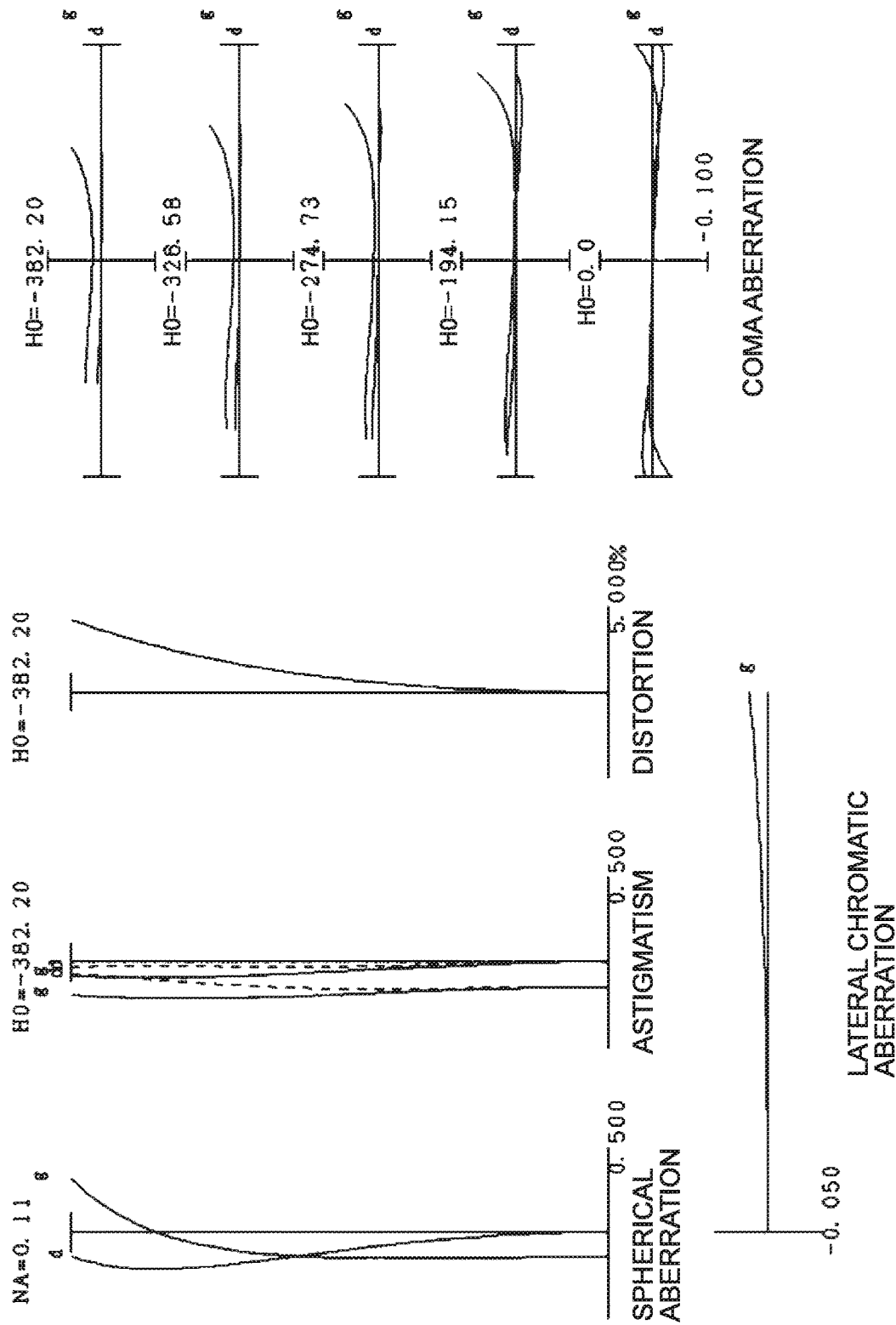

COMA ABERRATION

COMA ABERRATION

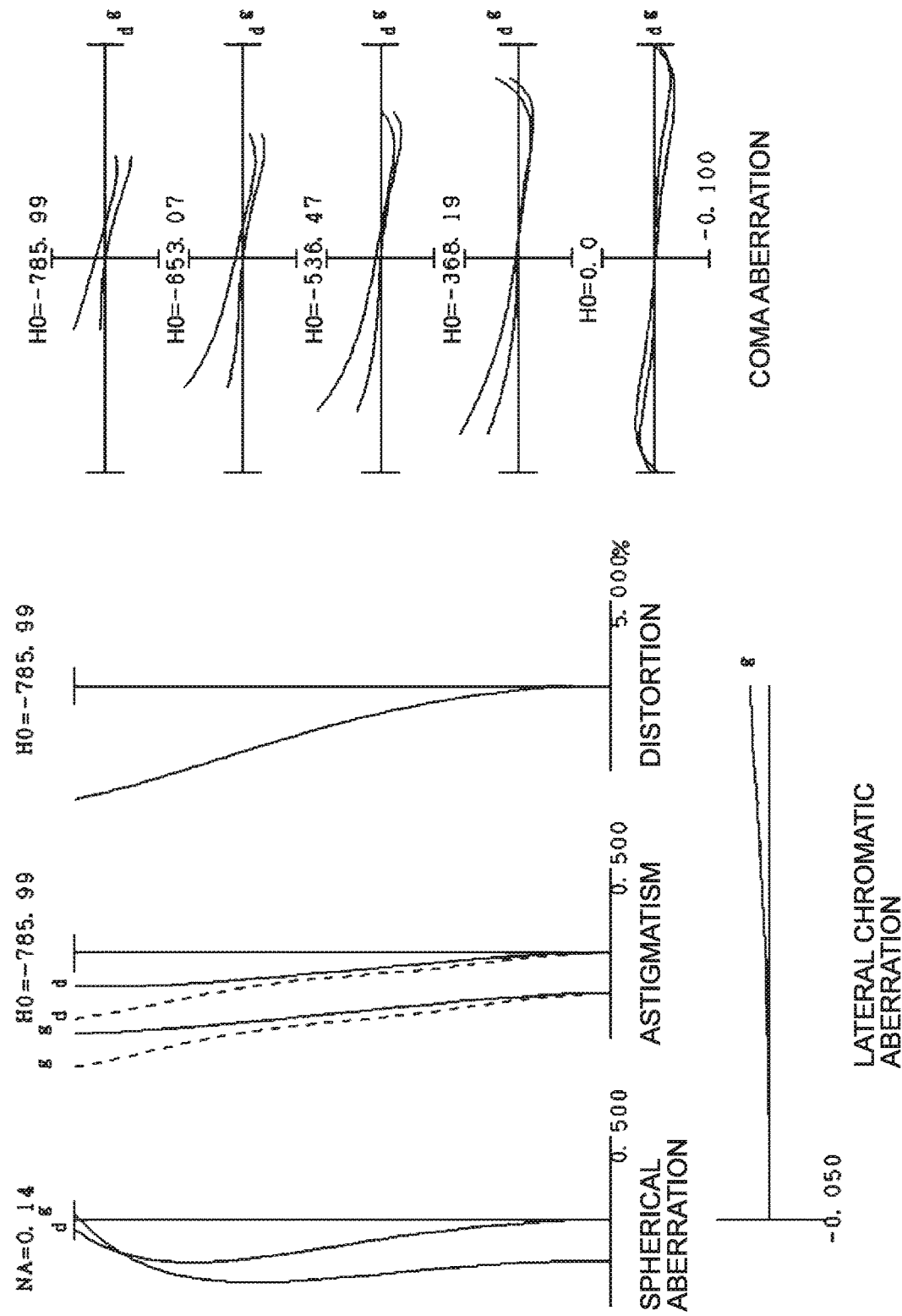

COMA ABERRATION

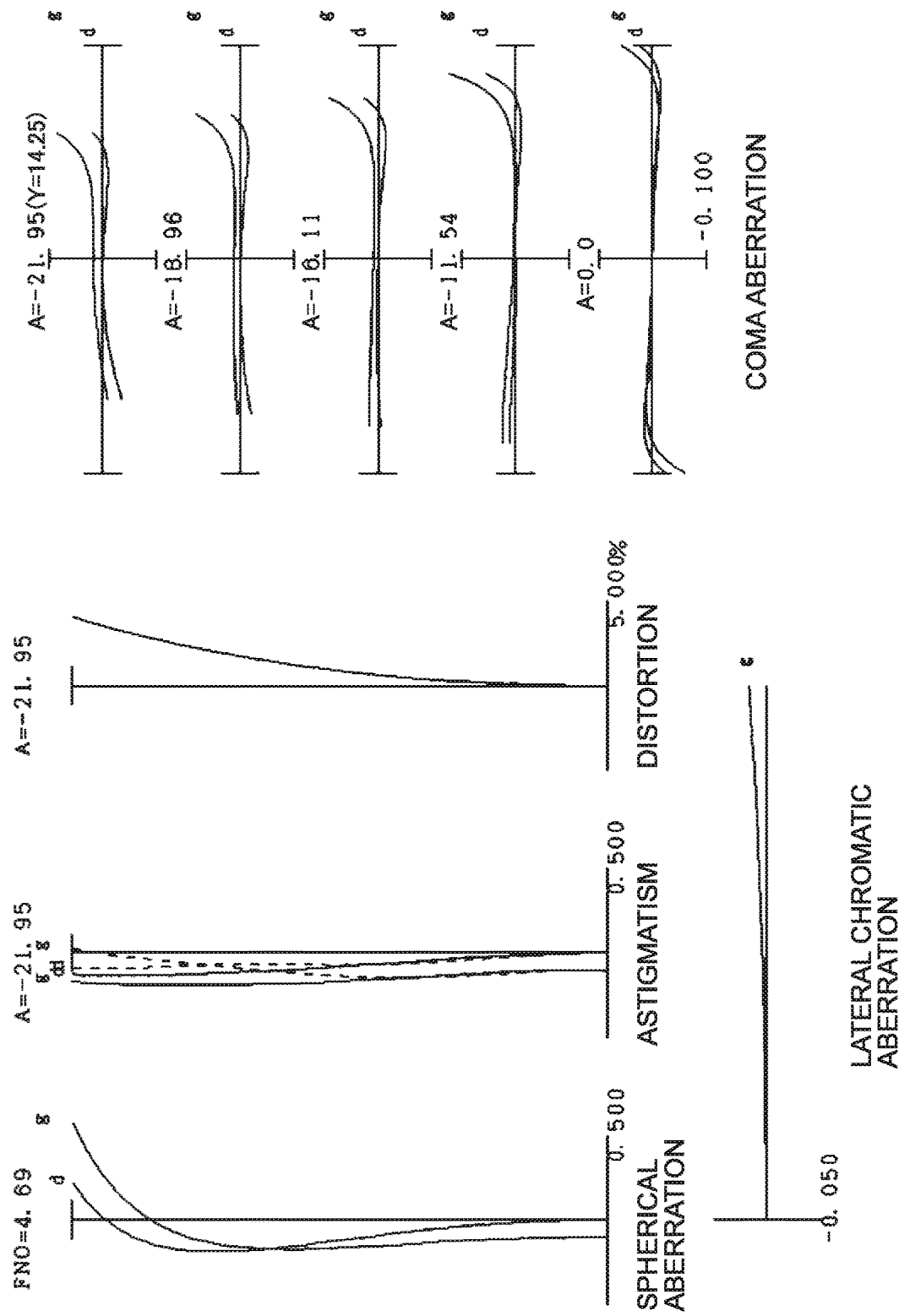

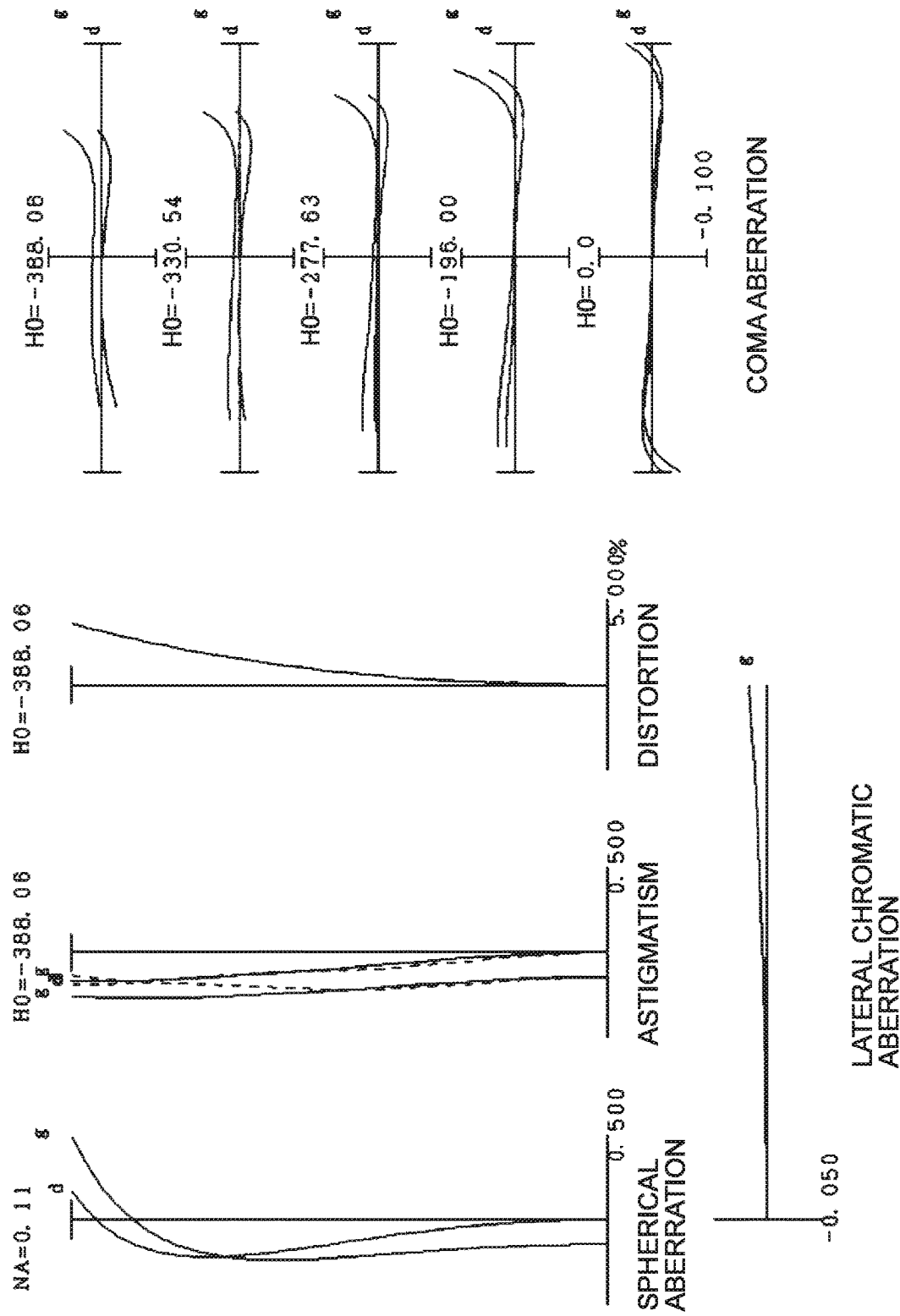

COMA ABERRATION

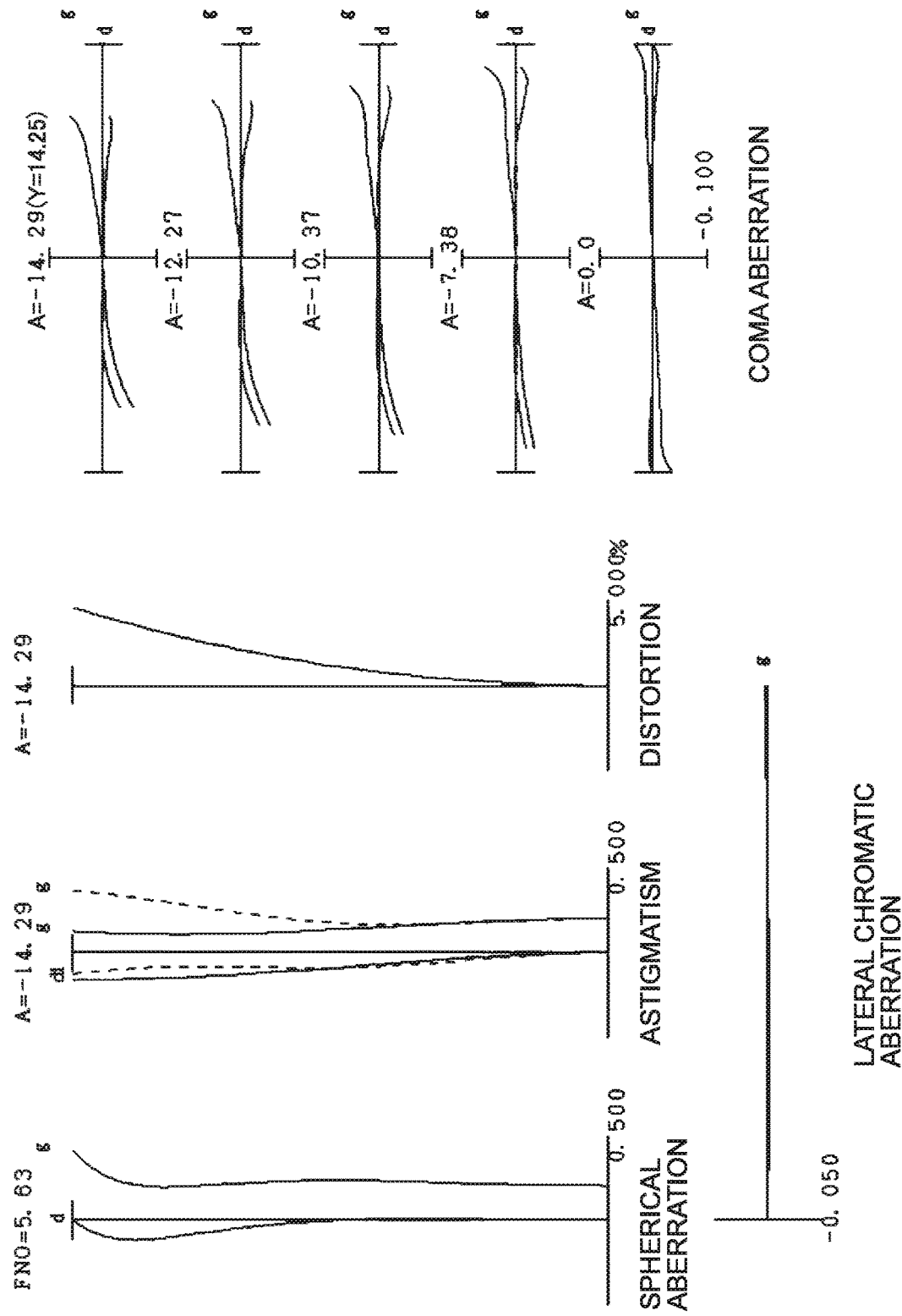

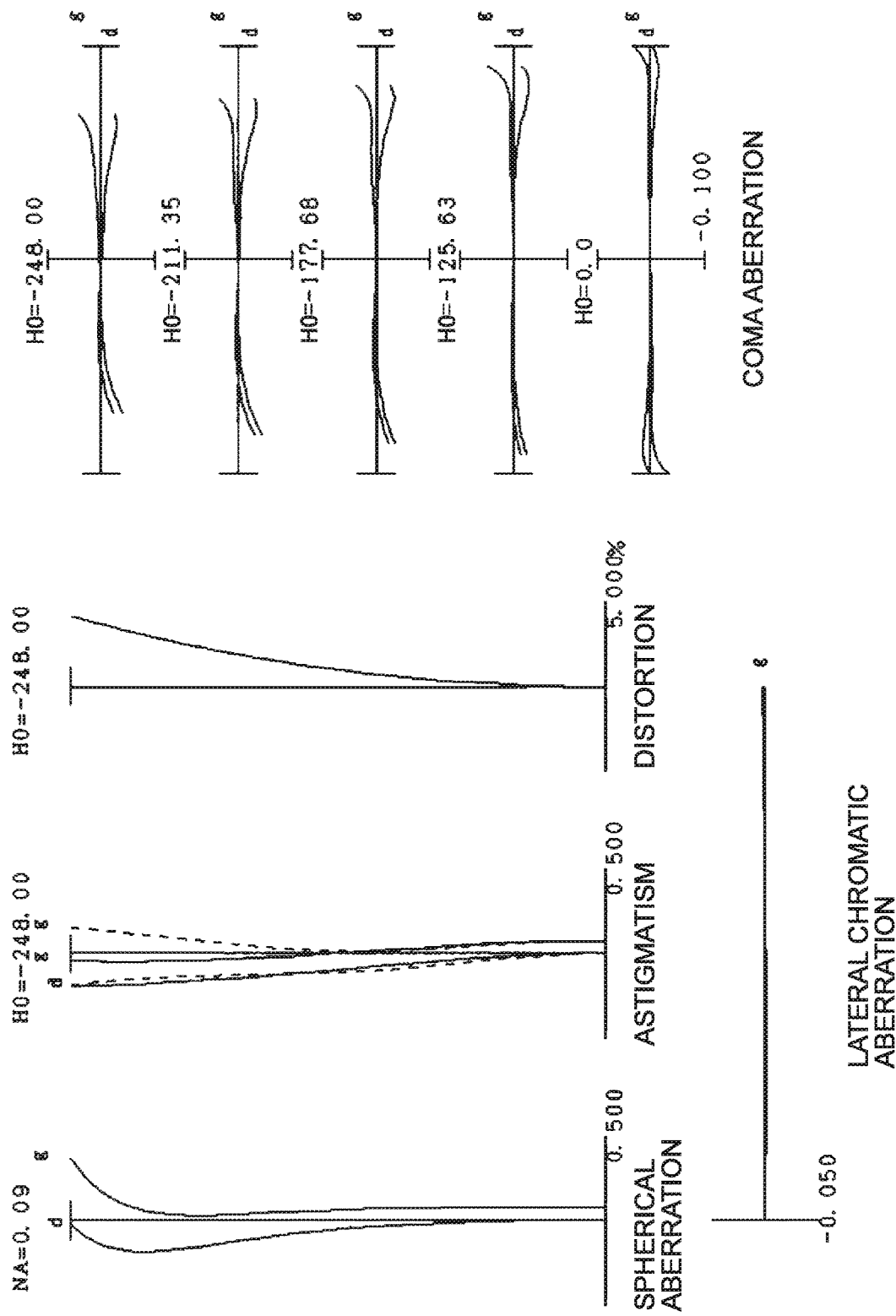

COMA ABERRATION

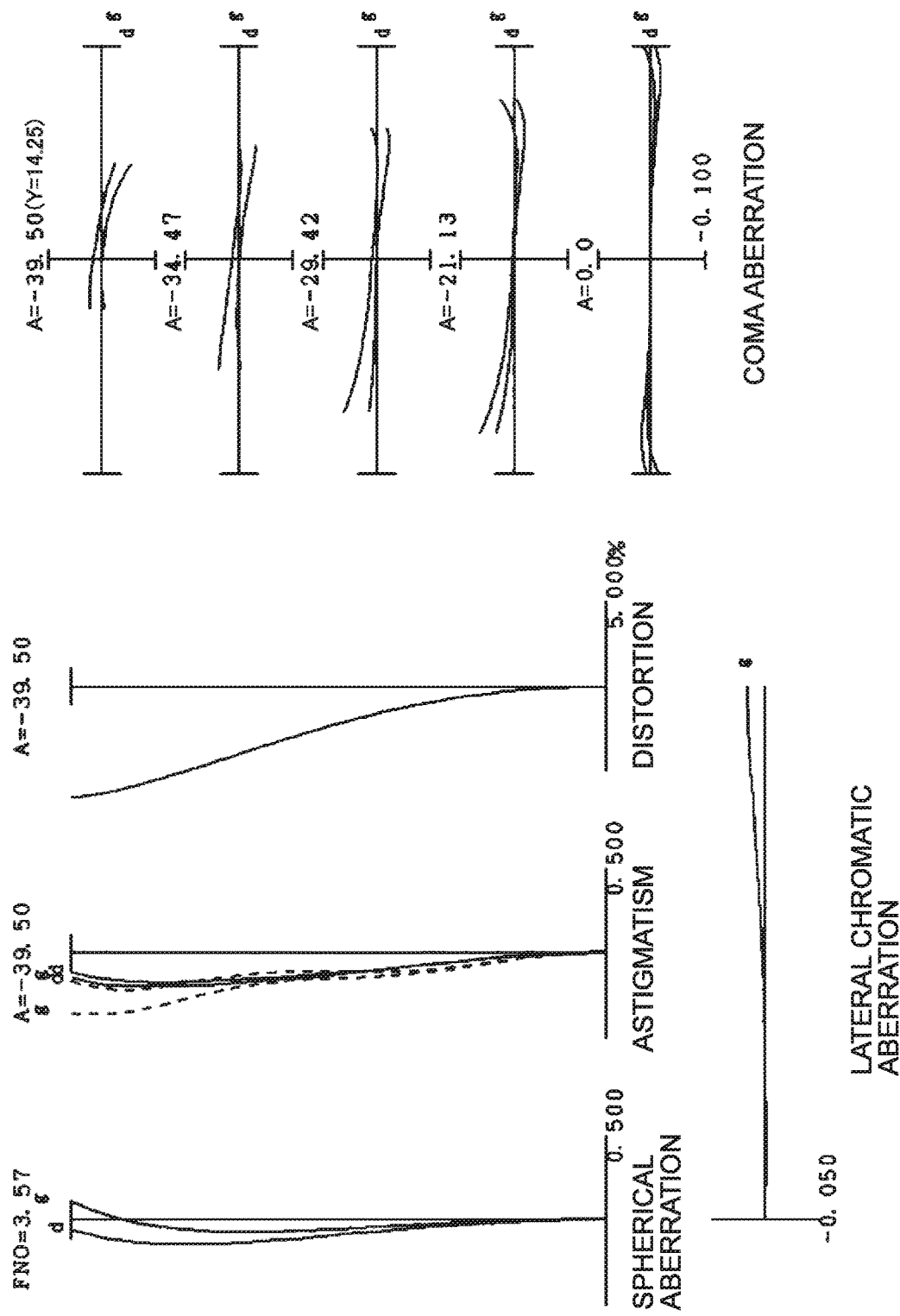

COMA ABERRATION

COMA ABERRATION

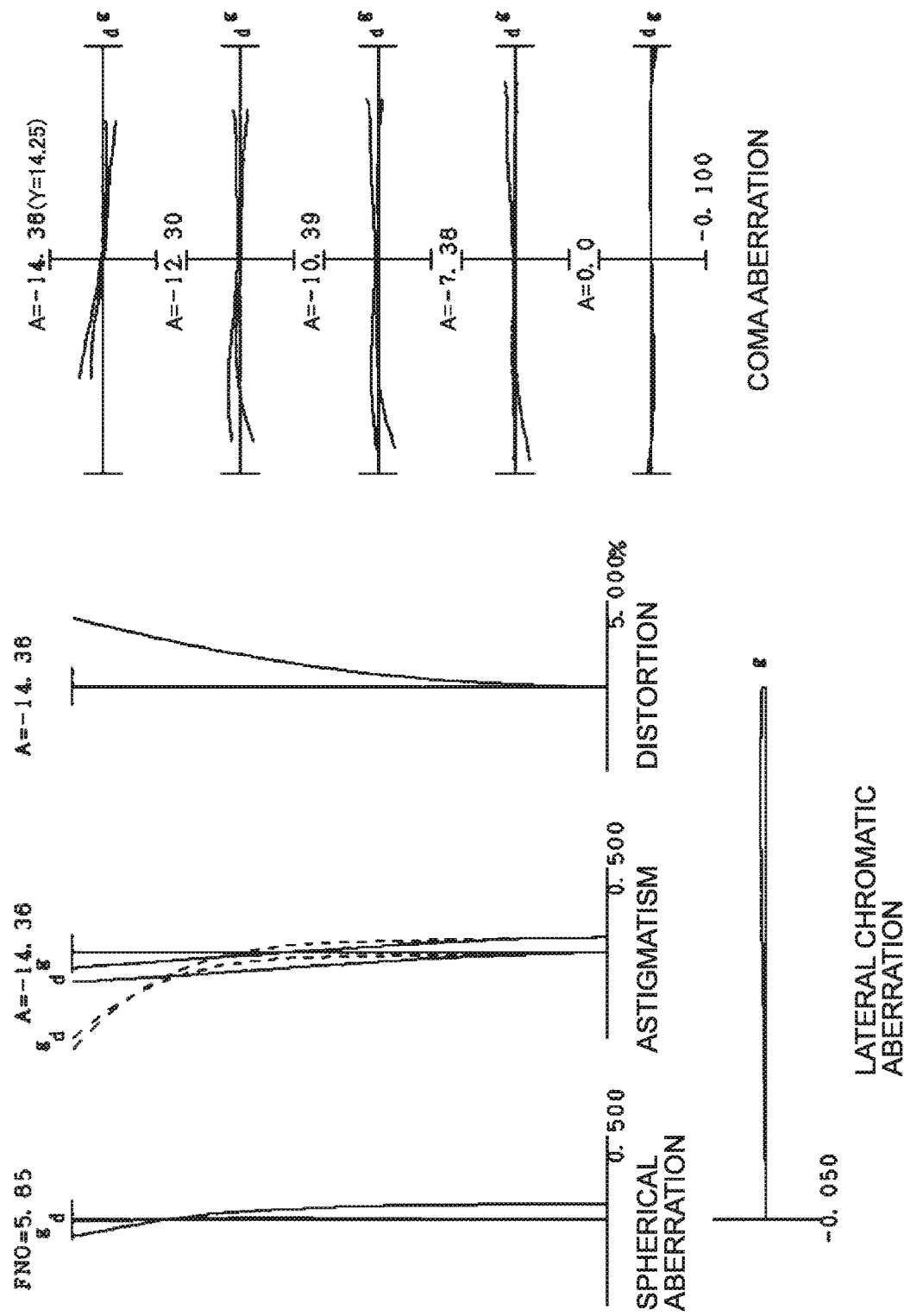

COMA ABERRATION

COMA ABERRATION

COMA ABERRATION

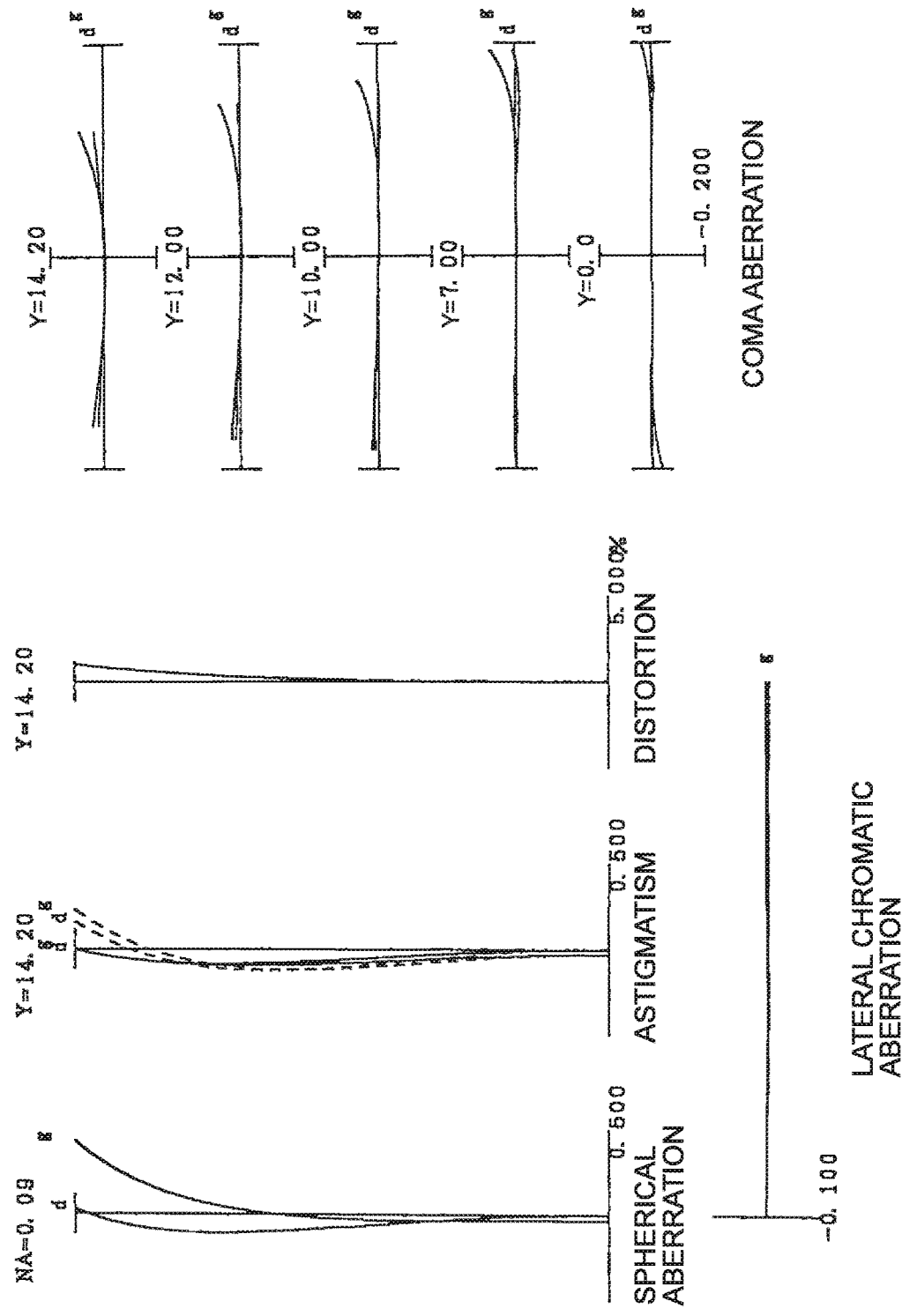

COMA ABERRATION

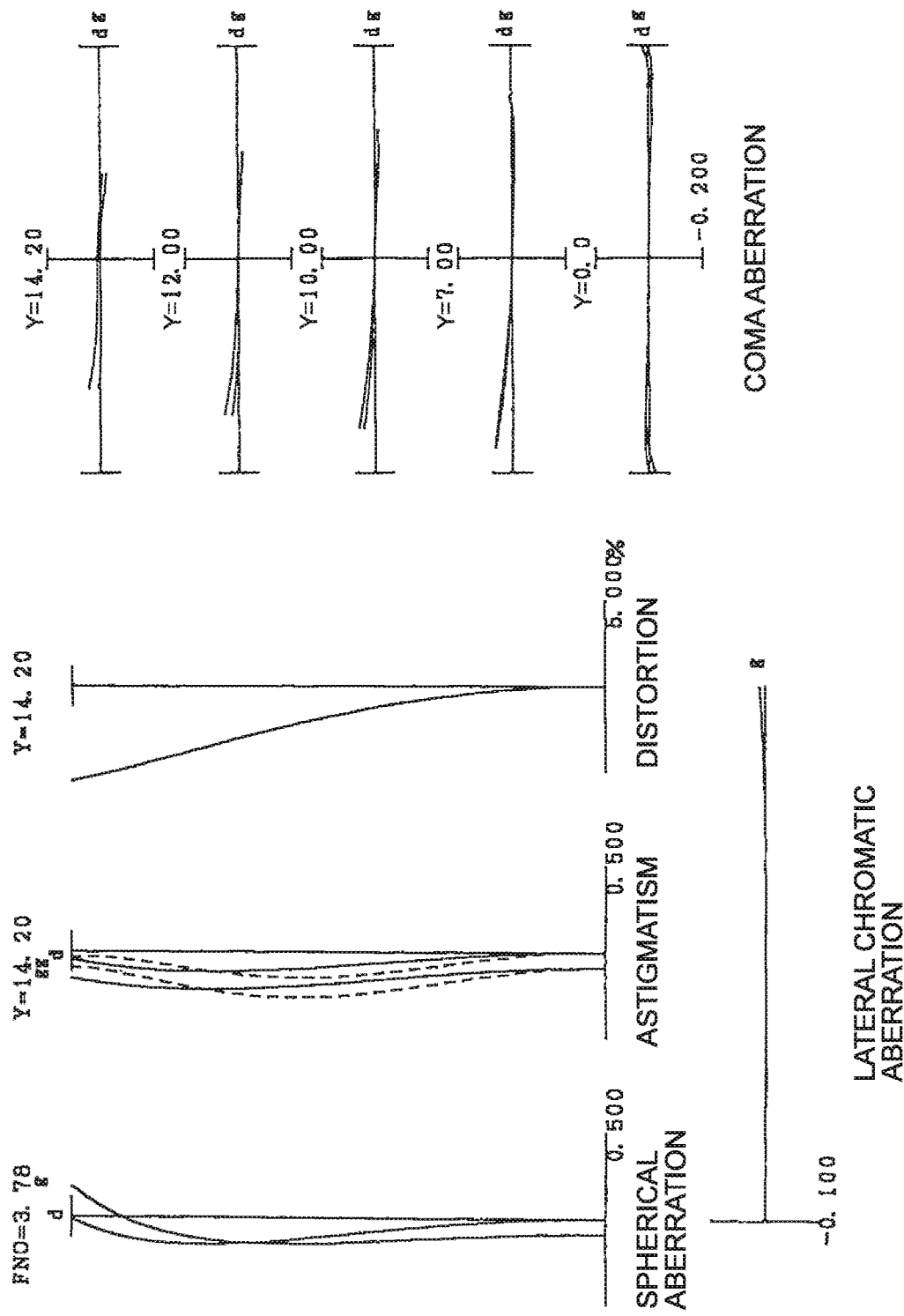

COMA ABERRATION

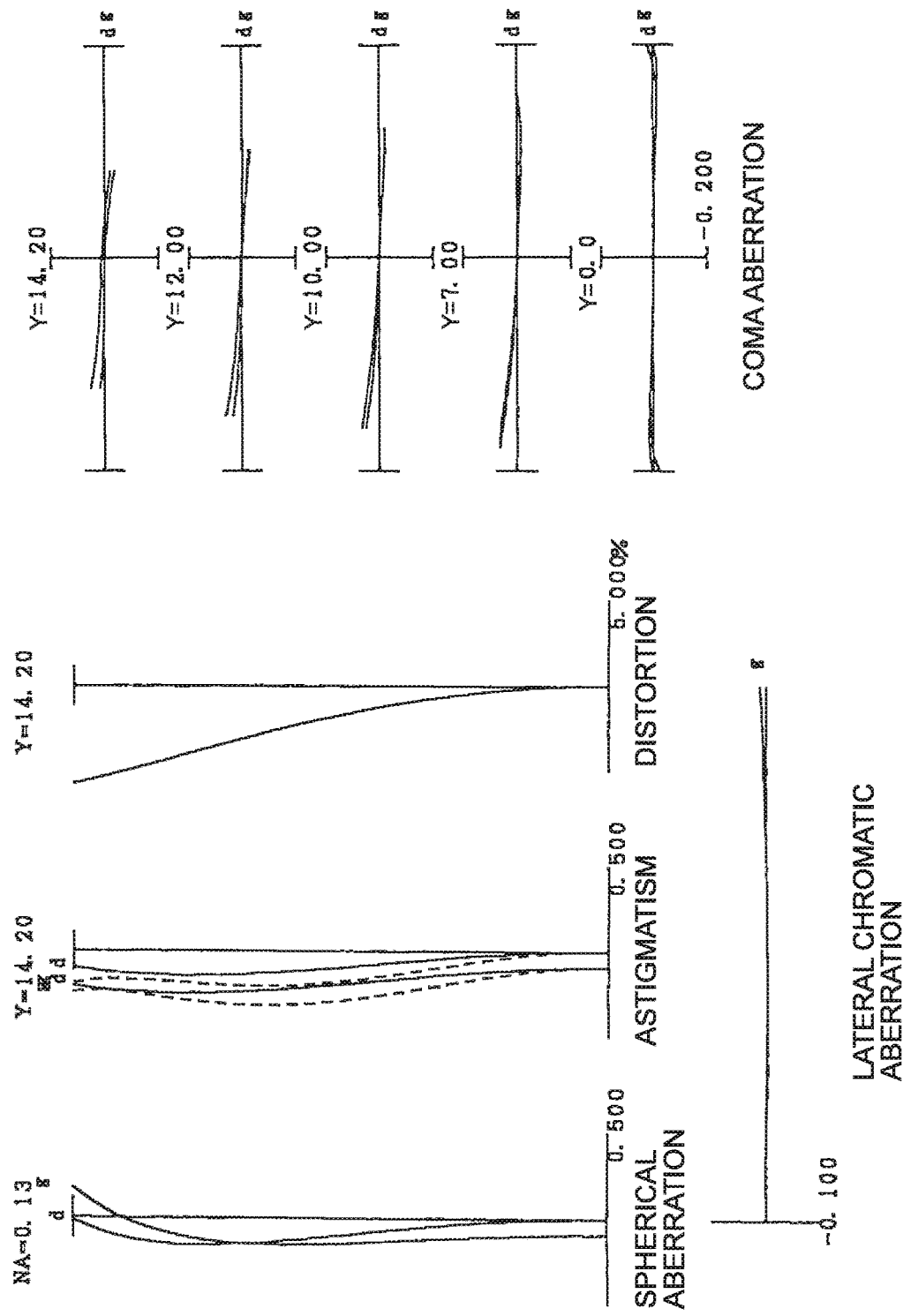

COMA ABERRATION

COMA ABERRATION

COMA ABERRATION

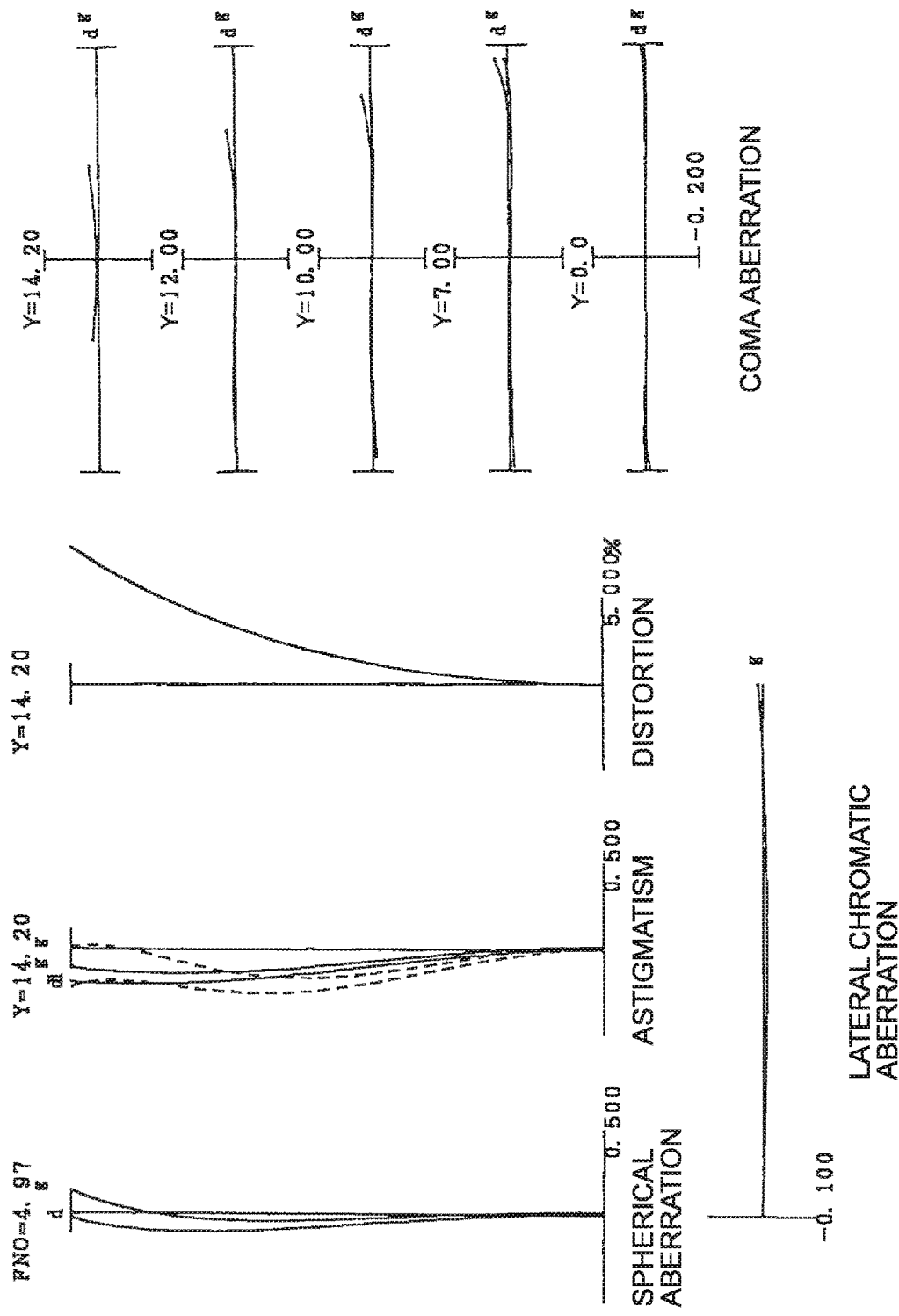

COMA ABERRATION

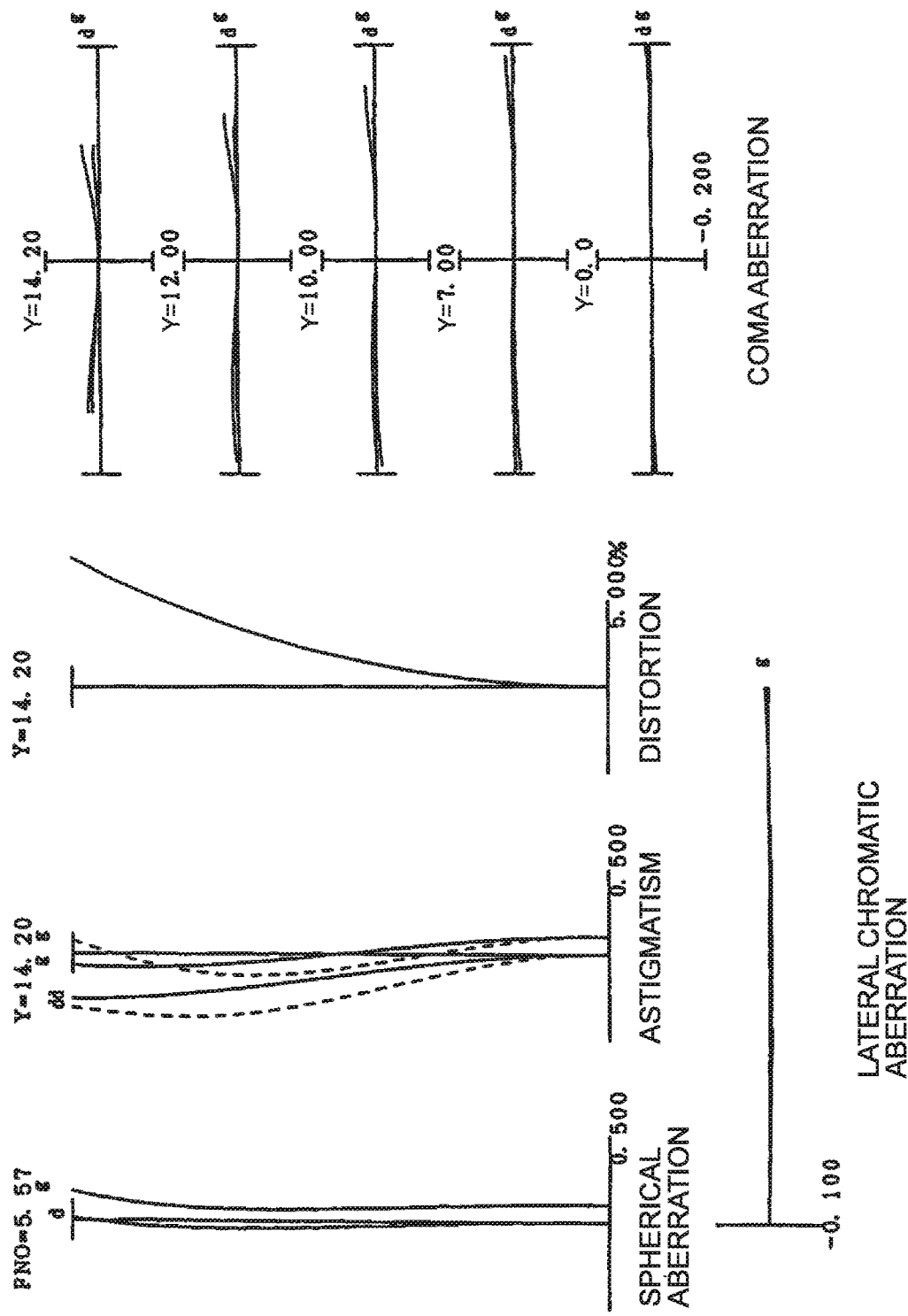

COMA ABERRATION

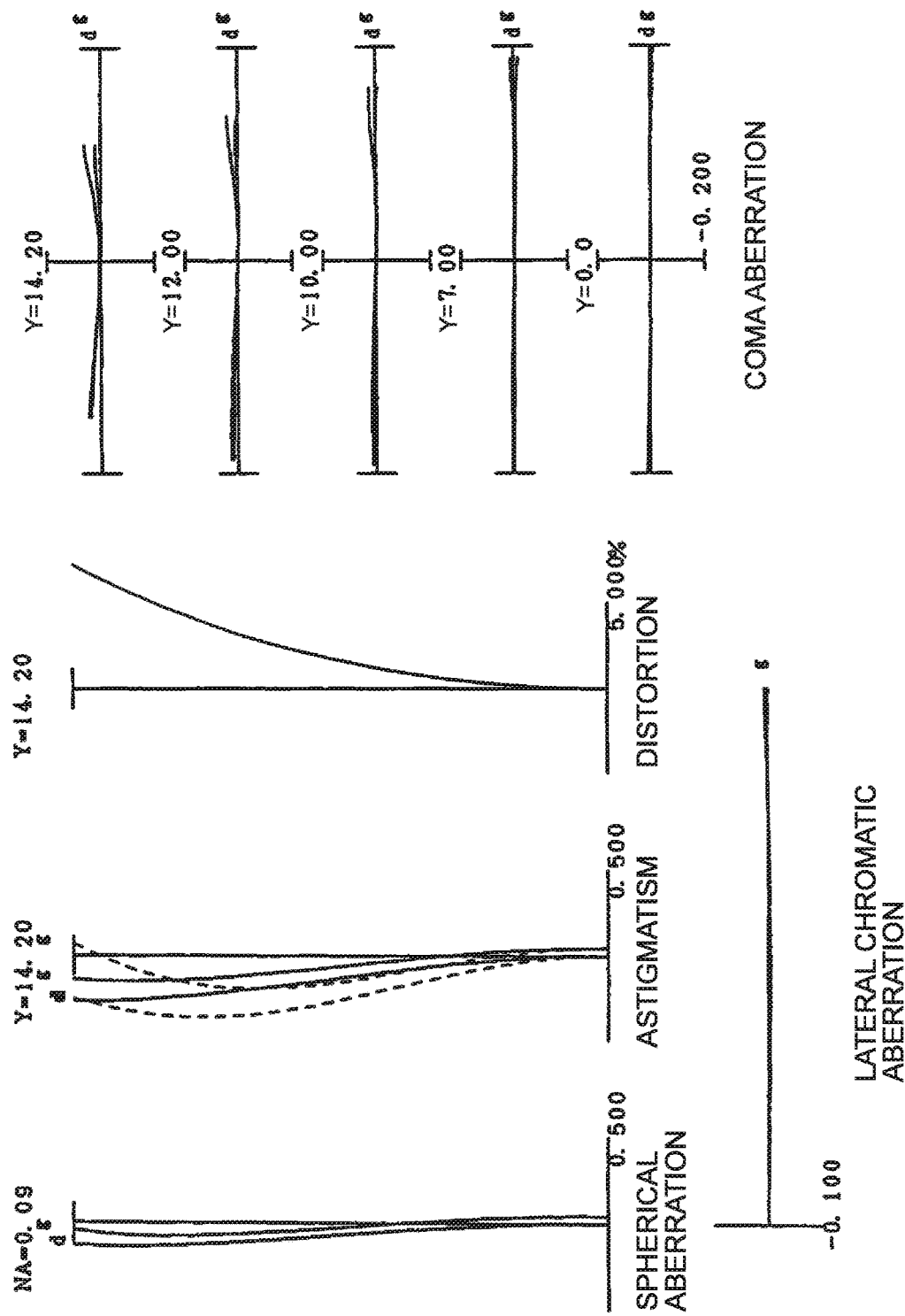

ZOOM OPTICAL SYSTEM, IMAGING DEVICE AND METHOD FOR MANUFACTURING THE ZOOM OPTICAL SYSTEM

TECHNICAL FIELD

The present invention relates to a zoom optical system, an imaging device, and a method for manufacturing the zoom optical system.

TECHNICAL BACKGROUND

Proposals have so far been made on zoom optical systems suitable for photographic cameras, electronic still cameras, video cameras, and the like (for example, see Patent Documents 1 and 2).

PRIOR ARTS LIST

Patent Document

Patent Document 1: Japanese Laid-Open Patent Publication No. 2012-42557(A)
Patent Document 2: Japanese Laid-Open Patent Publication No. S63-298210(A)

SUMMARY OF THE INVENTION

Problems to be Solved by the Invention

However, a conventional zoom optical system has faced a problem of large variations in aberration upon zooming. Moreover, in order to achieve higher image quality, the system is desired to have an image blur correction mechanism for correcting an image blur caused by camera shake, or the like.

Moreover, the conventional zoom optical system has faced problems of large variations in aberration upon zooming and large variations in aberration upon focusing on a short distance object.

Moreover, a zoom optical system having further successful optical performance has been recently required.

Means to Solve the Problems

A zoom optical system according to a first aspect of the invention is formed of, disposed in order from an object, a first lens group having positive refractive power, a second lens group having negative refractive power, and a third lens group having positive refractive power, in which at least a part of the second lens group or at least a part of the third lens group is configured to be movable, as a vibration-proof lens group for correcting an image blur, so as to have a component in a direction perpendicular to an optical axis, and the following conditional expression is satisfied:

$$4.40<f1/(-f2)<8.00$$

where f1 denotes a focal length of the first lens group, and f2 denotes a focal length of the second lens group.

An imaging device according to a first aspect of the invention is provided with the zooming optical system according to the first aspect of the invention.

A zoom optical system according to a second aspect of the invention has, disposed in order from an object, a first lens group having positive refractive power, a second lens group having negative refractive power, and a third lens group having positive refractive power, in which at least a part of the second lens group or at least a part of the third lens group is configured to be moveable, as a vibration-proof lens group for correcting an image blur, so as to have a component in a direction perpendicular to an optical axis, and the following conditional expression is satisfied:

$$3.60<f1/f3<8.00$$

where f1 denotes a focal length of the first lens group, and f3 denotes a focal length of the third lens group.

An imaging device according to a second aspect of the invention is provided with the zooming optical system according to the second aspect of the invention.

A zoom optical system according to a third aspect of the invention is formed of, disposed in order from an object, a first lens group having positive refractive power, a second lens group having negative refractive power, and a third lens group having positive refractive power, in which, upon zooming from a wide-angle end state to a telephoto end state, focusing is made by moving the first lens group to a direction of the object along an optical axis direction and moving at least a part of the third lens group along the optical axis direction, and the following conditional expression is satisfied:

$$0.73<(-f2)/f3<2.00$$

where f2 denotes a focal length of the second lens group, and
f3 denotes a focal length of the third lens group.

An imaging device according to a third aspect of the invention is provided with the zooming optical system according to the third aspect of the invention.

A zoom optical system according to a fourth aspect of the invention has, disposed in order from an object, a first lens group having positive refractive power, a second lens group having negative refractive power, and a third lens group having positive refractive power, in which, upon zooming from a wide-angle end state to a telephoto end state, the first lens group is moved to a direction of the object along an optical axis direction, and the following conditional expressions are satisfied:

$$0.14<fw/f1<0.26$$

$$0.77<fw/f3<1.05$$

where fw denotes a focal length of the zoom optical system in the wide-angle end state,
f1 denotes a focal length of the first lens group, and
f3 denotes a focal length of the third lens group.

An imaging device according to a fourth aspect of the invention is provided with the zooming optical system according to the fourth aspect of the invention.

A zoom optical system according to a fifth aspect of the invention has, disposed in order from an object, a first lens group having positive refractive power, a second lens group having negative refractive power, and a third lens group having positive refractive power, in which focusing is made by moving at least a part of the third lens group along an optical axis direction, and the following conditional expression is satisfied:

$$0.90<f3/fw<1.50$$

where f3 denotes a focal length of the third lens group, and
fw denotes a focal length of the zoom optical system in the wide-angle end state.

An imaging device according to a fifth aspect of the invention is provided with the zooming optical system according to the fifth aspect of the invention.

A zoom optical system according to a sixth aspect of the invention has, disposed in order from an object, a first lens group having positive refractive power, a second lens group having negative refractive power, and a third lens group having positive refractive power, in which at least a part of the third lens group is configured to be movable, as a vibration-proof lens group for correcting an image blur, so as to have a component in a direction perpendicular to an optical axis, and the following conditional expression is satisfied:

$$0.60<f3/fw<3.50$$

where f3 denotes a focal length of the third lens group, and fw denotes a focal length of the zoom optical system in the wide-angle end state.

An imaging device according to a sixth aspect of the invention is provided with the zooming optical system according to the sixth aspect of the invention.

A method for manufacturing a zoom optical system according to a first aspect of the invention refers to the method including, disposed in order from an object, a first lens group having positive refractive power, a second lens group having negative refractive power, and a third lens group having positive refractive power, in which each lens is arranged within a lens barrel in such a manner that at least a part of the second lens group or at least a part of the third lens group is configured to be movable, as a vibration-proof lens group for correcting an image blur, so as to have a component in a direction perpendicular to an optical axis, and the following expression is satisfied:

$$4.40<f1/(-f2)<8.00$$

where f1 denotes a focal length of the first lens group, and f2 denotes a focal length of the second lens group.

A method for manufacturing a zoom optical system according to a second aspect of the invention refers to the method including, disposed in order from an object, a first lens group having positive refractive power, a second lens group having negative refractive power, and a third lens group having positive refractive power, in which each lens is arranged within a lens barrel in such a manner that at least a part of the second lens group or at least a part of the third lens group is configured to be movable, as a vibration-proof lens group for correcting an image blur, so as to have a component in a direction perpendicular to an optical axis, and the following expression is satisfied:

$$3.60<f1/f3<8.00$$

where f1 denotes a focal length of the first lens group, and f3 denotes a focal length of the third lens group.

A method for producing a zoom optical system according to a third aspect of the invention refers to the method including, disposed in order from an object, a first lens group having positive refractive power, a second lens group having negative refractive power, and a third lens group having negative refractive power, in which each lens is arranged within a lens barrel in such a manner that, upon zooming from a wide-angle end state to a telephoto end state, focusing is made by moving the first lens group to a direction of the object along an optical axis direction, and moving at least apart of the lens group along the optical axis direction, and the following expression is satisfied:

$$0.73<(-f2)/f3<2.00$$

where f2 denotes a focal length of the second lens group, and f3 denotes a focal length of the third lens group.

A method for producing a zoom optical system according to a fourth aspect of the invention refers to the method including, disposed in order from an object, a first lens group having positive refractive power, a second lens group having negative refractive power, and a third lens group having negative refractive power, in which each lens is arranged within a lens barrel in such a manner that, upon zooming from a wide-angle end state to a telephoto end state, the first lens group is moved to a direction of the object along an optical axis direction, and the following expressions are satisfied:

$$0.14<fw/f1<0.26$$

$$0.77<fw/f3<1.05$$

where fw denotes a focal length of the zoom optical system in the wide-angle end state, f1 denotes a focal length of the first lens group, and f3 denotes a focal length of the third lens group.

A method for manufacturing a zoom optical system according to a fifth aspect of the invention refers to the method including, disposed in order from an object, a first lens group having positive refractive power, a second lens group having negative refractive power, and a third lens group having positive refractive power, in which each lens is arranged within a lens barrel in such a manner that focusing is made by moving at least a part of the third lens group along an optical axis direction, and the following expression is satisfied:

$$0.90<f3/fw<1.50$$

where f3 denotes a focal length of the third lens group, and fw denotes a focal length of the zoom optical system in the wide-angle end state.

A method for manufacturing a zoom optical system according to a sixth aspect of the invention refers to the method having, disposed in order from an object, a first lens group having positive refractive power, a second lens group having negative refractive power, and a third lens group having positive refractive power, in which each lens is arranged within a lens barrel in such a manner that at least a part of the third lens group is configured to be movable, as a vibration-proof lens group for correcting an image blur, so as to have a component in a direction perpendicular to an optical axis, and the following expression is satisfied:

$$0.60<f3/fw<3.50$$

where f3 denotes a focal length of the third lens group, and fw denotes a focal length of the zoom optical system in the wide-angle end state.

BRIEF DESCRIPTION OF THE DRAWINGS

FIG. 1 is a cross-sectional view showing a lens configuration of a zoom optical system according to Example 1.

FIGS. 2A, 2B and 2C are graphs showing aberrations of the zoom optical system (according to Example 1) in a wide-angle end state (f=18.500), in which FIG. 2A is graphs showing various aberrations upon focusing on infinity, FIG. 2B is graphs showing various aberrations upon focusing on a short distant object (imaging magnification β=−0.0196), and FIG. 2C is graphs showing coma aberration when an image blur is corrected (a correction angle θ=0.30°) upon focusing on infinity.

FIGS. 3A, 3B and 3C are graphs showing aberrations of the zoom optical system (according to Example 1) in an intermediate focal length state (f=35.000), in which FIG. 3A is graphs showing various aberrations upon focusing on infinity, FIG. 3B is graphs showing various aberrations upon focusing on a short distant object (imaging magnification β=−0.0365), and FIG. 3C is graphs showing coma aberration when an image blur is corrected (a correction angle θ=0.30°) upon focusing on infinity.

FIGS. 4A, 4B and 4C are graphs showing aberrations of the zoom optical system (according to Example 1) in a telephoto end state (f=53.500), in which FIG. 4A is graphs showing various aberrations upon focusing on infinity, FIG. 4B is graphs showing various aberrations upon focusing on a short distant object (imaging magnification β=−0.0554), and FIG. 4C is graphs showing coma aberration when an image blur is corrected (a correction angle θ=0.30°) upon focusing on infinity.

FIG. 5 is a cross-sectional view showing a lens configuration of a zoom optical system according to Example 2.

FIGS. 6A, 6B and 6C are graphs showing aberrations of the zoom optical system (according to Example 2) in a wide-angle end state (f=18.500), in which FIG. 6A is graphs showing various aberrations upon focusing on infinity, FIG. 6B is graphs showing various aberrations upon focusing on a short distant object (imaging magnification β=−0.0196), and FIG. 6C is graphs showing coma aberration when an image blur is corrected (a correction angle θ=0.30°) upon focusing on infinity.

FIGS. 7A, 7B and 7C are graphs showing aberrations of the zoom optical system (according to Example 2) in an intermediate focal length state (f=34.176), in which FIG. 7A is graphs showing various aberrations upon focusing on infinity, FIG. 7B is graphs showing various aberrations upon focusing on a short distant object (imaging magnification β=−0.0358), and FIG. 7C is graphs showing coma aberration when an image blur is corrected (a correction angle θ=0.30°) upon focusing on infinity.

FIGS. 8A, 8B and 8C are graphs showing aberrations of the zoom optical system (according to Example 2) in a telephoto end state (f=53.500), in which FIG. 8A is graphs showing various aberrations upon focusing on infinity, FIG. 8B is graphs showing various aberrations upon focusing on a short distant object (imaging magnification β=−0.0556), and FIG. 8C is graphs showing coma aberration when an image blur is corrected (a correction angle θ=0.30°) upon focusing on infinity.

FIGS. 10A, 10B and 10C are graphs showing aberrations of the zoom optical system (according to Example 3) in a wide-angle end state (f=18.477), in which FIG. 10A is graphs showing various aberrations upon focusing on infinity, FIG. 10B is graphs showing various aberrations upon focusing on a short distant object (imaging magnification β=−0.0194), and FIG. 10C is graphs showing coma aberration when an image blur is corrected (a correction angle θ=0.30°) upon focusing on infinity.

FIGS. 11A, 11B and 11C are graphs showing aberrations of the zoom optical system (according to Example 3) in an intermediate focal length state (f=34.000), in which FIG. 11A is graphs showing various aberrations upon focusing on infinity, FIG. 11B is graphs showing various aberrations upon focusing on a short distant object (imaging magnification β=−0.0355), and FIG. 11C is graphs showing coma aberration when an image blur is corrected (a correction angle θ=0.30°) upon focusing on infinity.

FIGS. 12A, 12B and 12C are graphs showing aberrations of the zoom optical system (according to Example 3) in a telephoto end state (f=53.500), in which FIG. 12A is graphs showing various aberrations upon focusing on infinity, FIG. 12B is graphs showing various aberrations upon focusing on a short distant object (imaging magnification β=−0.0552), and FIG. 12C is graphs showing coma aberration when an image blur is corrected (a correction angle θ=0.30°) upon focusing on infinity.

FIGS. 14A, 14B and 14C are graphs showing aberrations of the zoom optical system (according to Example 4) in a wide-angle end state (f=18.500), in which FIG. 14A is graphs showing various aberrations upon focusing on infinity, FIG. 14B is graphs showing various aberrations upon focusing on a short distant object (imaging magnification β=−0.0194), and FIG. 14C is graphs showing coma aberration when an image blur is corrected (a correction angle θ=0.30°) upon focusing on infinity.

FIGS. 15A, 15B and 15C are graphs showing aberrations of the zoom optical system (according to Example 4) in an intermediate focal length state (f=34.061), in which FIG. 15A is graphs showing various aberrations upon focusing on infinity, FIG. 15B is graphs showing various aberrations upon focusing on a short distant object (imaging magnification β=−0.0355), and FIG. 15C is graphs showing coma aberration when an image blur is corrected (a correction angle θ=0.30°) upon focusing on infinity.

FIGS. 16A, 16B and 16C are graphs showing aberrations of the zoom optical system (according to Example 4) in a telephoto end state (f=53.500), in which FIG. 16A is graphs showing various aberrations upon focusing on infinity, FIG. 16B is graphs showing various aberrations upon focusing on a short distant object (imaging magnification β=−0.0556), and FIG. 16C is graphs showing coma aberration when an image blur is corrected (a correction angle θ=0.30°) upon focusing on infinity.

FIGS. 23A, 23B and 23C are graphs showing aberrations of the zoom optical system (according to Example 5) in a wide-angle end state (f=18.50), in which FIG. 23A is graphs showing various aberrations upon focusing on infinity, FIG. 23B is graphs showing coma aberration when an image blur is corrected (a vibration-proof lens group shift amount=0.2 mm) upon focusing on infinity, and FIG. 23C is graphs showing various aberrations upon focusing on a short distant object (imaging magnification β=−0.009).

FIGS. 24A, 24B and 24C are graphs showing aberrations of the zoom optical system (according to Example 5) in an intermediate focal length state (f=34.95), in which FIG. 24A is graphs showing various aberrations upon focusing on infinity, FIG. 24B is graphs showing coma aberration when an image blur is corrected (a vibration-proof lens group shift amount=0.2 mm) upon focusing on infinity, and FIG. 24C is graphs showing various aberrations upon focusing on a short distant object (imaging magnification β=−0.018).

FIGS. 25A, 25B and 25C are graphs showing aberrations of the zoom optical system (according to Example 5) in a telephoto end state (f=53.50), in which FIG. 25A is graphs showing various aberrations upon focusing on infinity, FIG. 25B is graphs showing coma aberration when an image blur is corrected (a vibration-proof lens group shift amount=0.2 mm) upon focusing on infinity, and FIG. 25C is graphs showing various aberrations upon focusing on a short distant object (imaging magnification β=−0.027).

FIGS. 27A, 27B and 27C are graphs showing aberrations of the zoom optical system (according to Example 6) in a wide-angle end state (f=18.74), in which FIG. 27A is graphs showing various aberrations upon focusing on infinity, FIG. 27B is graphs showing coma aberration when an image blur is corrected (a vibration-proof lens group shift amount=0.2 mm) upon focusing on infinity, and FIG. 27C is graphs showing various aberrations upon focusing on a short distant object (imaging magnification β=−0.010).

FIGS. 28A, 28B and 28C are graphs showing aberrations of the zoom optical system (according to Example 6) in an intermediate focal length state (f=34.50), in which FIG. 28A is graphs showing various aberrations upon focusing on infinity, FIG. 28B is graphs showing coma aberration when an image blur is corrected (a vibration-proof lens group shift amount=0.2 mm) upon focusing on infinity, and FIG. 28C is graphs showing various aberrations upon focusing on a short distant object (imaging magnification β=−0.018).

FIGS. 29A, 29B and 29C are graphs showing aberrations of the zoom optical system (according to Example 6) in a telephoto end state (f=52.08), in which FIG. 29A is graphs showing various aberrations upon focusing on infinity, FIG. 29B is graphs showing coma aberration when an image blur is corrected (a vibration-proof lens group shift amount=0.2 mm) upon focusing on infinity, and FIG. 29C is graphs showing various aberrations upon focusing on a short distant object (imaging magnification β=−0.026).

FIGS. 31A, 31B and 31C are graphs showing aberrations of the zoom optical system (according to Example 7) in a wide-angle end state (f=18.72), in which FIG. 31A is graphs showing various aberrations upon focusing on infinity, FIG. 31B is graphs showing coma aberration when an image blur is corrected (a vibration-proof lens group shift amount=0.2 mm) upon focusing on infinity, and FIG. 31C is graphs showing various aberrations upon focusing on a short distant object (imaging magnification β=−0.010).

FIGS. 32A, 32B and 32C are graphs showing aberrations of the zoom optical system (according to Example 7) in an intermediate focal length state (f=35.50), in which FIG. 32A is graphs showing various aberrations upon focusing on infinity, FIG. 32B is graphs showing coma aberration when an image blur is corrected (a vibration-proof lens group shift amount=0.2 mm) upon focusing on infinity, and FIG. 32C is graphs showing various aberrations upon focusing on a short distant object (imaging magnification β=−0.018).

FIGS. 33A, 33B and 33C are graphs showing aberrations of the zoom optical system (according to Example 7) in a telephoto end state (f=52.00), in which FIG. 33A is graphs showing various aberrations upon focusing on infinity, FIG. 33B is graphs showing coma aberration when an image blur is corrected (a vibration-proof lens group shift amount=0.2 mm) upon focusing on infinity, and FIG. 33C is graphs showing various aberrations upon focusing on a short distant object (imaging magnification β=−0.027).

DESCRIPTION OF THE EMBODIMENTS (FIRST TO FOURTH EMBODIMENTS)

Figure 2C:
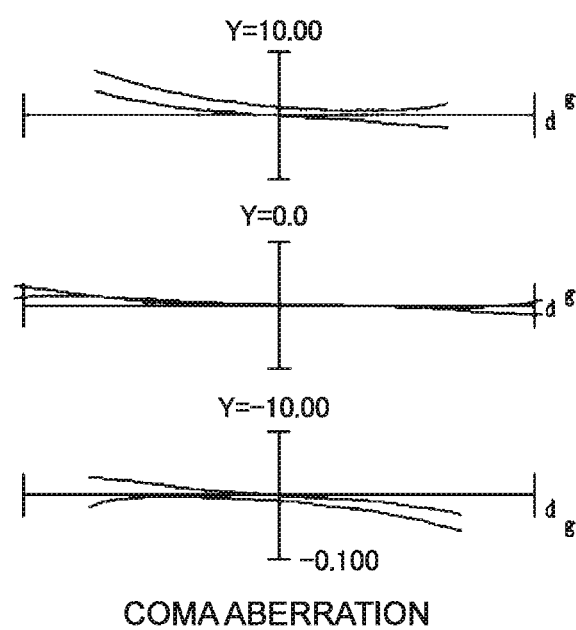

Hereinafter, a first embodiment will be described with reference to drawings. As shown in FIG. 1, a zoom optical system ZL according to the first embodiment is formed of, disposed in order from an object, a first lens group G1 having positive refractive power, a second lens group G2 having negative refractive power, and a third lens group G3 having positive refractive power.

According to this configuration, size reduction of a lens barrel and securement of a sufficient zoom ratio in a wide-angle end state can be achieved.

In the zoom optical system ZL according to the first embodiment, at least a part of the second lens group G2 or at least a part of the third lens group G3 is configured to be movable, as a vibration-proof lens group for correcting an image blur, so as to have a component in a direction perpendicular to an optical axis.

According to this configuration, size reduction of an image blur correction mechanism including the vibration-proof lens group can be achieved.

Then, under the configuration, the following conditional expression (1) is satisfied:

$$4.40 < f1/(-f2) < 8.00 \qquad (1)$$

where f1 denotes a focal length of the first lens group G1, and f2 denotes a focal length of the second lens group G2.

The conditional expression (1) specifies a proper ratio of the focal length of the first lens group G1 to the focal length of the second lens group G2. Successful optical performance and size reduction of an optical system can be achieved by satisfying the conditional expression (1).

If the ratio thereof is less than a lower limit of the conditional expression (1), refractive power of the first lens group G1 increases, and correction of coma aberration, astigmatism, and curvature of field in a telephoto end state becomes difficult, and therefore such a case is not preferable.

An effect of the first embodiment can be ensured by setting the lower limit of the conditional expression (1) to 5.00.

If the ratio thereof is more than an upper limit of the conditional expression (1), refractive power of the second lens group G2 increases, correction of coma aberration and astigmatism in a wide-angle end state becomes difficult, and therefore such a case is not preferable.

The effect of the first embodiment can be ensured by setting the upper limit of the conditional expression (1) to 7.00.

In the zoom optical system ZL according to the first embodiment, zooming is preferably made by varying an air distance between the first lens group G1 and the second lens group G2 and an air distance between the second lens group G2 and the third lens group G3.

According to this configuration, while variations in spherical aberration and curvature of field upon zooming are suppressed, a sufficient zoom ratio can be ensured.

In the zoom optical system ZL according to the first embodiment, the third lens group G3 is formed of, disposed in order from an object, a 31st lens group G31, a 32nd lens group G32, and a 33rd lens group G33, in which the 32nd lens group G32 is preferably configured to be movable, as the vibration-proof lens group, so as to have a component in a direction perpendicular to an optical axis.

According to this configuration, successful optical performance can be realized upon correcting the image blur (vibration proofing). Size reduction of the image blur correction mechanism can also be achieved.

In the zoom optical system ZL according to the first embodiment, the 32nd lens group G32 preferably has negative refractive power.

According to this configuration, successful optical performance can be realized upon correcting the image blur (vibration proofing).

The zoom optical system ZL according to the first embodiment preferably satisfies the following conditional expression (2):

$$2.00<(-f32)/f3<6.00 \qquad (2)$$

where f32 denotes a focal length of the 32nd lens group G32, and f3 denotes a focal length of the third lens group G3.

The conditional expression (2) specifies a proper ratio of the focal length of the 32nd lens group G32 to the focal length of the third lens group G3. Successful optical performance upon correcting the image blur (vibration proofing) and size reduction of the optical system can be achieved by satisfying the conditional expression (2).

If the ratio thereof is less than a lower limit of the conditional expression (2), refractive power of the third lens group G3 is reduced, size reduction of the lens barrel becomes difficult. If the refractive power of the first lens group G1 and the second lens group G2 is increased in order to achieve size reduction, correction of coma aberration, astigmatism, and curvature of field becomes difficult, and therefore such a case is not preferable.

The effect of the first embodiment can be ensured by setting the lower limit of the conditional expression (2) to 2.50.

If the ratio thereof is more than an upper limit of the conditional expression (2), refractive power of the third lens group G3 increases, correction of spherical aberration and coma aberration in the telephoto end state becomes difficult, and therefore such a case is not preferable. Refractive power of the 32nd lens group G32 also increases, and a shift amount upon correcting the image blur (vibration proofing) increases, and size reduction of the lens barrel becomes difficult.

The effect of the first embodiment can be ensured by setting the upper limit of the conditional expression (2) to 4.00.

The zoom optical system ZL according to the first embodiment preferably satisfies the following conditional expression (3):

$$0.50<|f31|/f3<2.00 \qquad (3)$$

where f31 denotes a focal length of the 31st lens group G31, and f3 denotes a focal length of the third lens group G3.

The conditional expression (3) specifies a proper ratio of the focal length of the 31st lens group 31 to the focal length of the third lens group G3. Successful optical performance and size reduction of the optical system can be achieved by satisfying the conditional expression (3).

If the ratio thereof is less than a lower limit of the conditional expression (3), refractive power of the third lens group G3 is reduced, and size reduction of the lens barrel becomes difficult. If refractive power of the first lens group G1 and the second lens group G2 is increased in order to achieve size reduction, correction of coma aberration, astigmatism, and curvature of field becomes difficult, and therefore such a case is not preferable.

The effect of the first embodiment can be ensured by setting the lower limit of the conditional expression (3) to 0.70.

If the ratio thereof is more than an upper limit of the conditional expression (3), refractive power of the third lens group G3 increases, and correction of spherical aberration and coma aberration in the telephoto end state becomes difficult, and therefore such a case is not preferable.

The effect of the first embodiment can be ensured by setting the upper limit of the conditional expression (3) to 1.50.

The zoom optical system ZL according to the first embodiment preferably satisfies the following conditional expression (4):

$$1.00<|f33|/f3 \qquad (4)$$

where f33 denotes a focal length of the 33rd lens group G33, and f3 denotes a focal length of the third lens group G3.

The conditional expression (4) specifies a proper ratio of the focal length of the 33rd lens group G33 to the focal length of the third lens group G3. Successful optical performance and size reduction of the optical system can be achieved by satisfying the conditional expression (4).

If the ratio thereof is less than a lower limit of the conditional expression (4), refractive power of the third lens group G3 is reduced, and size reduction of the lens barrel becomes difficult. If the refractive power of the first lens group G1 and the second lens group G2 is increased in order to achieve size reduction, correction of coma aberration, astigmatism, and curvature of field becomes difficult, and therefore such a case is not preferable.

The effect of the first embodiment can be ensured by setting the lower limit of the conditional expression (4) to 2.00.

In the zoom optical system ZL according to the first embodiment, the 32nd lens group G32 is preferably configured of a single lens.

According to this configuration, variations in decentering coma aberration and variations in curvature of field upon correcting the image blur can be successfully suppressed. Moreover, size reduction of the image blur correction mechanism can also be achieved.

The zoom optical system ZL according to the first embodiment has a stop S, and the stop S preferably moves along an optical axis direction integrally with the third lens group G3 upon zooming.

According to this configuration, lens barrel structure can be simplified and size reduction of the lens barrel can be achieved.

The zoom optical system ZL according to the first embodiment has a stop S, and the stop S is preferably arranged between the second lens group G2 and an image surface I.

According to this configuration, curvature of field and astigmatism can be successfully corrected.

The zoom optical system ZL according to the first embodiment preferably satisfies the following conditional expression (5):

$$30.00° < \omega w < 80.00° \quad (5)$$

where ωw denotes a half angle of view in a wide-angle end state.

The conditional expression (5) represents a condition specifying a value of an angle of view in a wide-angle end state. While the zoom optical system ZL has a wide angle of view, coma aberration, distortion, and curvature of field can be successfully corrected by satisfying the conditional expression (5).

Further successful aberration correction can be made by setting the lower limit of the conditional expression (5) to 33.00°. Still further successful aberration correction can be made by setting the lower limit of the conditional expression (5) to 36.00°.

Further successful aberration correction can be made by setting the upper limit of the conditional expression (5) to 77.00°.

The zoom optical system ZL according to the first embodiment preferably satisfies the following conditional expression (6):

$$2.00 < ft/fw < 15.00 \quad (6)$$

where ft denotes a focal length of the zoom optical system in the telephoto end state, and
fw denotes a focal length of the zoom optical system in a wide-angle end state.

The conditional expression (6) represents a condition specifying a ratio of the focal length of the zoom optical system in the telephoto end state to the focal length of the zoom optical system in the wide-angle end state. In the present zoom optical system ZL, a high zoom ratio can be obtained, and simultaneously spherical aberration and coma aberration can also be successfully corrected by satisfying the conditional expression (6).

Further successful aberration correction can be made by setting the lower limit of the conditional expression (6) to 2.30. Still further successful aberration correction can be made by setting the lower limit of the conditional expression (6) to 2.50. An effect of the first embodiment can be exhibited to a maximum by setting the lower limit of the conditional expression (6) to 2.70.

Further successful aberration correction can be made by setting an upper limit of the conditional expression (6) to 10.00. Still further successful aberration correction can be made by setting the upper limit of the conditional expression (6) to 7.00.

The zoom optical system ZL according to the first embodiment preferably satisfies the following conditional expression (7):

$$3.60 < f1/f3 < 8.00 \quad (7)$$

where f1 denotes a focal length of the first lens group G1, and
f3 denotes a focal length of the third lens group G3.

The conditional expression (7) specifies a proper ratio of the focal length of the first lens group G1 to the focal length of the third lens group G3. Successful optical performance and size reduction of the optical system can be achieved by satisfying the conditional expression (7).

If the ratio thereof is less than a lower limit of the conditional expression (7), refractive power of the first lens group G1 increases, correction of coma aberration, astigmatism, and curvature of field in the telephoto end state becomes difficult, and therefore such a case is not preferable.

The effect of the first embodiment can be ensured by setting the lower limit of the conditional expression (7) to 3.80.

If the ratio thereof is more than an upper limit of the conditional expression (7), refractive power of the third lens group G3 increases, and correction of spherical aberration and coma aberration in the telephoto end state becomes difficult, and therefore such a case is not preferable.

The effect of the first embodiment can be ensured by setting the upper limit of the conditional expression (7) to 7.00.

The zoom optical system ZL according to the first embodiment preferably satisfies the following conditional expression (8):

$$0.73 < (-f2)/f3 < 2.00 \quad (8)$$

where f2 denotes a focal length of the second lens group G2, and
f3 denotes a focal length of the third lens group G3.

The conditional expression (8) specifies a proper ratio of the focal length of the second lens group G2 to the focal length of the third lens group G3. Successful optical performance and size reduction of the optical system can be achieved by satisfying the conditional expression (8).

If the ratio thereof is less than a lower limit of the conditional expression (8), refractive power of the second lens group G2 increases, correction of coma aberration and astigmatism in a wide-angle end state becomes difficult, and therefore such a case is not preferable.

The effect of the first embodiment can be ensured by setting the lower limit of the conditional expression (8) to 0.75.

If the ratio thereof is more than an upper limit of the conditional expression (8), refractive power of the third lens group G3 increases, and correction of spherical aberration and coma aberration in the telephoto end state becomes difficult, and therefore such a case is not preferable.

The effect of the first embodiment can be ensured by setting the upper limit of the conditional expression (8) to 1.20.

The zoom optical system ZL according to the first embodiment preferably satisfies the following conditional expressions (9) and (10):

$$0.14 < fw/f1 < 0.26 \quad (9)$$

$$0.77 < fw/f3 < 1.05 \quad (10)$$

where fw denotes a focal length of the zoom optical system in a wide-angle end state,
f1 denotes a focal length of the first lens group G1, and
f3 denotes a focal length of the third lens group G3.

The conditional expression (9) specifies a proper ratio of the focal length of the zoom optical system in the wide-angle end state to the focal length of the first lens group G1.

Successful optical performance and size reduction of the optical system can be achieved by satisfying the conditional expression (9).

If the ratio thereof is less than a lower limit of the conditional expression (9), refractive power of the first lens group G1 is reduced, and size reduction of the lens barrel becomes difficult. If the refractive power of the second lens of the group G2 is increased in order to achieve size reduction, correction of coma aberration, astigmatism, and curvature of field becomes difficult, and therefore such a case is not preferable.

The effect of the first embodiment can be ensured by setting the lower limit of the conditional expression (9) to 0.15.

If the ratio thereof is more than an upper limit of the conditional expression (9), refractive power of the first lens group G1 increases, correction of coma aberration, astigmatism, and curvature of field in the telephoto end state becomes difficult, and therefore such a case is not preferable.

The effect of the first embodiment can be ensured by setting the upper limit of the conditional expression (9) to 0.25.

The conditional expression (10) specifies a proper ratio of the focal length of the zoom optical system in the wide-angle end state to the focal length of the third lens group G3. Successful optical performance and size reduction of the optical system can be achieved by satisfying the conditional expression (10).

If the ratio thereof is less than a lower limit of the conditional expression (10), refractive power of the third lens group G3 is reduced, and size reduction of the lens barrel becomes difficult. If refractive power of the first lens group G1 and the second lens group G2 is increased in order to achieve size reduction, correction of coma aberration, astigmatism, and curvature of field becomes difficult, and therefore such a case is not preferable.

The effect of the first embodiment can be ensured by setting the lower limit of the conditional expression (10) to 0.80.

If the ratio thereof is more than an upper limit of the conditional expression (10), refractive power of the third lens group G3 increases, correction of spherical aberration, coma aberration, and astigmatism becomes difficult, and therefore such a case is not preferable.

The effect of the first embodiment can be ensured by setting the upper limit of the conditional expression (10) to 1.02.

The zoom optical system ZL according to the first embodiment preferably has, disposed in order from an object, a first lens group G1, a second lens group G2, a third lens group G3, and a fourth lens group G4, and an air distance between the third lens group G3 and the fourth lens group G4 is preferably varied upon zooming.

According to this configuration, while variations in spherical aberration and curvature of field upon zooming are suppressed, a sufficient zoom ratio can be ensured.

According to the first embodiment as described above, while the zoom optical system ZL is provided with the image blur correction mechanism, the zoom optical system ZL having high optical performance can be realized.

Figure 17:
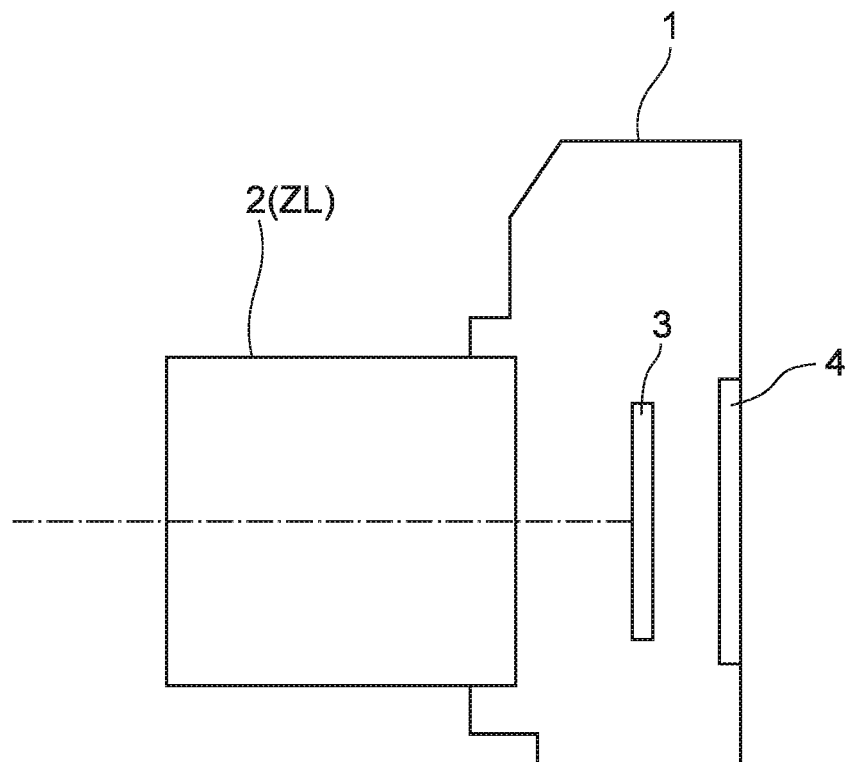
FIG. 17 is a substantial cross-sectional view showing a configuration of a camera according to each of first to fourth embodiments.

Next, a camera (imaging device) 1 provided with the above-mentioned zoom optical system ZL will be described with reference to FIG. 17. As shown in FIG. 17, the camera 1 is an interchangeable lens camera (so-called mirrorless camera) provided with the above-mentioned zoom optical system ZL as an imaging lens 2.

In the camera 1, light from an object (subject) (not shown) is collected by the imaging lens 2 to form a subject image on an imaging surface of an imaging unit 3 through an OLPF (optical low pass filter) (not shown). The subject image is then subjected to photoelectric conversion by a photoelectric conversion element provided in the imaging unit 3 to produce an image of the subject. This image is displayed on an EVF (electronic view finder) 4 provided in the camera 1. Thus, a photographer can observe the subject through the EVF 4.

Moreover, if a release bottom (not shown) is pressed by the photographer, the image of the subject produced in the imaging unit 3 is stored in a memory (not shown). Thus, the photographer can photograph the subject by the camera 1.

As is known also from each Example described later, while the zoom optical system ZL is provided with the image blur correction mechanism, the zoom optical system ZL according to the first embodiment, mounted in the camera 1 as the imaging lens 2, has high optical performance by the characteristic lens configuration. Thus, according to the present camera 1, while the imaging device is provided with the image blur correction mechanism, the imaging device having high optical performance can be realized.

In addition, even when the above-mentioned zoom optical system ZL is mounted on a single-lens reflex camera that has a quick return mirror and observes the subject by a finder optical system, an effect similar to the effect of the camera 1 can be produced. Moreover, even when the above-mentioned zoom optical system ZL is mounted on a video camera, an effect similar to the effect of the camera 1 can be produced.

Figure 18:
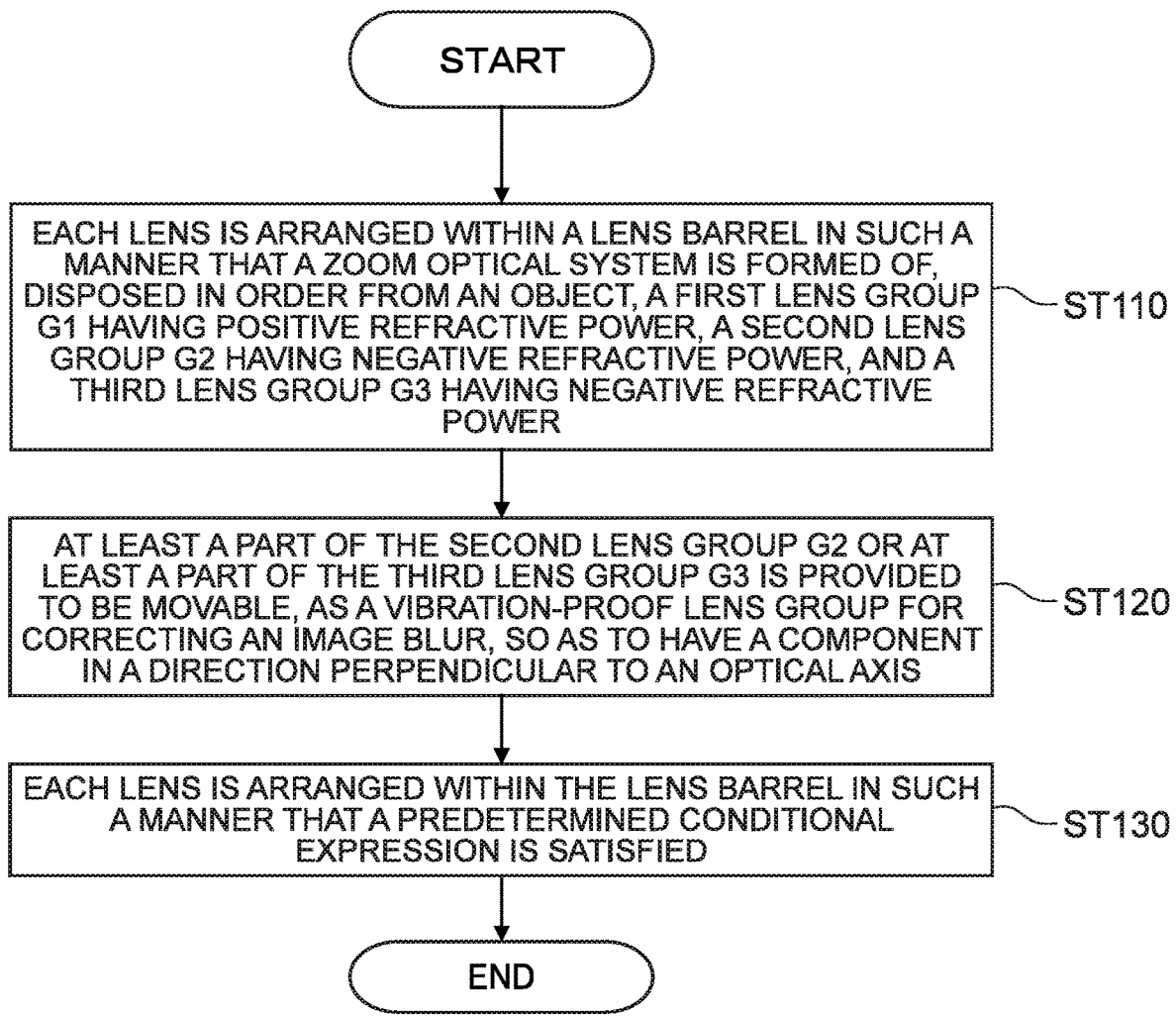
FIG. 18 is a flowchart for describing a method for manufacturing the zoom optical system according to the first embodiment.

Subsequently, a method for manufacturing the zoom optical system ZL having the configuration will be generally described with reference to FIG. 18. First, each lens is arranged within a lens barrel in such a manner that a zoom optical system ZL is formed of a first lens group G1 having positive refractive power, a second lens group G2 having negative refractive power, and a third lens group G3 having negative refractive power (step S110). At this time, at least a part of the second lens group G2 or at least a part of the third lens group G3 is configured to be movable, as a vibration-proof lens group for correcting the image blur caused by camera shake or the like, so as to have a component in a direction perpendicular to the optical axis (step ST120). Each lens is arranged within a lens barrel in such a manner that at least the following conditional expression (1) is satisfied among the conditional expressions (step ST130):

$$4.40 < f1/(-f2) < 8.00 \quad (1)$$

where f1 denotes a focal length of the first lens group G1, and f2 denotes a focal length of the second lens group G2.

To take a lens arrangement according to the first embodiment as one example, as shown in FIG. 1, as a first lens group G1, in order from an object, a cemented lens formed by cementing a negative meniscus lens L11 and a positive meniscus lens L12 each having a convex surface facing the object is arranged. As a second lens group G2, in order from the object, a negative meniscus lens L21 having a convex surface facing the object, a biconcave lens L22, a biconvex lens L23, and a negative meniscus lens L24 having a concave surface facing the object are arranged. As a third lens group G3, in order from the object, a positive meniscus lens L31 having a concave surface facing the object, a cemented lens formed by cementing a biconvex lens L32 and a biconcave lens L33, a biconcave lens L34, a biconvex lens L35, a biconvex lens L36, and a negative meniscus lens L37 having a concave surface facing the object are arranged. Moreover, each lens is arranged in such a manner that the conditional expression (1) (a corresponding value of the conditional expression (1) is 5.33) is satisfied.

According to the method for manufacturing the zoom optical system related to the first embodiment as described above, while the zoom optical system ZL is provided with the image blur correction mechanism, the zoom optical system ZL having high optical performance can be realized.

Next, a second embodiment will be described with reference to drawings. As shown in FIG. 1, a zoom optical system ZL according to the second embodiment has, disposed in order from an object, a first lens group G1 having positive refractive power, a second lens group G2 having negative refractive power, and a third lens group G3 having positive refractive power.

According to this configuration, size reduction of the lens barrel and securement of a sufficient zoom ratio in the wide-angle end state can be achieved.

In the zoom optical system ZL according to the second embodiment, at least a part of the second lens group G2 or at least a part of the third lens group G3 is configured to be movable, as a vibration-proof lens group for correcting an image blur, so as to have a component in a direction perpendicular to the optical axis.

According to this configuration, size reduction of the image blur correction mechanism, including the vibration-proof lens group, can be achieved.

Then, under the configuration, the following conditional expression (11) is satisfied:

$$3.60 < f1/f3 < 8.00 \quad (11)$$

where f1 denotes a focal length of the first lens group G1, and f3 denotes a focal length of the third lens group G3.
[0134] The conditional expression (11) specifies a proper ratio of the focal length of the first lens group G1 to the focal length of the third lens group G3. Successful optical performance and size reduction of the optical system can be achieved by satisfying the conditional expression (11).

If the ratio thereof is less than a lower limit of the conditional expression (11), refractive power of the first lens group G1 increases, and correction of coma aberration, astigmatism, and curvature of field in the telephoto end state becomes difficult, and therefore such a case is not preferable.

An effect of the second embodiment can be ensured by setting the lower limit of the conditional expression (11) to 3.80.

If the ratio thereof is more than an upper limit of the conditional expression (11), refractive power of the third lens group G3 increases, and correction of spherical aberration and coma aberration in the telephoto end state becomes difficult, and therefore such a case is not preferable.

The effect of the second embodiment can be ensured by setting the upper limit of the conditional expression (11) to 7.00.

In the zoom optical system ZL according to the second embodiment, zooming is preferably made by varying an air distance between the first lens group G1 and the second lens group G2, an air distance between the second lens group G2 and the third lens group G3.

According to this configuration, while variations in spherical aberration and curvature of field upon zooming are suppressed, a sufficient zoom ratio can be ensured.

In the zoom optical system ZL according to the second embodiment, the third lens group G3 is formed of, disposed in order from an object, a 31st lens group G31, a 32nd lens group G32, and a 33rd lens group G33, and the 32nd lens group G32 is preferably configured to be movable, as a vibration-proof lens group, so as to have a component in a direction perpendicular to the optical axis.

According to this configuration, successful optical performance can be realized upon correcting the image blur (vibration proofing). Moreover, size reduction of the image blur correction mechanism can also be achieved.

In the zoom optical system ZL according to the second embodiment, the 32nd lens group G32 preferably has negative refractive power.

According to this configuration, successful optical performance can be realized upon correcting the image blur (vibration proofing).

The zoom optical system ZL according to the second embodiment preferably satisfies the following conditional expression (12):

$$2.00 < (-f32)/f3 < 6.00 \quad (12)$$

where f32 denotes a focal length of the 32nd lens group G32, and f3 denotes a focal length of the third lens group G3.

The conditional expression (12) specifies a proper ratio of the focal length of the 32nd lens group to the focal length of the third lens group G3. Successful optical performance upon correcting the image blur (vibration proofing) and size reduction of the optical system can be achieved by satisfying the conditional expression (12).

If the ratio thereof is less than a lower limit of the conditional expression (12), refractive power of the third lens group G3 is reduced, and size reduction of the lens barrel becomes difficult. If refractive power of the first lens group G1 and the second lens group G2 is increased in order to achieve size reduction, correction of coma aberration, astigmatism, and curvature of field becomes difficult, and therefore such a case is not preferable.

The effect of the second embodiment can be ensured by setting the lower limit of the conditional expression (12) to 2.50.

If the ratio thereof is more than an upper limit of the conditional expression (12), refractive power of the third lens group G3 increases, and correction of spherical aberration and coma aberration in the telephoto end state becomes difficult, and therefore such a case is not preferable. Moreover, refractive power of the 32nd lens group G32 is reduced and a shift amount upon correcting the image blur (vibration proofing) increases, and size reduction of the lens barrel becomes difficult, and therefore such a case is not preferable.

The effect of the second embodiment can be ensured by setting the upper limit of the conditional expression (12) to 4.00.

The zoom optical system ZL according to the second embodiment preferably satisfies the following conditional expression (13):

$$0.50 < |f31|/f3 < 2.00 \quad (13)$$

where f31 denotes a focal length of the 31st lens group G31, and f3 denotes a focal length of the third lens group G3.

The conditional expression (13) specifies a proper ratio of the focal length of the 31st lens group G31 to the focal length of the third lens group G3. Successful optical performance and size reduction of the optical system can be achieved by satisfying the conditional expression (13).

If the ratio thereof is less than a lower limit of the conditional expression (13), refractive power of the third lens group G3 is reduced, and size reduction of the lens barrel becomes difficult. If refractive power of the first lens group G1 and the second lens group G2 is increased in order to achieve size reduction, correction of coma aberration, astigmatism, and curvature of field becomes difficult, and therefore such a case is not preferable.

The effect of the second embodiment can be ensured by setting the lower limit of the conditional expression (13) to 0.70.

If the ratio thereof is more than an upper limit of the conditional expression (13), refractive power of the third lens group G3 increases, and correction of spherical aberration and coma aberration in the telephoto end state becomes difficult, and therefore such a case is not preferable.

The effect of the second embodiment can be ensured by setting the upper limit of the conditional expression (13) to 1.50.

The zoom optical system ZL according to the second embodiment preferably satisfies the following conditional expression (14):

$$1.00 < |f33|/f3 \quad (14)$$

where f33 denotes a focal length of the 33rd lens group G33, and f3 denotes a focal length of the third lens group G3.

The conditional expression (14) specifies a proper ratio of the focal length of the 33rd lens group G33 to the focal length of the third lens group G3. Successful optical performance and size reduction of the optical system can be achieved by satisfying the conditional expression (14).

If the ratio thereof is less than a lower limit of the conditional expression (14), refractive power of the third lens group G3 is reduced, and size reduction of the lens barrel becomes difficult. If refractive power of the first lens group G1 and the second lens group G2 is increased in order to achieve size reduction, correction of coma aberration, astigmatism, and curvature of field becomes difficult, and therefore such a case is not preferable.

The effect of the second embodiment can be ensured by setting the lower limit of the conditional expression (14) to 2.00.

In the zoom optical system ZL according to the second embodiment, the 32nd lens group G32 is preferably configured of a single lens.

According to this configuration, variations in decentering coma aberration and variations in curvature of field upon correcting the image blur can be successfully corrected. Moreover, size reduction of the image blur correction mechanism can also be achieved.

The zoom optical system ZL according to the second embodiment has a stop S, and the stop S preferably moves along an optical axis direction integrally with the third lens group G3 upon zooming.

According to this configuration, lens barrel structure can be simplified, and size reduction of the lens barrel can be achieved.

The zoom optical system ZL according to the second embodiment has a stop S, and the stop S is preferably arranged between the second lens group G2 and the image surface I.

According to this configuration, curvature of field and astigmatism can be successfully corrected.

The zoom optical system ZL according to the second embodiment preferably satisfies the following conditional expression (15):

$$30.00° < \omega w < 80.00° \quad (15)$$

where ωw denotes a half angle of view in the wide-angle end state.

The conditional expression (15) represents a condition specifying a value of an angle of view in the wide-angle end state. While the zoom optical system ZL has a wide angle of view, coma aberration, distortion, and curvature of field can be successfully corrected by satisfying the conditional expression (15).

Further successful aberration correction can be made by setting a lower limit of the conditional expression (15) to 33.00°. Still further successful aberration correction can be made by setting the lower limit of the conditional expression (15) to 36.00°.

Further successful aberration correction can be made by setting an upper limit of the conditional expression (15) to 77.00.

The zoom optical system ZL according to the second embodiment preferably satisfies the following conditional expression (16):

$$2.00 < ft/fw < 15.00 \quad (16)$$

where ft denotes a focal length of the zoom optical system in the telephoto end state, and fw denotes a focal length of the zoom optical system in the wide-angle end state.

The conditional expression (16) represents a condition specifying a ratio of the focal length of the zoom optical system in the telephoto end state to the focal length of the zoom optical system in the wide-angle end state. In the present zoom optical system ZL, a high zoom ratio can be obtained, and simultaneously spherical aberration and coma aberration can be successfully corrected by satisfying the conditional expression (16).

Further successful aberration correction can be made by setting a lower limit of the conditional expression (16) to 2.30. Still further successful aberration correction can be made by setting the lower limit of the conditional expression (16) to 2.50. An effect of the second embodiment can be exhibited to a maximum by setting the lower limit of the conditional expression (16) to 2.70.

Further successful aberration correction can be made by setting an upper limit of the conditional expression (16) to 10.00. Still further successful aberration correction can be made by setting the upper limit of the conditional expression (16) to 7.00.

According to the second embodiment as described above, while the zoom optical system ZL is provided with the image blur correction mechanism, the zoom optical system ZL having high optical performance can be realized.

Next, a camera (imaging device) 1 provided with the above-mentioned zoom optical system ZL will be described with reference to FIG. 17. The camera 1 is identical with the camera 1 in the first embodiment, and the configuration thereof has been already described, and the description herein is omitted.

As is known also from each Example described later, while the zoom optical system ZL is provided with the image blur correction mechanism, the zoom optical system ZL according to the second embodiment, mounted in the camera 1 as the imaging lens 2, has high optical performance by the characteristic lens configuration. Thus, according to the present camera 1, while the imaging device is provided with the image blur correction mechanism, the imaging device having high optical performance can be realized.

In addition, even when the above-mentioned zoom optical system ZL is mounted on a single-lens reflex camera that has a quick return mirror and observes the subject by a finder optical system, an effect similar to the effect of the camera 1 can be produced. Moreover, even when the above-mentioned zoom optical system ZL is mounted on a video camera, an effect similar to the effect of the camera 1 can be produced.

Figure 19:
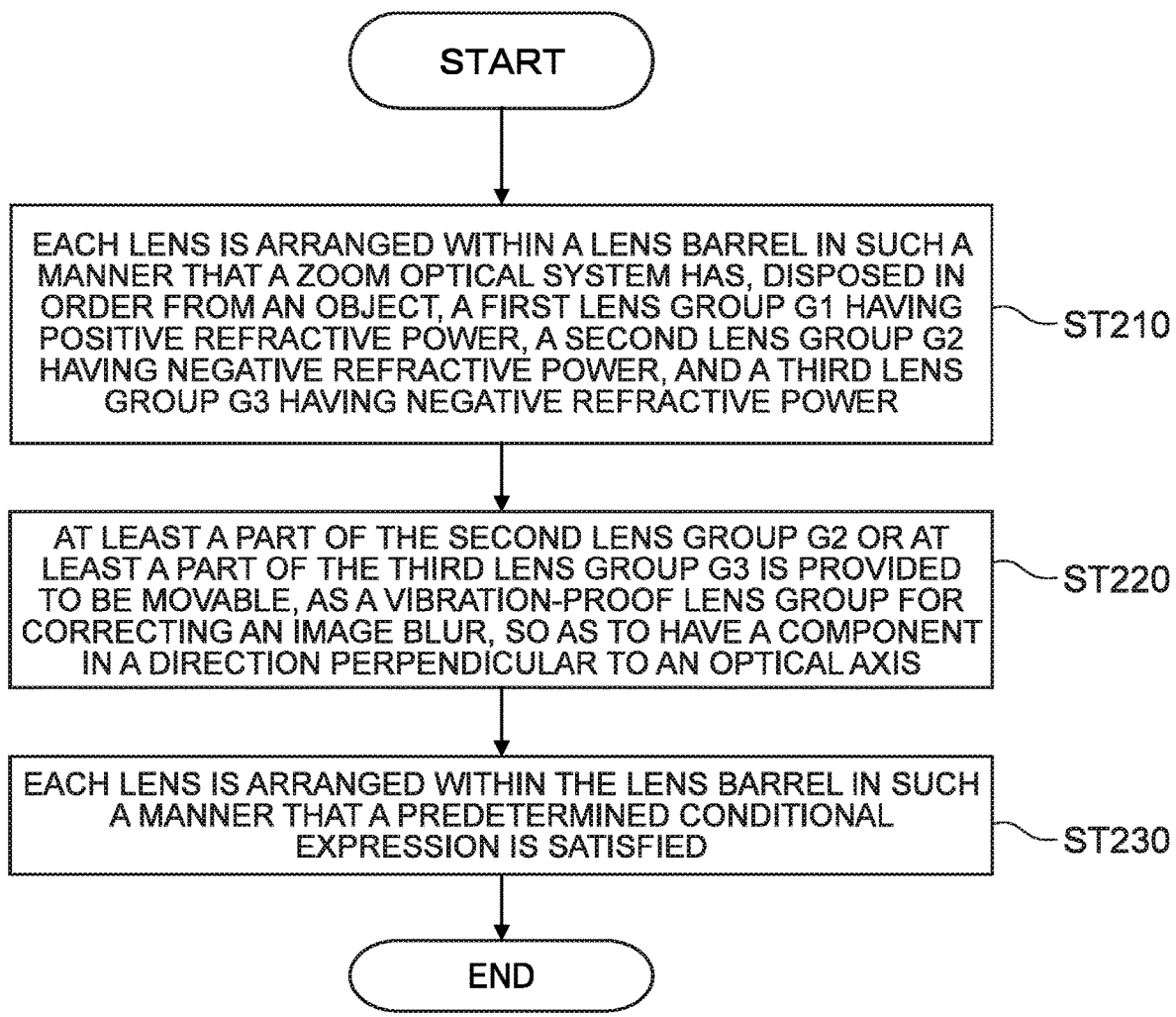
FIG. 19 is a flowchart for describing a method for manufacturing the zoom optical system according to the second embodiment.

Subsequently, a method for manufacturing the zoom optical system ZL having the configuration will be generally described with reference to FIG. 19. First, each lens is arranged within a lens barrel in such a manner that a zoom optical system ZL has a first lens group G1 having positive refractive power, a second lens group G2 having negative refractive power, and a third lens group G3 having positive refractive power (step ST210). At this time, at least a part of the second lens group G2 or at least a part of the third lens group G3 is configured to be movable, as a vibration-proof lens group for correcting an image blur (caused by camera shake or the like), so as to have a component in a direction perpendicular to an optical axis (step ST220). Each lens is arranged within the lens barrel in such a manner that at least the following conditional expression (11) among the conditional expressions (step ST230):

$$3.60 < f1/f3 < 8.00 \quad (11)$$

where f1 denotes a focal length of the first lens group G1, and f3 denotes a focal length of the third lens group G3.

To take a lens arrangement according to the second embodiment as one example, as shown in FIG. 1, as the first lens group G1, in order from an object, a cemented lens formed by cementing a negative meniscus lens L11 and a positive meniscus lens L12 each having a convex surface facing the object is arranged. As the second lens group G2, in order from the object, a negative meniscus lens L21 having a convex surface facing the object, a biconcave lens L22, a biconvex lens L23, and a negative meniscus lens L24 having a concave surface facing the object are arranged. As the third lens group G3, in order from the object, a positive meniscus lens L31 having a convex surface facing the object, a cemented lens formed by cementing a biconvex lens L32 and a biconcave lens L33, a biconcave lens L34, a biconvex lens 135, a biconvex lens L36, and a negative meniscus lens L37 having a concave surface facing the object are arranged. Moreover, each lens is arranged in such a manner that the conditional expression (11) (a corresponding value of the conditional expression (11) is 4.06) is satisfied.

According to the method for manufacturing the zoom optical system related to the second embodiment as described above, while the zoom optical system ZL is provided with the image blur correction mechanism, the zoom optical system ZL having high optical performance can be realized.

Next, a third embodiment will be described with reference to drawings. As shown in FIG. 1, a zoom optical system ZL according to the third embodiment is formed of, disposed in order from an object, a first lens group G1 having positive refractive power, a second lens group G2 having negative refractive power, and a third lens group G3 having positive refractive power.

According to this configuration, size reduction of the lens barrel and securement of a sufficient zoom ratio in the wide-angle end state can be achieved.

The zoom optical system ZL according to the third embodiment moves the first lens group G1 to a direction of the object along an optical axis direction upon zooming from the wide-angle end state to the telephoto end state.

According to this configuration, a sufficient zoom ratio can be ensured.

In the zoom optical system ZL according to the third embodiment, focusing is made by moving at least a part of the third lens group G3 along the optical axis direction.

According to this configuration, variations in aberration (for example, spherical aberration) upon focusing can be suppressed.

Then, under the configuration, the following conditional expression (17) is satisfied:

$$0.73 < (-f2)/f3 < 2.00 \quad (17)$$

where f2 denotes a focal length of the second lens group G2, and f3 denotes a focal length of the third lens group G3.

The conditional expression (17) specifies a proper ratio of the focal length of the second lens group G2 to the focal length of the third lens group G3. Successful optical performance and size reduction of the optical system can be achieved by satisfying the conditional expression (17).

If the ratio thereof is less than a lower limit of the conditional expression (17), refractive power of the second lens group G2 increases, correction of coma aberration and astigmatism in the wide-angle end state becomes difficult, and therefore such a case is not preferable.

An effect of the third embodiment can be ensured by setting the lower limit of the conditional expression (17) to 0.75.

If the ratio thereof is more than an upper limit of the conditional expression (17), refractive power of the third lens group G3 increases, and correction of spherical aberration and coma aberration in the telephoto end state becomes difficult, and therefore such a case is not preferable.

The effect of the third embodiment can be ensured by setting the upper limit of the conditional expression (17) to 1.20.

In the zoom optical system ZL according to the third embodiment, zooming is preferably made by varying an air distance between the first lens group G1 and the second lens group G2 and an air distance between the second lens group G2 and the third lens group G3.

According to this configuration, while variations in spherical aberration and curvature of field upon zooming are suppressed, a sufficient zoom ratio can be ensured.

In the zoom optical system ZL according to the third embodiment, the third lens group G3 is formed of, disposed in order from the object, a 3A lens group G3A and a 3B lens group G3B each having positive refractive power, in which focusing is preferably made by moving the 3A lens group G3A along the optical axis direction.

According to this configuration, variations in aberration (for example, spherical aberration) upon focusing can be suppressed.

The zoom optical system ZL according to the third embodiment preferably satisfies the following conditional expression (18):

$$1.00 < f3A/f3 < 4.00 \quad (18)$$

where f3A denotes a focal length of the 3A lens group G3A.

The conditional expression (18) specifies a proper ratio of the focal length of the 3A lens group G3A to the focal length of the third lens group G3. Successful optical performance upon focusing and size reduction of the optical system can be achieved by satisfying the conditional expression (18).

If the ratio thereof is less than a lower limit of the conditional expression (18), refractive power of the third lens group G3 is reduced, and size reduction of the lens barrel becomes difficult. If refractive power of the first lens group G1 and the second lens group G2 is increased in order to achieve size reduction, correction of coma aberration, astigmatism, and curvature of field becomes difficult, and therefore such a case is not preferable.

The effect of the third embodiment can be ensured by setting the lower limit of the conditional expression (18) to 1.50.

If the ratio thereof is more than an upper limit of the conditional expression (18), refractive power of the third lens group G3 increases, and correction of spherical aberration and coma aberration in the telephoto end state becomes difficult, and therefore such a case is not preferable.

The effect of the third embodiment can be ensured by setting the upper limit of the conditional expression (18) to 3.50.

In the zoom optical system ZL according to the third embodiment, the 3A lens group G3A is preferably formed of a single lens.

According to this configuration, size reduction of a focusing mechanism can be achieved.

The zoom optical system ZL according to the third embodiment preferably satisfies the following conditional expression (19):

$$1.00 < |f3B|/f3 < 5.00 \quad (19)$$

where f3 denotes a focal length of the third lens group G3.

The conditional expression (19) specifies a proper ratio of the focal length of the 3B lens group to the focal length of the third lens group G3. Successful optical performance and size reduction of the optical system can be achieved by satisfying the conditional expression (19).

If the ratio thereof is less than a lower limit of the conditional expression (19), refractive power of the third lens group G3 is reduced, and size reduction of the lens barrel becomes difficult. If refractive power of the first lens group G1 and the second lens group G2 is increased in order to achieve size reduction, correction of coma aberration, astigmatism, and curvature of field becomes difficult, and therefore such a case is not preferable.

The effect of the third embodiment can be ensured by setting the lower limit of the conditional expression (19) to 1.20.

If the ratio thereof is more than an upper limit of the conditional expression (19), refractive power of the third lens group G3 increases, and correction of spherical aberration and coma aberration in the telephoto end state becomes difficult, and therefore such a case is not preferable.

The effect of the third embodiment can be ensured by setting the upper limit of the conditional expression (19) to 3.00.

In the zoom optical system ZL according to the third embodiment, at least a part of the 3B lens group G3B is preferably configured to be movable, as a vibration-proof lens group VR for correcting an image blur, so as to have a component in a direction perpendicular to the optical axis.

According to this configuration, successful optical performance upon correcting the image blur (vibration proofing) can be realized. Moreover, size reduction of an image blur correction mechanism, including the vibration-proof lens group VR, can be achieved.

In the zoom optical system ZL according to the third embodiment, the vibration-proof lens group VR preferably has negative refractive power.

According to this configuration, successful optical performance upon correcting the image blur (vibration proofing) can be realized.

The zoom optical system ZL according to the third embodiment preferably satisfies the following conditional expression (20):

$$2.00 < |fvr|/f3 < 6.00 \quad (20)$$

where fvr denotes a focal length of the vibration-proof lens group VR.

The conditional expression (20) specifies a proper ratio of the focal length of the vibration-proof lens group VR to the focal length of the third lens group G3. Successful optical performance upon correcting the image blur and size reduction of the optical system can be achieved by satisfying the conditional expression (20).

If the ratio thereof is less than a lower limit of the conditional expression (20), refractive power of the third lens group G3 is reduced, and size reduction of the lens barrel becomes difficult. If refractive power of the first lens group G1 and the second lens group G2 is increased in order to achieve size reduction, correction of coma aberration, astigmatism, and curvature of field becomes difficult, and therefore such a case is not preferable.

The effect of the third embodiment can be ensured by setting the lower limit of the conditional expression (20) to 2.50.

If the ratio thereof is more than an upper limit of the conditional expression (20), refractive power of the third lens group G3 increases, and correction of spherical aberration and coma aberration in the telephoto end state becomes difficult, and therefore such a case is not preferable. Moreover, refractive power of the vibration-proof lens group VR is reduced, and a shift amount upon correcting the image blur (vibration proofing) increases, and size reduction of the lens barrel becomes difficult.

The effect of the third embodiment can be ensured by setting the upper limit of the conditional expression (20) to 4.00.

In the zoom optical system ZL according to the third embodiment, the vibration-proof lens group VR is preferably formed of a single lens.

According to this configuration, size reduction of the image blur correction mechanism can be achieved.

The zoom optical system ZL according to the third embodiment has a stop S, and the stop S preferably moves along the optical axis direction integrally with the third lens group G3 upon zooming.

According to this configuration, lens barrel structure can be simplified, and size reduction of the lens barrel can be achieved.

The zoom optical system ZL according to the third embodiment has a stop S, and the stop S is preferably arranged between the second lens group G2 and the image surface I.

According to this configuration, curvature of field and astigmatism can be successfully corrected.

The zoom optical system ZL according to the third embodiment preferably satisfies the following conditional expression (21):

$$30.00° < \omega w < 80.00° \quad (21)$$

where $\omega w$ denotes a half angle of view in the wide-angle end state.

The conditional expression (21) represents a condition specifying a value of an angle of view in the wide-angle end state. While the zoom optical system ZL has a wide angle of view, coma aberration, distortion, and curvature of field can be successfully corrected by satisfying the conditional expression (21).

Further successful aberration correction can be made by setting a lower limit of the conditional expression (21) to 33.00°. Still further successful aberration correction can be made by setting the lower limit of the conditional expression (21) to 36.00°.

Further successful aberration correction can be made by setting an upper limit of the conditional expression (21) to 77.00°.

The zoom optical system ZL according to the third embodiment preferably satisfies the following conditional expression (22):

$$2.00 < ft/fw < 15.00 \tag{22}$$

where ft denotes a focal length of the zoom optical system in the telephoto end state, and fw denotes a focal length of the zoom optical system in the wide-angle end state.

The conditional expression (22) represents a condition specifying a ratio of the focal length of the zoom optical system in the telephoto end state to the focal length of the zoom optical system in the wide-angle end state. In the present zoom optical system ZL, a high zoom ratio can be obtained, and simultaneously spherical aberration and coma aberration can be successfully corrected by satisfying the conditional expression (22).

Further successful aberration correction can be made by setting the lower limit of the conditional expression (22) to 2.30. Still further successful aberration correction can be made by setting the lower limit of the conditional expression (22) to 2.50. The effect of the third embodiment can be exhibited to a maximum by setting the lower limit of the conditional expression (22) to 2.70.

Further successful aberration correction can be made by setting an upper limit of the conditional expression (22) to 10.00. Still further successful aberration correction can be made by setting the upper limit of the conditional expression (22) to 7.00.

According to the third embodiment as described above, the zoom optical system ZL having high optical performance can be realized.

Next, a camera (imaging device) 1 provided with the above-mentioned zoom optical system ZL will be described with reference to FIG. 17. The camera 1 is identical with the camera 1 in the first embodiment, and the configuration has been already described, and therefore the description herein is omitted.

As is known also from each Example described later, the zoom optical system ZL according to the third embodiment, mounted in the camera 1 as an imaging lens 2, has high optical performance by the characteristic lens configuration. Thus, according to the present camera 1, the imaging device having high optical performance can be realized.

In addition, even when the above-mentioned zoom optical system ZL is mounted on a single-lens reflex camera that has a quick return mirror and observes the subject by a finder optical system, an effect similar to the effect of the camera 1 can be produced. Moreover, even when the above-mentioned zoom optical system ZL is mounted on a video camera, an effect similar to the effect of the camera 1 can be produced.

Figure 20:
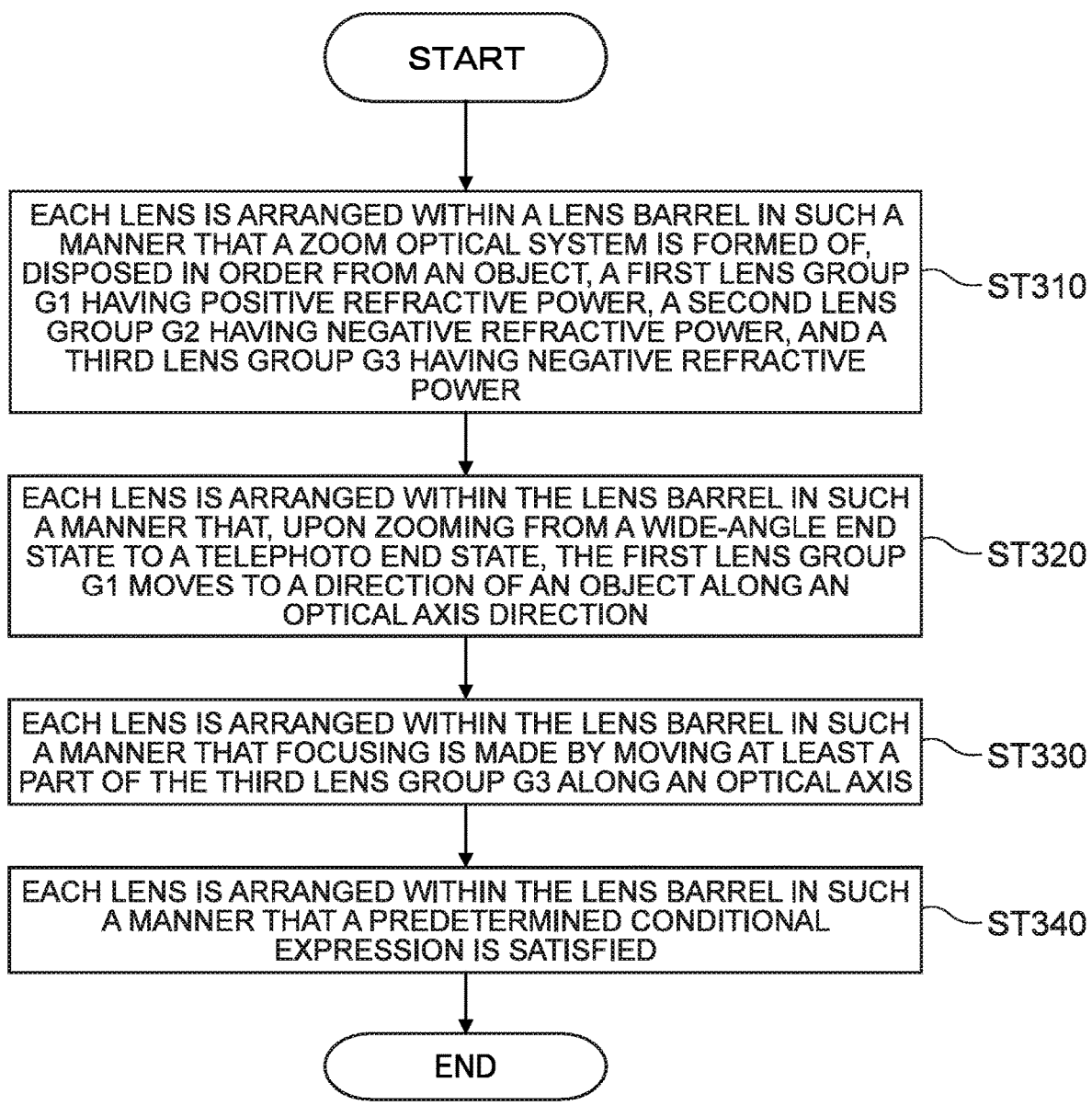
FIG. 20 is a flowchart for describing a method for manufacturing the zoom optical system according to the third embodiment.

Subsequently, a method for manufacturing the zoom optical system ZL having the configuration will be generally described with reference to FIG. 20. First, each lens is arranged within a lens barrel in such a manner that a zoom optical system ZL is formed of a first lens group G1 having positive refractive power, a second lens group G2 having negative refractive power, and a third lens group G3 having positive refractive power (step ST310). At this time, each lens is arranged in such a manner that the first lens group G1 moves to a direction of an object along an optical axis direction upon zooming from a wide-angle end state to a telephoto end state (step ST320). Each lens is arranged in such a manner that focusing is made by moving at least a part of the third lens group G3 along the optical axis direction (step ST330). Moreover, each lens is arranged within the lens barrel in such a manner that at least the following conditional expression (17) is satisfied among the conditional expressions (step ST340):

$$0.73 < (-f2)/f3 < 2.00 \tag{17}$$

where f2 denotes a focal length of the second lens group G2, and f3 denotes a focal length of the third lens group G3.

To take a lens arrangement according to the third embodiment as one example, as shown in FIG. 1, in order from an object, a cemented lens formed by cementing a negative meniscus lens L11 and a positive meniscus lens L12 each having a convex surface facing the object is arranged. As the second lens group G2, in order from the object, a negative meniscus lens L21 having a convex surface facing the object, a biconcave lens L22, a biconvex lens L23, and a negative meniscus lens L24 having a concave surface facing the object are arranged. As the third lens group G3, in order from the object, a positive meniscus lens L31 having a concave surface facing the object, a cemented lens formed by cementing a biconvex lens L32 and a biconcave lens L33, a biconcave lens L34, a biconvex L35, a biconvex lens L36, and a negative meniscus lens L37 having a concave surface facing the object are arranged. Moreover, each lens is arranged in such a manner that the conditional expression (17) (a corresponding value of the conditional expression (17) is 0.76) is satisfied.

According to the method for manufacturing the zoom optical system related to the third embodiment as described above, the zoom optical system ZL having has high optical performance can be realized.

Next, a fourth embodiment will be described with reference to drawings. As shown in FIG. 1, a zoom optical system ZL according to the fourth embodiment has, disposed in order from an object, a first lens group G1 having positive refractive power, a second lens group G2 having negative refractive power, and a third lens group G3 having positive refractive power.

According to this configuration, size reduction of a lens barrel in the wide-angle end state can be achieved.

The zoom optical system ZL according to the fourth embodiment moves the first lens group G1 to a direction of the object along an optical axis direction upon zooming from a wide-angle end state to a telephoto end state.

According to this configuration, a sufficient zoom ratio can be ensured.

Then, under the configuration, the following conditional expressions (23) and (24) are satisfied:

$$0.14 < fw/f1 < 0.26 \tag{23}$$

$$0.77 < fw/f3 < 1.05 \tag{24}$$

where fw denotes a focal length of the zoom optical system in the wide-angle end state,
f1 denotes a focal length of the first lens group G1, and
f3 denotes a focal length of the third lens group G3.

The conditional expression (23) specifies a proper ratio of the focal length of the zoom optical system in a wide-angle end state to the focal length of the first lens group G1. Successful optical performance and size reduction of the optical system can be achieved by satisfying the conditional expression (23).

If the ratio thereof is less than a lower limit of the conditional expression (23), refractive power of the first lens group G1 is reduced, and size reduction of the lens barrel becomes difficult. If refractive power of the second lens group G2 is increased in order to achieve size reduction, correction of coma aberration, astigmatism, and curvature of field becomes difficult, and therefore such a case is not preferable.

An effect of the fourth embodiment can be ensured by setting the lower limit of the conditional expression (23) to 0.15.

If the ratio thereof is more than an upper limit of the conditional expression (23), refractive power of the first lens group G1 increases, correction of coma aberration, astigmatism, and curvature of field in the telephoto end state becomes difficult, and therefore such a case is not preferable.

The effect of the fourth embodiment can be ensured by setting the upper limit of the conditional expression (23) to 0.25.

The conditional expression (24) specifies a proper ratio of the focal length of the zoom optical system in a wide-angle end state to the focal length of the third lens group G3. Successful optical performance and size reduction of the optical system can be achieved by satisfying the conditional expression (24).

If the ratio thereof is less than a lower limit of the conditional expression (24), refractive power of the third lens group G3 is reduced, and size reduction of the lens barrel becomes difficult. If refractive power of the first lens group G1 and the second lens group G2 is increased in order to achieve size reduction, correction of coma aberration, astigmatism, and curvature of field becomes difficult, and therefore such a case is not preferable.

The effect of the fourth embodiment can be ensured by setting the lower limit of the conditional expression (24) to 0.80.

If the ratio thereof is more than an upper limit of the conditional expression (24), refractive power of the third lens group G3 increases, and correction of spherical aberration, coma aberration, and astigmatism becomes difficult, and therefore such a case is not preferable.

The effect of the fourth embodiment can be ensured by setting the upper limit of the conditional expression (24) to 1.02.

In the zoom optical system ZL according to the fourth embodiment, zooming is preferably made by varying an air distance between the first lens group G1 and the second lens group G2, an air distance between the second lens group G2 and the third lens group G3.

According to this configuration, while variations in spherical aberration and curvature of field upon zooming are suppressed, a sufficient zoom ratio can be ensured.

In the zoom optical system ZL according to the fourth embodiment, at least a part of the second lens group G2 or at least a part of the third lens group G3 is preferably configured to be movable, as a vibration-proof lens group for correcting an image blur (caused by camera shake or the like), so as to have a component in a direction perpendicular to the optical axis.

According to this configuration, size reduction of an image blur correction mechanism, including the vibration-proof lens group, can be achieved.

In the zoom optical system ZL according to the fourth embodiment, focusing is preferably made by moving at least a part of the third lens group G3 along the optical axis direction.

According to this configuration, variations in aberration (for example, spherical aberration) upon focusing can be suppressed.

In the zoom optical system ZL according to the fourth embodiment, the third lens group G3 is formed of, disposed in order from the object, a 31st lens group G31, a 32nd lens group G32, and a 33rd lens group G33, and the 32nd lens group G32 is preferably configured to be movable, as a vibration-proof lens group, so as to have a component in a direction perpendicular to the optical axis.

According to this configuration, successful optical performance upon correcting the image blur (vibration proofing) can be realized. Moreover, size reduction of the image blur correction mechanism can be achieved.

In the zoom optical system ZL according to the fourth embodiment, the 32nd lens group G32 preferably has negative refractive power.

According to this configuration, successful optical performance upon correcting the image blur (vibration proofing) can be realized.

The zoom optical system ZL according to the fourth embodiment preferably satisfies the following conditional expression (25):

$$2.00 < (-f32)/f3 < 6.00 \tag{25}$$

where f32 denotes a focal length of the 32nd lens group G32, and
f3 denotes a focal length of the third lens group G3.

The conditional expression (25) specifies a proper ratio of the focal length of the 32nd lens group G32 to the focal length of the third lens group G3. Successful optical performance upon correcting the image blur (vibration proofing) and size reduction of the optical system can be achieved by satisfying the conditional expression (25).

If the ratio thereof is less than a lower limit of the conditional expression (25), refractive power of the third lens group G3 is reduced, and size reduction of the lens barrel becomes difficult. If refractive power of the first lens group G1 and the second lens group G2 is increased in order to achieve size reduction, correction of coma aberration, astigmatism, and curvature of field becomes difficult, and therefore such a case is not preferable.

The effect of the fourth embodiment can be ensured by setting the lower limit of the conditional expression (25) to 2.50.

If the ratio thereof is more than an upper limit of the conditional expression (25), refractive power of the third lens group G3 increases, and correction of spherical aberration and coma aberration in the telephoto end state becomes difficult. Moreover, refractive power of the 32nd lens group G32 is reduced and a shift amount upon correcting the image blur (vibration proofing) increases, and size reduction of the lens barrel becomes difficult.

The effect of the fourth embodiment can be ensured by setting the upper limit of the conditional expression (25) to 4.00.

The zoom optical system ZL according to the fourth embodiment preferably satisfies the following conditional expression (26):

$$0.50 < |f31|/f3 < 2.00 \quad (26)$$

where f31 denotes a focal length of the 31st lens group G31, and f3 denotes a focal length of the third lens group G3.

The conditional expression (26) specifies a proper ratio of the focal length of the 31st lens group G31 to the focal length of the third lens group G3. Successful optical performance and size reduction of the optical system can be achieved by satisfying the conditional expression (26).

If the ratio thereof is less than a lower limit of the conditional expression (26), refractive power of the third lens group G3 is reduced, and size reduction of the lens barrel becomes difficult. If refractive power of the first lens group G1 and the second lens group G2 is increased in order to achieve size reduction, correction of coma aberration, astigmatism, and curvature of field becomes difficult, and therefore such a case is not preferable.

The effect of the fourth embodiment can be ensured by setting the lower limit of the conditional expression (26) to 0.70.

If the ratio thereof is more than an upper limit of the conditional expression (26), refractive power of the third lens group G3 increases, and correction of spherical aberration and coma aberration in the telephoto end state becomes difficult, and therefore such a case is not preferable.

The effect of the fourth embodiment can be ensured by setting the upper limit of the conditional expression (26) to 1.50.

The zoom optical system ZL according to the fourth embodiment preferably satisfies the following conditional expression (27):

$$1.00 < |f33|/f3 \quad (27)$$

where f33 denotes a focal length of the 33rd lens group G33, and f3 denotes a focal length of the third lens group G3.

The conditional expression (27) specifies a proper ratio of the focal length of the 33rd lens group G33 to the focal length of the third lens group G3. Successful optical performance and size reduction of the optical system can be achieved by satisfying the conditional expression (27).

If the ratio thereof is less than a lower limit of the conditional expression (27), refractive power of the third lens group G3 is reduced, and size reduction of the lens barrel becomes difficult. If refractive power of the first lens group G1 and the second lens group G2 is increased in order to achieve size reduction, correction of coma aberration, astigmatism, and curvature of field becomes difficult, and therefore such a case is not preferable.

The effect of the fourth embodiment can be ensured by setting the lower limit of the conditional expression (27) to 2.00.

In the zoom optical system ZL according to the fourth embodiment, the 32nd lens group G32 is preferably configured of a single lens.

According to this configuration, variations in decentering coma aberration and variations in curvature of field upon correcting the image blur can be successfully corrected. Moreover, size reduction of the image blur correction mechanism can be achieved.

In the zoom optical system 1ZL according to the fourth embodiment, the 31st lens group G31 is preferably formed of, disposed in order from the object, a front group G3F having positive refractive power and a rear group G3R, in which focusing is preferably made by moving the front group G3F along the optical axis direction.

According to this configuration, variations in aberration (for example, spherical aberration) upon focusing can be suppressed.

The zoom optical system ZL according to the fourth embodiment has a stop S, and the stop S preferably moves along the optical axis direction integrally with the third lens group G3 upon zooming.

According to this configuration, lens barrel structure can be simplified, and size reduction of the lens barrel can be achieved.

The zoom optical system ZL according to the fourth embodiment has a stop S, and the stop S is preferably arranged between the second lens group G2 and the image surface I.

According to this configuration, curvature of field and astigmatism can be successfully corrected.

The zoom optical system ZL according to the fourth embodiment preferably satisfies the following conditional expression (28):

$$30.00° < \omega w < 80.00° \quad (28)$$

where ωw denotes a half angle of view in a wide-angle end state.

The conditional expression (28) represents a condition specifying a value of an angle of view in the wide-angle end state. While the zoom optical system ZL has a wide angle of view, coma aberration, distortion, and curvature of field can be successfully corrected by satisfying the conditional expression (28).

Further successful aberration correction can be made by setting a lower limit of the conditional expression (28) to 33.00°. Still further successful aberration correction can be made by setting the lower limit of the conditional expression (28) to 36.00°.

Further successful aberration correction can be made by setting an upper limit of the conditional expression (28) to 77.00°.

The zoom optical system ZL according to the fourth embodiment preferably satisfies the following conditional expression (29):

$$2.00 < ft/fw < 15.00 \quad (29)$$

where ft denotes a focal length of the zoom optical system in the telephoto end state, and fw denotes a focal length of the zoom optical system in the wide-angle end state.

The conditional expression (29) represents a condition specifying a ratio of the focal length of the zoom optical system in the telephoto end state to the focal length of the zoom optical system in the wide-angle end state. In the present zoom optical system ZL, a high zoom ratio can be obtained, and simultaneously spherical aberration and coma aberration can be successfully corrected by satisfying the conditional expression (29).

Further successful aberration correction can be made by setting a lower limit of the conditional expression (29) to 2.30. Still further successful aberration correction can be made by setting the lower limit of the conditional expression (29) to 2.50. The effect of the fourth embodiment can be exhibited to a maximum by setting the lower limit of the conditional expression (29) to 2.70.

Further successful aberration correction can be made by setting an upper limit of the conditional expression (29) to 10.00. Still further successful aberration correction can be made by setting the upper limit of the conditional expression (29) to 7.00.

According to the fourth embodiment as described above, the zoom optical system ZL having high optical performance can be realized.

Next, a camera (imaging device) 1 provided with the above-mentioned zoom optical system ZL will be described with reference to FIG. 17. The camera 1 is identical with the camera 1 in the first embodiment, and the configuration has been already described above, and therefore the description herein is omitted.

As is known also from each Example described later, the zoom optical system ZL according to the fourth embodiment, mounted in the camera 1 as an imaging lens 2, has high optical performance by the characteristic lens configuration. Thus, according to the present camera 1, the imaging device having high optical performance can be realized.

In addition, even when the above-mentioned zoom optical system ZL is mounted on a single-lens reflex camera that has a quick return mirror and observes the subject by a finder optical system, an effect similar to the effect of the camera 1 can be produced. Moreover, even when the above-mentioned zoom optical system ZL is mounted on a video camera, an effect similar to the effect of the camera 1 can be produced.

Figure 21:
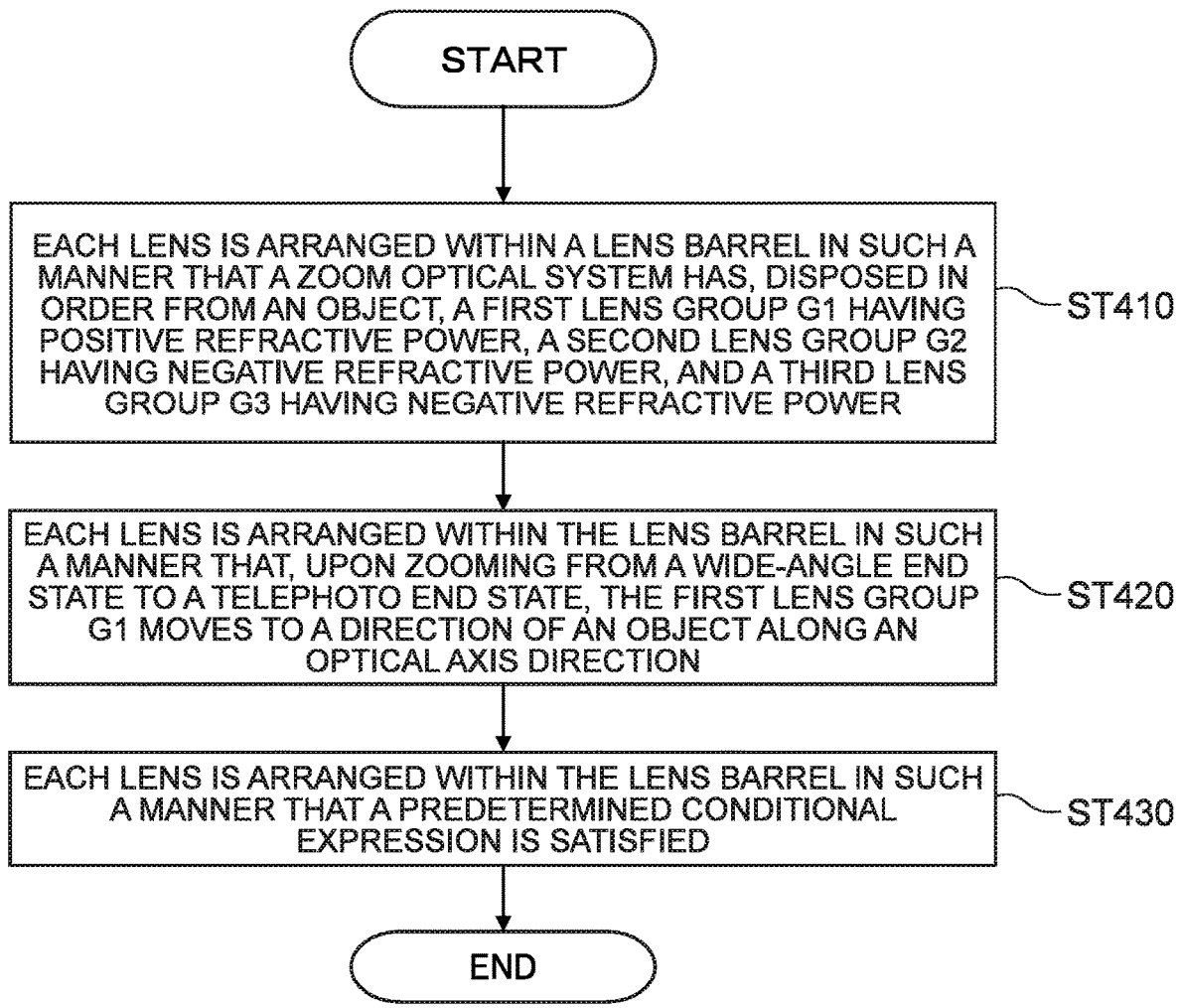
FIG. 21 is a flowchart for describing a method for manufacturing the zoom optical system according to the fourth embodiment.

Subsequently, a method for manufacturing the zoom optical system ZL having the configuration will be generally described with reference to FIG. 21. First, each lens is arranged within a lens barrel in such a manner that the zoom optical system ZL has a first lens group G1 having positive refractive power, a second lens group G2 having negative refractive power, and a third lens group G3 having positive refractive power (step ST410). At this time, each lens is arranged in such a manner that the first lens group G1 moves to a direction of an object along an optical axis direction upon zooming from a wide-angle end state to a telephoto end state (step ST420). Each lens is arranged within the lens barrel in such a manner that at least the following conditional expressions (23) and (24) are satisfied among the conditional expressions (step ST430):

$$0.14 < fw/f1 < 0.26 \quad (23)$$

$$0.77 < fw/f3 < 1.05 \quad (24)$$

where fw denotes a focal length of the zoom optical system in the wide-angle end state,
f1 denotes a focal length of the first lens group G1, and
f3 denotes a focal length of the third lens group G3.

To take a lens arrangement according to the fourth embodiment as one example, as shown in FIG. 1, as a first lens group G1, in order from an object, a cemented lens formed by cementing a negative meniscus lens L11 and a positive meniscus lens L12 each having a convex surface facing the object is arranged. As a second lens group G2, in order from the object, a negative meniscus lens L21 having a convex surface facing the object, a biconcave lens L22, a biconvex lens L23, and a negative meniscus lens L24 having a concave surface facing the object are arranged. As a third lens group G3, in order from the object, a positive meniscus lens L31 having a concave surface facing the object, a cemented lens formed by cementing a biconvex lens L32 and a biconcave lens L33, a biconcave lens L34, a biconvex L35, a biconvex lens L36, and a negative meniscus lens L37 having a concave surface facing the object are arranged. Moreover, each lens is arranged in such a manner that conditional expressions (23) and (24) (a corresponding value of the conditional expression (23) is 0.22 and a corresponding value of the conditional expression (24) is 0.90) are satisfied.

According to the method for manufacturing the zoom optical system according to the fourth embodiment as described above, the zoom optical system ZL having high optical performance can be obtained.

Examples According to First to Fourth Embodiments

Next, each Example according to each of the first to fourth embodiments will be described based on drawings. Tables 1 to 4 are provided below, and these Tables indicate specifications in Examples 1 to 4, respectively.

However, Example 4 corresponds to only the second and fourth embodiments.

FIGS. 1, 5, 9, and 13 each are a cross-sectional drawing showing a configuration of each of zoom optical systems ZL (ZL to ZL4) according to Examples 1, 2, 3, and 4. In these cross-sectional views showing the zoom optical systems ZL1 to ZL4, a moving track of each of lens groups along an optical axis upon zooming from a wide-angle end state (W) to a telephoto end state (T) is shown by an arrow.

Each reference sign for FIG. 1 according to Example 1 is independently used for each Example in order to avoid complication of the description by an increase in digit number of the reference sign. Therefore, even if reference signs common to reference signs in drawings according to other Examples are placed, the reference signs do not necessarily provide configurations common to the configurations in other Examples.

In each Example, a d-line (wavelength: 587.5620 nm) and a g-line (wavelength: 435.8350 nm) are selected as an object for calculation of aberration characteristics.

In "Lens Data" in the Table, a surface number indicates an order of optical surfaces from an object along a direction in which a ray of light progresses, r denotes a radius of curvature of each optical surface, D denotes a distance to the next lens surface being the distance on an optical axis from each optical surface to the next optical surface (or image surface), vd denotes the Abbe number of a material of an optical member on the basis of the d-line, and nd denotes a refractive index for the d-line of the material of the optical member. Moreover, (Variable) indicates a variable distance to the next lens surface, "∞" in a radius of curvature indicates a flat surface or an aperture, and (Stop S) indicates an aperture stop S. A refractive index (d-line) of air "1.000000" is omitted. When the optical surface is aspherical, "*" is placed on a left side of the surface number, and a paraxial radius of curvature is shown in a column of the radius of curvature r.

In "Aspherical Surface Data" in the Table, a shape of an aspherical surface shown in "Lens Data" is expressed by the following expression (a). Here, y denotes a height in a direction perpendicular to an optical axis, X(y) denotes an amount of displacement (amount of sag) in an optical axis direction at a height y, r denotes a radius of curvature (paraxial radius of curvature) of a reference spherical surface, K denotes a conical coefficient, and An represents an n-th aspherical coefficient. In addition, "E-n" represents "×10$^{-n}$," and for example, "1.234E-05" represents "1.234× 10$^{-5}$."

$$X(y)=(y^2/r)/[1+\{1-\kappa(y^2/r^2)\}^{1/2}]+A4 \times y^4+A6 \times y^6+A8 \times y^8+A10 \times y^{10} \quad (a)$$

In "Various Data" in the Table, f denotes a focal length of a whole lens system, Fno denotes an F-number, ω denotes a half angle of view (a unit: °), Y denotes an image height, TL denotes a total length of a lens system (a distance from a lens forefront surface to an image surface I on an optical axis), and Bf denotes a back focus (a distance from a lens final surface to the image surface I on the optical axis).

In "Variable Distance Data" in the Table, a focal length f or imaging magnification β of a zoom optical system in a wide-angle end state, an intermediate focal length state, and a telephoto end state upon focusing on infinity and a short distant object (an imaging distance R=1.0 m), and a value of each variable distance is shown. In addition, DO denotes a distance from an object surface to a first surface, and Di (where, i is an integer) denotes a variable distance between an i-th surface and a (i+1)-th surface.

In "Lens Group Data" in the Table, a start surface number (surface number on a side closest to an object) of each group is shown in a group first surface, and a focal length of each group is shown in a group focal length.

In "Conditional Expression Corresponding Value" in the Table, values corresponding to the conditional expressions (1) to (29) are shown.

In the following, in all the values of the specifications, unless otherwise stated, "mm" is generally used for the focal length f, the radius of curvature r, the distance to the next lens surface D and other lengths, and the like entered therein. However, equivalent optical performance can be obtained even if the optical system is proportionally scaled up or scaled down, and therefore the values are not limited thereto. Moreover, the unit is not limited to "mm," and other appropriate units can be used.

The description with regard to Table so far is common in all Examples, and the description in the following is omitted.

Example 1

Example 1 will be described using FIG. 1, FIGS. 2A-2C, 3A-3C, 4A-4C and Table 1. As shown in FIG. 1, a zoom optical system ZL (ZL1) according to Example 1 is configured of, disposed in order from an object along an optical axis, a first lens group G1 having positive refractive power, a second lens group G2 having negative refractive power, and a third lens group G3 having positive refractive power.

The first lens group G1 is configured of, disposed in order from the object, a cemented lens formed by cementing a negative meniscus lens L11 and a positive meniscus lens L12 each having a convex surface facing the object.

The second lens group G2 is configured of, disposed in order from the object, a negative meniscus lens L21 having a convex surface facing the object, a biconcave lens L22, a biconvex lens L23, and a negative meniscus lens L24 having a concave surface facing the object.

The third lens group G3 is configured of, disposed in order from the object, a 31st lens group G31, a 32nd lens group G32, and a 33rd lens group G33.

The 31st lens group G31 is configured of, disposed in order from the object, a front group G3F having positive refractive power, and a rear group G3R. The front group G3F (focusing group) is configured of a positive meniscus lens L31 having a concave surface facing the object. The rear group G3R is configured of, disposed in order from the object, a cemented lens formed by cementing a biconvex lens L32 and a biconcave lens L33.

The 32nd lens group G32 (vibration-proof lens group) is configured of a biconcave lens L34. The 33rd lens group G33 is configured of, disposed in order from the object, a biconvex lens L35, a biconvex lens L36, and a negative meniscus lens L37 having a concave surface facing the object.

An aperture stop S determining an F-number is provided within the third lens group G3.

An image surface I is formed on an imaging element (not shown), and the imaging element is configured of a CCD or a CMOS, for example.

In the zoom optical system ZL1 according to Example 1, zooming from a wide-angle end state to a Telephoto end state is made by varying an air distance between the first lens group G1 and the second lens group G2 and an air distance between the second lens group G2 and the third lens group G3. At this time, relative to the image surface I, the first lens group G1 monotonously moves to the object. The second lens group G2 moves along the optical axis so as to draw a convex track to an image. The third lens group G3 monotonously moves to the object. The aperture stop S monotonously moves to the object integrally with the third lens group G3 upon zooming.

More specifically, in the zoom optical system ZL1 according to Example 1, zooming from the wide-angle end state to the telephoto end state is made by moving each of the lens groups G1 to G3 along the optical axis in such a manner that the distance between the first lens group G1 and the second lens group G2 is enlarged, and the air distance between the second lens group G2 and the third lens group G3 is reduced.

The zoom optical system ZL1 according to Example 1 has a configuration in which focusing is made by moving the front group G3F of the third lens group G3, namely the positive meniscus lens L31 having the concave surface facing the object, along the optical axis direction, and as shown by an arrow in FIG. 1, upon causing a change from a state of focusing on infinity to a state of focusing on the short distant object, the positive meniscus lens L31 moves from the object to the image.

Upon occurrence of an image blur, correction of the image blur (vibration proofing) on the image surface I is made by moving, as a vibration-proof lens group, the 32nd lens group G32, namely the biconcave lens L34 so as to have a component in a direction perpendicular to the optical axis.

Table 1 below shows values of each of specifications in Example 1. Surface numbers 1 to 25 in Table 1 correspond to optical surfaces m1 to m25 shown in FIG. 1, respectively.

TABLE 1

[Lens Data]

| Surface Number | r | D | vd | nd |
|---|---|---|---|---|
| 1 | 41.994 | 1.800 | 23.80 | 1.846660 |
| 2 | 31.917 | 6.967 | 67.90 | 1.593190 |
| 3 | 1604.312 | D3(Variable) | | |
| 4 | 79.168 | 1.500 | 32.35 | 1.850260 |

TABLE 1-continued

| | | | | |
|---|---|---|---|---|
| 5 | 11.927 | 5.219 | | |
| 6 | −52.994 | 1.000 | 42.73 | 1.834810 |
| 7 | 32.701 | 0.418 | | |
| 8 | 22.013 | 4.124 | 23.80 | 1.846660 |
| 9 | −31.216 | 0.747 | | |
| 10 | −21.084 | 1.000 | 42.73 | 1.834810 |
| 11 | −79.290 | D11(Variable) | | |
| 12 | −459.370 | 1.607 | 49.62 | 1.772500 |
| 13 | −32.039 | D13(Variable) | | |
| 14 | ∞ | 2.000 | (Stop S) | |
| 15 | 11.886 | 6.181 | 82.57 | 1.497820 |
| 16 | −23.884 | 0.800 | 23.80 | 1.846660 |
| 17 | 297.976 | 2.028 | | |
| 18 | −1480.750 | 0.800 | 49.62 | 1.772500 |
| 19 | 47.464 | 1.000 | | |
| 20 | 76.691 | 6.975 | 38.03 | 1.603420 |
| 21 | −38.339 | 0.200 | | |
| 22 | 83.747 | 2.496 | 50.27 | 1.719990 |
| 23 | −62.763 | 2.711 | | |
| 24 | −9.776 | 1.000 | 42.73 | 1.834810 |
| 25 | −16.921 | Bf | | |

[Various Data]

| | | | |
|---|---|---|---|
| f | 18.500 | 35.000 | 53.500 |
| Fno | 3.747 | 4.644 | 5.669 |
| ω | 39.556 | 21.350 | 14.391 |
| Y | 14.250 | 14.250 | 14.250 |
| TL | 88.166 | 99.495 | 109.353 |
| Bf | 17.445 | 26.392 | 35.677 |

[Variable Distance Data]

| | (Infinity) | | | (Imaging Distance 1 m) | | |
|---|---|---|---|---|---|---|
| | Wide-Angle End | Intermediate | Telephoto End | Wide-Angle End | Intermediate | Telephoto End |
| f, β | 18.500 | 35.000 | 53.500 | −0.0196 | −0.0365 | −0.0554 |
| D0 | 0.000 | 0.000 | 0.000 | 911.8 | 900.5 | 890.6 |
| D1 | 1.086 | 12.752 | 18.159 | 1.086 | 12.752 | 18.159 |
| D11 | 15.129 | 5.845 | 1.011 | 15.637 | 6.644 | 2.065 |
| D13 | 3.924 | 3.924 | 3.924 | 3.416 | 3.125 | 2.871 |

[Lens Group Data]

| Group Number | Group First Surface | Group Focal Length |
|---|---|---|
| G1 | 1 | 83.101 |
| G2 | 4 | −15.594 |
| G3 | 12 | 20.444 |

[Conditional Expression Corresponding Value]

$f1/(-f2)=5.33$ Conditional Expression (1):

$(-f32)/f3=2.91$ Conditional Expression (2):

$|f31|/f3=1.02$ Conditional Expression (3):

$|f33|/f3=3.59$ Conditional Expression (4):

$\omega w=39.556$ Conditional Expression (5):

$ft/fw=2.89$ Conditional Expression (6):

$f1/f3=4.06$ Conditional Expression (7):

$(-f2)/f3=0.76$ Conditional Expression (8):

$fw/f1=0.22$ Conditional Expression (9):

$fw/f3=0.90$ Conditional Expression (10):

$f1/f3=4.06$ Conditional Expression (11):

$(-f32)/f3=2.91$ Conditional Expression (12):

$|f31|/f3=1.02$ Conditional Expression (13):

$|f33|/f3=3.59$ Conditional Expression (14):

$\omega w=39.556$ Conditional Expression (15):

$ft/fw=2.89$ Conditional Expression (16):

$(-f2)/f3=0.76$ Conditional Expression (17):

$f3A/f3=2.18$ Conditional Expression (18):

$|f3B|/f3=1.88$ Conditional Expression (19):

$|fvr|/f3=2.91$ Conditional Expression (20):

$\omega w=39.556$ Conditional Expression (21):

$ft/fw=2.89$ Conditional Expression (22):

$fw/f1=0.22$ Conditional Expression (23):

$fw/f3=0.90$  Conditional Expression (24):

$(-f32)/f3=2.91$  Conditional Expression (25):

$|f31|/f3=1.02$  Conditional Expression (26):

$|f33|/f3=3.59$  Conditional Expression (27):

$\omega w=39.556$  Conditional Expression (28):

$ft/fw=2.89$  Conditional Expression (29):

Table 1 shows that the zoom optical system ZL1 according to Example 1 satisfies the conditional expressions (1) to (29).

Figure 3C:
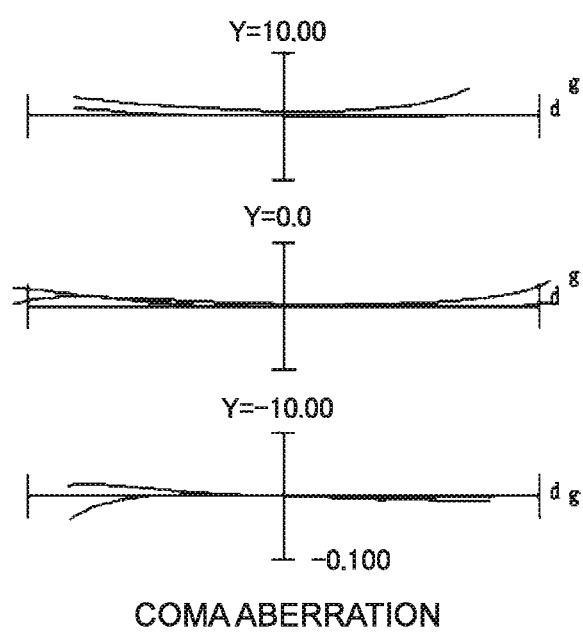
Figure 4C:
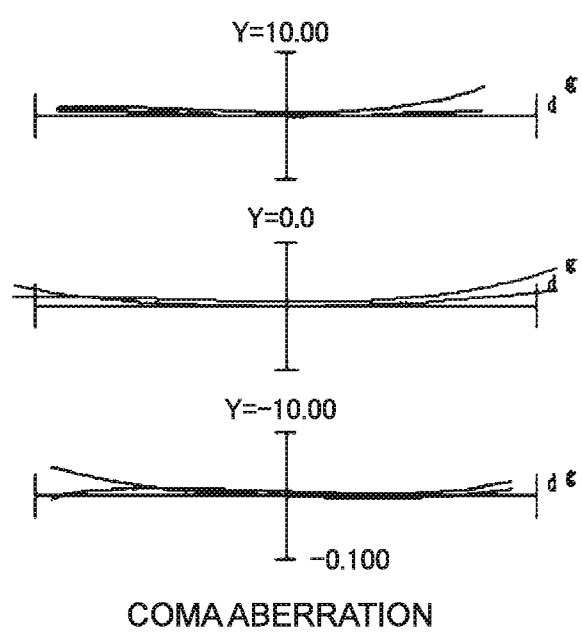

FIGS. 2A, 2B and 2C are graphs showing aberrations of the zoom optical system ZL1 according to Example 1 in a wide-angle end state (f=18.500), in which FIG. 2A is graphs showing various aberrations upon focusing on infinity, FIG. 2B is graphs showing various aberrations (imaging magnification β=−0.0196) upon focusing on a short distant object, and FIG. 2C is graphs showing coma aberration when an image blur is corrected (a correction angle θ=0.30°) upon focusing on infinity. FIGS. 3A, 3B and 3C are graphs showing aberrations of the zoom optical system ZL1 according to Example 1 in an intermediate focal length state (f=35.000), in which FIG. 3A is graphs showing various aberrations upon focusing on infinity, FIG. 3B is graphs showing various aberrations (imaging magnification β=−0.0365) upon focusing on a short distant object, and FIG. 3C is graphs showing coma aberration when an image blur is corrected (a correction angle θ=0.30°) upon focusing on infinity. FIGS. 4A, 4B and 4C are graphs showing aberrations of the zoom optical system ZL1 according to Example 1 in a telephoto end state (f=53.500), in which FIG. 4A is graphs showing various aberrations upon focusing on infinity, FIG. 4B is graphs showing various aberrations (imaging magnification β=−0.0554) upon focusing on a short distant object, and FIG. 4C is graphs showing coma aberration when an image blur is corrected (a correction angle θ=0.30°) upon focusing on infinity. In the present Example, as shown in FIG. 2C, FIG. 3C and FIG. 4C, optical performance upon vibration proofing is shown in graphs showing coma aberration, centering on an image height y=0.0, corresponding to image heights of vertically plus 10.0 and minus 10.0.

In each graph showing aberration, FNO denotes an F-number, NA denotes the number of apertures of a ray of light incident to the first lens group G1, A denotes an angle, namely a half angle (unit: °) of view of an entered ray of light, HO denotes an object height (unit: mm), Y denotes an image height, d denotes aberration in a d-line, and g denotes aberration in a g-line. A column without description of d or g aberration in the d-line. In the graphs showing spherical aberration, a solid line indicates spherical aberration and a broken line indicates sine conditions. In the graphs showing astigmatism, a solid line indicates a sagittal image surface and a broken line indicates a meridional image surface. In the graph showing coma aberration, a solid line indicates meridional coma. The description of the graphs showing aberration as described above is regarded to be the same also in other Examples, and the description thereof is omitted.

From each of the graphs showing aberration shown in FIGS. 2A-2C, 3A-3C and 4A-4C, the zoom optical system ZL1 according to Example 1 is found to have high imaging performance in which various aberrations are successfully corrected from the wide-angle end state to the telephoto end. Moreover, the zoom optical system ZL1 is found to have high imaging performance also upon correcting the image blur.

Example 2

Example 2 will be described using FIG. 5, FIGS. 6A-6C, 7A-7C, 8A-8C and Table 2. As shown in FIG. 5, a zoom optical system ZL (ZL2) according to Example 2 is configured of, disposed in order from an object along an optical axis, a first lens group G1 having positive refractive power, a second lens group G2 having negative refractive power, and a third lens group G3 having positive refractive power.

The first lens group G1 is configured of, disposed in order from the object, a cemented lens formed by cementing a negative meniscus lens L11 and a positive meniscus lens L12 each having a convex surface facing the object.

The second lens group G2 is configured of, disposed in order from the object, a negative meniscus lens L21 having a convex surface facing the object, a biconcave lens L22, a biconvex lens L23, and a negative meniscus lens L24 having a concave surface facing the object.

The third lens group G3 is configured of, disposed in order from the object, a 31st lens group G31, a 32nd lens group G32, and a 33rd lens group G33.

The 31st lens group G31 is configured of, disposed in order from the object, a front group G3F having positive refractive power and a rear group G3R. The front group G3F (focusing group) is configured of a positive meniscus lens L31 having a concave surface facing the object. The rear group G3R is configured of, disposed in order from the object, a biconvex lens L32, and a negative meniscus lens L33 having a concave surface facing the object.

The 32nd lens group G32 (vibration-proof lens group) is configured of a negative meniscus lens L34 having a concave surface facing the object. The 33rd lens group G33 is configured of, disposed in order from the object, a biconvex lens L35, and a negative meniscus lens L36 having a concave surface facing the object.

An aperture stop S determining an F-number is provided within the third lens group G3.

An image surface I is formed on an imaging element (not shown), and the imaging element is configured of a CCD or a CMOS, for example.

In the zoom optical system ZL2 according to Example 2, zooming from a wide-angle end state to a telephoto end state is made by varying an air distance between the first lens group G1 and the second lens group G2 and an air distance between the second lens group G2 and the third lens group G3. At this time, relative to the image surface I, the first lens group G1 monotonously moves to the object. The second lens group G2 monotonously moves to the object. The third lens group G3 monotonously moves to the object. The aperture stop S monotonously moves to the object integrally with the third lens group G3 upon zooming.

More specifically, in the zoom optical system ZL2 according to Example 2, zooming from the wide-angle end state to the telephoto end state is made by moving each of the lens groups G1 to G3 along the optical axis in such a manner that the air distance between the first lens group G1 and the second lens group G2 is enlarged, and the air distance between the second lens group G2 and the third lens group G3 is reduced.

The zoom optical system ZL2 according to Example 2 has a configuration in which focusing is made by moving the front group G3F of the third lens group G3, namely the positive meniscus lens L31 having the concave surface facing the object along the optical axis direction, and as shown by an arrow in FIG. 5, upon causing a change from a state of focusing on infinity to a state of focusing on a short distant object, the positive meniscus lens L31 moves from the object to an image.

Upon occurrence of an image blur, correction of the image blur (vibration proofing) on the image surface I is made by moving, as a vibration-proof lens group, the 32nd lens group G32, namely the negative meniscus lens L34 having the convex surface facing the object so as to have a component in a direction perpendicular to the optical axis.

Table 2 below shows values of each of specifications in Example 2. Surface numbers 1 to 23 in Table 2 correspond to optical surfaces m1 to m23 shown in FIG. 5, respectively.

[Conditional Expression Corresponding Value]

| | |
|---|---|
| $f1/(-f2)=6.03$ | Conditional Expression (1): |
| $(-f32)/f3=3.19$ | Conditional Expression (2): |
| $\|f31\|/f3=1.00$ | Conditional Expression (3): |
| $\|f33\|/f3=8.00$ | Conditional Expression (4): |
| $\omega w=38.474$ | Conditional Expression (5): |
| $ft/fw=2.89$ | Conditional Expression (6): |
| $f1/f3=4.77$ | Conditional Expression (7): |

TABLE 2

[Lens Data]

| Surface Number | r | D | vd | nd |
|---|---|---|---|---|
| 1 | 45.608 | 1.800 | 23.80 | 1.846660 |
| 2 | 33.721 | 6.519 | 67.90 | 1.593190 |
| 3 | 45648.551 | D3(Variable) | | |
| 4 | 45.310 | 1.500 | 32.35 | 1.850260 |
| 5 | 11.154 | 5.514 | | |
| 6 | −66.392 | 1.000 | 42.73 | 1.834810 |
| 7 | 28.177 | 0.200 | | |
| 8 | 19.025 | 4.190 | 23.80 | 1.846660 |
| 9 | −36.189 | 0.897 | | |
| 10 | −20.633 | 1.000 | 42.73 | 1.834810 |
| 11 | −125.484 | D11(Variable) | | |
| 12 | −244.725 | 1.512 | 42.73 | 1.834810 |
| 13 | −35.967 | D13(Variable) | | |
| 14 | ∞ | 2.000 | (Stop S) | |
| 15 | 11.692 | 7.246 | 82.57 | 1.497820 |
| 16 | −15.635 | 0.800 | 23.80 | 1.846660 |
| 17 | −55.007 | 2.028 | | |
| 18 | 119.072 | 0.800 | 55.52 | 1.696800 |
| 19 | 30.792 | 1.886 | | |
| 20 | 46.232 | 7.366 | 34.92 | 1.801000 |
| 21 | −29.295 | 2.129 | | |
| 22 | −9.299 | 1.000 | 35.72 | 1.902650 |
| 23 | −17.109 | Bf | | |

[Various Data]

| | | | |
|---|---|---|---|
| f | 18.500 | 34.176 | 53.500 |
| Fno | 3.606 | 4.649 | 5.743 |
| ω | 38.474 | 21.695 | 14.318 |
| Y | 14.250 | 14.250 | 14.250 |
| TL | 84.418 | 96.972 | 109.393 |
| Bf | 17.330 | 26.452 | 35.995 |

[Variable Distance Data]

| | (Infinity) | | | (Imaging Distance 1 m) | | |
|---|---|---|---|---|---|---|
| | Wide-Angle End | Intermediate | Telephoto End | Wide-Angle End | Intermediate | Telephoto End |
| f, β | 18.500 | 34.176 | 53.500 | −0.0196 | −0.0358 | −0.0556 |
| D0 | 0.000 | 0.000 | 0.000 | 915.6 | 903.0 | 890.6 |
| D3 | 1.003 | 12.242 | 19.287 | 1.003 | 12.242 | 19.287 |
| D11 | 12.973 | 5.166 | 1.000 | 13.423 | 5.869 | 1.977 |
| D13 | 3.717 | 3.717 | 3.717 | 3.266 | 3.013 | 2.739 |

[Lens Group Data]

| Group Number | Group First Surface | Group Focal Length |
|---|---|---|
| G1 | 1 | 89.519 |
| G2 | 4 | −14.853 |
| G3 | 12 | 18.756 |

(−f2)/f3=0.79   Conditional Expression (8):

fw/f1=0.21   Conditional Expression (9):

fw/f3=0.99   Conditional Expression (10):

f1/f3=4.77   Conditional Expression (11):

(−f32)/f3=3.19   Conditional Expression (12):

|f31|/f3=1.00   Conditional Expression (13):

|f33|/f3=8.00   Conditional Expression (14):

ωw=38.474   Conditional Expression (15):

ft/fw=2.89   Conditional Expression (16):

(−f2)/f3=0.79   Conditional Expression (17):

f3A/f3=2.68   Conditional Expression (18):

|f3B|/f3=1.64   Conditional Expression (19):

|fvr|/f3=3.19   Conditional Expression (20):

ωw=38.474   Conditional Expression (21):

ft/fw=2.89   Conditional Expression (22):

fw/f1=0.21   Conditional Expression (23):

fw/f3=0.99   Conditional Expression (24):

(−f32)/f3=3.19   Conditional Expression (25):

|f31|/f3=1.00   Conditional Expression (26):

|f33|/f3=8.00   Conditional Expression (27):

ωw=38.474   Conditional Expression (28):

ft/fw=2.89   Conditional Expression (29):

Table 2 shows that the zoom optical system ZL2 according to Example 2 satisfies the conditional expressions (1) to (29).

Figure 6C:
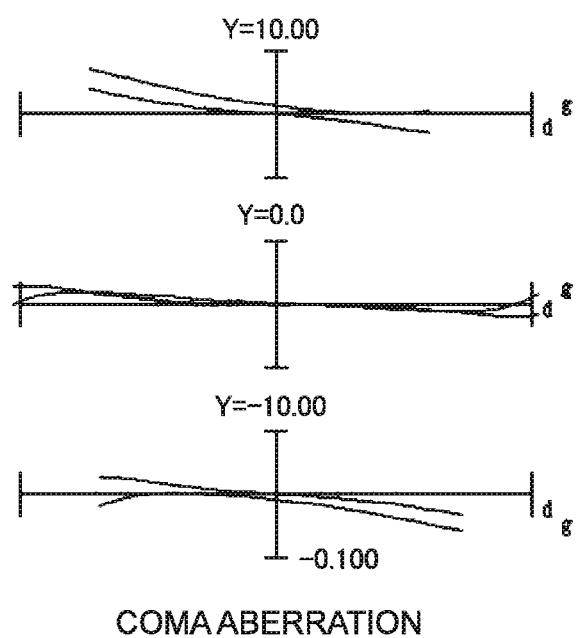
Figure 7A:
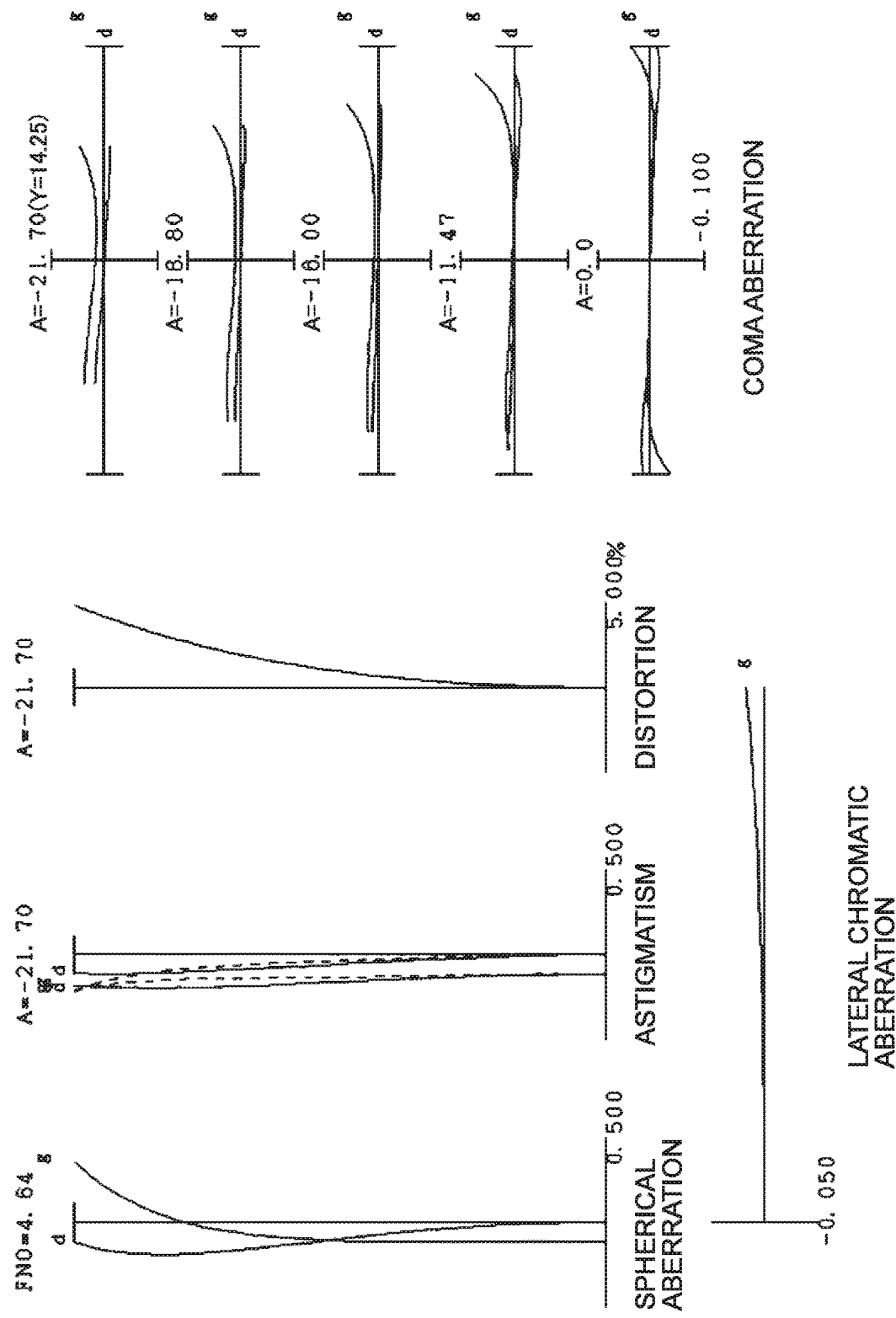
Figure 7C:
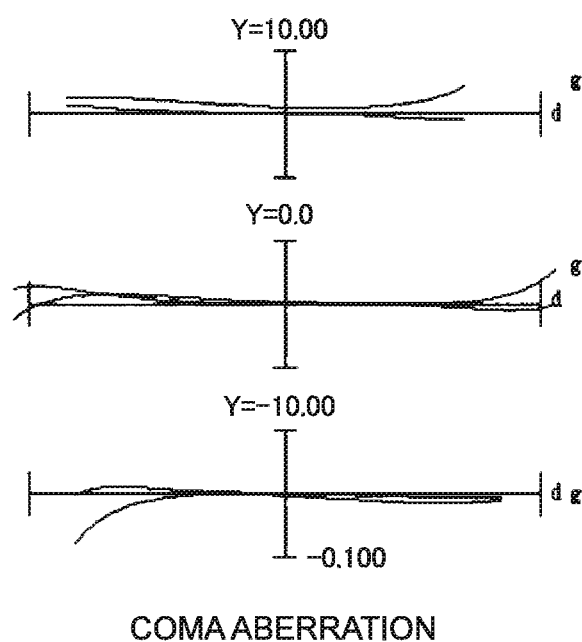
Figure 8A:
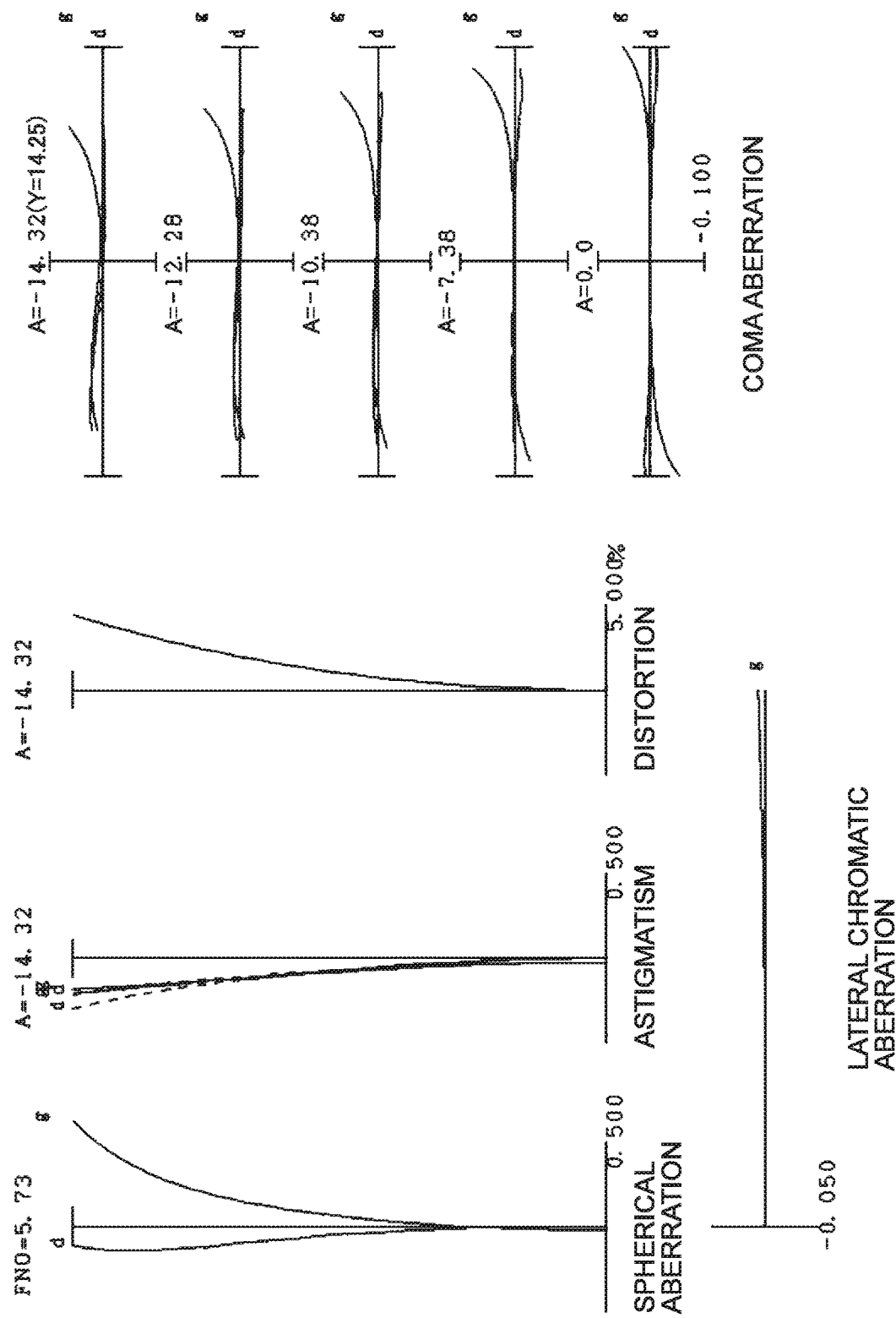
Figure 8B:
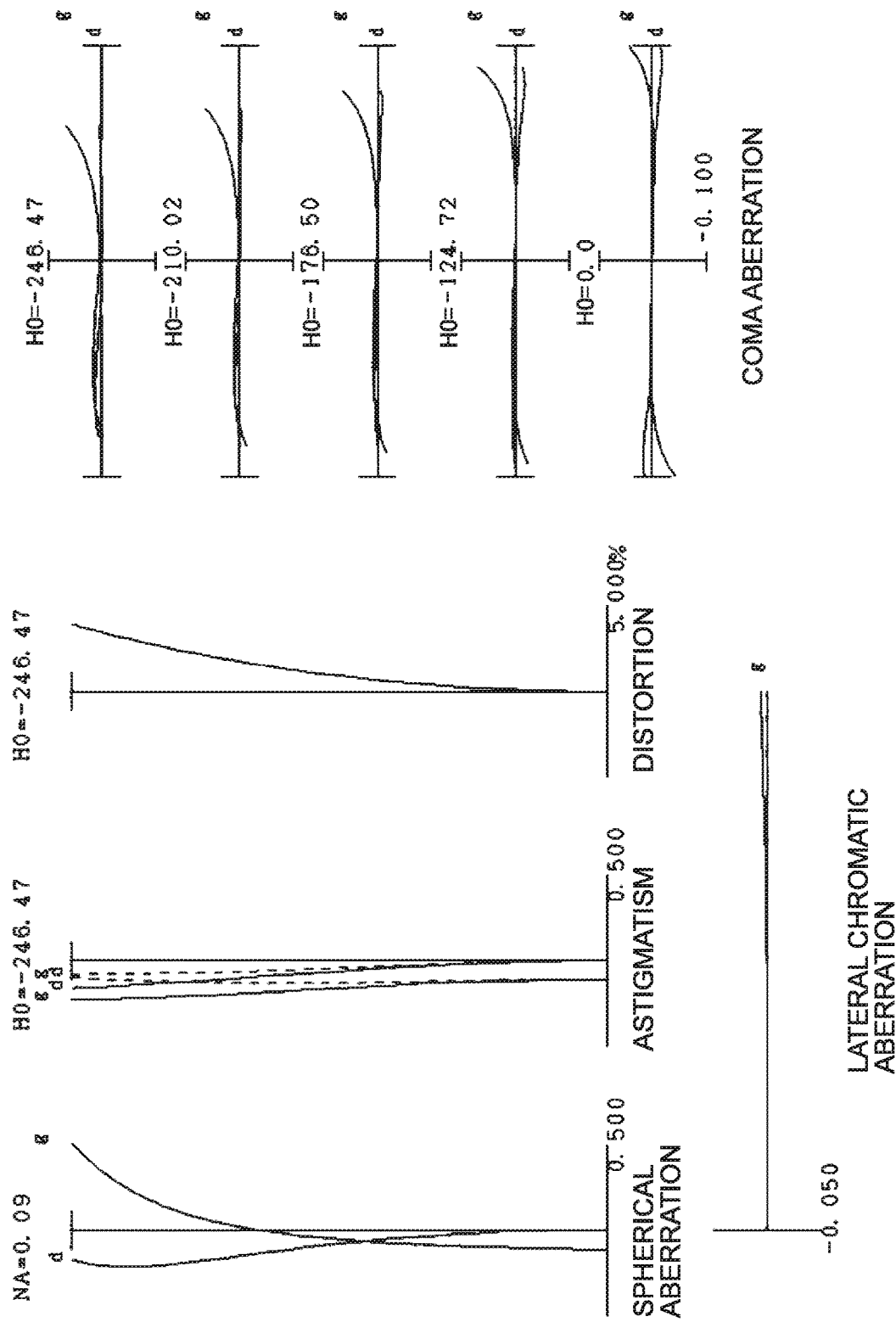
Figure 8C:
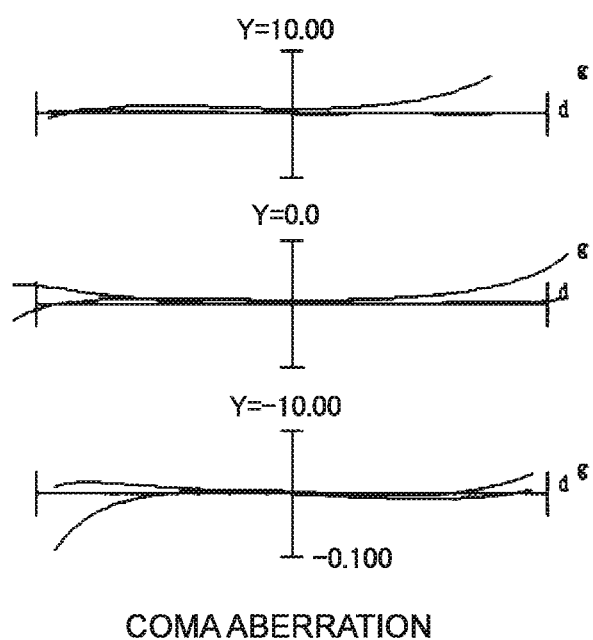

FIGS. 6A, 6B and 6C are graphs showing aberrations of the zoom optical system ZL2 according to Example 2 in a wide-angle end state (f=18.500), in which FIG. 6A is graphs showing various aberrations upon focusing on infinity, FIG. 6B is graphs showing various aberrations (imaging magnification β=−0.0196) upon focusing on a short distant object, and FIG. 6C is graphs showing coma aberration when an image blur is corrected (a correction angle θ=0.30°) upon focusing on infinity. FIGS. 7A, 7B and 7C are graphs showing aberrations of the zoom optical system ZL2 according to Example 2 in an intermediate focal length state (f=34.176), in which FIG. 7A is graphs showing various aberrations upon focusing on infinity, FIG. 7B is graphs showing various aberrations (imaging magnification β=−0.0358) upon focusing on a short distant object, and FIG. 7C is graphs showing coma aberration when an image blur is corrected (a correction angle θ=0.30°) upon focusing on infinity. FIGS. 8A, 8B and 8C are graphs showing aberrations of the zoom optical system ZL2 according to Example 2 in a telephoto end state (f=53.500), in which FIG. 8A is graphs showing various aberrations upon focusing on infinity, FIG. 8B is graphs showing various aberrations upon focusing on a short distant object (imaging magnification β=−0.0556), and FIG. 8C is graphs showing coma aberration when an image blur is corrected (a correction angle θ=0.30°) upon focusing on infinity. In the present Example, as shown in FIG. 6C, FIG. 7C, and FIG. 8C, optical performance upon vibration proofing is shown in graphs showing coma aberration, centering on an image height y=0.0, corresponding to image heights of vertically plus 10.0 and minus 10.0.

From each of the graphs showing aberration shown in FIGS. 6A-6C, 7A-7C and 8A-8C, the zoom optical system ZL2 according to Example 2 is found to have high imaging performance in which various aberrations are successfully corrected from the wide-angle end state to the telephoto end. Moreover, the zoom optical system ZL2 is found to have high imaging performance also upon correcting the image blur.

Example 3

Figure 9:
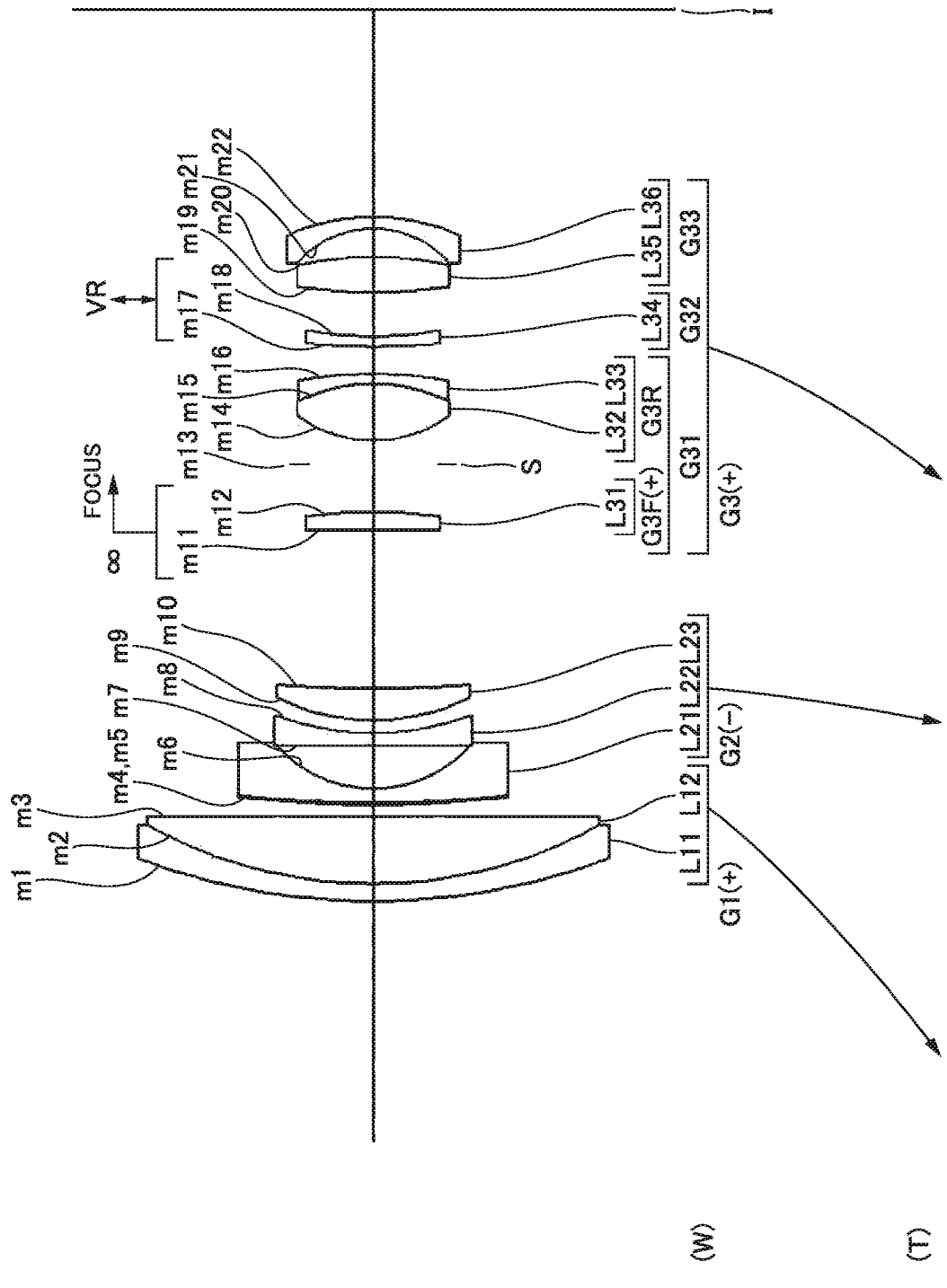
FIG. 9 is a cross-sectional view showing a lens configuration of a zoom optical system according to Example 3.

Example 3 will be described using FIG. 9, FIGS. 10A-10C, 11A-11C, 12A-12C and Table 3. As shown in FIG. 9, a zoom optical system ZL (ZL3) according to Example 3 is configured of, disposed in order from an object along an optical axis, a first lens group G1 having positive refractive power, a second lens group G2 having negative refractive power, and a third lens group G3 having positive refractive power.

The first lens group G1 is configured of, disposed in order from the object, a cemented lens formed by cementing a negative meniscus lens L11 having a convex surface facing the object and a biconvex lens L12.

The second lens group G2 is configured of, disposed in order from the object, a negative meniscus lens L21 having a convex surface facing the object, a biconcave lens L22, and a positive meniscus lens L23 having a convex surface facing the object. A surface of the negative meniscus lens L21 to the object is aspherical.

The third lens group G3 is configured of, disposed in order from the object, a 31st lens group G31, a 32nd lens group G32, and a 33rd lens group G33.

The 31st lens group G31 is configured of, disposed in order from the object, a front group G3F having positive refractive power and a rear group G3R. The front group G3F (focusing group) is configured of a biconvex lens L31. The rear group G3R is configured of, disposed in order from the object, a cemented lens formed by cementing a biconvex L32 and a negative meniscus lens L33 having a concave surface facing the object.

The 32nd lens group G32 (vibration-proof lens group) is configured of a negative meniscus lens L34 having a convex surface facing the object. The 33rd lens group G33 is configured of, disposed in order from the object, a biconvex lens L35, and a negative meniscus lens L36 having a concave surface facing the object. A surface of the negative meniscus lens L34 to the object is aspherical. A surface of the negative meniscus lens L36 to the object is aspherical.

An aperture stop S determining an F-number is provided within the third lens group G3.

An image surface I is formed on an imaging element (not shown), and the imaging element is configured of a CCD or a CMOS, for example.

In the zoom optical system ZL3 according to Example 3, zooming from a wide-angle end state to a telephoto end state is made by varying an air distance between the first lens group G1 and the second lens group G2 and an air distance between the second lens group G2 and the third lens group G3. At this time, relative to the image surface I, the first lens group G1 monotonously moves to the object. The second lens group G2 monotonously moves to the object. The third lens group G3 monotonously moves to the object. The aperture stop S monotonously moves to the object integrally with the third lens group G3 upon zooming.

More specifically, in the zoom optical system ZL3 according to Example 3, zooming from the wide-angle end state to the telephoto end state is made by moving each of the lens groups G1 to G3 along the optical axis in such a manner that the air distance between the first lens group G1 and the second lens group G2 is enlarged, and the air distance between the second lens group G2 and the third lens group G3 is reduced.

The zoom optical system ZL3 according to Example 3 has a configuration in which focusing is made by moving the front group G3F of the third lens group G3, namely the biconvex lens L31 along the optical axis direction, and as shown by an arrow in FIG. 9, upon causing a change from a state of focusing on infinity to a state of focusing on short distant object, the biconvex lens L31 moves from the object to an image.

Upon occurrence of an image blur, correction of the image blur (vibration proofing) on the image surface I is made by moving, as a vibration-proof lens group, the 32nd lens group G32, namely the negative meniscus lens L34 having the convex surface facing the object so as to have a component in a direction perpendicular to the optical axis.

Table 3 below shows values of each of specifications in Example 3. Surface numbers 1 to 22 in Table 3 correspond to optical surfaces m1 to m22 shown in FIG. 9, respectively

TABLE 3

[Lens Data]

| Surface Number | r | D | vd | nd |
|---|---|---|---|---|
| 1 | 54.753 | 1.500 | 23.80 | 1.846660 |
| 2 | 38.695 | 5.554 | 67.90 | 1.593190 |
| 3 | −34295.201 | D3(Variable) | | |
| *4 | 78.694 | 0.160 | 38.09 | 1.553890 |
| 5 | 98.152 | 1.200 | 42.73 | 1.834810 |
| 6 | 10.847 | 3.606 | | |
| 7 | −970.417 | 1.000 | 42.73 | 1.834810 |
| 8 | 23.052 | 1.059 | | |
| 9 | 17.651 | 2.718 | 25.45 | 1.805180 |
| 10 | 124.240 | D10(Variable) | | |
| 11 | 756.198 | 1.530 | 44.80 | 1.744000 |
| 12 | −42.339 | D12(Variable) | | |
| 13 | ∞ | 2.000 | (Stop S) | |
| 14 | 10.744 | 4.744 | 82.57 | 1.497820 |
| 15 | −14.187 | 0.800 | 32.35 | 1.850260 |
| 16 | −36.052 | 2.298 | | |
| *17 | 61.167 | 0.800 | 49.26 | 1.743200 |
| 18 | 25.724 | 3.680 | | |
| 19 | 40.116 | 2.998 | 36.40 | 1.620040 |
| 20 | −27.927 | 2.317 | | |
| *21 | −8.706 | 1.000 | 31.27 | 1.903660 |
| 22 | −17.386 | Bf | | |

[Aspherical Surface Data]

The 4th Surface
κ = 1.0000
A4 = −8.92993E−06
A6 = −3.84277E−08
A8 = 5.03368E−10
A10 = −1.64069E−12
The 17th Surface
κ = 1.0000
A4 = 4.87068E−06
A6 = −6.89267E−08
A8 = 0.00000E+00
A10 = 0.00000E+00
The 21st Surface
κ = 1.0000
A4 = −3.24561E−05
A6 = −9.10280E−07
A8 = 2.25192E−08
A10 = −6.24358E−10

[Various Data]

| | | | |
|---|---|---|---|
| f | 18.477 | 34.000 | 53.500 |
| Fno | 3.630 | 4.663 | 5.630 |
| ω | 39.444 | 21.946 | 14.295 |
| Y | 14.250 | 14.250 | 14.250 |
| TL | 74.395 | 88.467 | 104.339 |
| Bf | 17.318 | 26.476 | 34.918 |

TABLE 3-continued

[Variable Distance Data]

| | (Infinity) | | | (Imaging Distance 1 m) | | |
|---|---|---|---|---|---|---|
| | Wide-Angle End | Intermediate | Telephoto End | Wide-Angle End | Intermediate | Telephoto End |
| f, β | 18.477 | 34.000 | 53.500 | −0.0194 | −0.0355 | −0.0552 |
| D0 | 0.000 | 0.000 | 0.000 | 925.6 | 911.5 | 895.7 |
| D3 | 1.000 | 14.075 | 25.532 | 1.000 | 14.075 | 25.532 |
| D10 | 13.187 | 5.026 | 1.000 | 13.679 | 5.760 | 2.066 |
| D12 | 3.919 | 3.919 | 3.919 | 3.428 | 3.185 | 2.852 |

[Lens Group Data]

| Group Number | Group First Surface | Group Focal Length |
|---|---|---|
| G1 | 1 | 110.968 |
| G2 | 4 | −16.768 |
| G3 | 11 | 18.415 |

[Conditional Expression Corresponding Value]

$f1/(-f2)=6.62$ Conditional Expression (1):

$(-f32)/f3=3.28$ Conditional Expression (2):

$|f31|/f3=0.93$ Conditional Expression (3):

$|f33|/f3=7.37$ Conditional Expression (4):

$\omega w=39.444$ Conditional Expression (5):

$ft/fw=2.90$ Conditional Expression (6):

$f1/f3=6.03$ Conditional Expression (7):

$(-f2)/f3=0.91$ Conditional Expression (8):

$fw/f1=0.17$ Conditional Expression (9):

$fw/f3=1.00$ Conditional Expression (10):

$f1/f3=6.03$ Conditional Expression (11):

$(-f32)/f3=3.28$ Conditional Expression (12):

$|f31|/f3=0.93$ Conditional Expression (13):

$|f33|/f3=7.37$ Conditional Expression (14):

$\omega w=39.444$ Conditional Expression (15):

$ft/fw=2.90$ Conditional Expression (16):

$(-f2)/f3=0.91$ Conditional Expression (17):

$f3A/f3=2.93$ Conditional Expression (18):

$|f3B|/f3=1.63$ Conditional Expression (19):

$|fvr|/f3=3.28$ Conditional Expression (20):

$\omega w=39.444$ Conditional Expression (21):

$ft/fw=2.90$ Conditional Expression (22):

$fw/f1=0.17$ Conditional Expression (23):

$fw/f3=1.00$ Conditional Expression (24):

$(-f32)/f3=3.28$ Conditional Expression (25):

$|f31|/f3=0.93$ Conditional Expression (26):

$|f33|/f3=7.37$ Conditional Expression (27):

$\omega w=39.444$ Conditional Expression (28):

$ft/fw=2.90$ Conditional Expression (29):

Table 3 shows that the zoom optical system ZL3 according to Example 3 satisfies the conditional expressions (1) to (29).

Figure 10A:
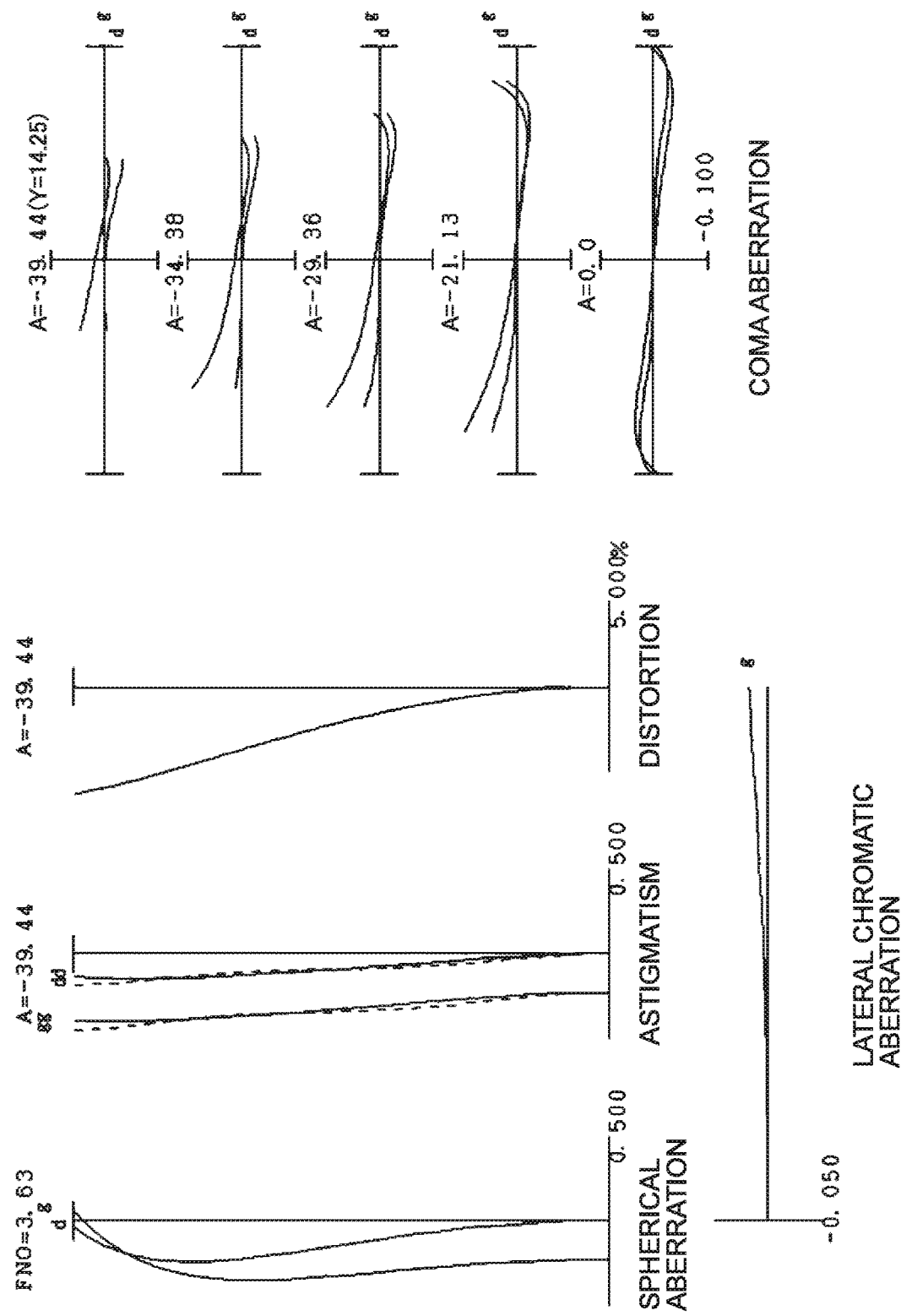
Figure 10C:
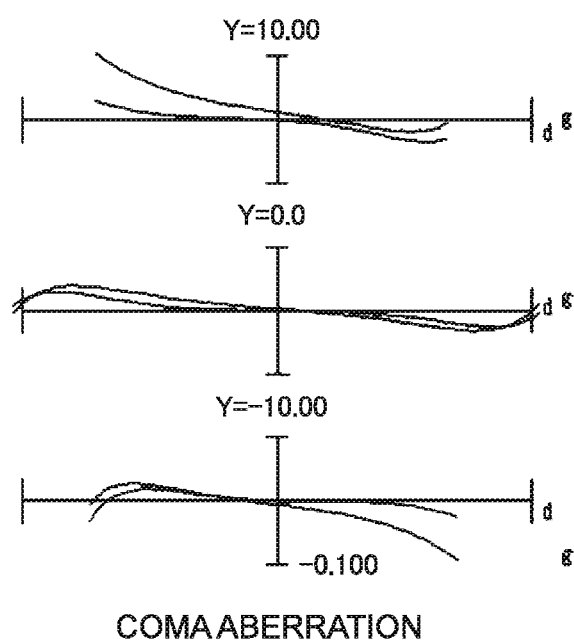
Figure 11C:
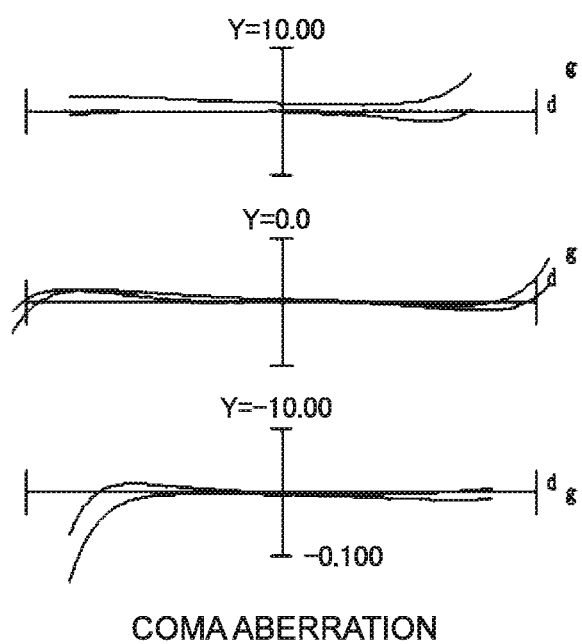
Figure 12C:
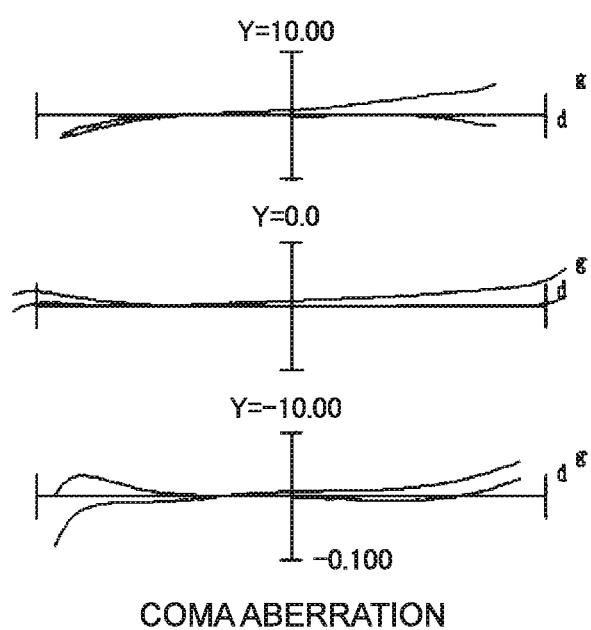

FIGS. 10A, 10B and 10C are graphs showing aberrations of the zoom optical system ZL3 according to Example 3 in a wide-angle end state (f=18.477), in which FIG. 10A is graphs showing various aberrations upon focusing on infinity, FIG. 10B is graphs showing various aberrations upon focusing on a short distant object (imaging magnification β=−0.0194), and FIG. 10C is graphs showing coma aberration when an image blur is corrected (a correction angle θ=0.30°) upon focusing on infinity. FIGS. 11A, 11B and 11C are graphs showing aberrations of the zoom optical system ZL3 according to Example 3 in an intermediate focal length state (f=34.000), in which FIG. 11A is graphs showing various aberrations upon focusing on infinity, FIG. 11B is graphs showing various aberrations upon focusing on a short distant object (imaging magnification β=−0.0355), and FIG. 11C is graphs showing coma aberration when an image blur is corrected (a correction angle θ=0.30°) upon focusing on infinity. FIGS. 12A, 12B and 12C are graphs showing aberrations of the zoom optical system ZL3 according to Example 3 in a telephoto end state (f=53.500), in which FIG. 12A is graphs showing various aberrations upon focusing on infinity, FIG. 12B is graphs showing various aberrations upon focusing on a short distant object (imaging magnification β=−0.0552), and FIG. 12C is graphs showing coma aberration when an image blur is corrected (a correction angle θ=0.30°) upon the focusing on infinity. In the present Example, as shown in FIG. 10C, FIG. 11C and FIG. 12C, optical performance upon vibration proofing is shown in graphs showing coma aberration, centering on an image height y=0.0, corresponding to image heights of vertically plus 10.0 and minus 10.0.

From each of the graphs showing aberration shown in FIGS. 10A-10C, 11A-11C and 12A-12C, the zoom optical system ZL3 according to Example 3 is found to have high imaging performance in which various aberrations are successfully corrected from the wide-angle end state to the telephoto end. Moreover, the zoom optical system ZL3 is found to have high imaging performance also upon correcting the image blur.

Example 4

Figure 13:
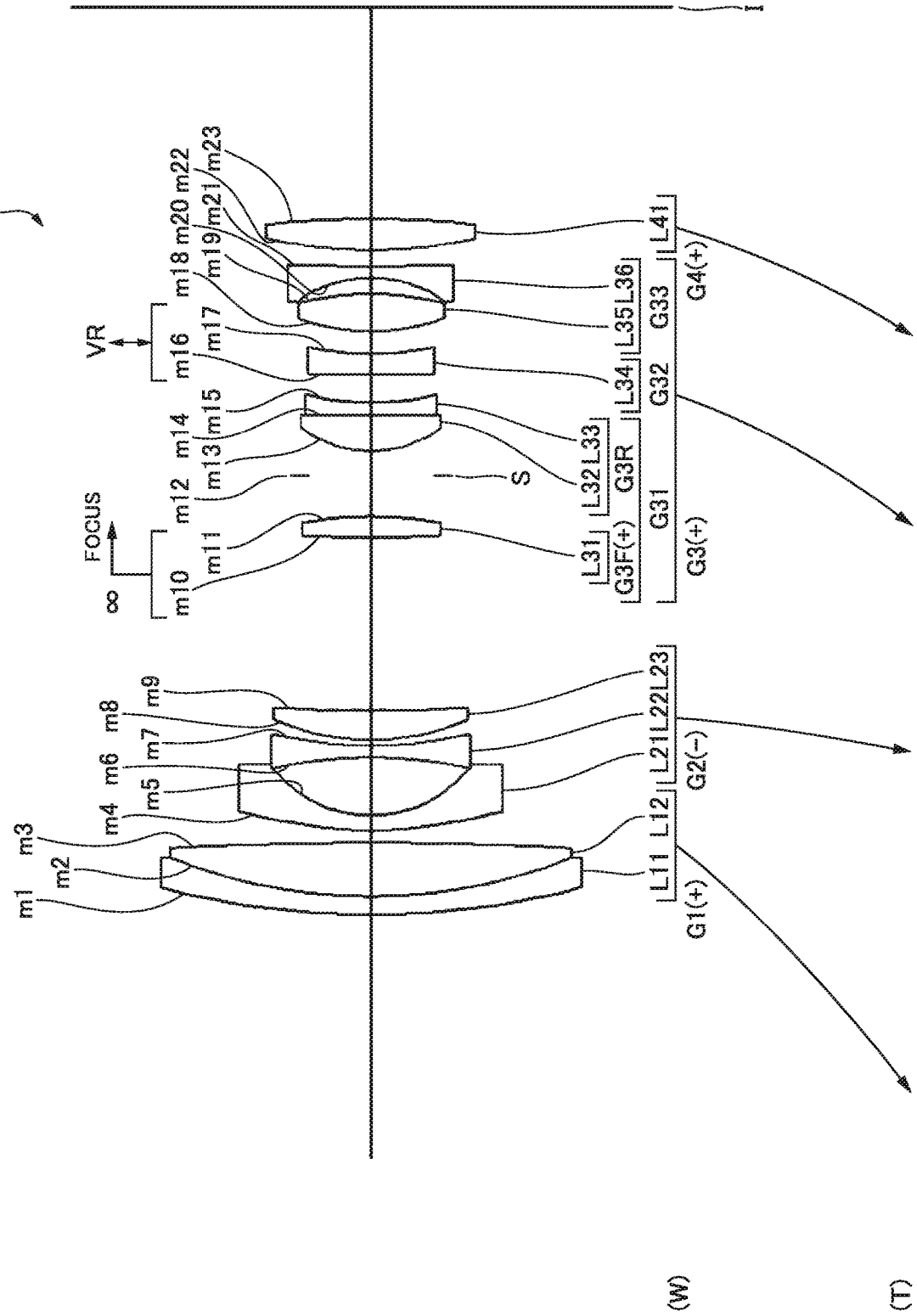
FIG. 13 is a cross-sectional view showing a lens configuration of a zoom optical system according to Example 4.

Example 4 will be described using FIG. 13, FIGS. 14A-14C, 15A-15C, 16A-16C and Table 4. As shown in FIG. 13, a zoom optical system ZL (ZL4) according to Example 4 is configured of, disposed in order from an object along an optical axis, a first lens group G1 having positive refractive power, a second lens group G2 having negative refractive power, a third lens group G3 having positive refractive power, and a fourth lens group G4 having positive refractive power.

The first lens group G1 is configured of, disposed in order from the object, a cemented lens formed by cementing a negative meniscus lens L11 having a convex surface facing the object, and a biconvex lens L12.

The second lens group G2 is configured of, disposed in order from the object, a negative meniscus lens L21 having a convex surface facing the object, a biconcave lens L22, and a positive meniscus lens L23 having a convex surface facing the object. A surface of the negative meniscus lens L21 to the object is aspherical.

The third lens group G3 is configured of, disposed in order from the object, a 31st lens group G31, a 32nd lens group G32, and a 33rd lens group G33.

The 31st lens group G31 is configured of, disposed in order from the object, a front group G3F having positive refractive power and a rear group G3R. The front group G3F (focusing group) is configured of a biconvex lens L31, The rear group G3R is configured of, disposed in order from the object, a cemented lens formed by cementing a biconvex lens L32 and a biconcave lens L33.

The 32nd lens group G32 (vibration-proof lens group) is configured of a negative meniscus lens L34 having a convex surface facing the object. The 33rd lens group G33 is configured of, disposed in order from the object, a biconvex lens L35 and a biconcave lens L36. A surface of the negative meniscus lens L36 to the object is aspherical.

The fourth lens group G4 is configured of a biconvex lens L41.

An aperture stop S determining an F-number is provided within the third lens group G3.

An image surface I is formed on an imaging element (not shown), and the imaging element is configured of a CCD or a CMOS, for example. [0402] In the zoom optical system ZL4 according to Example 4, zooming from a wide-angle end state to a telephoto end state is made by varying an air distance between the first lens group G1 and the second lens group G2, an air distance between the second lens group G2 and the third lens group G3, and an air distance between the third lens group G3 and the fourth lens group G4. At this time, relative to the image surface I, the first lens group G1 monotonously moves to the object. The second lens group G2 monotonously moves to a direction of the object. The third lens group G3 monotonously moves to the object. The fourth lens group G4 monotonously moves to the object. The aperture stop S monotonously moves to the object integrally with the third lens group G3 upon zooming.

More specifically, in the zoom optical system ZL4 according to Example 4, zooming from the wide-angle end state to the telephoto end state is made by moving each of the lens groups G1 to G4 along the optical axis in such a manner that the air distance between the first lens group G1 and the second lens group G2 is enlarged, the air distance between the second lens group G2 and the third lens group G3 is reduced, and the air distance between the third lens group G3 and a fourth lens group G4 is enlarged.

The zoom optical system ZL4 according to Example 4 has a configuration in which focusing is made by moving the front group G3F of the third lens group G3, namely the biconvex lens L31 along the optical axis direction, and as shown by an arrow in FIG. 13, upon causing a change from a state of focusing on infinity to a state of focusing in a short distant object, the biconvex lens L31 moves from the object to an image.

Upon occurrence of an image blur, correction of the image blur (vibration proofing) on the image surface I is made by moving, as a vibration-proof lens group, the 32nd lens group G32, namely the negative meniscus lens L34 having the convex surface facing the object so as to have a component in a direction perpendicular to the optical axis.

Table 4 below shows values of each of specifications in Example 4. Surface numbers 1 to 23 in Table 4 correspond to optical surfaces m1 to m23 shown in FIG. 13, respectively.

TABLE 4

| [Lens Data] | | | | |
|---|---|---|---|---|
| Surface Number | r | D | νd | nd |
| 1 | 67.912 | 1.500 | 42.73 | 1.834810 |
| 2 | 44.077 | 4.405 | 67.90 | 1.593190 |
| 3 | −288.500 | D3(Variable) | | |
| *4 | 33.454 | 1.200 | 42.73 | 1.834810 |
| 5 | 10.199 | 4.749 | | |
| 6 | −36.627 | 1.000 | 50.27 | 1.719990 |
| 7 | 36.778 | 0.404 | | |
| 8 | 19.164 | 2.419 | 23.80 | 1.846660 |
| 9 | 95.617 | D9(Variable) | | |
| 10 | 89.310 | 1.766 | 65.44 | 1.603000 |
| 11 | −30.641 | D11(Variable) | | |
| 12 | ∞ | 2.000 | (Stop S) | |
| 13 | 9.587 | 3.001 | 58.54 | 1.612720 |
| 14 | −1767.044 | 1.000 | 23.80 | 1.846660 |
| 15 | 20.932 | 2.301 | | |
| 16 | 151.332 | 1.699 | 82.57 | 1.497820 |
| 17 | 24.318 | 1.805 | | |

TABLE 4-continued

| 18 | 16.814 | 3.077 | 69.89 | 1.518600 |
|----|--------|-------|-------|----------|
| 19 | -24.653 | 1.282 | | |
| *20 | -12.479 | 1.000 | 35.72 | 1.902650 |
| 21 | 194.680 | D21(Variable) | | |
| 22 | 41.253 | 2.502 | 23.80 | 1.846660 |
| 23 | -90.972 | Bf | | |

[Aspherical Surface Data]

The 4th Surface
κ = 1.0000
A4 = -1.31511E-05
A6 = -1.12654E-07
A8 = 7.35232E-10
A10 = -2.69203E-12
The 20th Surface
κ = 1.0000
A4 = -1.69994E-04
A6 = -2.07858E-06
A8 = 6.76235E-09
A10 = -8.84176E-10

[Various Data]

| f | 18.500 | 34.061 | 53.500 |
|---|--------|--------|--------|
| Fno | 3.568 | 4.700 | 5.851 |
| ω | 39.495 | 21.888 | 14.364 |
| Y | 14.250 | 14.250 | 14.250 |
| TL | 74.382 | 87.897 | 104.318 |
| Bf | 17.380 | 27.437 | 37.937 |

[Variable Distance Data]

| | (Infinity) | | | (Imaging Distance 1 m) | | |
|---|---|---|---|---|---|---|
| | Wide-Angle End | Intermediate | Telephoto End | Wide-Angle End | Intermediate | Telephoto End |
| f, β | 18.500 | 34.061 | 53.500 | -0.0194 | -0.0355 | -0.0556 |
| D0 | 0.000 | 0.000 | 0.000 | 925.6 | 912.1 | 895.7 |
| D3 | 1.000 | 12.968 | 22.438 | 1.000 | 12.968 | 22.438 |
| D9 | 14.194 | 5.413 | 1.000 | 14.671 | 6.042 | 1.837 |
| D11 | 3.342 | 3.342 | 3.342 | 2.865 | 2.712 | 2.504 |
| D21 | 1.346 | 1.617 | 2.481 | 1.346 | 1.617 | 2.481 |

[Lens Group Data]

| Group Number | Group First Surface | Group Focal Length |
|---|---|---|
| G1 | 1 | 112.838 |
| G2 | 4 | -17.024 |
| G3 | 10 | 20.227 |
| G4 | 22 | 33.817 |

[Conditional Expression Corresponding Value]

$f1/f3=5.58$  Conditional Expression (11):

$(-f32)/f3=2.89$  Conditional Expression (12):

$|f31|/f3=0.92$  Conditional Expression (13):

$|f33|/f3=2.97$  Conditional Expression (14):

$ωw=39.495$  Conditional Expression (15):

$ft/fw=2.89$  Conditional Expression (16):

$fw/f1=0.16$  Conditional Expression (23):

$fw/f3=0.91$  Conditional Expression (24):

$(-f32)/f3=2.89$  Conditional Expression (25):

$|f31|/f3=0.92$  Conditional Expression (26):

$|f33|/f3=2.97$  Conditional Expression (27):

$ωw=39.495$  Conditional Expression (28):

$ft/fw=2.89$  Conditional Expression (29):

Table 4 shows that the zoom optical system ZL4 according to Example 4 satisfies the conditional expressions (11) to (16) and (23) to (28).

Figure 14B:
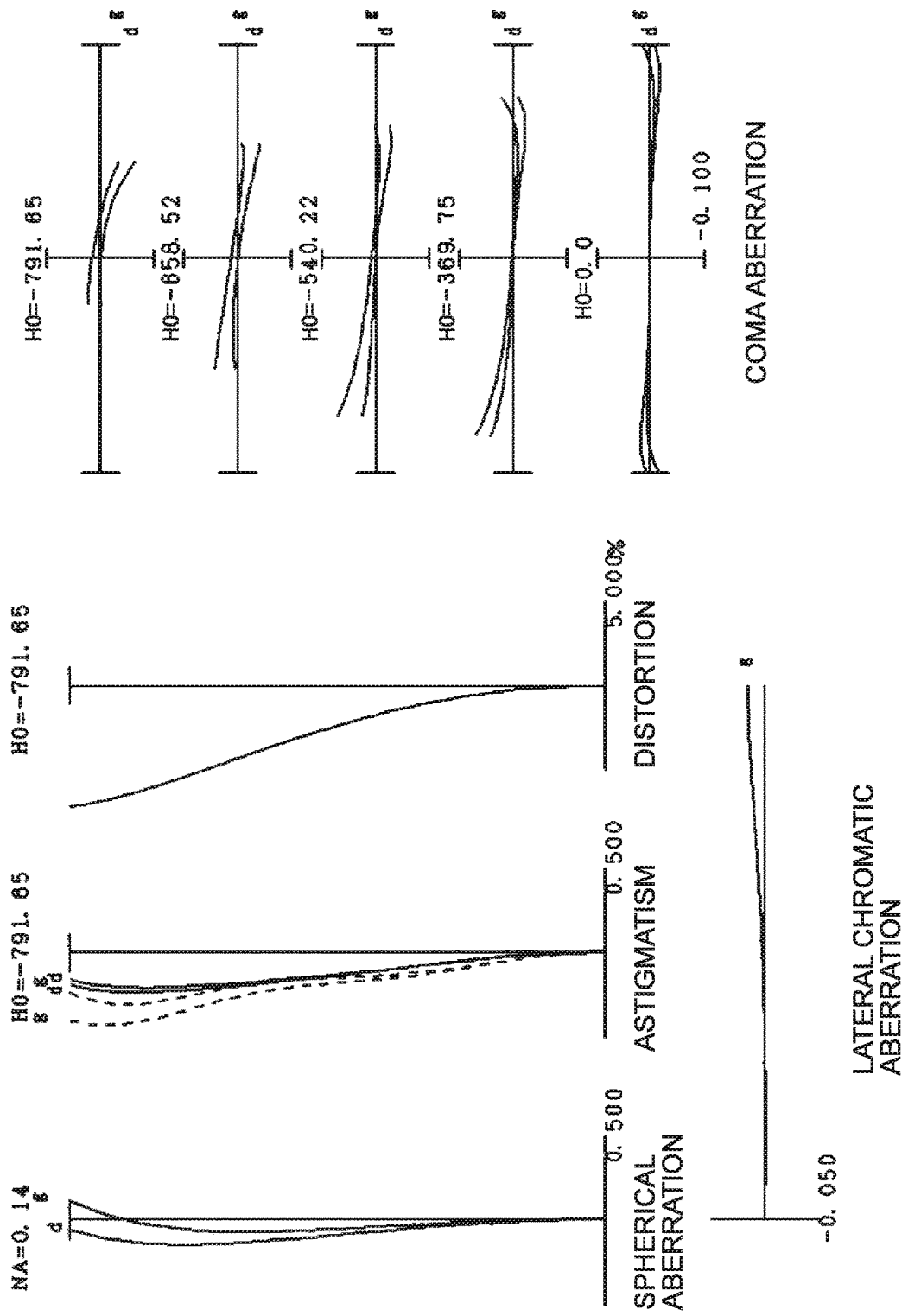
Figure 14C:
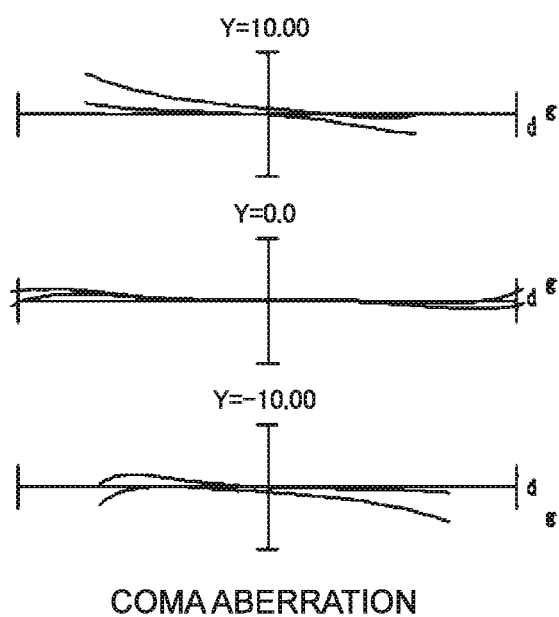
Figure 15A:
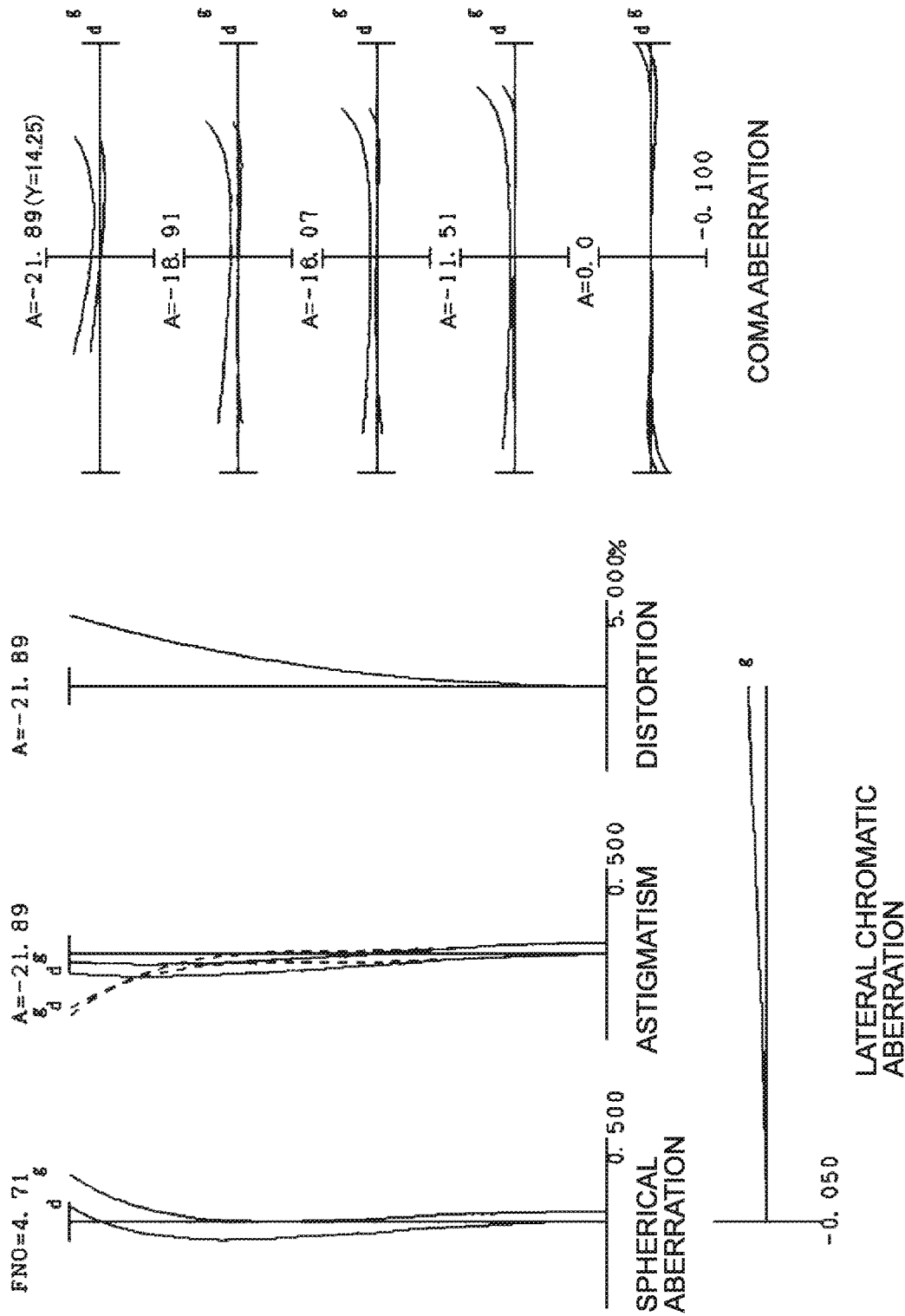
Figure 15B:
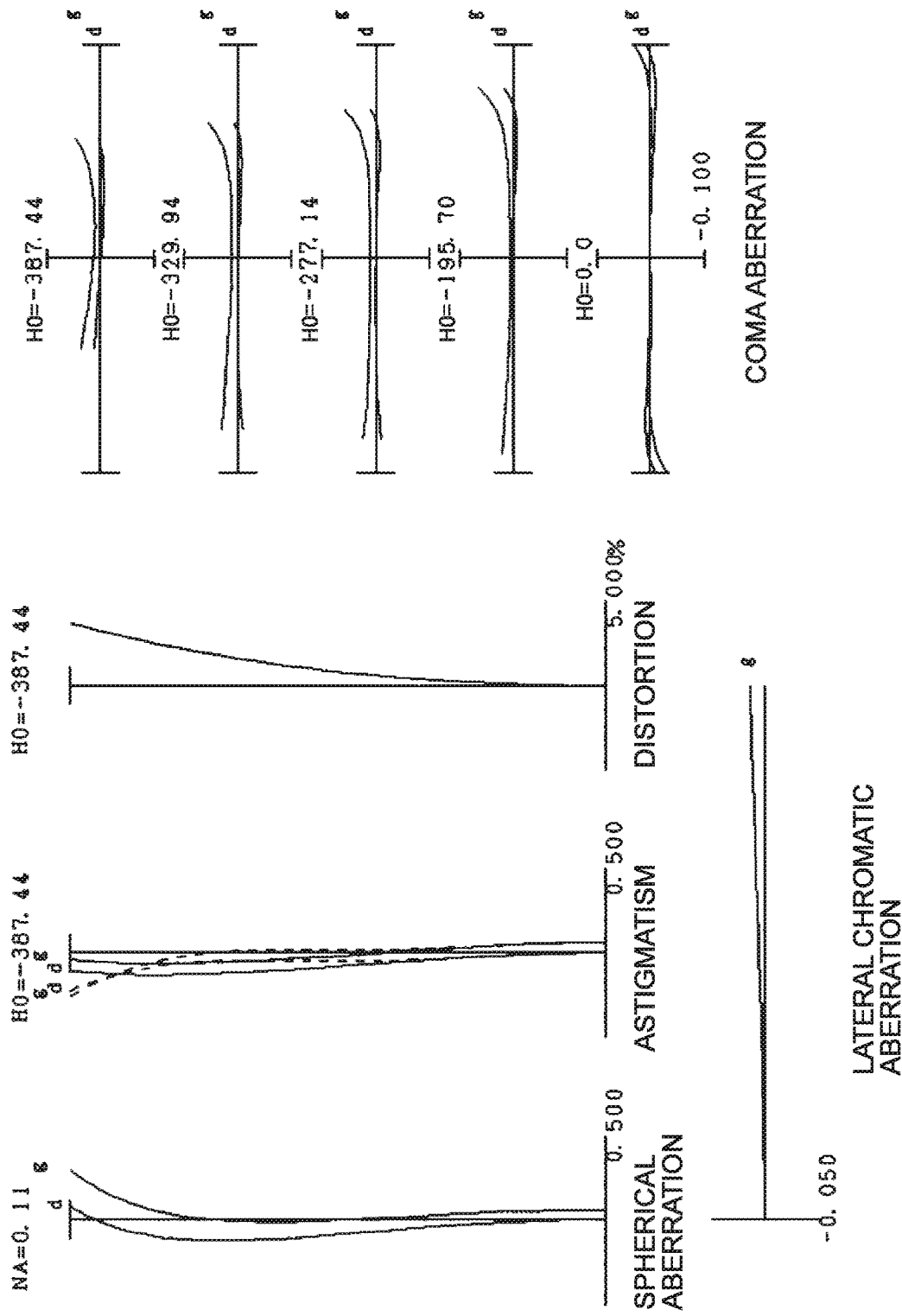
Figure 15C:
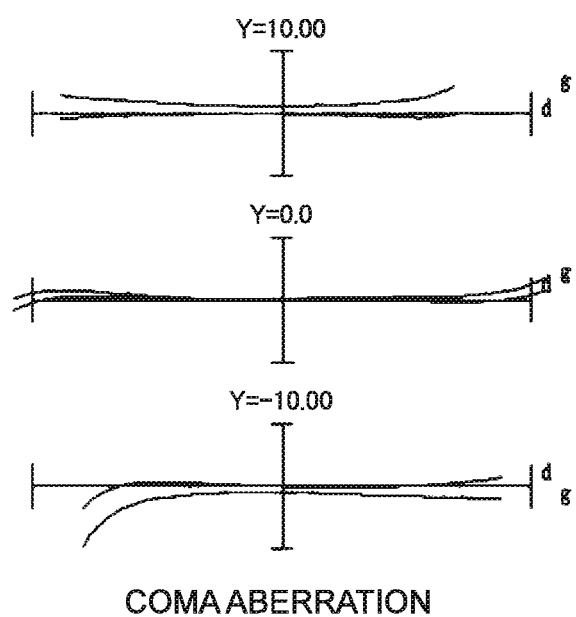
Figure 16B:
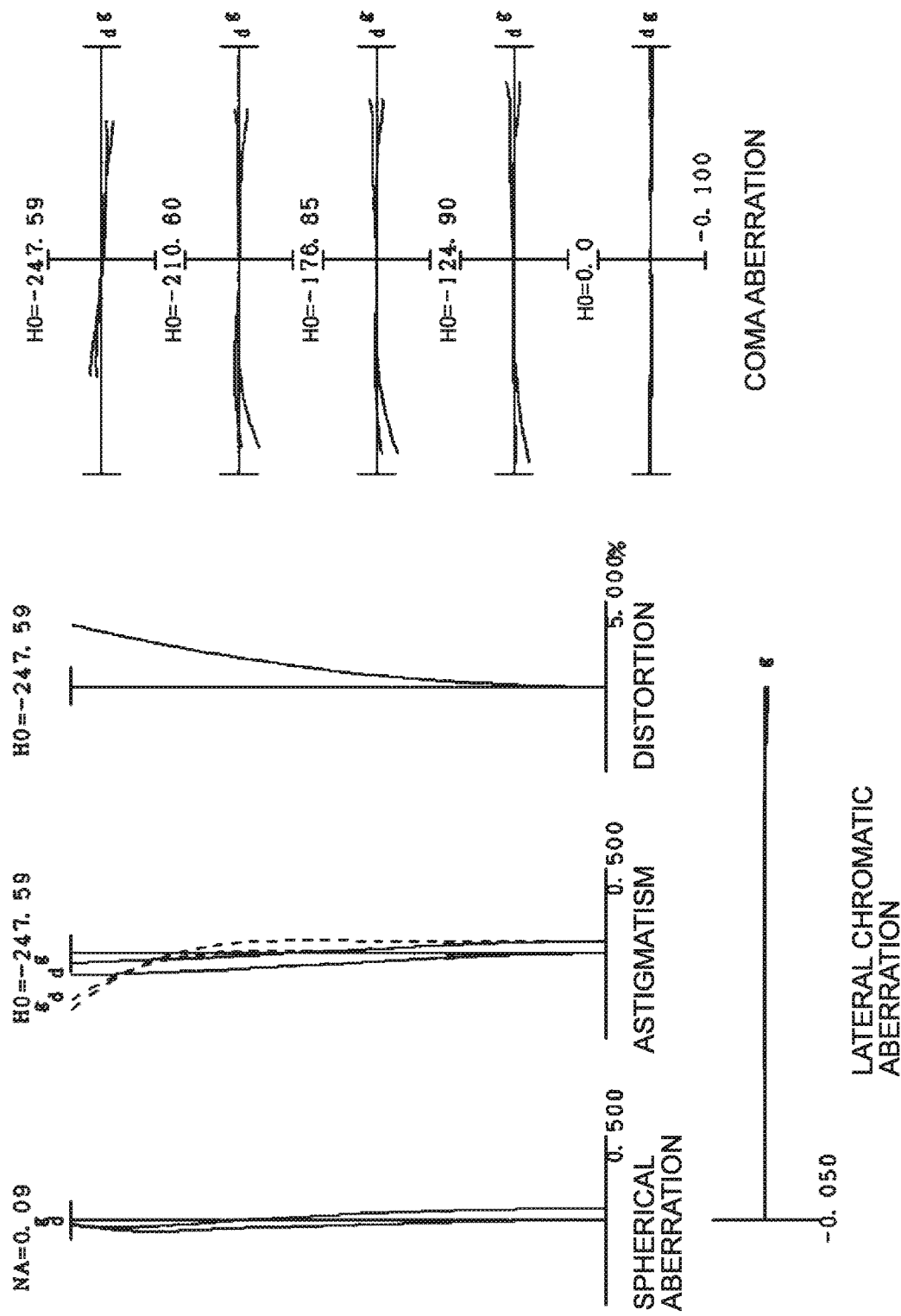
Figure 16C:
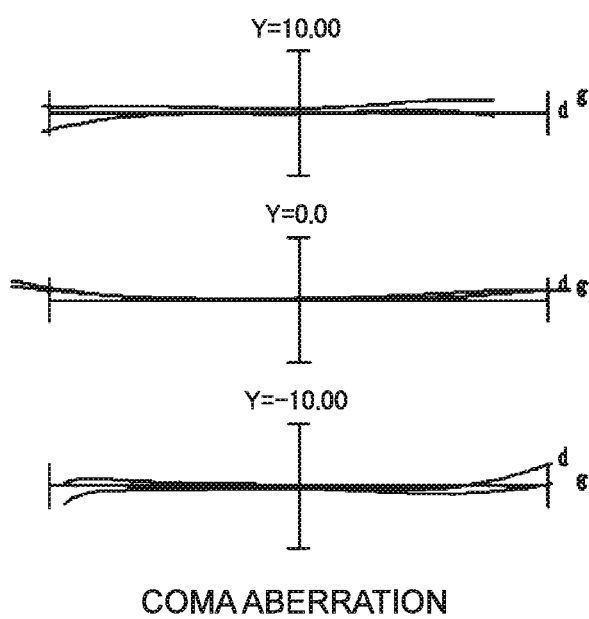

FIGS. 14A, 14B and 14C are graphs showing aberrations of the zoom optical system ZL4 according to Example 4 in a wide-angle end state (f=18.500), in which FIG. 14A is graphs showing various aberrations upon focusing on infinity, FIG. 14B is graphs showing various aberrations upon focusing on a short distant object (imaging magnification β=-0.0194), and FIG. 14C is graphs showing coma aberration when an image blur is corrected (a correction angle θ: 30°) upon focusing on infinity. FIGS. 15A, 15B and 15C are graphs showing aberrations of the zoom optical system ZL4 according to Example 4 in an intermediate focal length state (f=34.061), in which FIG. 15A is graphs showing various aberrations upon focusing on infinity, FIG. 15B is graphs showing various aberrations upon focusing on a short distant object (imaging magnification β=−0.0355), and FIG. 15C is graphs showing coma aberration when an image blur is corrected (a correction angle θ=0.30°) upon focusing on infinity. FIGS. 16A, 16B and 16C are graphs showing aberrations of the zoom optical system ZL4 according to Example 4 in a telephoto end state (f=53.500), in which FIG. 16A is graphs showing various aberrations upon focusing on infinity, FIG. 16B is graphs showing various aberrations upon focusing on a short distant object (imaging magnification β=−0.0556), and FIG. 16C is graphs showing coma aberration when an image blur is corrected (a correction angle θ=0.30°) upon focusing on infinity. In the present example, as shown in FIG. 14C, FIG. 15C, and FIG. 16C, optical performance upon vibration proofing is shown in graphs showing coma aberration, centering on an image height y=0.0, corresponding to image heights of vertically plus 10.0 and minus 10.0.

From each of the graphs showing aberration shown in FIGS. 14A-14C, 15A-15C and 16A-16C, the zoom optical system ZL4 according to Example 4 is found to have high imaging performance in which various aberrations are successfully corrected from the wide-angle end state to the telephoto end. Moreover, the zoom optical system ZL4 is found to have high imaging performance also upon correcting the image blur.

According to each Example described above, while the zoom optical system is provided with an image blur correction mechanism, the zoom optical system has high optical performance can be realized.

In addition, each Example described above shows one specific example of the zoom optical system according to each of the first to fourth embodiments, and the zoom optical systems according to the first to fourth embodiments are not limited thereto. In the first to fourth embodiments, the following content can be appropriately adopted within the range in which the optical performance is not adversely affected.

In Examples using numerical values according to the first to fourth embodiments, a three-group configuration was shown. However, the present invention can also be applied to other configurations such as a four-group configuration. For example, a configuration in which a lens or lens group is added thereto on a side closest to the object, or a configuration is allowed in which a lens or lens group is added thereto on a side closest to the image. Moreover, the lens group represents a part which is separated by the air distances which change upon zooming or focusing and have at least one lens.

In the first to fourth embodiments, the zoom optical system may be formed into a focusing lens group in which focusing on an infinite distant object to a short distant object is made by moving a single lens group or a plurality of lens groups, or a partial lens group in the optical axis direction. The focusing lens group can also be applied to autofocusing, and is also suitable for a motor drive (using an ultrasonic motor, or the like) for autofocusing. In particular, at least a part of the third lens group G3 is preferably applied as the focusing lens group.

In the first to fourth embodiments, the zoom optical system may be formed into the vibration-proof lens group in which the image blur caused by camera shake is corrected by moving the lens group or the partial lens group so as to have the component in the direction perpendicular to the optical axis, or rotationally moving (swinging) the lens group or the partial lens group in an in-plane direction including the optical axis. In particular, at least a part of the third lens group G3 is preferably applied as the vibration-proof lens group.

In the first to fourth embodiments, a lens surface may be formed of a spherical surface or a flat surface, or formed of an aspherical surface. When the lens surface is spherical or flat, lens processing and assembly and adjustment are facilitated, and deterioration of optical performance by an error of the processing and assembly and adjustment can be prevented. Thus, such a case is preferable. Moreover, when the lens surface is aspherical, the aspherical surface may be any aspherical surface, including an aspherical surface by grinding, a glass mold aspherical surface in which glass is formed into an aspherical surface shape by using a mold, and a composite type aspherical surface in which a resin is formed into the aspherical surface shape on a surface of glass. Moreover, the lens surface may be formed into a diffraction surface, or the lens may be formed into a gradient index lens (GRIN lens) or a plastic lens.

In the first to fourth embodiments, the aperture stop S is preferably arranged in a neighborhood of the third lens group G3 or within the third lens group G3. However, a lens frame may be used as substitution for such a role without providing a member as the aperture stop.

In the first to fourth embodiments, an antireflection film having high transmittance in a wide wavelength range may be applied to each lens surface in order to reduce a flare and a ghost to achieve high optical performance with high contrast.

The zoom optical systems ZL according to the first to fourth embodiments each have a zoom ratio of about 2 to 7.

Description of the Embodiments (Fifth and Sixth Embodiments)

Figure 22:
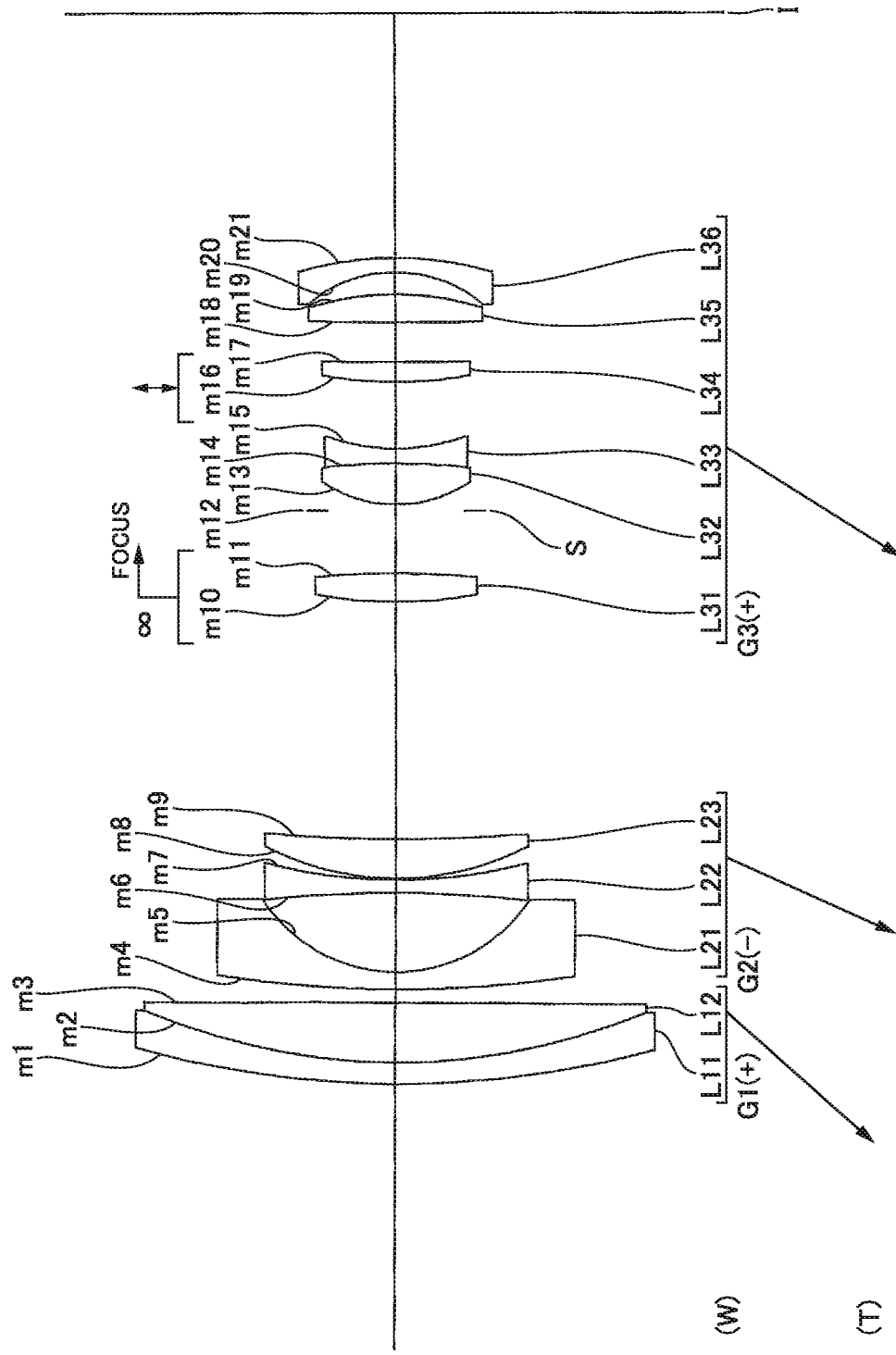
FIG. 22 is a cross-sectional view showing a lens configuration of a zoom optical system according to Example 5.

Hereinafter, a fifth embodiment will be described with reference to drawings. As shown in FIG. 22, a zoom optical system ZL according to the fifth embodiment has, disposed in order from an object, a first lens group G1 having positive refractive power, a second lens group G2 having negative refractive power, and a third lens group G3 having positive refractive power.

According to this configuration, size reduction of a lens barrel can be achieved and variations in aberration upon zooming can be successfully corrected.

Moreover, in the zoom optical system ZL, focusing is made by moving, as a focusing lens group, at least a part of the third lens group G3 (for example, a biconvex lens L31 in FIG. 22) along an optical axis direction.

According to this configuration, size reduction of the lens barrel can be achieved and variations in aberration (for example, spherical aberration, curvature of field, and the like) upon focusing can be successfully corrected.

Under the configuration, the zoom optical system ZL satisfies the following conditional expression (30):

$$0.90 < f3/fw < 1.50 \quad (30)$$

where f3 denotes a focal length of the third lens group G3, and fw denotes a focal length of the zoom optical system in a wide-angle end state.

The conditional expression (30) specifies a ratio of the focal length f3 of the third lens group G3 to the focal length fw of the zoom optical system in the wide-angle end state. In the present zoom optical system ZL, size reduction of the lens barrel and successful optical performance can be realized by satisfying the conditional expression (30).

If the ratio thereof is more than an upper limit of the conditional expression (30), refractive power of the third lens group G3 is reduced, and size reduction of the lens barrel becomes difficult. Refractive power of the first lens group G1 and the second lens group G2 is to be increased in order to achieve size reduction, and correction of coma aberration, astigmatism, and curvature of field becomes difficult. If the ratio thereof is less than a lower limit of the conditional expression (30), refractive power of the third lens group G3 increases, and correction of spherical aberration, coma aberration, and astigmatism becomes difficult.

Further successful aberration correction can be made by setting the lower limit of the conditional expression (30) to 1.00.

Further successful aberration correction can be made by setting the upper limit of the conditional expression (30) to 1.35.

In the zoom optical system ZL according to the fifth embodiment, zooming is preferably made by varying an air distance between the first lens group G1 and the second lens group G2 and an air distance between the second lens group G2 and the third lens group G3.

According to this configuration, spherical aberration and curvature of field caused upon zooming can be successfully corrected.

In the zoom optical system ZL according to the fifth embodiment, upon zooming from the wide-angle end state to the telephoto end state, the air distance between the first lens group G1 and the second lens group G2 is preferably enlarged, and the air distance between the second lens group G2 and the third lens group G3 is preferably reduced.

According to this configuration, spherical aberration and curvature of field caused upon zooming can be successfully corrected.

The zoom optical system ZL according to the fifth embodiment preferably satisfies the following conditional expression (31):

$$4.70 < f1/f3 < 30.00 \quad (31)$$

where f1 denotes a focal length of the first lens group G1.

The conditional expression (31) specifies a ratio of the focal length f1 of the first lens group G1 to the focal length f3 of the third lens group G3. In the present zoom optical system ZL, size reduction of the lens barrel and a predetermined zoom ratio can be realized by satisfying the conditional expression (31).

If the ratio thereof is more than an upper limit of the conditional expression (31), refractive power of the third lens group G3 increases, and correction of spherical aberration and coma aberration in the telephoto end state becomes difficult. If the ratio thereof is less than a lower limit of the conditional expression (31), refractive power of the first lens group G1 increases, and correction of coma aberration, astigmatism, and curvature of field in the telephoto end state becomes difficult.

Further successful aberration correction can be made by setting the lower limit of the conditional expression (31) to 4.76.

Further successful aberration correction can be made by setting the upper limit of the conditional expression (31) to 10.00.

The zoom optical system ZL according to the fifth embodiment preferably satisfies the following conditional expression (32):

$$0.60 < (-f2)/f3 < 1.05 \quad (32)$$

where f2 denotes a focal length of the second lens group G2.

The conditional expression (32) specifies a ratio of the focal length f3 of the third lens group G3 to the focal length f2 of the second lens group G2. In the present zoom optical system ZL, successful optical performance and a predetermined zoom ratio can be realized by satisfying the conditional expression (32).

If the ratio thereof is more than an upper limit of the conditional expression (32), refractive power of the third lens group G3 increases, and correction of spherical aberration and coma aberration in the telephoto end state becomes difficult. If the ratio thereof is less than a lower limit of the conditional expression (32), refractive power of the second lens group G2 increases, and correction of coma aberration and astigmatism in the wide-angle end state becomes difficult.

Further successful aberration correction can be made by setting the lower limit of the conditional expression (32) to 0.70.

Further successful aberration correction can be made by setting the upper limit of the conditional expression (32) to 1.00.

The zoom optical system ZL according to the fifth embodiment preferably satisfies the following conditional expression (33):

$$5.20 < f1/(-f2) < 30.00 \quad (33)$$

where f1 denotes a focal length of the first lens group G1, and f2 denotes a focal length of the second lens group G2.

The conditional expression (33) specifies a ratio of the focal length f1 of the first lens group G1 to the focal length f2 of the second lens group G2. In the present zoom optical system ZL, successful optical performance and a predetermined zoom ratio can be realized by satisfying the conditional expression (33).

If the ratio thereof is more than an upper limit of the conditional expression (33), refractive power of the second lens group G2 increases, and correction of coma aberration and astigmatism in the wide-angle end state becomes difficult. If the ratio thereof is less than a lower limit of the conditional expression (33), refractive power of the first lens group G1 increases, and correction of coma aberration, astigmatism, and curvature of field in the telephoto end state becomes difficult.

Further successful aberration correction can be made by setting the lower limit of the conditional expression (33) to 5.30.

Further successful aberration correction can be made by setting the upper limit of the conditional expression (33) to 10.00.

In the zoom optical system ZL according to the fifth embodiment, at least a part of the third lens group G3 (for example, a positive meniscus lens L34 having a convex surface facing the object in FIG. 22) is preferably configured to be movable, as a vibration-proof lens group for correcting an image blur, so as to have a component in a direction perpendicular to the optical axis.

According to this configuration, variations in curvature of field and variations in decentering coma aberration upon correcting the image blur can be simultaneously corrected.

In the zoom optical system ZL according to the fifth embodiment, the first lens group G1 is preferably formed of one cemented lens.

According to this configuration, while size reduction of the lens barrel is achieved, lateral chromatic aberration in the telephoto end state can be successfully corrected.

In the zoom optical system ZL according to the fifth embodiment, the second lens group G2 is preferably formed of two negative lenses and one positive lens.

According to this configuration, coma aberration and curvature of field in the wide-angle end state can be successfully corrected.

In the zoom optical system ZL according to the fifth embodiment, the second lens group G2 is preferably formed of, disposed in order from the object, a negative lens, a negative, lens, and a positive lens.

According to this configuration, coma aberration and curvature of field in the wide-angle end state can be successfully corrected.

In the zoom optical system ZL according to the fifth embodiment, the third lens group G3 is preferably formed of six or more lenses.

According to this configuration, spherical aberration and coma aberration can be successfully corrected.

The zoom optical system ZL according to the fifth embodiment preferably satisfies the following conditional expression (34):

$$30.00° < \omega w < 80.00° \quad (34)$$

where ωw denotes a half angle of view in the wide-angle end state.

The conditional expression (34) represents a condition specifying a value of an angle of view in the wide-angle end state. While the zoom optical system ZL has a wide angle of view, coma aberration, distortion, and curvature of field can be successfully corrected by satisfying the conditional expression (34).

Further successful aberration correction can be made by setting a lower limit of the conditional expression (34) to 33.00°. Still further successful aberration correction can be made by setting the lower limit of the conditional expression (34) to 36.00°.

Further successful aberration correction can be made by setting an upper limit of the conditional expression (34) to 77.00°.

The zoom optical system ZL according to the fifth embodiment preferably satisfies the following conditional expression (35):

$$2.00 < ft/fw < 15.00 \quad (35)$$

where ft denotes a focal length of the zoom optical system in the telephoto end state.

The conditional expression (35) represents a condition specifying a ratio of the focal length of the zoom optical system in the telephoto end state to the focal length of the zoom optical system in the wide-angle end state. In the present zoom optical system ZL, a high zoom ratio can be obtained, and simultaneously spherical aberration and coma aberration can be successfully corrected by satisfying the conditional expression (35).

Further successful aberration correction can be made by setting a lower limit of the conditional expression (35) to 2.30. Still further successful aberration correction can be made by setting the lower limit of the conditional expression (35) to 2.50. An effect of the fifth embodiment can be exhibited to a maximum by setting the lower limit of the conditional expression (35) to 2.70.

Further successful aberration correction can be made by setting an upper limit of the conditional expression (35) to 10.00. Still further successful aberration correction can be made by setting the upper limit of the conditional expression (35) to 7.00.

Figure 26:
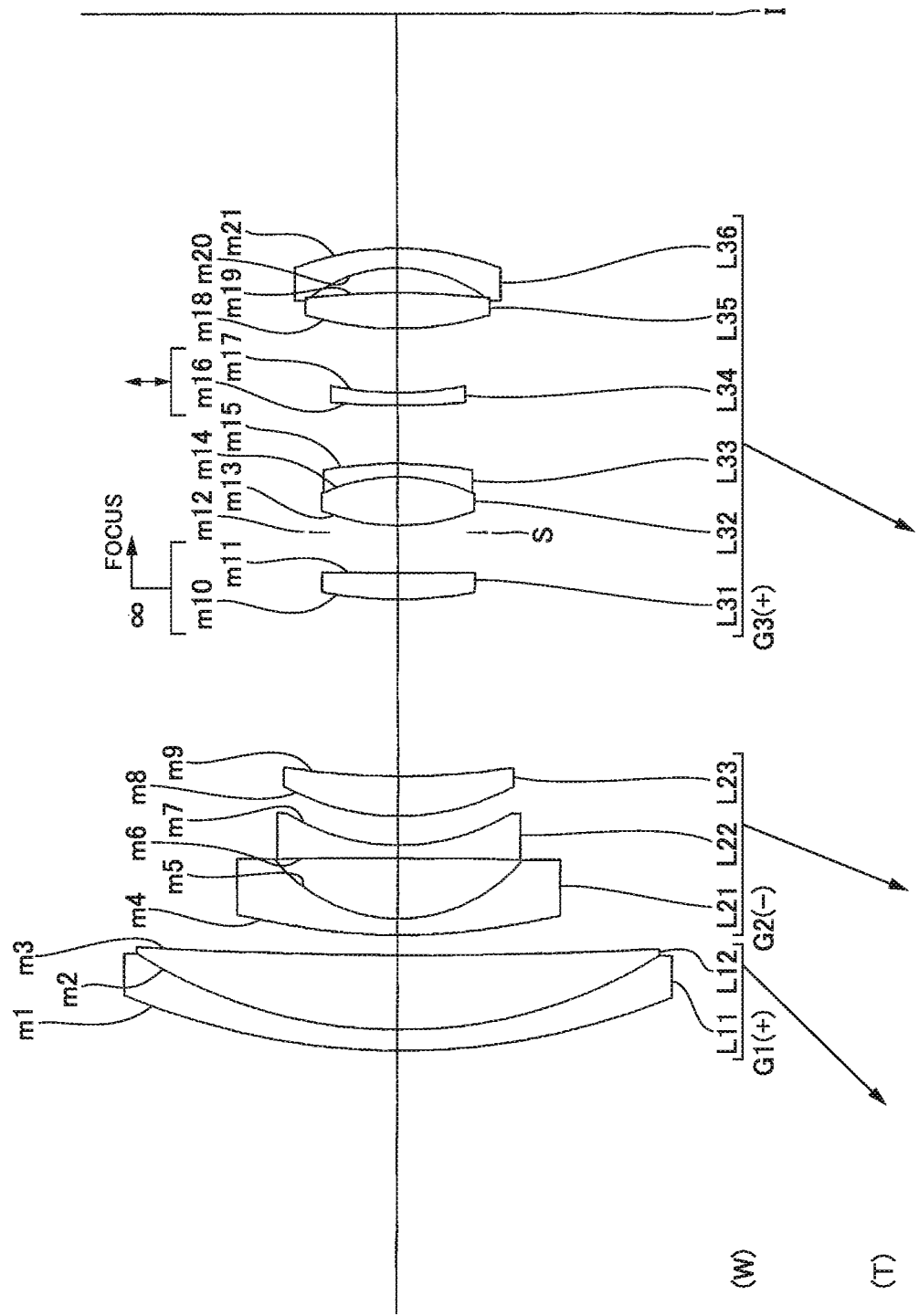
FIG. 26 is a cross-sectional view showing a lens configuration of a zoom optical system according to Example 6.

As shown in FIG. 22 and FIG. 26, in the zoom optical system ZL according to the fifth embodiment, a focusing lens group is preferably arranged, in the third lens group G3, on a side closer to the object than the vibration-proof lens group. At this time, the focusing lens group is preferably arranged, in the third lens group G3, on a side closest to the object. Moreover, the focusing lens group is preferably formed of a single lens.

Figure 30:
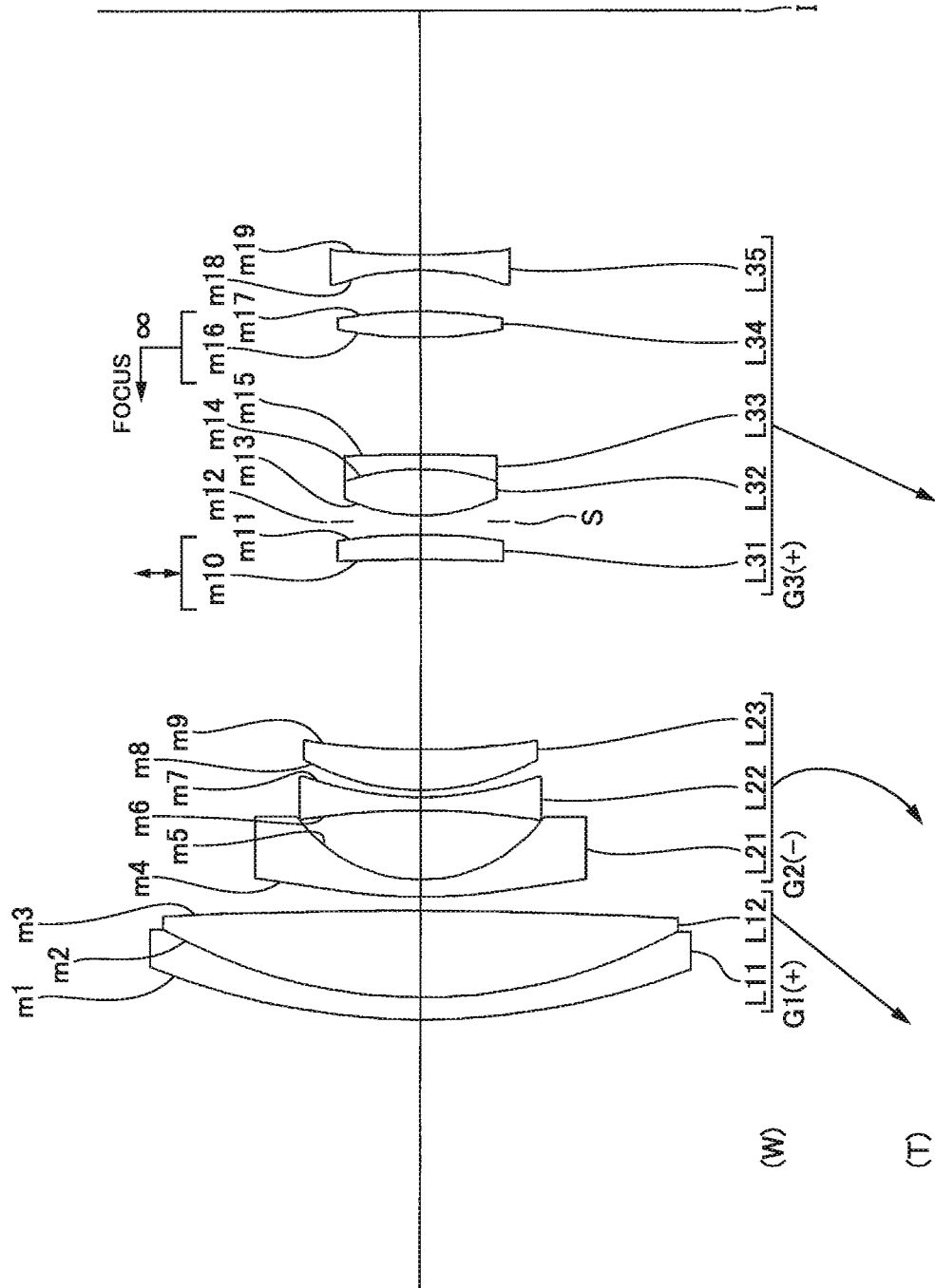
FIG. 30 is a cross-sectional view showing a lens configuration of a zoom optical system according to Example 7.

As shown in FIG. 30, in the zoom optical system ZL according to the fifth embodiment, the vibration-proof lens group is preferably arranged, in the third lens group G3, on a side closer to the object than the focusing lens group. At this time, the vibration-proof lens group is preferably arranged, in the third lens group G3, on a side closest to the object. Moreover, the vibration-proof lens group is preferably formed of a single lens.

According to the fifth embodiment as described above, the zoom optical system ZL having successful optical performance can be realized.

Figure 34:
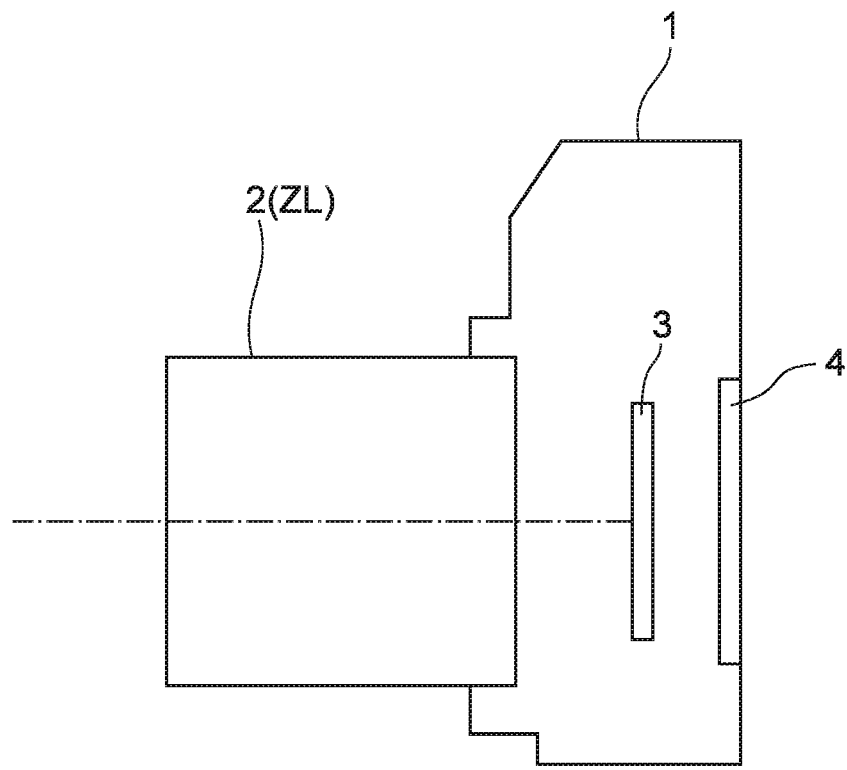
FIG. 34 is a substantial cross-sectional view showing a configuration of a camera according to each of fifth and sixth embodiments.

Next, a camera (imaging device) 1 provided with the above-mentioned zoom optical system ZL will be described with reference to FIG. 34. As shown in FIG. 34, the camera 1 is a lens interchangeable camera (so-called mirrorless camera) provided with the above-mentioned zoom optical system ZL as an imaging lens 2.

In the camera 1, light from an object (subject) (not shown) is collected by the imaging lens 2 to form a subject image on an imaging surface of an imaging unit 3 through an OLPF (optical low pass filter) (not shown). The subject image is then subjected to photoelectric conversion by a photoelectric conversion element provided in the imaging unit 3 to produce an image of the subject. This image is displayed on an EVF (electronic view finder) 4 provided in the camera 1. Thus, a photographer can observe the subject through the EVF 4.

Moreover, if a release bottom (not shown) is pressed by the photographer, the image of the subject produced in the imaging unit 3 is stored in a memory (not shown). Thus, the photographer can photograph the subject by the camera 1.

As is known also from each Example described later, the zoom optical system ZL according to the fifth embodiment, mounted in the camera 1 as the imaging lens 2, has successful optical performance by the characteristic lens configuration. Thus, according to the present camera 1, the imaging device having successful optical performance can be realized.

In addition, even when the above-mentioned zoom optical system ZL is mounted on a single-lens reflex camera that has a quick return mirror and observes the subject by a finder optical system, an effect similar to the effect of the camera 1 can be produced. Moreover, even when the above-mentioned zoom optical system ZL is mounted on a video camera, an effect similar to the effect of the camera 1 can be produced.

Figure 35:
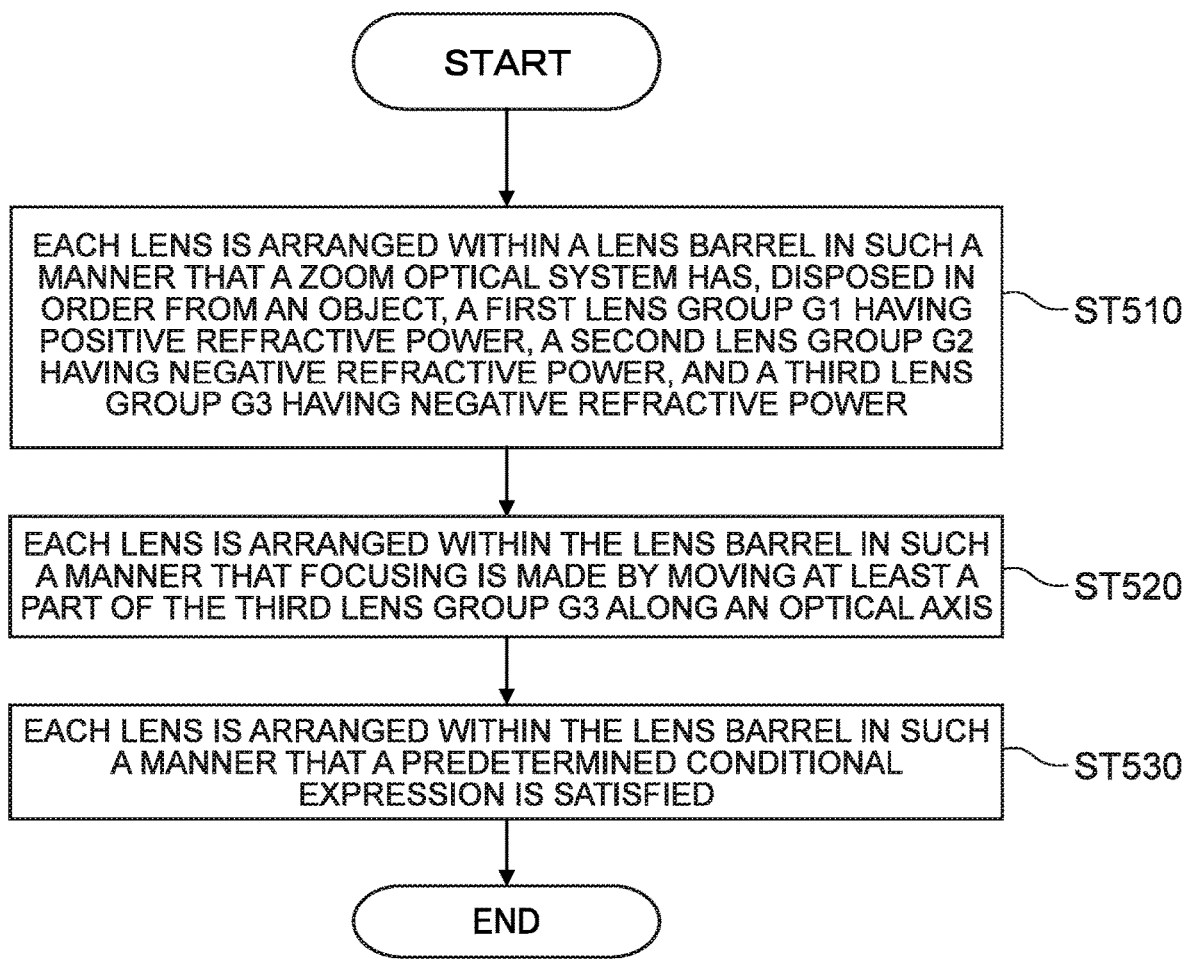
FIG. 35 is a flowchart for describing a method for manufacturing the zoom optical system according to the fifth embodiment.

Subsequently, a method for manufacturing the zoom optical system ZL having the configuration will be generally described with reference to FIG. 35. First, each lens is arranged within a lens barrel in such a manner that a zoom optical system ZL has a first lens group G1 having positive refractive power, a second lens group G2 having negative refractive power, and a third lens group G3 having positive refractive power (step ST510). At this time, each lens is arranged within the lens barrel in such a manner that focusing is made by moving at least a part of the third lens group G3 along an optical axis direction as a focusing lens group (step ST520). Each lens is arranged within the lens barrel in such a manner that at least the following conditional expression (30) is satisfied among the conditional expressions (step ST530):

$$0.90 < f3/fw < 1.50 \tag{30}$$

where f3 denotes a focal length of the third lens group G3, and fw denotes a focal length of the zoom optical system in the wide-angle end state.

To take a lens arrangement according to the fifth embodiment as one example, as shown in FIG. 22, as the first lens group G1, in order from the object, a cemented positive lens formed by cementing a negative meniscus lens L11 having a convex surface facing the object and a biconvex lens L12 is arranged. As the second lens group G2, in order from the object, a negative meniscus lens L21 having a convex surface facing the object, a biconcave lens L22, and a positive meniscus lens L23 having a convex surface facing the object are arranged. As the third lens group G3, in order from the object, a biconvex lens L31, a cemented positive lens formed by cementing a biconvex lens L32 and a biconcave lens L33, a positive meniscus lens L34 having a convex surface facing the object, a biconvex lens L35, and a negative meniscus lens L36 having a convex surface facing the image are arranged. Moreover, each lens is arranged in such a manner that the conditional expression (30) (a corresponding value of the conditional expression (30) is 1.14) is satisfied.

In addition, in the manufacturing method, each lens is preferably arranged within the lens barrel in such a manner that at least a part of the third lens group G3 (for example, the positive meniscus lens L34 having the convex surface facing the object in FIG. 22) is movable, as a vibration-proof lens group for correcting the image blur, so as to have a component in a direction perpendicular to the optical axis.

Moreover, in the manufacturing method, each lens is preferably arranged within the lens barrel in such a manner that the focusing lens group is arranged, in the third lens group G3, on a side closer to the object than the vibration-proof lens group (see FIG. 22 and FIG. 26).

Moreover, in the manufacturing method, each lens is preferably arranged within the lens barrel in such a manner that the vibration-proof lens group is arranged, in the third lens group G3, on a side closer to the object than the focusing group (see FIG. 30).

According to the method for manufacturing the zoom optical system related to the fifth embodiment as described above, the zoom optical system ZL having successful optical performance can be obtained.

Next, a sixth embodiment will be described with reference to drawings. As shown in FIG. 22, a zoom optical system ZL according to the sixth embodiment has, disposed in order from an object, a first lens group G1 having positive refractive power, a second lens group G2 having negative refractive power, and a third lens group G3 having positive refractive power.

According to this configuration, size reduction of the lens barrel can be realized and variations in aberration upon zooming can be successfully corrected.

Moreover, the zoom optical system ZL has a configuration in which at least a part of the third lens group G3 (for example, the positive meniscus lens L34 having the convex surface facing the object in FIG. 22) is movable, as a vibration-proof lens group for correcting the image blur, so as to have a component in a direction perpendicular to the optical axis.

According to this configuration, variations in curvature of field and variations in decentering coma upon correcting the image blur can be simultaneously corrected.

Under the configuration, the zoom optical system ZL satisfies the following conditional expression (36):

$$0.60 < f3/fw < 3.50 \tag{36}$$

where f3 denotes a focal length of the third lens group G3, and fw denotes a focal length of the zoom optical system in a wide-angle end state.

The conditional expression (36) specifies a ratio of the focal length f3 of the third lens group G3 to the focal length fw of the zoom optical system in the wide-angle end state. In the present zoom optical system ZL, size reduction of the lens barrel and successful optical performance can be realized by satisfying the conditional expression (36).

If the ratio thereof is more than an upper limit of the conditional expression (36), refractive power of the third lens group G3 is reduced, and size reduction of the lens barrel becomes difficult. Refractive power of the first lens group G1 and the second lens group G2 is to be increased in order to achieve size reduction, and correction of coma aberration, astigmatism, and curvature of field becomes difficult. If the ratio thereof is less than a lower limit of the conditional expression (36), refractive power of the third lens group G3 increases, and correction of spherical aberration, coma aberration, and astigmatism becomes difficult.

Further successful aberration correction can be made by setting the lower limit of the conditional expression (36) to 0.75. Still further successful aberration correction can be made by setting the lower limit of the conditional expression (36) to 0.85.

Further successful aberration correction can be made by setting the upper limit of the conditional expression (36) to 2.00. Still further successful aberration correction can be made by setting the upper limit of the conditional expression (36) to 1.50.

In the zoom optical system ZL according to the sixth embodiment, zooming is preferably made by varying an air distance between the first lens group G1 and the second lens group G2 and an air distance between the second lens group G2 and the third lens group G3.

According to this configuration, spherical aberration and curvature of field caused upon zooming can be successfully corrected.

In the zoom optical system ZL according to the sixth embodiment, upon zooming from the wide-angle end state to the telephoto end state, the air distance between the first lens group G1 and the second lens group G2 is preferably enlarged, and the air distance between the second lens group G2 and the third lens group G3 is preferably reduced.

According to this configuration, spherical aberration and curvature of field caused upon zooming can be successfully corrected.

The zoom optical system ZL according to the sixth embodiment preferably satisfies the following conditional expression (37):

$$4.70 < f1/f3 < 30.00 \tag{37}$$

where f1 denotes a focal length of the first lens group G1.

The conditional expression (37) specifies a ratio of the focal length f1 of the first lens group G1 to the focal length f3 of the third lens group G3. In the present zoom optical system, ZL size reduction of the lens barrel and a predetermined zoom ratio can be realized by satisfying the conditional expression (37).

If the ratio thereof is more than an upper limit of the conditional expression (37), refractive power of the third lens group G3 increases, and correction of spherical aberration and coma aberration in the telephoto end state becomes difficult. If the ratio thereof is less than a lower limit of the conditional expression (37), refractive power of the first lens group G1 increases, and correction of coma aberration, astigmatism, and curvature of field in the telephoto end state becomes difficult.

Further successful aberration correction can be made by setting the lower limit of the conditional expression (37) to 4.76.

Further successful aberration correction can be made by setting the upper limit of the conditional expression (37) to 10.00.

The zoom optical system ZL according to the sixth embodiment preferably satisfies the following conditional expression (38):

$$0.60<(-f2)/f3<1.05 \quad (38)$$

where f2 denotes a focal length of the second lens group G2.

The conditional expression (38) specifies a ratio of the focal length f3 of the third lens group G3 to the focal length f2 of the second lens group G2. In the present zoom optical system ZL, successful optical performance and a predetermined zoom ratio can be realized by satisfying the conditional expression (38).

If the ratio thereof is more than an upper limit of the conditional expression (38), refractive power of the third lens group G3 increases, and correction of spherical aberration and coma aberration in the telephoto end state becomes difficult. If the ratio thereof is less than a lower limit of the conditional expression (38), refractive power of the second lens group G2 increases, and correction of coma aberration and astigmatism in the wide-angle end state becomes difficult.

Further successful aberration correction can be made by setting the lower limit of the conditional expression (38) to 0.70.

Further successful aberration correction can be made by setting the upper limit of the conditional expression (38) to 1.00.

The zoom optical system ZL according to the sixth embodiment preferably satisfies the following conditional expression (39):

$$5.20<f1/(-f2)<30.00 \quad (39)$$

where f1 denotes a focal length of the first lens group G1, and f2 denotes a focal length of the second lens group G2.

The conditional expression (39) specifies a ratio of the focal length f1 of the first lens group G1 to the focal length f2 of the second lens group G2. In the present zoom optical system ZL, successful optical performance and a predetermined zoom ratio can be realized by satisfying the conditional expression (39).

If the ratio thereof is more than an upper limit of the conditional expression (39), refractive power of the second third lens group G2 increases, and correction of coma aberration and astigmatism in the wide-angle end state becomes difficult. If the ratio thereof is less than a lower limit of the conditional expression (39), refractive power of the first lens group G1 increases, and correction of coma aberration, astigmatism, and curvature of field in the telephoto end state becomes difficult.

Further successful aberration correction can be made by setting the lower limit of the conditional expression (39) to 5.30.

Further successful aberration correction can be made by setting the upper limit of the conditional expression (39) to 10.00.

In the zoom optical system ZL according to the sixth embodiment, focusing is preferably made by moving at least a part of the third lens group G3 (for example, the biconvex lens L31 in FIG. 22) along the optical axis direction.

According to this configuration, size reduction of the lens barrel can be achieved and variations in aberration (for example, spherical aberration, curvature of field, and the like) upon focusing can be successfully corrected.

In the zoom optical system ZL according to the sixth embodiment, the first lens group G1 is preferably formed of one cemented lens.

According to this configuration, while size reduction of the lens barrel is achieved, lateral chromatic aberration in the telephoto end state can be successfully corrected.

In the zoom optical system ZL according to the sixth embodiment, the second lens group G2 is preferably formed of two negative lenses and one positive lens.

According to this configuration, coma aberration and curvature of field in the wide-angle end state can be successfully corrected.

In the zoom optical system ZL according to the sixth embodiment, the second lens group G2 is preferably formed of, disposed in order from the object, a negative lens, a negative lens, and a positive lens.

According to this configuration, coma aberration and curvature of field in the wide-angle end state can be successfully corrected.

In the zoom optical system ZL according to the sixth embodiment, the third lens group G3 is preferably formed of six or more lenses.

According to this configuration, spherical aberration and coma aberration can be successfully corrected.

The zoom optical system ZL according to the sixth embodiment preferably satisfies the following conditional expression (40):

$$30.00°<\omega w<80.00° \quad (40)$$

where $\omega w$ denotes a half angle of view in the wide-angle end state.

The conditional expression (40) represents a condition specifying a value of an angle of view in the wide-angle end state. While the zoom optical system ZL has a wide angle of view, coma aberration, distortion, and curvature of field can be successfully corrected by satisfying the conditional expression (40).

Further successful aberration correction can be made by setting the lower limit of the conditional expression (40) to 33.00°. Still further successful aberration correction can be made by setting the lower limit of the conditional expression (40) to 36.00°.

Further successful aberration correction can be made by setting the upper limit of the conditional expression (40) to 77.00°.

The zoom optical system ZL according to the sixth embodiment preferably satisfies the following conditional expression (41):

$$2.00<ft/fw<15.00 \quad (41)$$

where ft denotes a focal length of the zoom optical system in the telephoto end state.

The conditional expression (41) represents a condition specifying a ratio of the focal length of the zoom optical system in the telephoto end state to the focal length of the zoom optical system in the wide-angle end state. In the present zoom optical system ZL, a high zoom ratio can be obtained, and simultaneously spherical aberration and coma aberration can be successfully corrected by satisfying the conditional expression (41).

Further successful aberration correction can be made by setting the lower limit of the conditional expression (41) to 2.30. Still further successful aberration correction can be made by setting the lower limit of the conditional expression (41) to 2.50. An effect of the sixth embodiment can be exhibited to a maximum by setting the lower limit of the conditional expression (41) to 2.70.

Further successful aberration correction can be made by setting the upper limit of the conditional expression (41) to 10.00. Still further successful aberration correction can be made by setting the upper limit of the conditional expression (41) to 7.00.

According to the sixth embodiment as described above, the zoom optical system ZL having successful optical performance can be realized.

Next, a camera (imaging device) 1 provided with the above-mentioned zoom optical system ZL will be described with reference to FIG. 34. The camera 1 is identical with the camera 1 in the fifth embodiment, and the configuration has been already described above, and therefore the description herein is omitted.

As is known also from each Example described later, the zoom optical system ZL according to the sixth embodiment, mounted in the camera 1 as an imaging lens 2, has successful optical performance by the characteristic lens configuration. Thus, according to the present camera 1, the imaging device having successful optical performance can be realized.

In addition, even when the above-mentioned zoom optical system ZL is mounted on a single-lens reflex camera that has a quick return mirror and observes the subject by a finder optical system, an effect similar to the effect of the camera 1 can be produced. Moreover, even when the above-mentioned zoom optical system ZL is mounted on a video camera, an effect similar to the effect of the camera 1 can be produced.

Figure 36:
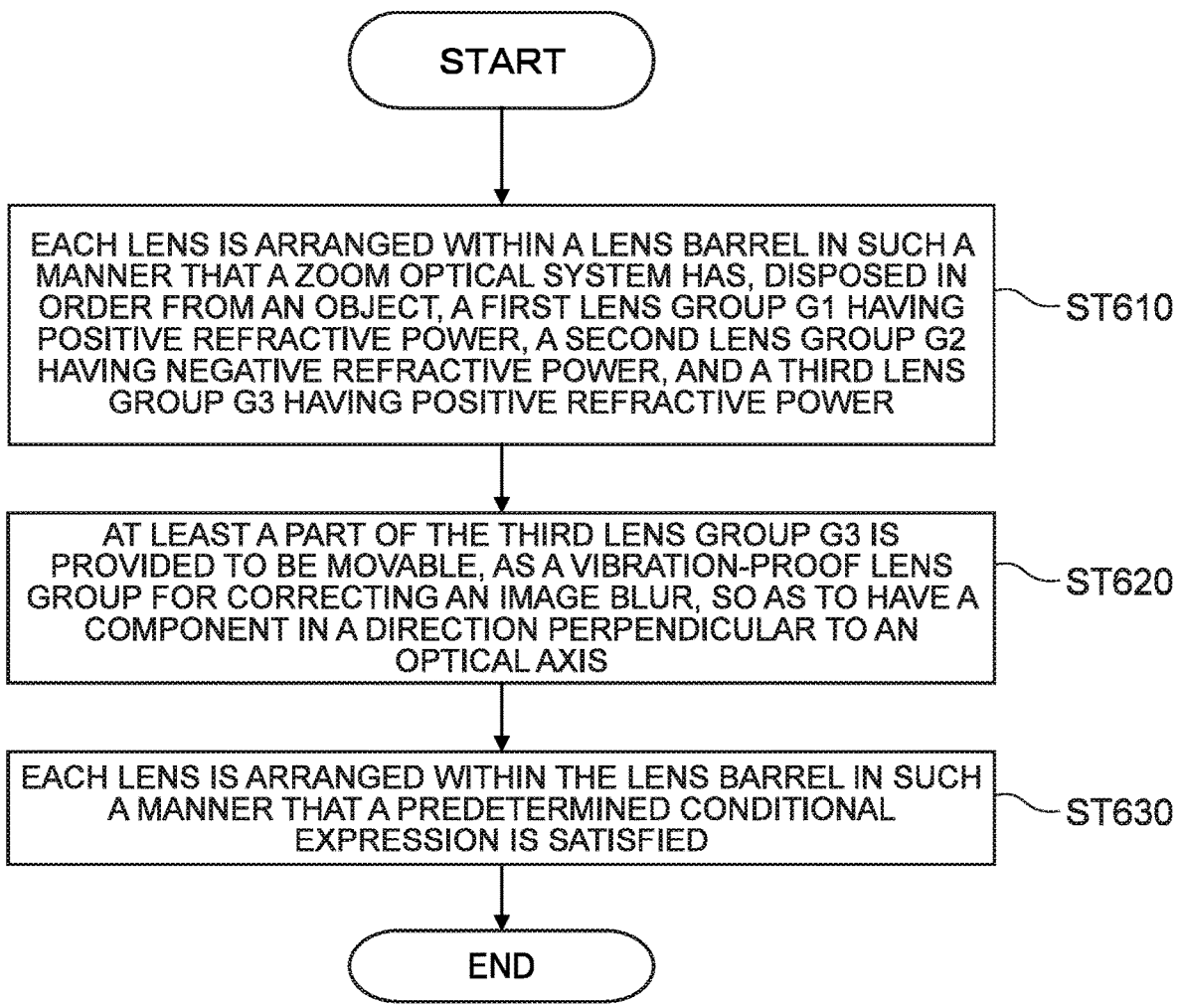
FIG. 36 is a flowchart for describing a method for manufacturing the zoom optical system according to the sixth embodiment.

Subsequently, a method for manufacturing the zoom optical system ZL having the configuration will be generally described with reference to FIG. 36. First, each lens is arranged within a lens barrel in such a manner that a zoom optical system ZL has, disposed in order from an object, a first lens group G1 having positive refractive power, a second lens group G2 having negative refractive power, and a third lens group G3 having positive refractive power (step ST610). At this time, at least a part of the third lens group G3 is configured to be movable, as a vibration-proof lens group for correcting an image blur, so as to have a component in a direction perpendicular to an optical axis (step ST620). Each lens is arranged within the lens barrel in such a manner that at least the following conditional expression (36) is satisfied among the conditional expressions (step ST630):

$$0.60 < f3/fw < 3.50 \quad (36)$$

where f3 denotes a focal length of the third lens group G3, and fw denotes a focal length of the zoom optical system in the wide-angle end state.

To take a lens arrangement according to the sixth embodiment as one example, as shown in FIG. 22, as a first lens group G1, in order from an object, a cemented positive lens formed by cementing a negative meniscus lens L11 having a convex surface facing the object and a biconvex lens L12 is arranged. As a second lens group G2, in order from the object, a negative meniscus lens L21 having a convex surface facing the object, a biconcave lens L22, and a positive meniscus lens L23 having a convex surface facing the object are arranged. As a third lens group G3, in order from the object, a biconvex lens L31, a cemented positive lens formed by cementing a biconvex lens L32 and a biconcave lens L33, a positive meniscus lens L34 having a convex surface facing the object, a biconvex lens L35, and a negative meniscus lens L36 having a convex surface facing the image are arranged. Moreover, each lens is arranged in such a manner that the conditional expression (36) (a corresponding value of the conditional expression (36) is 1.14) is satisfied.

According to the method for manufacturing the zoom optical system related to the sixth embodiment as described above, the zoom optical system. ZL having successful optical performance can be obtained.

Examples According to Fifth and Sixth Embodiments

Next, each Example according to each of the fifth and sixth embodiments will be described based on drawings. Tables 5 to 7 are provided below, and these Tables show each of specifications in Examples 5 to 7.

FIG. 22, FIG. 26, and FIG. 30 each are a cross-sectional view showing a configuration of each of zoom optical systems ZL (ZL5 to ZL7) according to each Example. In the cross-sectional view of each of the zoom optical systems ZL5 to ZL7, a movement track of each of the lens groups G1 to G3 along the optical axis upon zooming from a wide-angle end state (W) to a telephoto end state (T) is shown by an arrow.

Each reference sign for FIG. 22 according to Example 5 is independently used for each Example in order to avoid complication of the description by an increase in digit number of the reference sign. Therefore, even if reference signs common to reference signs in drawings according to other Examples are placed, the reference signs do not necessarily provide configurations common to the configurations in other Examples.

In each Example, a d-line (wavelength: 587.5620 nm) and a g-line (wavelength: 435.8350 nm) are selected as an object for calculation of aberration characteristics.

In "Lens Data" in the Table, a surface number indicates an order of optical surfaces from the object along a direction in which a ray of light progresses, r denotes a radius of curvature of each optical surface, D denotes a distance to the next lens surface being the distance on an optical axis from each optical surface to the next optical surface (or image surface), vd denotes the Abbe number of a material of an optical member on the basis of the d-line, and nd denotes a refractive index for the d-line of the material of the optical member. Moreover, (Variable) indicates a variable distance to the next lens surface, "∞" in a radius of curvature indicates a flat surface or an aperture, and (Stop S) indicates an aperture stop S. A refractive index (d-line) of air "1.00000" is omitted. When the optical surface is aspherical, "*" is placed on a left side of the surface number, and a paraxial radius of curvature is shown in a column of the radius of curvature r.

In "Aspherical Surface Data" in the Table, a shape of an aspherical surface shown in "Lens Data" is expressed by the following expression (b). Here, y denotes a height in a direction perpendicular to an optical axis, X(y) denotes an amount of displacement (amount of sag) in an optical axis direction at a height y, r denotes a radius of curvature (paraxial radius of curvature) of a reference spherical surface, κ denotes a conical coefficient, and An represents an n-th aspherical coefficient. In addition, "E-n" represents "×10$^{-n}$," and for example, "1.234E-05" represents "1.234×10$^{-5}$."

$$X(y)=(y^2/r)/[1+\{1-\kappa(y^2/r^2)\}^{1/2}]+A4\times y^4+A6\times y^6+A8\times y^8+A10\times y^{10} \quad (b)$$

In "Various Data" in the Table, f denotes a focal length of a whole lens system, Fno denotes an F-number, ω denotes a half angle of view (a unit: °), Y denotes an image height, TL denotes a total length of a lens system (a distance from a lens forefront surface to an image surface I on an optical axis), and Bf denotes a back focus (a distance from a lens final surface to the image surface I on the optical axis).

In "Variable Distance Data" in the Table, a focal length f or imaging magnification β of a zoom optical system in a wide-angle end state, an intermediate focal length state, and a telephoto end state upon focusing on infinity and a short distant object (an imaging distance R=2.0 m), and a value of each variable distance is shown. In addition, DO denotes a distance from an object surface to a first surface, and Di (where, i is an integer) denotes a variable distance between an i-th surface and a (i+1)-th surface.

In "Lens Group Data" in the Table, a start surface number (surface number on a side closest to the object) of each group is shown in a group first surface, and a focal length of each group is shown in a group focal length.

In "Conditional Expression Corresponding Value" in the Table, values corresponding to the conditional expressions (30) to (41) are shown.

In the following, in all the values of the specifications, unless otherwise stated, "mm" is generally used for the focal length f, the radius of curvature r, the distance to the next lens surface D and other lengths, and the like entered therein. However, equivalent optical performance can be obtained even if the optical system is proportionally scaled up or scaled down, and therefore the values are not limited thereto. Moreover, the unit is not limited to "mm," and other appropriate units can be used.

The description with regard to Table so far is common in all Examples, and the description in the following is omitted.

Example 5

Example 5 will be described using FIG. 22, FIGS. 23A-23C, 24A-24C, 25A-25C and Table 5. As shown in FIG. 22, a zoom optical system ZL (ZL5) according to Example 5 is configured of, disposed in order from an object along an optical axis, a first lens group G1 having positive refractive power, a second lens group G2 having negative refractive power, and a third lens group G3 having positive refractive power.

The first lens group G1 is formed of, disposed in order from the object, a cemented positive lens formed by cementing a negative meniscus lens L11 having a convex surface facing the object and a biconvex lens L12.

The second lens group G2 is formed of, disposed in order from the object, a negative meniscus lens L21 having a convex surface facing the object, a biconcave lens L22, and a positive meniscus lens L23 having a convex surface facing the object. A surface of the negative meniscus lens L21 to the object is aspherical.

The third lens group G3 is formed of, disposed in order from the object, a biconvex lens L31, a cemented positive lens formed by cementing a biconvex lens L32 and a biconcave lens L33, a positive meniscus lens L34 having a convex surface facing the object, a biconvex lens L35, and a negative meniscus lens L36 having a convex surface facing an image.

An aperture stop S determining an F-number is provided within the third lens group G3.

An image surface I is formed on an imaging element (not shown), and the imaging element is configured of a CCD or a CMOS, for example.

In the zoom optical system ZL5 according to Example 5, zooming from a wide-angle end state to a telephoto end state is made by varying an air distance between the first lens group G1 and the second lens group G2 and an air distance between the second lens group G2 and the third lens group G3. At this time, relative to the image surface I, the first lens group G1 to the third lens group G3 move to the object. The aperture stop S moves to the object integrally with the third lens group G3 upon zooming.

More specifically, in the zoom optical system ZL5 according to Example 5, zooming from the wide-angle end state to the telephoto end state is made by moving each of the lens groups G1 to G3 along the optical axis in such a manner that the air distance between the first lens group G1 and the second lens group G2 is enlarged, and the air distance between the second lens group G2 and the third lens group G3 is reduced.

The zoom optical system ZL5 according to Example 5 has a configuration in which focusing is made by moving the biconvex lens L31, in the third lens group G3, along the optical axis direction, and as shown by an arrow in FIG. 22, upon causing a change from a state of focusing on infinity to a state of focusing on a short distant object, the biconvex lens L31 moves from the object to the image.

Upon occurrence of an image blur, correction of the image blur (vibration proofing) on the image surface I is made by moving, as a vibration-proof lens group, the positive meniscus lens L34 having the convex surface facing the object in the third lens group G3 so as to have a component in a direction perpendicular to the optical axis.

Table 5 below shows values of each of specifications in Example 5. Surface numbers 1 to 21 in Table 5 correspond to optical surfaces m1 to m21 shown in FIG. 22, respectively.

TABLE 5

| [Lens Data] | | | | |
|---|---|---|---|---|
| Surface Number | r | D | vd | nd |
| 1 | 73.1346 | 1.6000 | 23.80 | 1.84666 |
| 2 | 47.7461 | 4.4680 | 55.52 | 1.69680 |
| 3 | −2795.9453 | D3(Variable) | | |
| *4 | 86.1349 | 1.3000 | 46.60 | 1.80400 |
| 5 | 11.7958 | 6.0000 | | |

TABLE 5-continued

| | | | | |
|---|---|---|---|---|
| 6 | −86.9238 | 1.0000 | 46.60 | 1.80400 |
| 7 | 38.6168 | 0.1000 | | |
| 8 | 20.8772 | 3.0000 | 23.80 | 1.84666 |
| 9 | 111.9344 | D9(Variable) | | |
| 10 | 32.7034 | 2.2000 | 55.35 | 1.67790 |
| 11 | −64.0118 | D11(Variable) | | |
| 12 | ∞ | 0.5000 | (Stop S) | |
| 13 | 9.7190 | 3.1000 | 61.22 | 1.58913 |
| 14 | −45.7099 | 1.1044 | 29.37 | 1.95000 |
| 15 | 14.5899 | 5.0000 | | |
| 16 | 30.0000 | 1.5000 | 31.27 | 1.90366 |
| 17 | 200.0000 | 3.0000 | | |
| 18 | 296.9316 | 2.1000 | 50.27 | 1.71999 |
| 19 | −22.1475 | 1.6841 | | |
| 20 | −9.9417 | 1.1000 | 46.60 | 1.80400 |
| 21 | −24.7454 | Bf(Variable) | | |

[Aspherical Surface Data]

The 4th Surface
κ = 1.0000
A4 = −1.68932E−06
A6 = 3.45601E−09
A8 = 3.25066E−11
A10 = −1.38349E−13

[Various Data]

| | |
|---|---|
| f | 18.50~53.50 |
| Fno | 3.62~5.91 |
| ω | 39.30~14.42 |
| Y | 14.25~14.25 |
| TL | 80.892~108.569 |
| Bf | 18.519~37.340 |

[Variable Distance Data]

| | (Infinity) | | | (Imaging Distance 2 m) | | |
|---|---|---|---|---|---|---|
| | Wide-Angle End | Intermediate | Telephoto End | Wide-Angle End | Intermediate | Telephoto End |
| f, β | 18.503 | 34.953 | 53.500 | −0.009 | −0.018 | −0.027 |
| D0 | 0.000 | 0.000 | 0.000 | 1918.427 | 1909.008 | 1890.749 |
| D3 | 1.000 | 9.986 | 25.233 | 1.000 | 9.986 | 25.233 |
| D9 | 17.878 | 6.525 | 2.500 | 18.261 | 6.878 | 3.013 |
| D11 | 4.739 | 4.739 | 4.739 | 4.356 | 4.387 | 4.226 |
| Bf | 18.519 | 30.304 | 37.340 | 18.519 | 30.304 | 37.340 |

[Lens Group Data]

| Group Number | Group First Surface | Group Focal Length |
|---|---|---|
| G1 | 1 | 114.802 |
| G2 | 4 | −18.462 |
| G3 | 10 | 21.087 |

[Conditional Expression Corresponding Value]

f3/fw=1.14    Conditional Expression (30):

f1/f3=5.44    Conditional Expression (31):

f2/(−f3)=0.88    Conditional Expression (32):

f1/(−f2)=6.22    Conditional Expression (33):

ωw=39.30    Conditional Expression (34):

ft/fw=2.89    Conditional Expression (35):

f3/fw=1.14    Conditional Expression (36):

f1/f3=5.44    Conditional Expression (37):

f2/(−f3)=0.88    Conditional Expression (38):

f1/(−f2)=6.22    Conditional Expression (39):

ωw=39.30    Conditional Expression (40):

ft/fw=2.89    Conditional Expression (41):

Table 5 shows that the zoom optical system ZL5 according to Example 5 satisfies the conditional expressions (30) to (41).

Figure 23A:
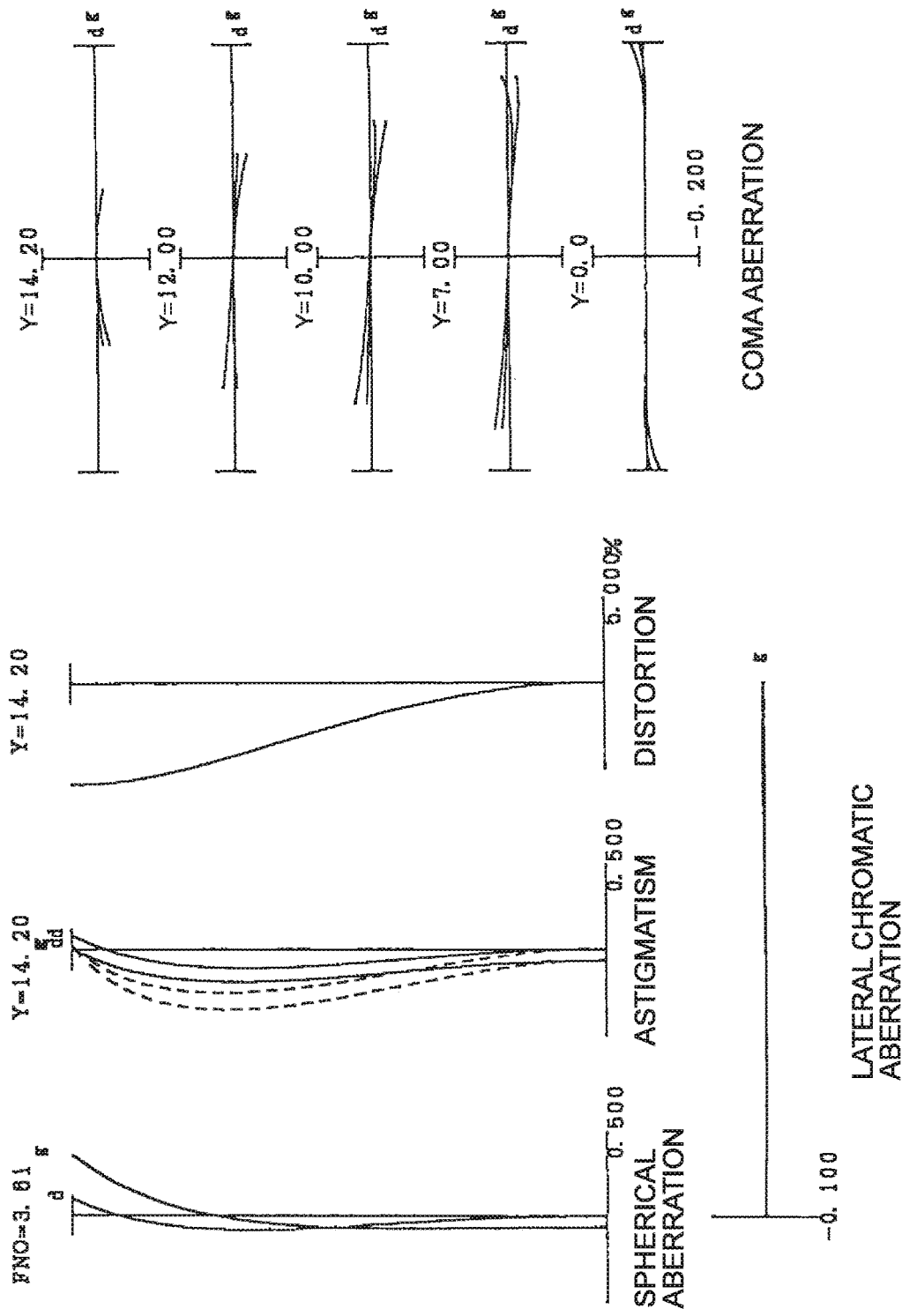
Figure 23B:
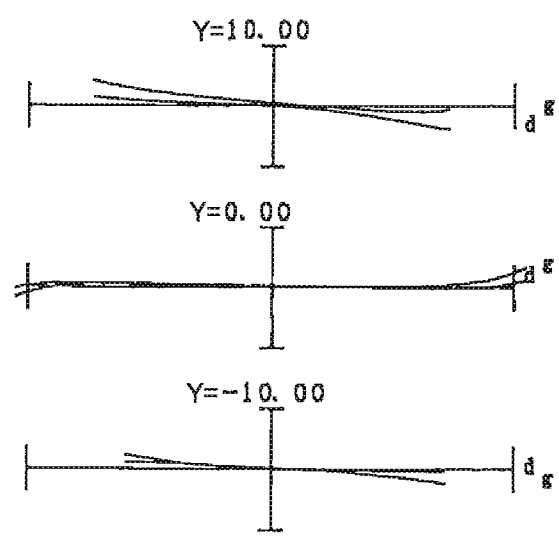
Figure 23C:
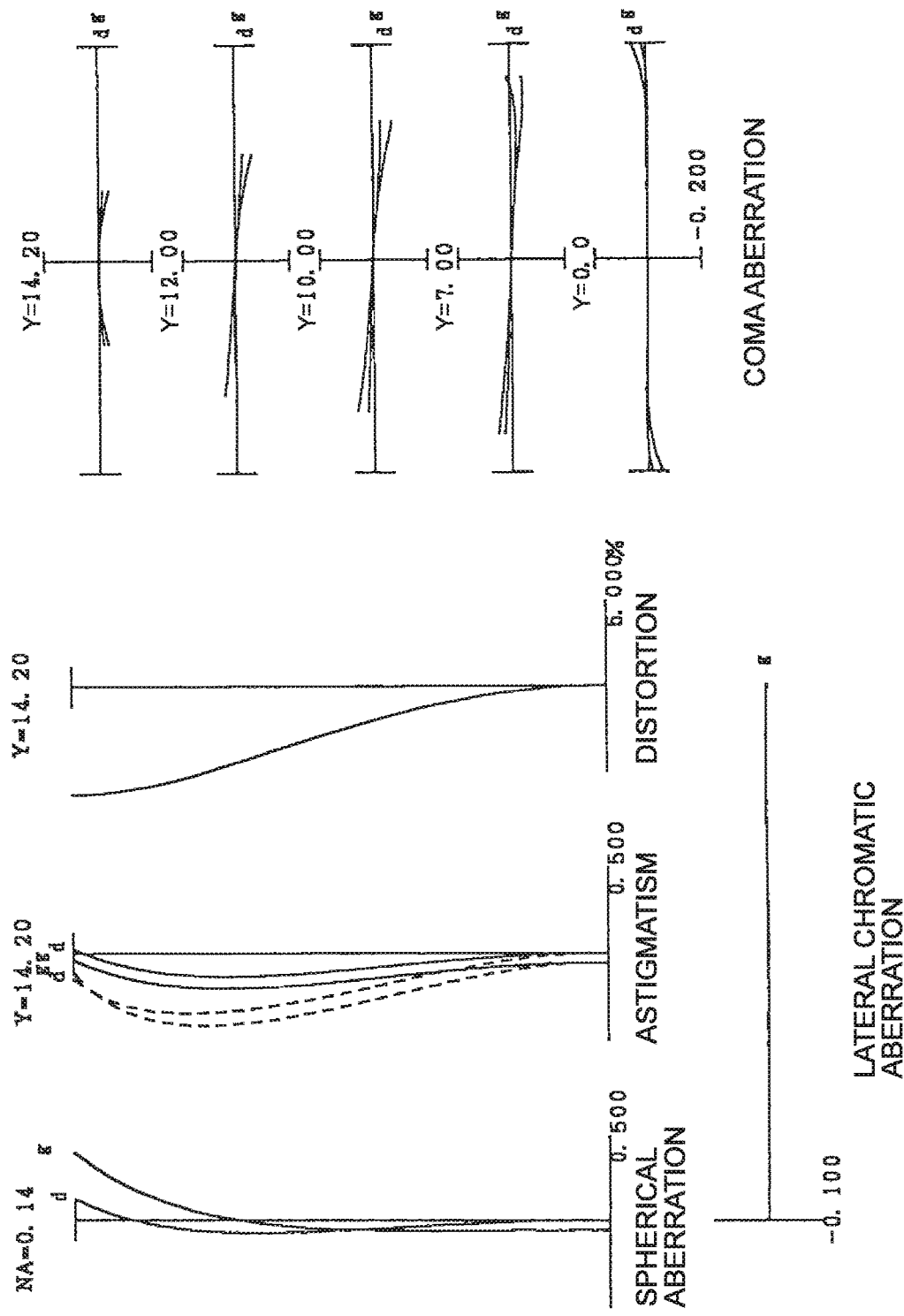

FIGS. 23A, 23B and 23C are graphs showing aberrations of the zoom optical system ZL5 according to Example 5 in a wide-angle end state (f=18.50), in which FIG. 23A is graphs showing various aberrations upon focusing on infinity, FIG. 23B is graphs showing coma aberration when an image blur is corrected (a vibration-proof lens group shift amount=0.2 mm) upon focusing on infinity, and FIG. 23C is graphs showing various aberrations upon focusing on a short distant object (imaging magnification β=−0.009). FIGS.

Figure 24A:
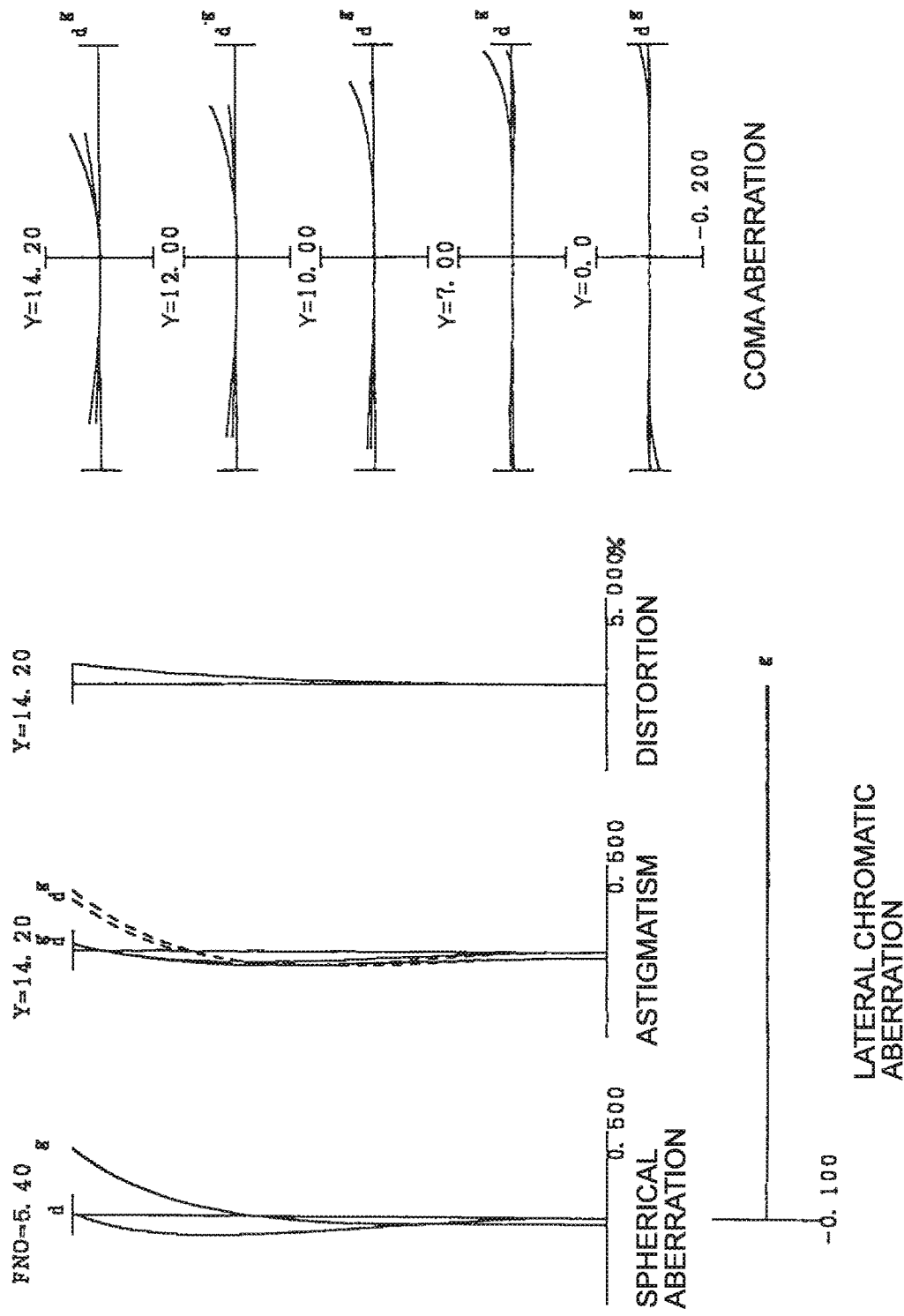
Figure 24B:
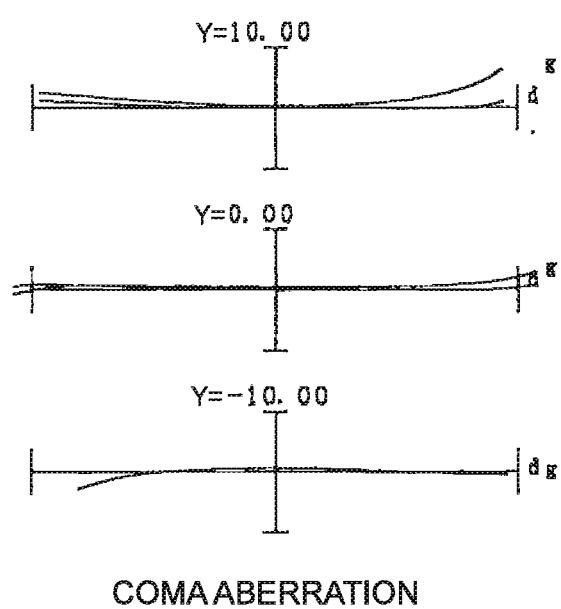
Figure 25A:
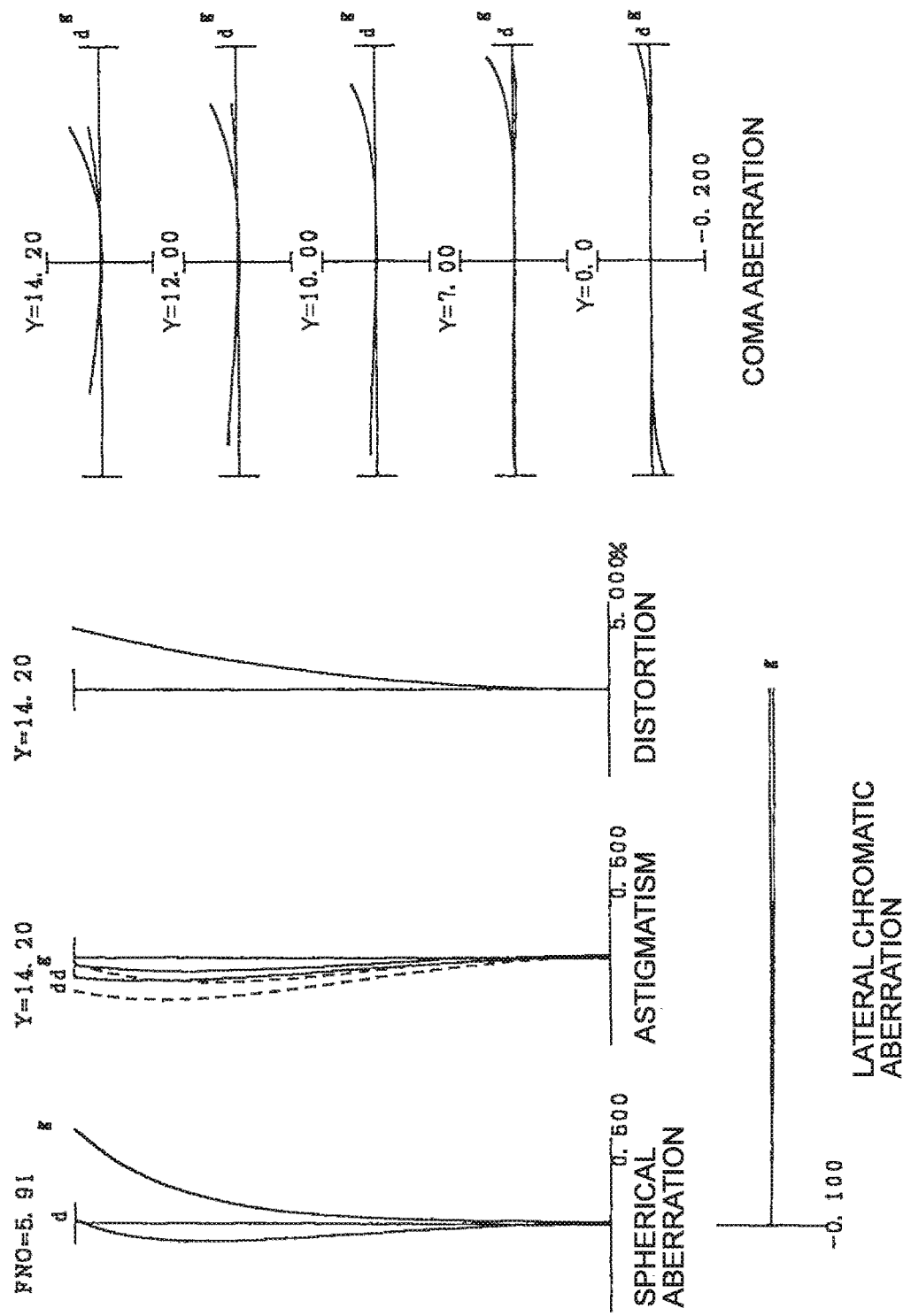
Figure 25B:
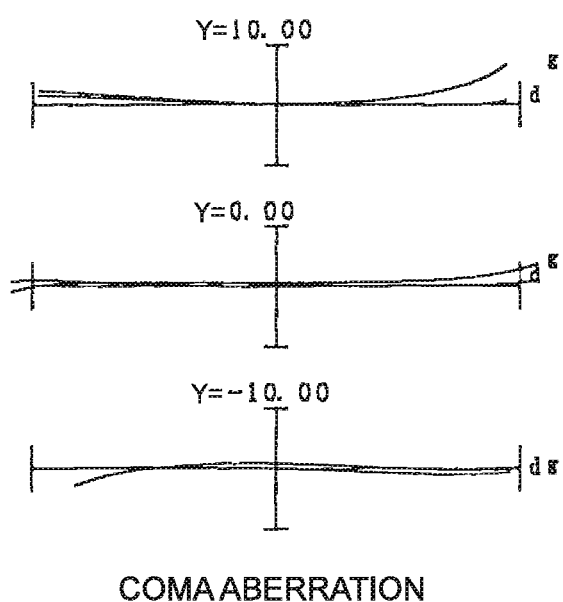
Figure 25C:
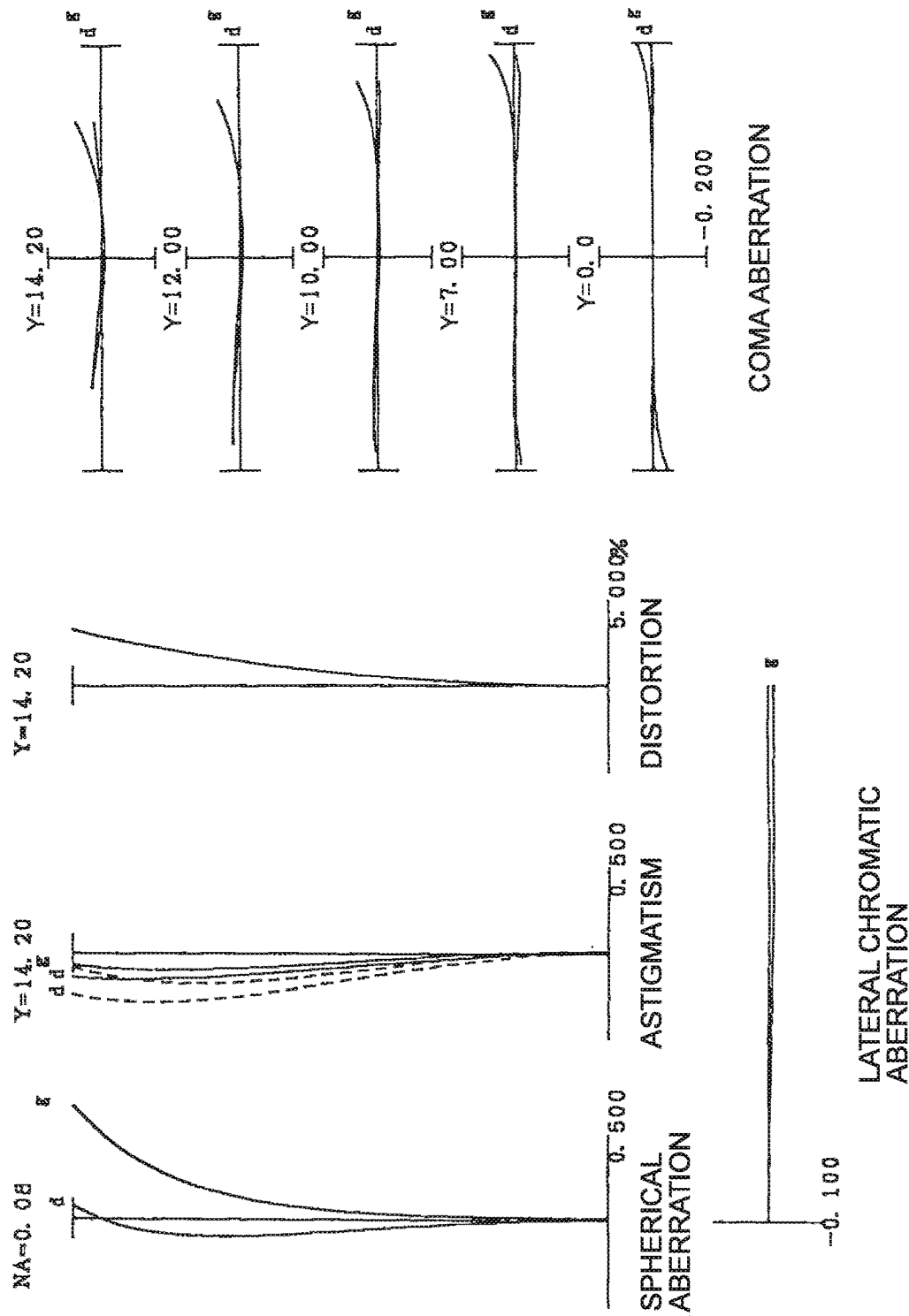

24A, 24B and 24C are graphs showing aberrations of the zoom optical system ZL5 according to Example 5 in an intermediate focal length state (f=34.95), in which FIG. 24A is graphs showing various aberrations upon focusing on infinity, FIG. 24B is graphs showing coma aberration when an image blur is corrected (a vibration-proof lens group shift amount=0.2 mm) upon focusing on infinity, and FIG. 24C is graphs showing various aberrations upon focusing on a short distant object (imaging magnification β=−0.018). FIGS. 25A, 25B and 25C are graphs showing aberrations of the zoom optical system ZL5 according to Example 5 in a telephoto end state (f=53.50), in which FIG. 25A is graphs showing various aberrations upon focusing on infinity, FIG. 25B is graphs showing coma aberration when an image blur is corrected (a vibration-proof lens group shift amount=0.2 mm) upon focusing on infinity, and FIG. 25C is graphs showing various aberrations upon focusing on a short distant object (imaging magnification β=−0.027). In the present Example, as shown in FIG. 23B, FIG. 24B, and FIG. 25B, optical performance upon vibration proofing is shown in graphs showing coma aberration, centering on an image height y=0.0, corresponding to image heights of vertically plus 10.0 and minus 10.0.

In each graph showing aberration, FNO denotes an F-number, Y denotes an image height, d denotes aberration in a d-line, and g denotes aberration in a g-line. A column without description of d or g indicates aberration in the d-line. In the graphs showing spherical aberration, a value of the F-number corresponding to a maximum aperture is shown, and in the graphs showing astigmatism and distortion, a maximum value of the image height is shown. In the graphs showing astigmatism, a solid line indicates a sagittal image surface and a broken line indicates a meridional image surface. In the graphs showing coma aberration, a solid line indicates meridional coma, and a broken line indicates sagittal coma. The description of the graphs showing aberration above is regarded to be the same also in other Examples, and the description thereof is omitted.

From each of the graphs showing aberration shown in FIGS. 23A-23C, 24A-24C and 25A-25C, the zoom optical system ZL5 according to Example 5 is found to have high imaging performance in which various aberrations are successfully corrected from the wide-angle end state to the telephoto end state. Moreover, the zoom optical system ZL5 is found to have high imaging performance also upon correcting the image blur.

Example 6

Example 6 will be described using FIG. 26, FIGS. 27A-27C, 28A-28C, 29A-29C and Table 6. As shown in FIG. 26, a zoom optical system ZL (ZL6) according to Example 6 is configured of, disposed in order from an object along an optical axis, a first lens group G1 having positive refractive power, a second lens group G2 having negative refractive power, and a third lens group G3 having positive refractive power.

The first lens group G1 is formed of, disposed in order from the object, a cemented positive lens formed by cementing a negative meniscus lens L11 and a positive meniscus lens L12 each having a convex surface facing the object.

The second lens group G2 is formed of, disposed in order from the object, a negative meniscus lens L21 having a convex surface facing the object, a biconcave lens L22, and a positive meniscus lens L23 having a convex surface facing the object. A surface of the negative meniscus lens L21 to the object is aspherical.

The third lens group G3 is formed of, disposed in order from the object, a positive meniscus lens L31 having a convex surface facing the object, a cemented positive lens formed by cementing a biconvex lens L32 and a negative meniscus lens L33, a negative meniscus lens L34 having a convex surface facing the object, a biconvex lens L35, and a negative meniscus lens L36 having a convex surface facing an image. A surface of the negative meniscus lens L36 to the image is aspherical.

An aperture stop S determining an F-number is provided within the third lens group G3.

An image surface I is formed on an imaging element (not shown), and the imaging element is formed of a CCD or a CMOS, for example.

In the zoom optical system ZL6 according to Example 6, zooming from a wide-angle end state to a telephoto end state is made by varying an air distance between the first lens group G1 and the second lens group G2 and an air distance between the second lens group G2 and the third lens group G3. At this time, relative to the image surface I, the first lens group G1 to the third lens group G3 move to the object. The aperture stop S moves to the object integrally with the third lens group G3 upon zooming.

More specifically, in the zoom optical system ZL6 according to Example 6, zooming from the wide-angle end state to the telephoto end state is made by moving each of the lens groups G1 to G3 along the optical axis in such a manner that the air distance between the first lens group G1 and the second lens group G2 is enlarged, and the air distance between the second lens group G2 and the third lens group G3 is reduced.

The zoom optical system ZL6 according to Example 6 has a configuration in which focusing is made by moving the positive meniscus lens L31 having the convex surface facing the object, in the third lens group G3, along the optical axis direction, and as shown by an arrow in FIG. 26, upon causing a change from a state of focusing on infinity to a state of focusing on a short distant object, the positive meniscus lens L31 moves from the object to the image.

Upon occurrence of an image blur, correction of the image blur (vibration proofing) on the image surface I is made by moving, as a vibration-proof lens group, the negative positive meniscus lens L34 having the convex surface facing the object in the third lens group G3 so as to have a component in a direction perpendicular to the optical axis.

Table 6 below shows values of each of specifications in Example 6. Surface numbers 1 to 21 in Table 6 correspond to optical surfaces m1 to m21 shown in FIG. 26.

TABLE 6

| [Lens Data] | | | | |
|---|---|---|---|---|
| Surface Number | r | D | vd | nd |
| 1 | 53.5681 | 1.6000 | 23.80 | 1.84666 |
| 2 | 37.0346 | 5.7211 | 55.52 | 1.69680 |
| 3 | 353.3821 | D3(Variable) | | |
| *4 | 45.0000 | 1.2492 | 46.60 | 1.80400 |
| 5 | 12.0000 | 4.6255 | | |

TABLE 6-continued

| | | | | |
|---|---|---|---|---|
| 6 | −419.8499 | 1.0000 | 46.60 | 1.80400 |
| 7 | 16.0327 | 2.2223 | | |
| 8 | 17.7685 | 3.0523 | 23.80 | 1.84666 |
| 9 | 54.0639 | D9(Variable) | | |
| 10 | 30.8461 | 2.0203 | 55.52 | 1.69680 |
| 11 | 1697.1702 | D11(Variable) | | |
| 12 | ∞ | 0.5000 | (Stop S) | |
| 13 | 15.5855 | 3.7128 | 63.88 | 1.51680 |
| 14 | −13.3636 | 1.0121 | 27.57 | 1.75520 |
| 15 | −31.5468 | 4.5348 | | |
| 16 | 52.8796 | 1.0000 | 29.37 | 1.95000 |
| 17 | 26.1372 | 4.8969 | | |
| 18 | 23.6866 | 2.7133 | 46.97 | 1.54072 |
| 19 | −63.5925 | 1.9047 | | |
| 20 | −10.9032 | 1.5000 | 46.60 | 1.80400 |
| *21 | −19.7349 | Bf(Variable) | | |

[Aspherical Surface Data]

The 4th Surface
$\kappa$ = 1.0000
A4 = −5.26610E−06
A6 = −3.69410E−08
A8 = 1.17750E−10
A10 = −9.98120E−14
The 21st Surface
$\kappa$ = 1.0000
A4 = 2.90520E−05
A6 = −1.19970E−08
A8 = −6.98280E−10
A10 = 0.00000E+00

[Various Data]

| | |
|---|---|
| f | 18.74~52.08 |
| Fno | 3.77~5.71 |
| ω | 39.16~14.81 |
| Y | 14.25~14.25 |
| TL | 79.523~109.107 |
| Bf | 18.021~35.053 |

[Variable Distance Data]

| | (Infinity) | | | (Imaging Distance 2 m) | | |
|---|---|---|---|---|---|---|
| | Wide-Angle End | Intermediate | Telephoto End | Wide-Angle End | Intermediate | Telephoto End |
| f, β | 18.741 | 34.496 | 52.082 | −0.010 | −0.018 | −0.026 |
| D0 | 0.000 | 0.000 | 0.000 | 1919.796 | 1906.950 | 1890.212 |
| D3 | 1.546 | 11.351 | 25.190 | 1.546 | 11.351 | 25.190 |
| D9 | 13.592 | 5.482 | 2.500 | 13.794 | 5.765 | 2.958 |
| D11 | 3.099 | 3.099 | 3.099 | 2.897 | 2.816 | 2.641 |
| Bf | 18.021 | 29.172 | 35.053 | 18.021 | 29.172 | 35.053 |

[Lens Group Data]

| Group Number | Group First Surface | Group Focal Length |
|---|---|---|
| G1 | 1 | 100.52307 |
| G2 | 4 | −15.10823 |
| G3 | 10 | 19.34026 |

[Conditional Expression Corresponding Value]

$f3/fw$=1.03   Conditional Expression (30):

$f1/f3$=5.20   Conditional Expression (31):

$f2/(-f3)$=0.78   Conditional Expression (32):

$f1/(-f2)$=6.65   Conditional Expression (33):

$\omega w$=39.16   Conditional Expression (34):

$ft/fw$=2.78   Conditional Expression (35):

$f3/fw$=1.03   Conditional Expression (36):

$f1/f3$=5.20   Conditional Expression (37):

$f2/(-f3)$=0.78   Conditional Expression (38):

$f1/(-f2)$=6.65   Conditional Expression (39):

$\omega w$=39.16   Conditional Expression (40):

$ft/fw$=2.78   Conditional Expression (41):

Table 6 shows that the zoom optical system ZL6 according to Example 6 satisfies the conditional expressions (30) to (41).

Figure 27B:
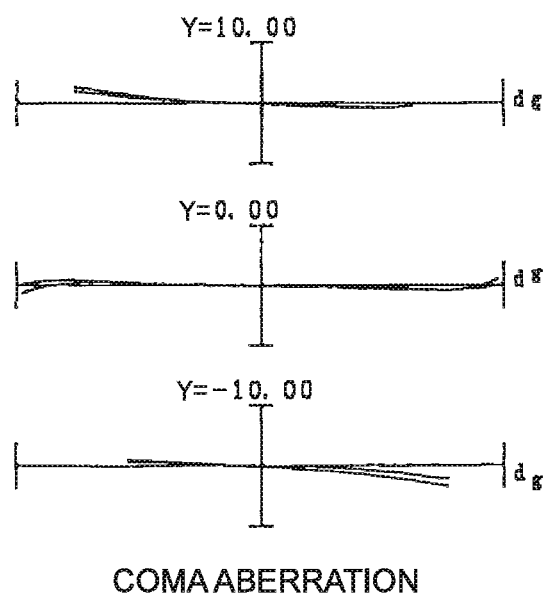
Figure 28A:
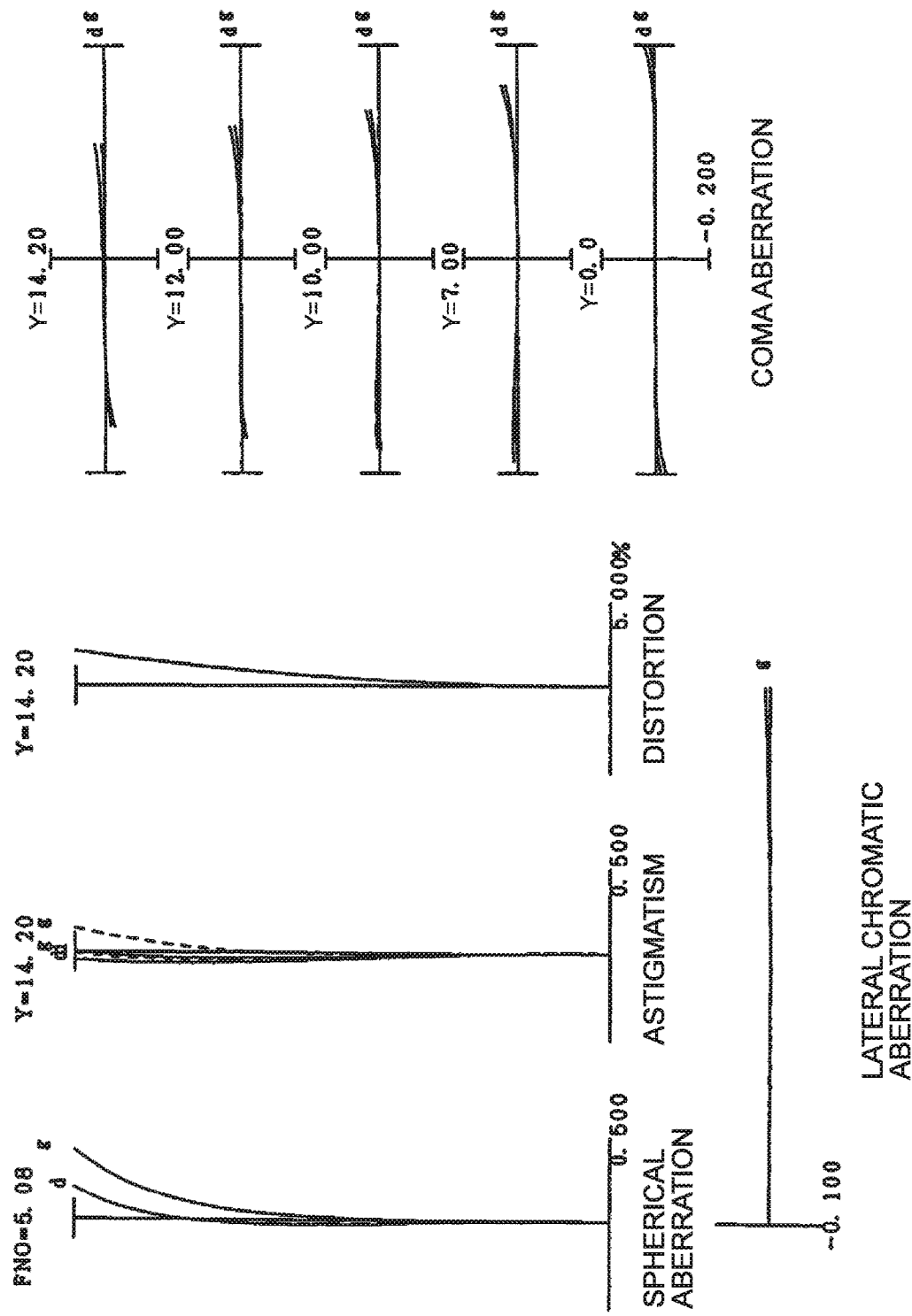
Figure 28B:
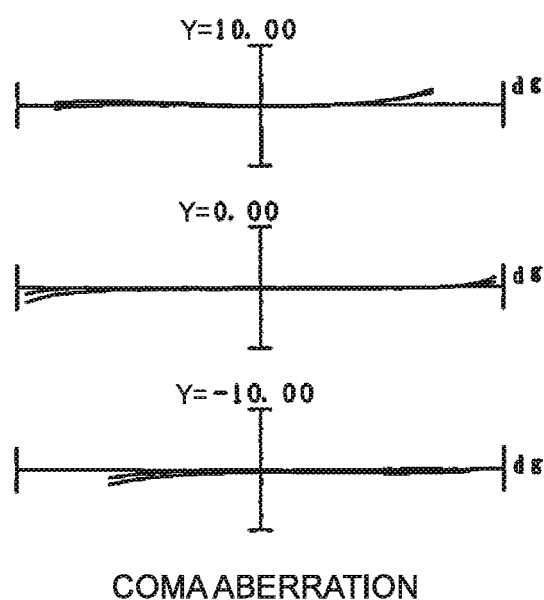
Figure 28C:
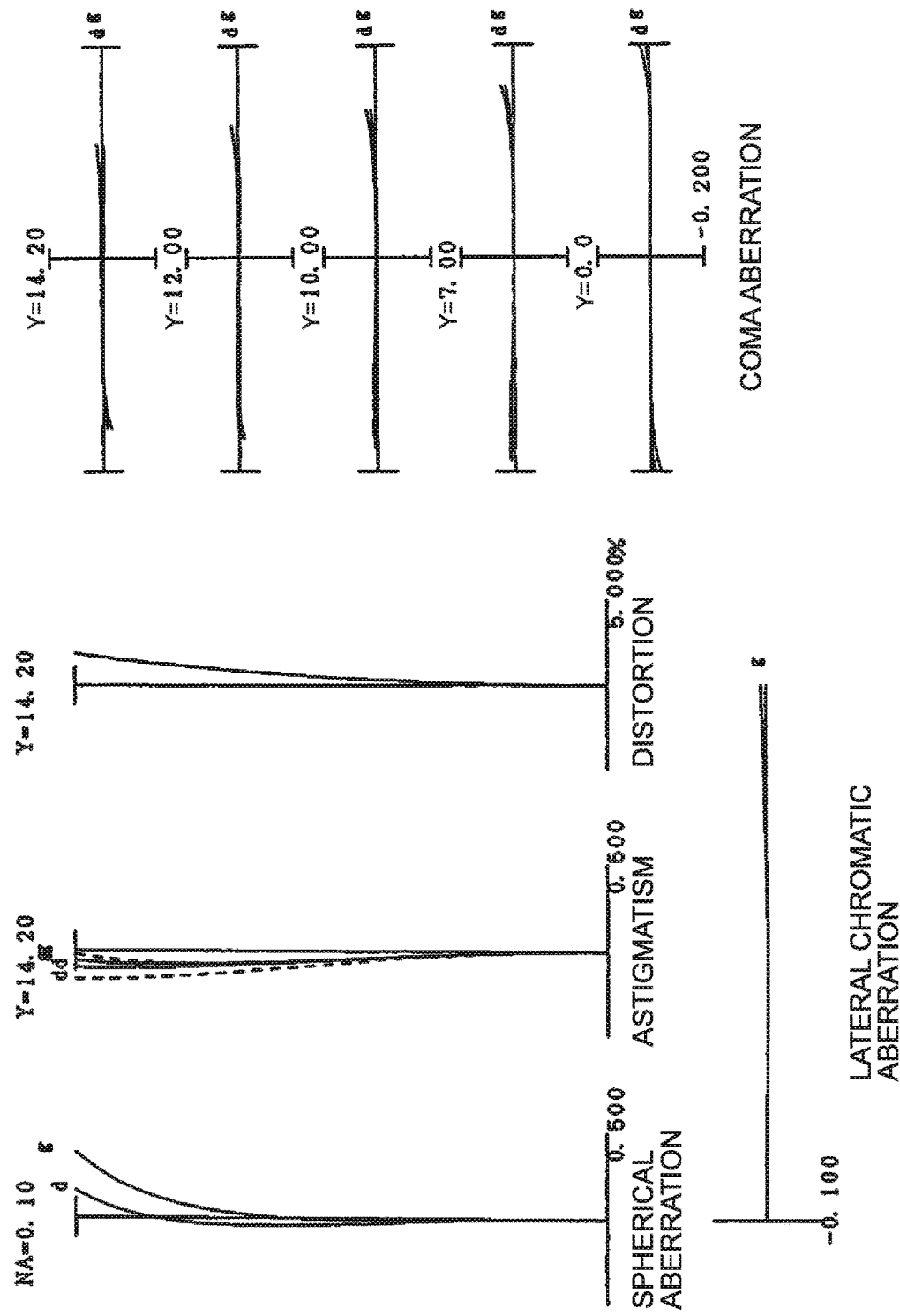
Figure 29A:
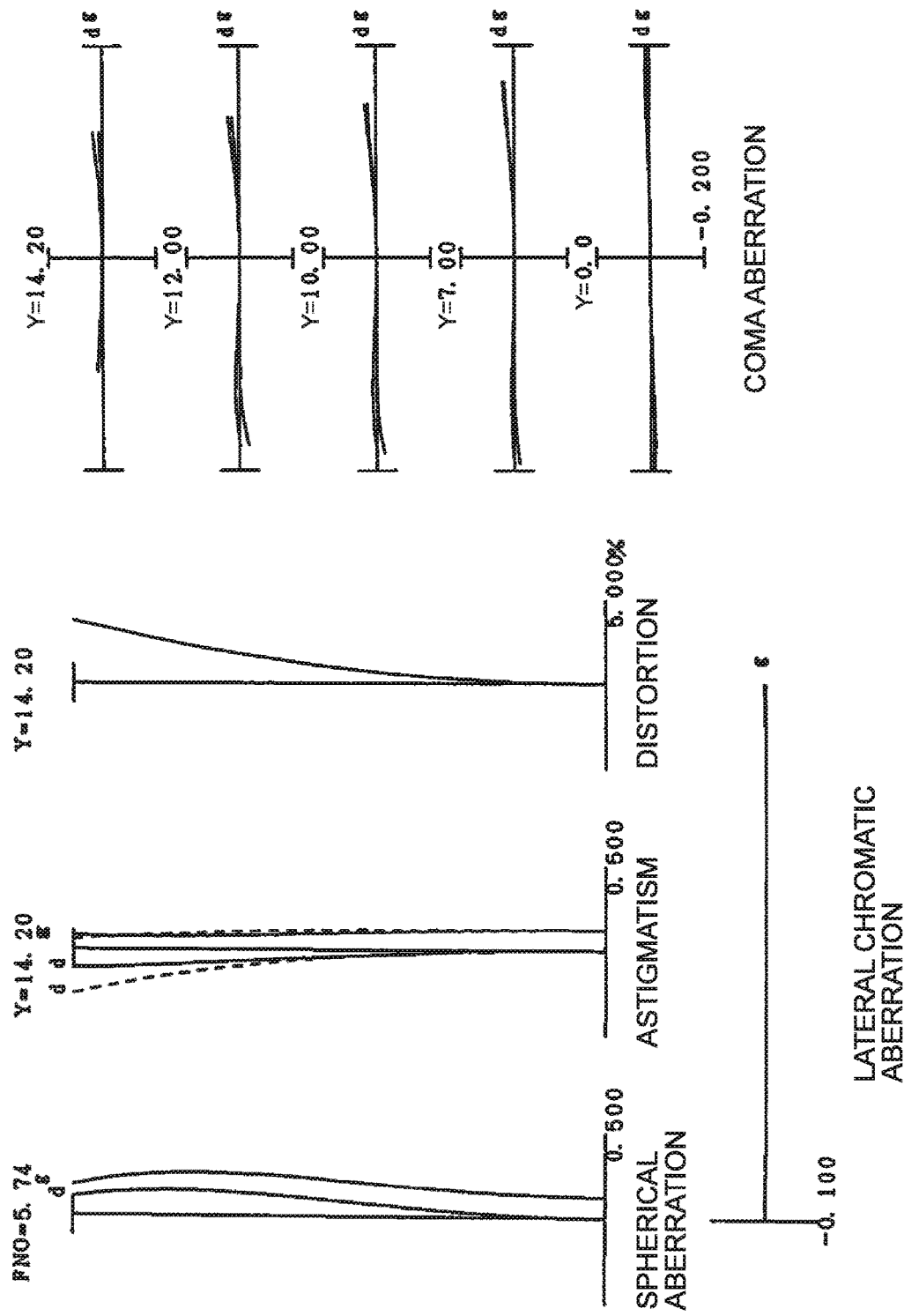
Figure 29B:
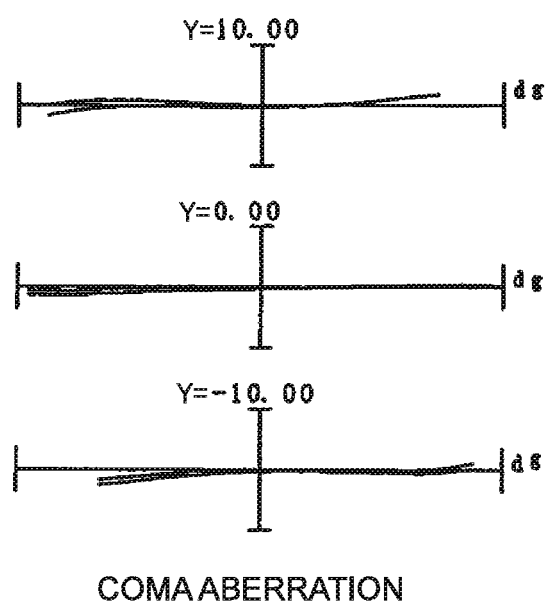
Figure 29C:
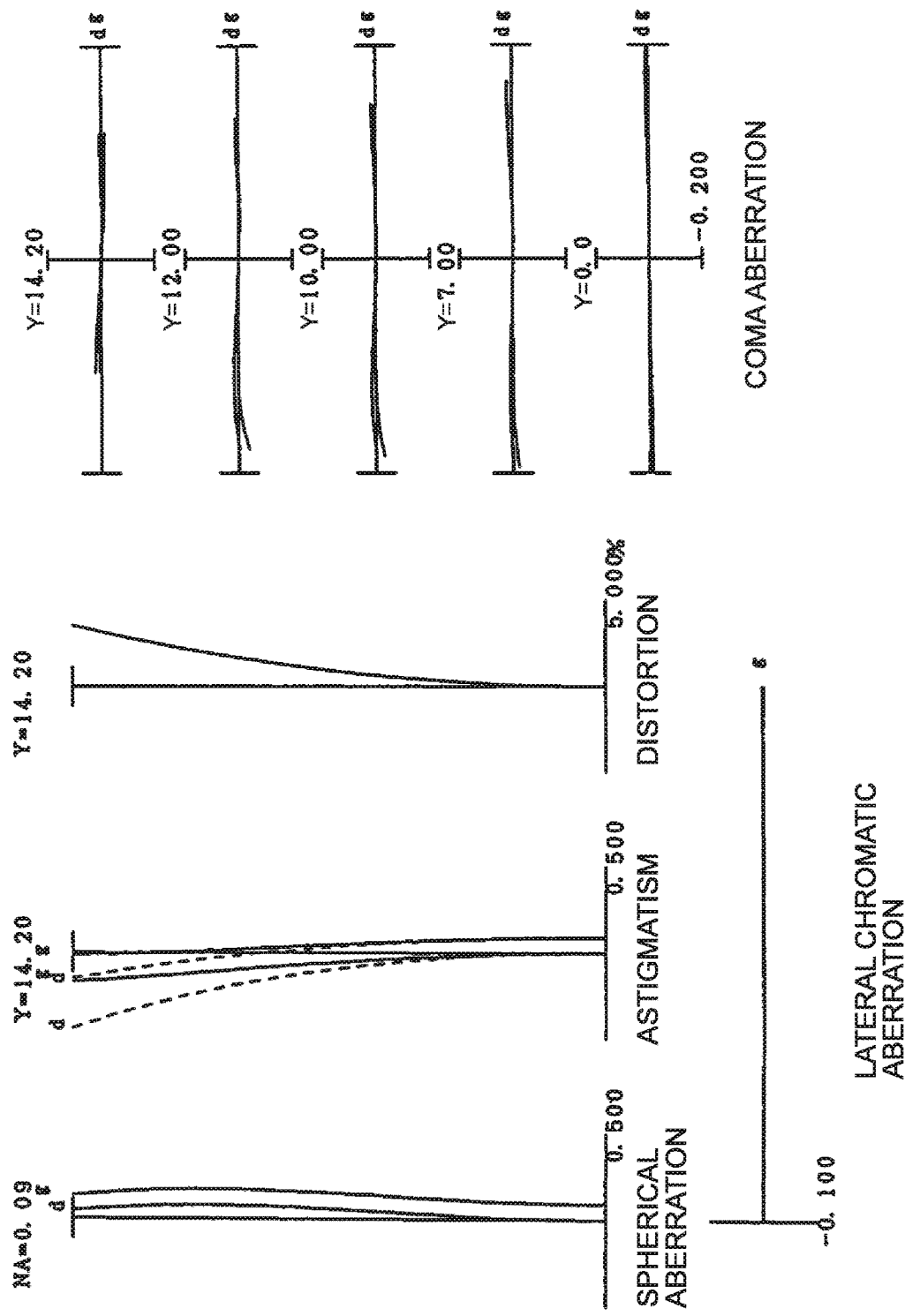

FIGS. 27A, 27B and 27C are graphs showing aberrations of the zoom optical system ZL6 according to Example 6 in a wide-angle end state (f=18.74), in which FIG. 27A is graphs showing various aberrations upon focusing on infinity, FIG. 27B is graphs showing coma aberration when an image blur is corrected (a vibration-proof lens group shift amount=0.2 mm) upon focusing on infinity, and FIG. 27C is graphs showing various aberrations upon focusing on a short distant object (imaging magnification β=−0.010). FIGS. 28A, 28B and 28C are graphs showing aberrations of the zoom optical system ZL6 according to Example 6 in an intermediate focal length state (f=34.50), in which FIG. 28A is graphs showing various aberrations upon focusing on infinity, FIG. 28B is graphs showing coma aberration when an image blur is corrected (a vibration-proof lens group shift amount=0.2 mm) upon focusing on infinity, and FIG. 28C is graphs showing various aberrations upon focusing on a short distant object (imaging magnification β=−0.018). FIGS. 29A, 29B and 29C are graphs showing aberrations of the zoom optical system ZL6 according to Example 6 in a telephoto end state (f=52.08), in which FIG. 29A is graphs showing various aberrations upon focusing on infinity, FIG. 29B is graphs showing coma aberration when an image blur is corrected (a vibration-proof lens group shift amount=0.2 mm) upon focusing on infinity, and FIG. 29C is graphs showing various aberrations upon focusing on a short distant object (imaging magnification β=−0.026).

From each of the graphs showing aberration shown in FIGS. 27A-27C, 28A-28C and 29A-29C, the zoom optical system ZL6 according to Example 6 is found to have high imaging performance in which various aberrations are successfully corrected from the wide-angle end state to the telephoto end state. Moreover, the zoom optical system ZL6 is found to have high imaging performance also upon correcting the image blur.

Example 7

Example 7 will be described using FIG. 30 to FIGS. 31A-31C, 32A-32C, 33A-33C and Table 7. As shown in FIG. 30, a zoom optical system ZL (ZL7) according to Example 7 is configured of, disposed in order from an object along an optical axis, a first lens group G1 having positive refractive power, a second lens group G2 having negative refractive power, and a third lens group G3 having positive refractive power.

The first lens group G1 is formed of, disposed in order from the object, a cemented positive lens formed by cementing a negative meniscus lens L11 having a convex surface facing the object and a biconvex lens L12.

The second lens group G2 is formed of, disposed in order from the object, a negative meniscus lens L21 having a convex surface facing the object, a biconcave lens L22, and a positive meniscus lens L23 having a convex surface facing the object. A surface of the negative meniscus lens L21 to the object is aspherical.

The third lens group G3 is formed of, disposed in order from the object, a positive meniscus lens L31 having a convex surface facing the object, a cemented positive lens formed by cementing a biconvex lens L32 and a negative meniscus lens L33 having a convex surface facing an image, a biconvex lens L34, and a biconcave lens L35. A surface of the negative meniscus lens L34 to the image is aspherical.

An aperture stop S determining an F-number is provided within the third lens group G3.

An image surface I is formed on an imaging element (not shown), and the imaging element is formed of a CCD or a CMOS, for example.

In the zoom optical system ZL7 according to Example 7, zooming from a wide-angle end state to a telephoto end state is made by varying an air distance between the first lens group G1 and the second lens group G2 and an air distance between the second lens group G2 and the third lens group G3. At this time, relative to the image surface I, the first lens group G1 to the third lens group G3 move to the object. The aperture stop S moves to the object integrally with the third lens group G3 upon zooming.

More specifically, in the zoom optical system ZL7 according to Example 7, zooming from the wide-angle end state to the telephoto end state is made by moving each of the lens groups G1 to G3 along the optical axis in such a manner that the air distance between the first lens group G1 and the second lens group G2 is enlarged, and the air distance between the second lens group G2 and the third lens group G3 is reduced.

The zoom optical system ZL7 according to Example 7 has a configuration in which focusing is made by moving the biconvex lens L34 of the third lens group G3 along an optical axis direction, and as shown by an arrow in FIG. 30, upon causing a change from a state of focusing on infinity to a state of focusing on a short distant object, the biconvex lens L34 moves from the object to the image.

Upon occurrence of an image blur, correction of the image blur (vibration proofing) on the image surface I is made by moving, as a vibration-proof lens group, the positive meniscus lens L31 having the convex surface facing the image in the third lens group G3 so as to have a component in a direction perpendicular to the optical axis.

Table 7 below shows values of each of specifications in Example 7. Surface numbers 1 to 19 in Table 7 correspond to optical surfaces m1 to m19 shown in FIG. 30.

TABLE 7

| [Lens Data] | | | | |
|---|---|---|---|---|
| Surface Number | r | D | vd | nd |
| 1 | 53.2376 | 1.6000 | 23.80 | 1.84666 |
| 2 | 38.1514 | 6.3571 | 63.34 | 1.61800 |
| 3 | −369.5355 | D3(Variable) | | |
| *4 | 37.0679 | 1.2789 | 52.34 | 1.75500 |
| 5 | 11.0000 | 5.1524 | | |
| 6 | −55.1564 | 1.0000 | 46.60 | 1.80400 |
| 7 | 24.6508 | 0.5019 | | |
| 8 | 17.1923 | 3.0456 | 23.80 | 1.84666 |

TABLE 7-continued

| | | | | |
|---|---|---|---|---|
| 9 | 55.8429 | D9(Variable) | | |
| 10 | −147.8871 | 1.8235 | 59.42 | 1.58313 |
| 11 | −38.8546 | 0.9660 | | |
| 12 | ∞ | 0.4673 | (Stop S) | |
| 13 | 13.2618 | 3.3759 | 65.44 | 1.60300 |
| 14 | −18.1264 | 1.0943 | 29.37 | 1.95000 |
| 15 | −141.8073 | D15(Variable) | | |
| 16 | 32.4435 | 1.9144 | 49.62 | 1.77250 |
| *17 | −28.4962 | D17(Variable) | | |
| 18 | −19.1230 | 1.1000 | 46.59 | 1.81600 |
| 19 | 55.1349 | Bf(Variable) | | |

[Aspherical Surface Data]

The 4th Surface
κ = 1.0000
A4 = −2.53250E−05
A6 = −1.03610E−07
A8 = 7.17390E−10
A10 = −2.12490E−12
The 17th Surface
κ = 1.0000
A4 = 7.38500E−05
A6 = 4.27730E−07
A8 = 0.00000E+00
A10 = 0.00000E+00

[Various Data]

| | |
|---|---|
| f | 18.72~52.00 |
| Fno | 3.60~5.57 |
| ω | 39.22~14.29 |
| Y | 14.25~14.25 |
| TL | 74.332~95.718 |
| Bf | 18.038~32.068 |

[Variable Distance Data]

| | (Infinity) | | | (Imaging Distance 2 m) | | |
|---|---|---|---|---|---|---|
| | Wide-Angle End | Intermediate | Telephoto End | Wide-Angle End | Intermediate | Telephoto End |
| f, β | 18.724 | 35.500 | 52.000 | −0.010 | −0.018 | −0.027 |
| D0 | 0.000 | 0.000 | 0.000 | 1924.987 | 1912.247 | 1903.600 |
| D3 | 1.000 | 14.288 | 20.264 | 1.000 | 14.288 | 20.264 |
| D9 | 13.907 | 5.856 | 2.000 | 13.907 | 5.856 | 2.000 |
| D15 | 8.710 | 8.710 | 8.710 | 8.661 | 8.597 | 8.533 |
| D17 | 3.000 | 3.000 | 3.000 | 3.049 | 3.112 | 3.177 |
| Bf | 18.038 | 25.541 | 32.068 | 18.038 | 25.541 | 32.068 |

[Lens Group Data]

| Group Number | Group First Surface | Group Focal Length |
|---|---|---|
| G1 | 1 | 86.38416 |
| G2 | 4 | −15.99559 |
| G3 | 10 | 17.86718 |

[Conditional Expression Corresponding Value]

$f3/fw=0.95$     Conditional Expression (30):

$f1/f3=4.83$     Conditional Expression (31):

$f2/(-f3)=0.90$     Conditional Expression (32):

$f1/(-f2)=5.40$     Conditional Expression (33):

$ωw=39.22$     Conditional Expression (34):

$ft/fw=2.78$     Conditional Expression (35):

$f3/fw=0.95$     Conditional Expression (36):

$f1/f3=4.83$     Conditional Expression (37):

$f2/(-f3)=0.90$     Conditional Expression (38):

$f1/(-f2)=5.40$     Conditional Expression (39):

$ωw=39.22$     Conditional Expression (40):

$ft/fw=2.78$     Conditional Expression (41):

Table 7 shows that the zoom optical system ZL7 according to Example 7 satisfies the conditional expressions (30) to (41).

Figure 31A:
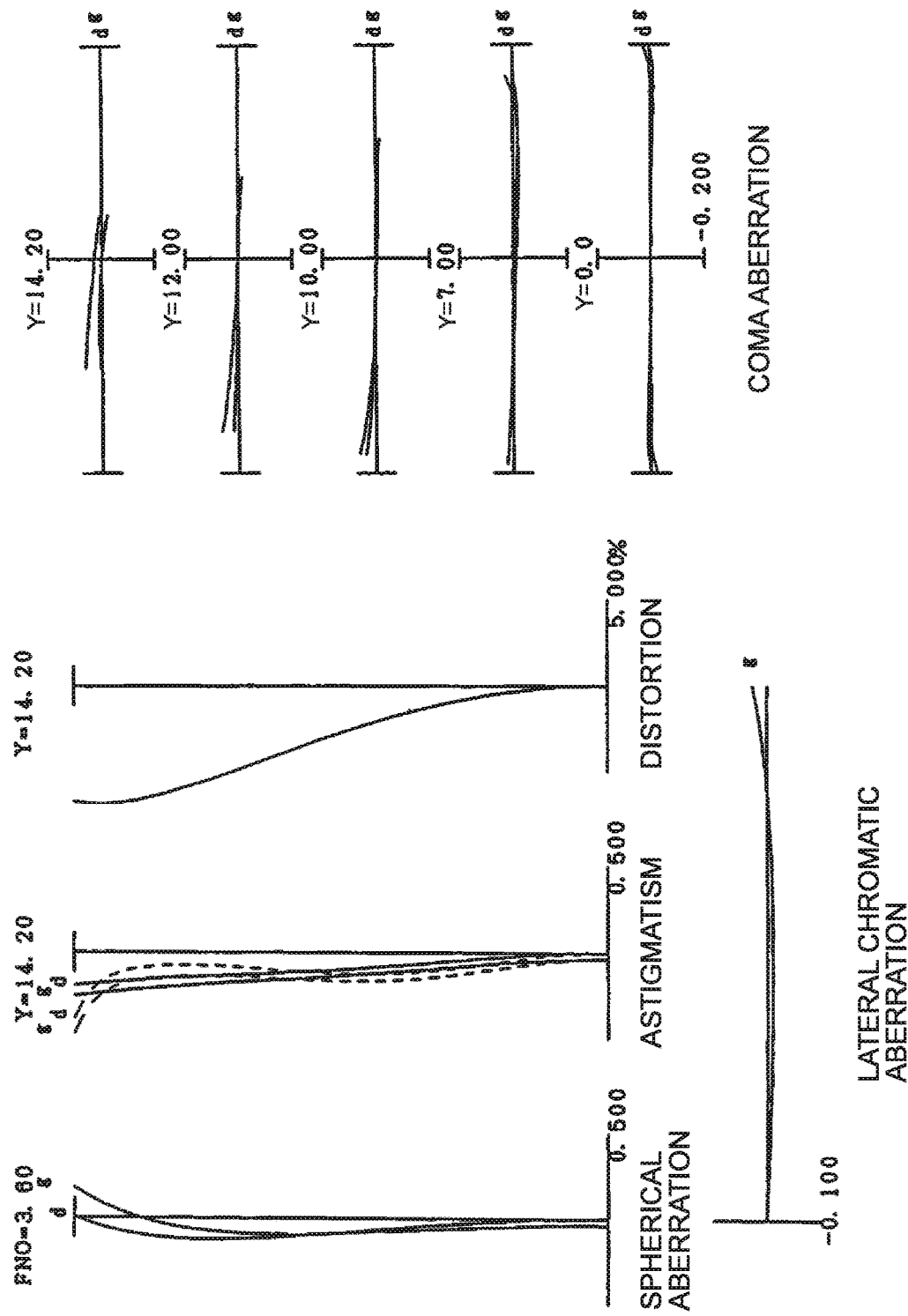
Figure 31B:
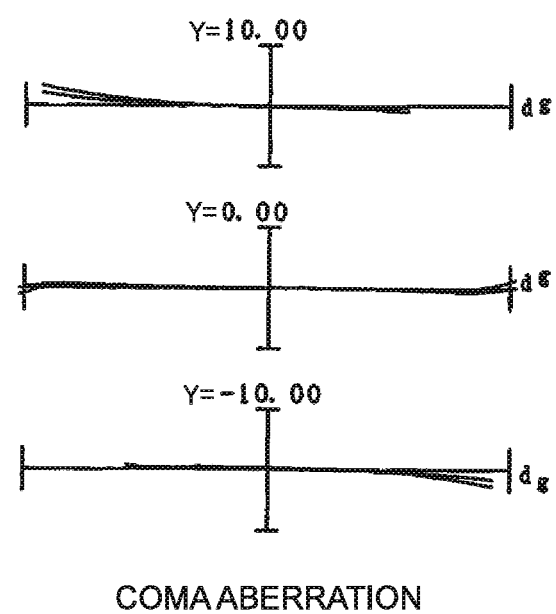
Figure 31C:
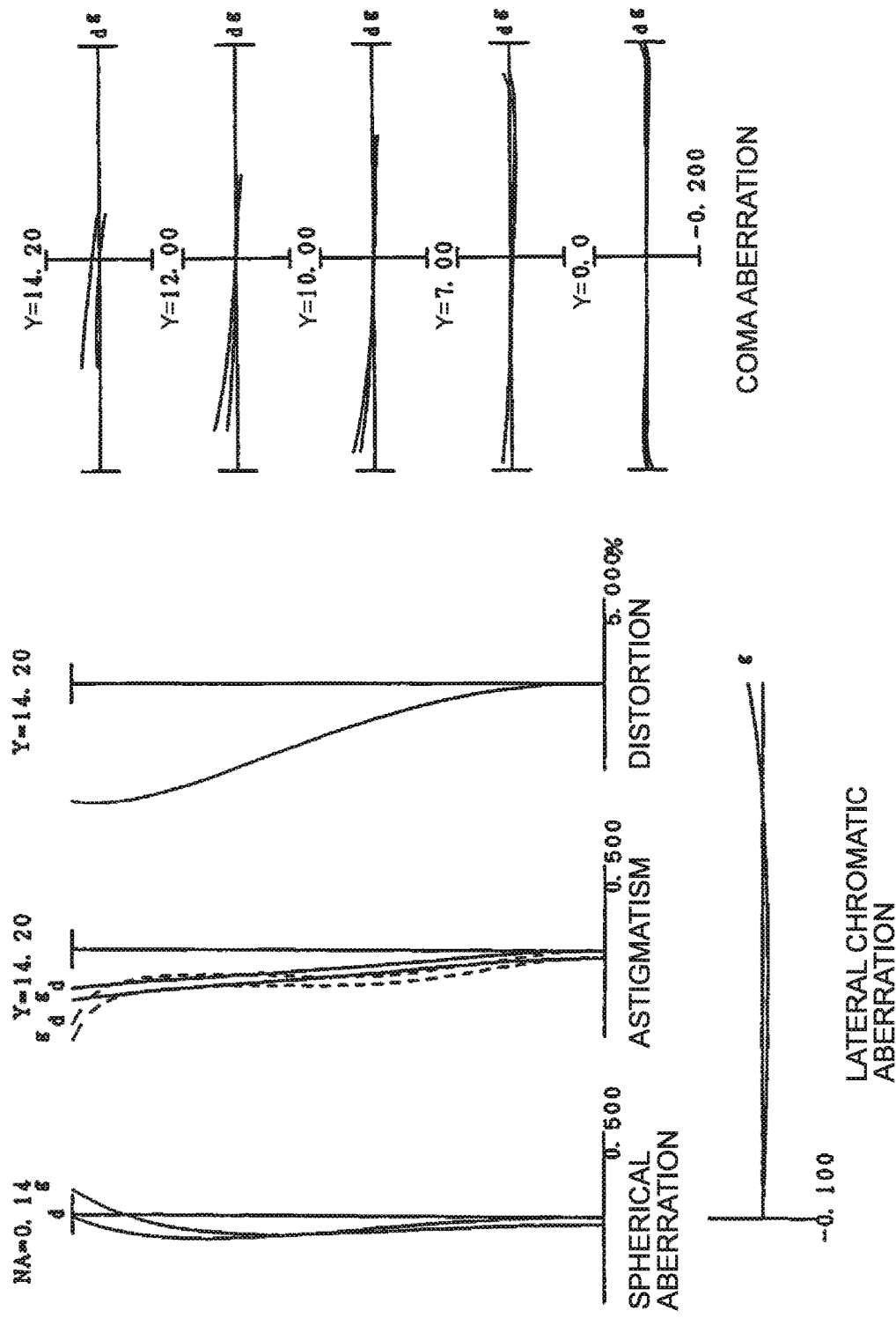
Figure 32B:
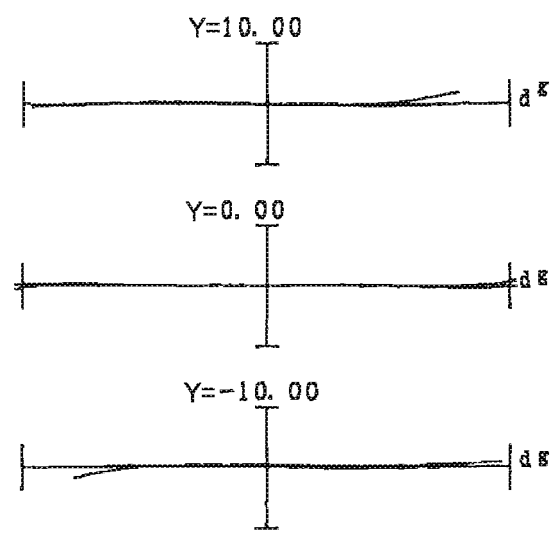
Figure 32C:
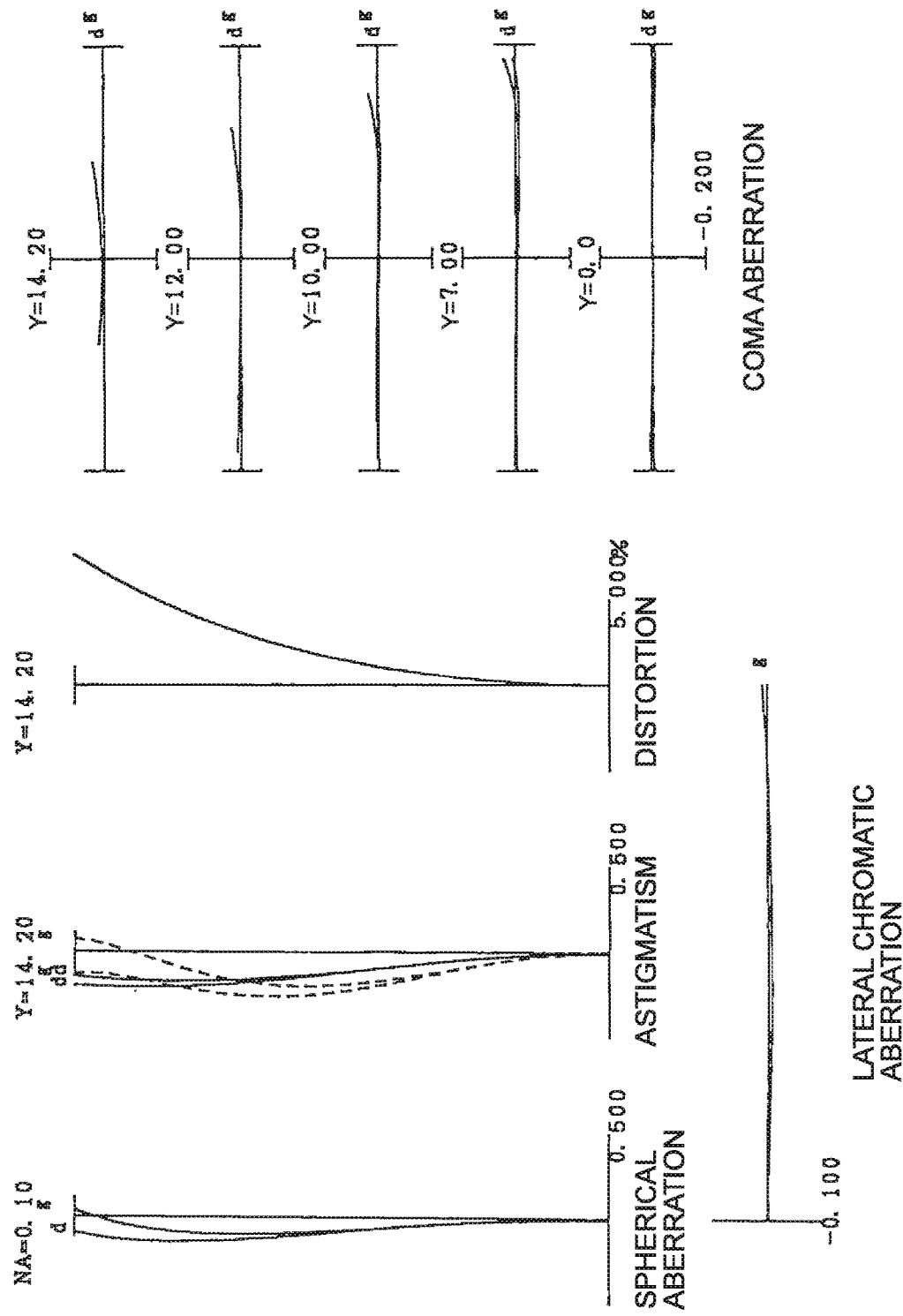
Figure 33B:
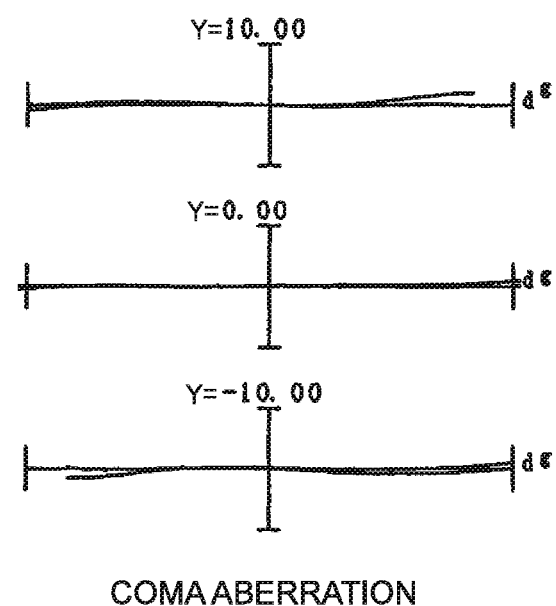

FIGS. 31A, 31B and 31C are graphs showing aberrations of the zoom optical system ZL7 according to Example 7 in a wide-angle end state (f=18.72), in which FIG. 31A is graphs showing various aberrations upon focusing on infinity, FIG. 31B is graphs showing coma aberration when an image blur is corrected (a vibration-proof lens group shift amount=0.2 mm) upon focusing on infinity, and FIG. 31C is graphs showing various aberrations upon focusing on a short distant object (imaging magnification β=−0.010). FIGS. 32A, 32B and 32C are graphs showing aberrations of the zoom optical system ZL7 according to Example 7 in an intermediate focal length state (f=35.50), in which FIG. 32A is graphs showing various aberrations upon focusing on infinity, FIG. 32B is graphs showing coma aberration when an image blur is corrected (a vibration-proof lens group shift amount=0.2 mm) upon focusing on infinity, and FIG. 32C is graphs showing various aberrations upon focusing on a short distant object (imaging magnification β=−0.018). FIGS. 33A, 33B and 33C are graphs showing aberrations of the zoom optical system ZL7 according to Example 7 in a telephoto end state (f=52.00), in which FIG. 33A is graphs showing various aberrations upon focusing on infinity, FIG. 33B is graphs showing coma aberration when an image blur is corrected (a vibration-proof lens group shift amount of 0.2 mm) upon focusing on infinity, and FIG. 33C is graphs showing various aberrations upon focusing on a short distant object (imaging magnification β=−0.027).

From each of the graphs showing aberration shown in FIGS. 31A-31C, 32A-32C and 33A-33C, the zoom optical system ZL7 according to Example 7 is found to have high imaging performance in which various aberrations are successfully corrected from the wide-angle end state to the telephoto end state. Moreover, the zoom optical system ZL7 is found to have high imaging performance also upon correcting the image blur.

According to each Example described above, the zoom optical system having successful optical performance can be realized.

In addition, each Example described above shows one specific example of the zoom optical system according to each of the fifth and sixth embodiments, and the zoom optical systems according to the fifth and sixth embodiments are not limited thereto. In the fifth and sixth embodiments, the following content can be appropriately adopted within the range in which the optical performance is not adversely affected.

In Examples using numerical values according to the fifth and sixth embodiments, a three-group configuration was shown. However, the present invention can also be applied to other configurations such as a four-group configuration. For example, a configuration is allowed in which a lens or lens group is added thereto on a side closest to the object, or a configuration in which a lens or lens group is added thereto on a side closest to the image. Moreover, the lens group represents a part which is separated by the air distance which changes upon zooming or focusing and has at least one lens.

In the fifth and sixth embodiments, the zoom optical system may be formed into a focusing lens group in which focusing on an infinite distant object to a short distant object is made by moving a single lens group or a plurality of lens groups, or a partial lens group in the optical axis direction. The focusing lens group can also be applied to autofocusing, and is also suitable for a motor drive (using an ultrasonic motor, or the like) for autofocusing. In particular, at least a part of the third lens group G3 is preferably applied as the focusing lens group.

In the fifth and sixth embodiments, the zoom optical system may be formed into the vibration-proof lens group in which the image blur caused by camera shake is corrected by moving the lens group or the partial lens group so as to have the component in the direction perpendicular to the optical axis, or rotationally moving (swinging) the lens group or the partial lens group in an in-plane direction including the optical axis. In particular, at least a part of the third lens group G3 is preferably applied as the vibration-proof lens group.

In the fifth and sixth embodiments, a lens surface may be formed of a spherical surface or a flat surface, or formed of an aspherical surface. When the lens surface is spherical or flat, lens processing and assembly and adjustment are facilitated, and deterioration of optical performance by an error of the processing and assembly and adjustment can be prevented, and such a case is preferable. Moreover, when the lens surface is aspherical, the aspherical surface may be any aspherical surface, including an aspherical surface by grinding, a glass mold aspherical surface in which glass is formed into an aspherical surface shape by using a mold, and a composite type aspherical surface in which a resin is formed into the aspherical surface shape on a surface of glass. Moreover, the lens surface may be formed into a diffraction surface, or the lens may be formed into a gradient index lens (GRIN lens) or a plastic lens.

In the fifth and sixth embodiments, the aperture stop S is preferably arranged in a neighborhood of the third lens group G3 or within the third lens group G3. However, a lens frame may be used as substitution for such a role without providing a member as the aperture stop.

In the fifth and sixth embodiments, an antireflection film having high transmittance in a wide wavelength range may be applied to each lens surface in order to reduce a flare and a ghost to achieve high optical performance with high contrast.

The zoom optical systems ZL according to the fifth and sixth embodiments each have a zoom ratio of about 2 to 7.

EXPLANATION OF NUMERALS AND CHARACTERS

ZL (ZL1 to ZL7) Zoom optical system
G1 First lens group
G2 Second lens group
G3 Third lens group
S Aperture stop
I Image surface
1 Camera (imaging device)
2 Imaging lens (zoom optical system)

The invention claimed is:
1. A zoom optical system, comprising:
in order from an object, a first lens group having positive refractive power; a second lens group having negative refractive power; and a third lens group having positive refractive power,
wherein the first lens group moves toward an object and air distances between the first to the third lens groups are varied upon zooming from a wide-angle end state to a tele-photo end state,
the first lens group comprises a cemented lens consisting of a negative lens and a positive lens in order from the object,
the second lens group comprises, in order from the object, a negative lens, a negative lens, a positive lens and a negative lens,
a positive single lens is disposed closest to the object in the third lens group,
a lens group disposed closest to an image has positive refractive power and a lens disposed closest to the image is a single lens, and the following conditional expressions are satisfied:

$$4.40 < f1/(-f2) < 7.00$$

$$0.90 < f3/fw < 1.35$$

$$0.70 < (-f2)/f3 < 1.05$$

$$30.00° < \omega w < 80.00°$$ where f1 denotes a focal length of the first lens group,
f2 denotes a focal length of the second lens group,
f3 denotes a focal length of the third lens group,
fw denotes a focal length of the zoom optical system in the wide-angle end state, and
ωw denotes a half angle of view in the wide-angle end state.

2. The zoom optical system according to claim 1, wherein the following conditional expression is satisfied:

$$2.60 < f1/f3 < 8.00.$$

3. The zoom optical system according to claim 1, wherein the third lens group comprises a positive lens disposed closest to the object in the third lens group.

4. An optical apparatus comprising a lens barrel and the zoom optical system according to claim 1 disposed in the lens barrel.

5. A method for manufacturing a zoom optical system, the method comprising:

arranging lens groups in a lens barrel, the lens groups including, in order form an object, a first lens group having positive refractive power, a second lens group having negative refractive power, and a third lens group having positive refractive power, the arrangement of lens groups in the lens barrel being such that:

the first lens group moves toward an object and air distances between the first to the third lens groups are varied upon zooming from a wide-angle end state to a tele-photo end state, the first lens group comprises a cemented lens consisting of a negative lens and a positive lens in order from the object, the second lens group comprises, in order from the object, a negative lens, a negative lens, a positive lens and a negative lens, a positive single lens is disposed closest to the object in the third lens group, a lens group disposed closest to an image has positive refractive power and a lens disposed closest to the image is a single lens, and the following conditional expressions are satisfied:

$$4.40 < f1/(-f2) < 7.00$$

$$0.90 < f3/fw < 1.35$$

$$0.70 < (-f2)/f3 < 1.05$$

$$30.00° < \omega w < 80.00°$$ where f1 denotes a focal length of the first lens group, and
f2 denotes a focal length of the second lens group,
f3 denotes a focal length of the third lens group,
fw denotes a focal length of the zoom optical system in the wide-angle end state, and
ωw denotes a half angle of view in the wide-angle end state.

\* \* \* \* \*